US012794332B2

(12) United States Patent
Takahashi et al.

(10) Patent No.: US 12,794,332 B2

(45) Date of Patent: Nov. 10, 2026

(54) ACTUATOR, AND ACTUATOR AND SYSTEM THAT PRESENT PERCEPTIBLE OUTPUT

(71) Applicants: Yuki Takahashi, Tokyo (JP); Takanori Kato, Tokyo (JP); Yoshihiro Gomi, Tokyo (JP); Chikara Sekiguchi, Tokyo (JP); Yasutaka Kitamura, Tokyo (JP)

(72) Inventors: Yuki Takahashi, Tokyo (JP); Takanori Kato, Tokyo (JP); Yoshihiro Gomi, Tokyo (JP); Chikara Sekiguchi, Tokyo (JP); Yasutaka Kitamura, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 204 days.

(21) Appl. No.: 18/721,924

(22) PCT Filed: Dec. 23, 2022

(86) PCT No.: PCT/JP2022/047777

§ 371 (c)(1),
(2) Date: Jun. 20, 2024

(87) PCT Pub. No.: WO2023/120729

PCT Pub. Date: Jun. 29, 2023

(65) Prior Publication Data

US 2025/0062669 A1 Feb. 20, 2025

(30) Foreign Application Priority Data

Dec. 24, 2021 (JP) ................................ 2021-211406
Dec. 28, 2021 (JP) ................................ 2021-214748
Dec. 28, 2021 (JP) ................................ 2021-214759

(51) Int. Cl.

| | |
|---|---|
| ***H02K 33/18*** | (2006.01) |
| ***H02K 11/01*** | (2016.01) |
| ***H02K 11/215*** | (2016.01) |

(52) U.S. Cl.

CPC .......... *H02K 33/18* (2013.01); *H02K 11/014* (2020.08); *H02K 11/215* (2016.01)

(58) Field of Classification Search

CPC ..... H02K 33/18; H02K 11/215; H02K 11/014

See application file for complete search history.

(56) References Cited

U.S. PATENT DOCUMENTS 6,105,943 A * 8/2000 Nagasawa ............. H02K 33/12 267/140.14
2020/0381987 A1 * 12/2020 Takahashi ............. H02K 33/02
2022/0140718 A1 5/2022 Chiba et al.

FOREIGN PATENT DOCUMENTS

EP 3451510 3/2019
EP 3745568 12/2020

(Continued)

OTHER PUBLICATIONS

English translation of JP-2012042017-A. (Year: 2012).*

(Continued)

*Primary Examiner* — Sean Gugger

(57) ABSTRACT

An actuator includes a movable body including: a disk-shaped magnet, a pair of disk-shaped yokes fixed to front and back surfaces of the disk-shaped magnet, a pair of spring retaining parts connected at one ends to the disk-shaped yokes, respectively, and connected at other ends to central portions of circular leaf springs, respectively, and a protruding part protruding in an axial direction of the disk-shaped magnet from the other end of one spring retaining part of the pair of spring retaining parts; and a fixing body including: a coil disposed at an outer circumference of the movable body, and a case including an opening portion through which the protruding part is inserted, the case accommodating the coil and the movable body such that a protruding end side of the protruding part protrudes to an outside.

32 Claims, 67 Drawing Sheets

(56) References Cited

FOREIGN PATENT DOCUMENTS

| | | | | |
|---|---|---|---|---|
| EP | 3846326 | | | 7/2021 |
| JP | 54-121208 | | | 8/1979 |
| JP | 2009-240138 | | | 10/2009 |
| JP | 2012-042017 | | | 3/2012 |
| JP | 2012042017 | A | * | 3/2012 |
| JP | 2020-071674 | | | 5/2020 |
| WO | WO 2020/175610 | | | 9/2020 |

OTHER PUBLICATIONS

Notice of the Reasons for Rejection Dated Nov. 11, 2025 From the Japan Patent Office Re. Application No. 2021-214748 and Its Translation Into English. (6 Pages).

Supplementary European Search Report and the European Search Opinion Dated Nov. 24, 2025 From the European Patent Office Re. Application No. 22911430.1. (15 Pages).

* cited by examiner

1

1

1C

20D

1E

80E

1G

1H

1M

80N

1S

1S

1T

1U

1V

ACTUATOR, AND ACTUATOR AND SYSTEM THAT PRESENT PERCEPTIBLE OUTPUT

RELATED APPLICATIONS

This application is a National Phase of PCT Patent Application No. PCT/JP2022/047777 having International filing date of Dec. 23, 2022, which claims the benefit of priority of Japan Patent Application Nos. 2021-211406 filed on Dec. 24, 2021, 2021-214748 and 2021-214759 both filed on Dec. 28, 2021. The contents of the above applications are all incorporated by reference as if fully set forth herein in their entirety.

TECHNICAL FIELD

The present invention relates to actuators, and in particular to actuators and systems capable of presenting perceptible outputs such as a tactile output, an output of sense of force, an auditory output, etc.

BACKGROUND ART

Conventionally, a tactile sensation presenting device that applies vibration to a touch panel by an actuator has been known as one of technologies for feedback of an operation feeling (tactile sensation) during a touch operation to a finger pad or the like of a user who has touched the touch panel.

For example, Patent Literature (hereinafter, referred to as "PTL") 1 discloses a tactile sensation presenting device including an operation detecting part that detects an operation amount of an operation on an operation surface of a panel, an actuator that applies vibration to the operation surface, and a control part that performs drive control of the actuator based on a result of the operation detecting part. The tactile sensation presenting device disclosed in PTL 1 applies a haptic feeling by performing, as presentation of vibration of a natural strength, tactile sensation presentation in which uncomfortable feeling felt by a user is reduced by changing modes of the drive control of the actuator depending on the amount of change in the operation amount at the time of a release operation.

CITATION LIST

Patent Literature

PTL 1

Japanese Patent Application Laid-Open No. 2020-071674

SUMMARY OF INVENTION

Technical Problem

Meanwhile, the tactile sensation presenting device as described above is desired to present a user with a sufficient haptic feeling in quick response to an operation, that is, to perform strong feedback. To this end, it is required to apply vibration generated by the actuator to the user suitably quickly.

Further, in the tactile sensation presenting device of PTL 1, operation detection is mainly performed by a strain gauge or a pressure detecting part, which is the operation detecting part, and a haptic feedback function is performed by an actuator such as a piezo actuator or a voice coil motor.

As described above, many of such tactile sensation presenting devices as disclosed in PTL 1 is configured such that the operation detection function and the haptic feedback function are performed by the strain gauge or the like and the piezo actuator separate from each other. Thus, these parts have their respective mounting positions and it is necessary to perform their respective settings, and this is time-consuming.

There is also a problem that expensive sensors such as a strain gauge, a pressure sensor, and a light detection sensor are often used as the operation detecting part, and a manufacturing cost thus increases.

Therefore, as a tactile sensation presenting device, a device having a detection function and a haptic feedback function, which is easier to use, is desired.

Further, it is desired that a movable body that is to be movable operate stably without misalignment even in a case where a vibration actuator is in a mounting environment in which an external load is applied in a direction intersecting the axial direction, for example, from the outside in the radial direction.

An object of the present invention is at least one of: providing an actuator capable of applying a strong haptic feedback to a user in quick response to a user's operation; providing an actuator capable of stably providing a strong haptic feedback to a user's operation even when an external load is applied; and providing an actuator and a system that can be easily manufactured at a low cost and are easier to use and that have an operation detection function and a haptic feedback function.

Solution to Problem

One aspect of an actuator of the present invention is configured to include:

- a movable body including:
  - a disk-shaped magnet,
  - a pair of disk-shaped yokes fixed to front and back surfaces of the disk-shaped magnet,
  - a pair of spring retaining parts connected at one ends to the disk-shaped yokes, respectively, and connected at other ends to central portions of circular leaf springs, respectively, and
  - a protruding part protruding in an axial direction of the disk-shaped magnet from the other end of one spring retaining part of the pair of spring retaining parts; and
- a fixing body including:
  - a coil disposed at an outer circumference of the movable body, and
  - a case including an opening portion through which the protruding part is inserted, the case accommodating the coil and the movable body such that a protruding end side of the protruding part protrudes to an outside, the fixing body being configured to support the movable body movably in the axial direction of the disk-shaped magnet via the circular leaf springs.

Another aspect of the actuator of the present invention is configured to include:

- a movable body including:
  - a disk-shaped magnet,
  - a pair of disk-shaped yokes fixed to front and back surfaces of the disk-shaped magnet,
  - a pair of spring retaining parts connected at one ends to the disk-shaped yokes, respectively, and connected at other ends to central portions of circular leaf springs, respectively, and a protruding part protruding in an axial direction of the disk-shaped magnet from the other end of one spring retaining part of the pair of spring retaining parts; and a fixing body including:

a coil disposed at an outer circumference of the movable body, and a case including an opening portion through which the protruding part is inserted, the case accommodating the coil and the movable body such that a protruding end side of the protruding part protrudes to an outside, the fixing body being configured to support the movable body movably in the axial direction of the disk-shaped magnet via the circular leaf springs, in which the opening portion is formed to provide a gap between the opening portion and an outer circumference of the protruding part such that the protruding part moves in a non-contact manner.

Still another aspect of the actuator of the present invention is configured to include:

a movable body including:

a disk-shaped magnet, a pair of disk-shaped yokes fixed to front and back surfaces of the disk-shaped magnet, a pair of spring retaining parts joined at one ends to the disk-shaped yokes and connected at other ends to a central portion of a circular leaf spring, and a protruding part protruding in an axial direction of the disk-shaped magnet from the other end of one spring retaining part of the pair of spring retaining parts; and a fixing body including:

a coil disposed at an outer circumference of the movable body, and a case including an opening portion through which the protruding part is inserted, the case accommodating the coil and the movable body such that a protruding end side of the protruding part protrudes to an outside, the fixing body being configured to support the movable body movably in the axial direction of the disk-shaped magnet via the circular leaf springs, in which the opening portion supports an outer circumference of the protruding part so as to allow forward/backward movement of the protruding end side in the axial direction in the outside.

Yet another aspect of the actuator of the present invention is an actuator configured to drive a movable body including a magnet in response to movement of the movable body caused by an operation by a user, so as to present an output perceptible by the user, the actuator including:

a fixing body including:

a magnetic sensor configured to detect a position of the movable body that moves by the operation, and a coil configured to generate a magnetic field by energization based on a detection result of the magnetic sensor so as to move the movable body, the magnetic sensor being disposed apart from the movable body in a moving direction of the movable body.

One aspect of a system of the present invention is configured to include:

a first actuator and a second actuator, each of which is the above-described actuator; and a communication connection part configured to connect the first actuator and the second actuator for communication, in which the communication connection part controls displacement of the movable body of the second actuator based on displacement of the movable body of the first actuator.

Advantageous Effects of Invention

According to the present invention, it is possible to realize an actuator capable of applying a strong haptic feedback to a user in quick response to a user's operation. It is also possible to prevent a wobble of the protruding end of the protruding part caused by its deviating from the axial direction of the magnet that is the moving direction, and even when an external load is applied, it is possible to stably provide a strong haptic feedback in response to the user's operation. It is also possible to realize an actuator and a system having an operation detection function and a haptic feedback function which can be easily manufactured at a low cost and are easier to use.

DESCRIPTION OF EMBODIMENTS

Hereinafter, an embodiment of the present invention will be described in detail with reference to the drawings.

Embodiment 1

<Overall Configuration of Actuator 1>

Figure 1:
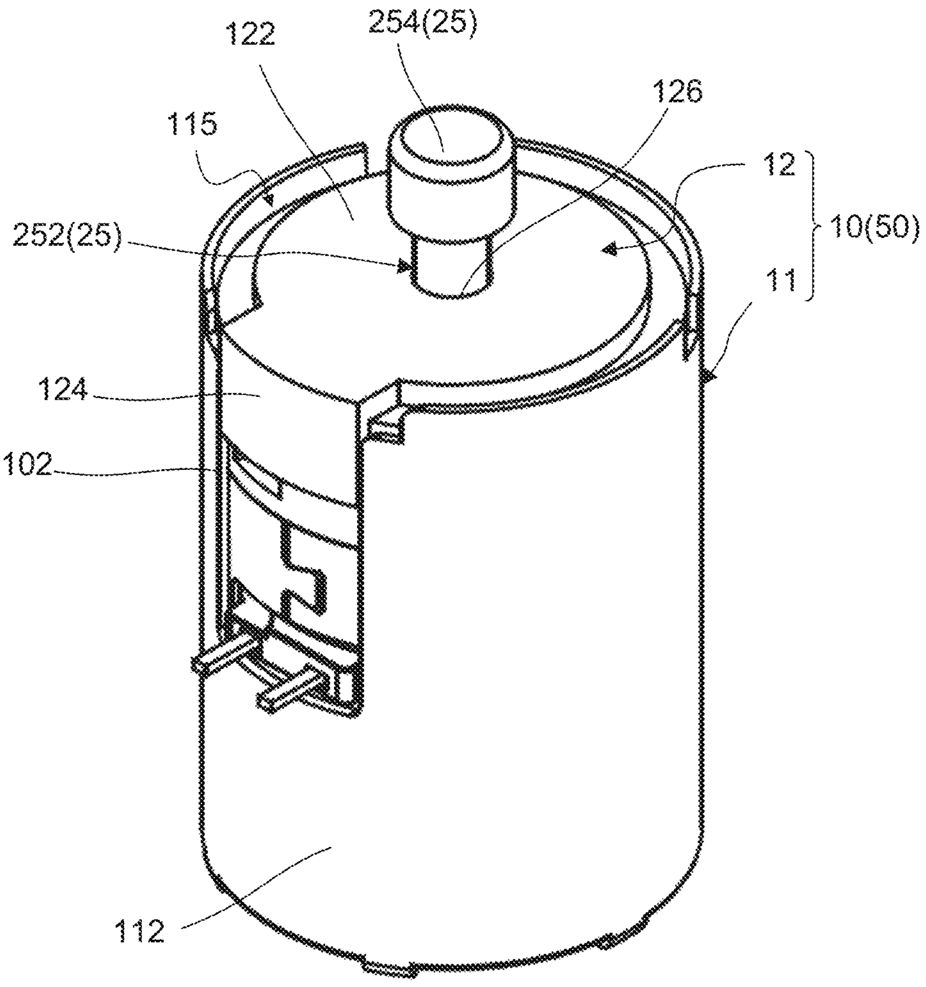
FIG. 1 is an external perspective view of an actuator according to an embodiment of the present invention.
Figure 2:
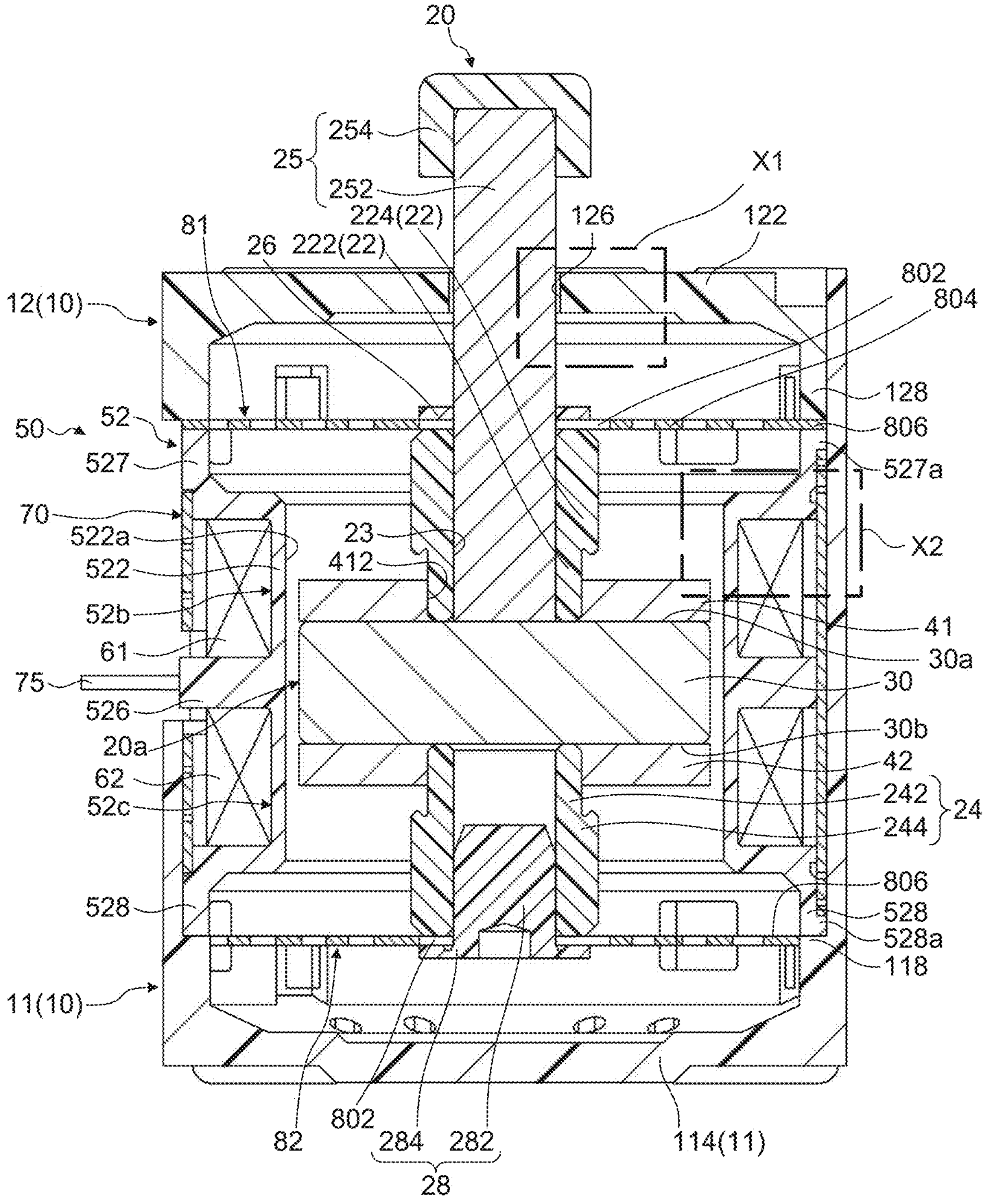
FIG. 2 is a longitudinal sectional view illustrating a configuration of a principal part of the actuator.
Figure 3:
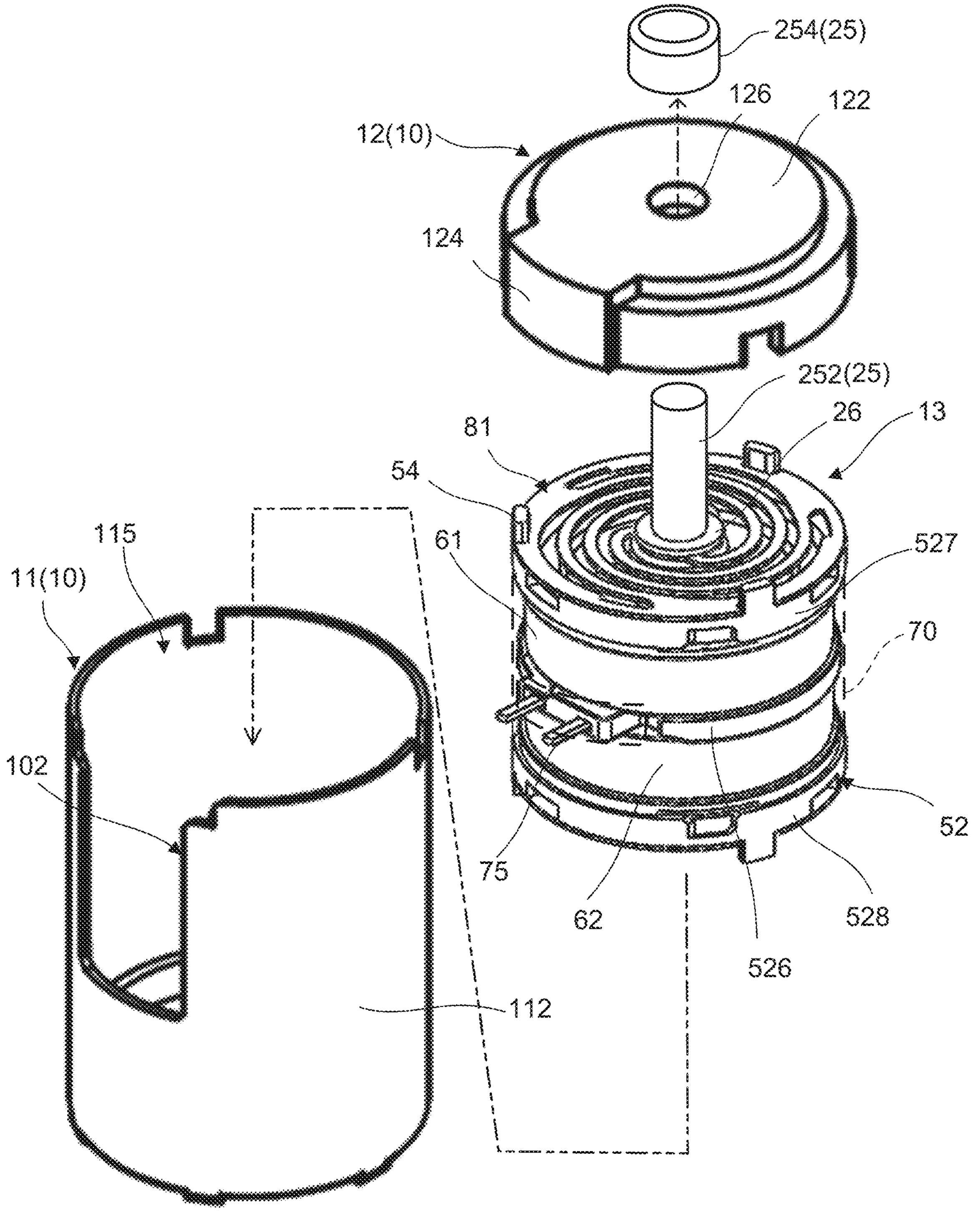
FIG. 3 illustrates an internal structure of the actuator from which a case is removed.
Figure 4:
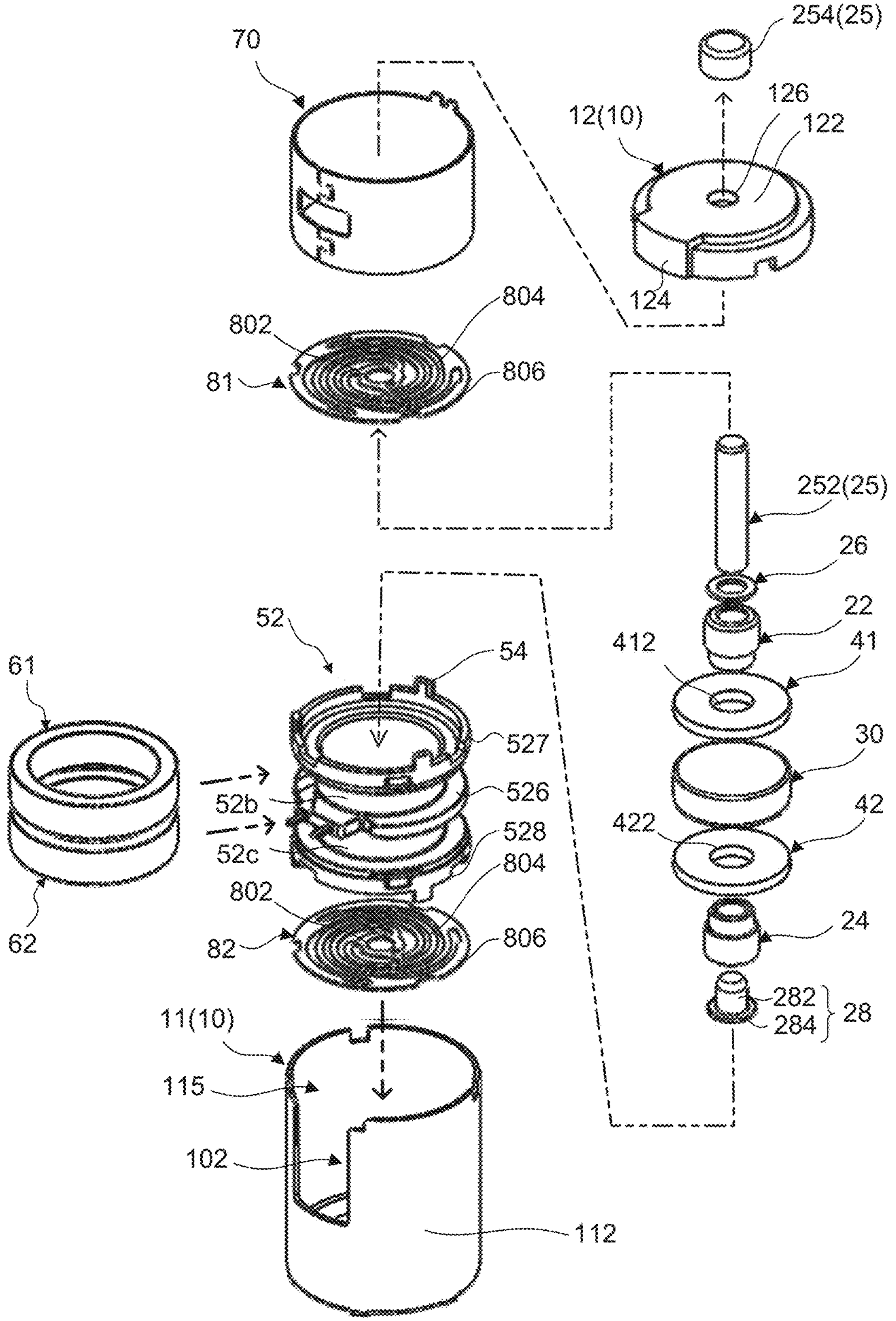
FIG. 4 is an exploded perspective view of the actuator.

FIG. 1 is an external perspective view of an actuator according to an embodiment of the present invention, and FIG. 2 is a longitudinal sectional view illustrating a configuration of a principal part of the actuator. FIG. 3 is a view illustrating an internal structure of the actuator from which a case is removed, and FIG. 4 is an exploded perspective view of the actuator. In FIG. 3, outer yoke 70 is illustrated as transparent for convenience.

Note that the "upper" side and the "lower" side in the present embodiment are given for convenience in order to facilitate understanding, and mean one side and the other side in a reciprocation direction of the movable body in the actuator. That is, when the actuator is mounted on an electronic device (not illustrated), the upper and lower sides of the actuator may be reversed and may also be oriented left and right, but it is preferable that a forward/backward movement direction of output shaft portion 252 (protruding part 25) protruding from the actuator be identical to a direction in which the user touches an operation section. The same applies to the following variations.

Actuator 1 according to Embodiment 1 is used for haptics including tactile sensation presentation technology, for example, and transmits, as a haptic feeling or a force sensation of the user, a reciprocating motion of movable body 20 in response to a touch operation by the user on an operation section. In addition, actuator 1 may present a sound to the user in order to appeal to auditory sensation.

Actuator 1 illustrated in FIGS. 1 and 2 includes protruding part 25 (output shaft portion 252) protruding from case 10 so as to be movable forward and backward, and protruding part 25 is directly connectable to an operation section (for example, a touch panel or the like) operated by the user making contact therewith. Protruding part 25 is a portion of movable body 20 movably accommodated in case 10. Actuator 1 drives the movable body in accordance with the movement of movable body 20 by the operation of the user, to present the user with an output perceptible by the user.

Note that it is preferable that actuator 1 be used as a haptics device that performs operation detection and feedback of a haptic feeling, but the present invention is not limited thereto, and may be implemented as a vibration generation source in an electronic device such as a portable game terminal device. In addition, actuator 1 may be simply used as a vibration generator, or may be used for a resonant pump, a character input keyboard, an exciter, or the like. Actuator 1 may be used as a vibration presenting device.

Actuator 1 includes output shaft portion 252 and magnet 30 in movable body 20 and coils 61 and 62 in fixing body 50, and movable body 20 can reciprocate in a straight line direction by cooperation of energized coils 61 and 62 and magnet 30. Actuator 1 includes elastic supporting parts 81 and 82 for supporting movable body 20 such that the movable body can reciprocate with respect to fixing body 50, and when movable body 20 reciprocates, output shaft portion 252 moves forward and backward in the axial direction, or in the upper-lower direction in the figure, at the outside of top surface portion 122 of case 10.

Specifically, actuator 1 includes movable body 20 including a pair of yokes 41 and 42 and a pair of spring retaining parts 22 and 24 in addition to magnet 30, and fixing body 50 including outer yoke 70 in addition to a pair of annular coils 61 and 62. A pair of elastic supporting parts 81 and 82 are provided between movable body 20 and fixing body 50.

Note that a configuration in which a pair of yokes 41 and 42, a pair of spring retaining parts 22 and 24, and a pair of coils 61 and 62 are disposed is employed, but the present invention is not limited thereto, and the number of yokes, spring retaining parts, and coils may also be one, three, or more as long as it is possible to achieve movability on one side or both side in one linear direction.

In actuator 1, coils 61 and 62, outer yoke 70, magnet 30, and yokes 41 and 42 constitute a magnetic circuit for moving movable body 20. In actuator 1, coils 61 and 62 are energized from a power supply section (not illustrated) via terminal part 75, and movable body 20 is moved. Movable body 20 can reciprocate in both directions in the axial direction which is a reciprocation direction, or in one direction which is one side in the axial direction. For example, actuator 1 moves in both directions in the axial direction (see the arrow directions indicated by "Upward in moving direction" and "Downward in moving direction" in FIG. 9).

In actuator 1 of the present embodiment, movable body 20 reciprocates in the moving direction (also referred to as the axial direction of coils 61 and 62) along a holding-portion main body (protective wall portion) 522 disposed between the coils and movable body 20 inside coils 61 and 62 held by coil holding part 52. The moving direction is not only the axial direction of coils 61 and 62, but also the magnetization direction of magnet 30, and is also the axial direction of coil holding part 52.

In addition, as illustrated in FIG. 3, actuator 1 has a configuration in which case 10 including case main body 11 and lid portion 12 accommodates therein unit 13 including fixing body 50 and movable body 20 connected to each other by elastic supporting parts 81 and 82. Accordingly, assembly of the principal part of actuator 1 can be accurately performed in a process separate from a process for case 10.

<Movable Body 20>

Figure 5:
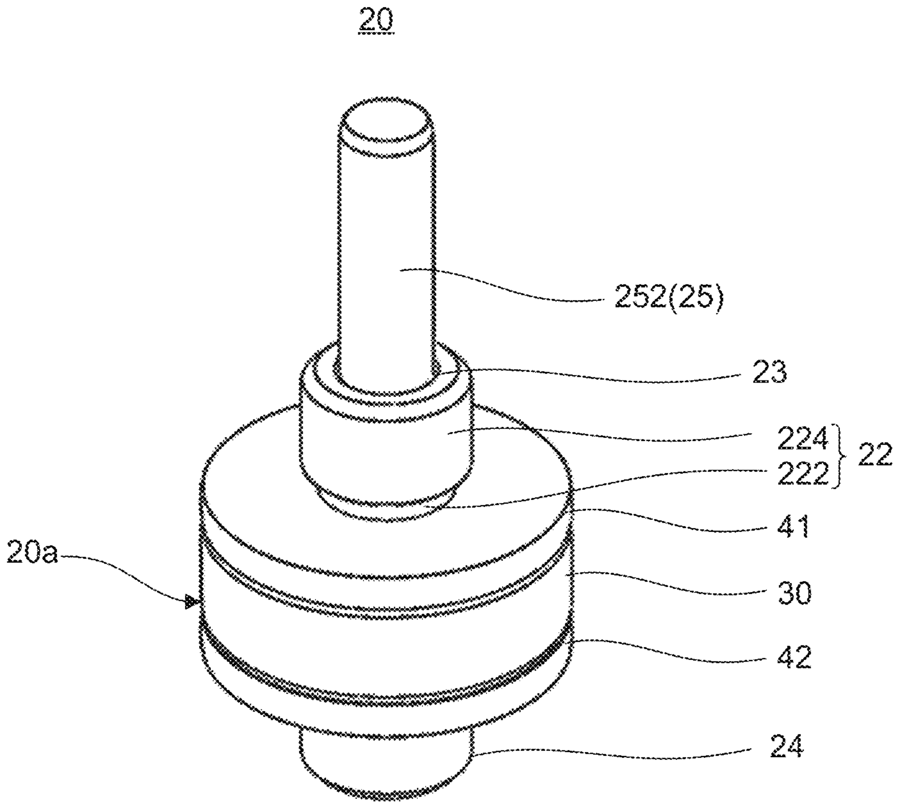
FIG. 5 is a perspective view of a movable body.
Figure 6:
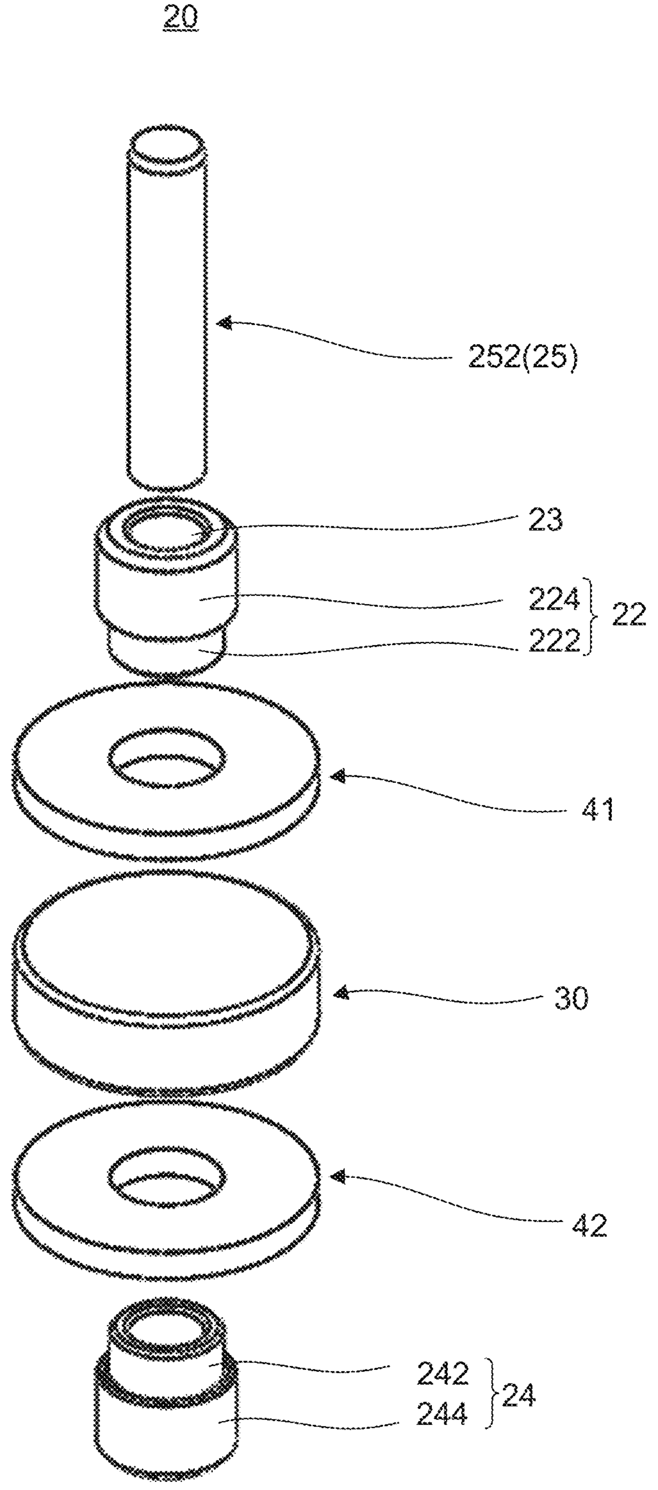
FIG. 6 is an enlarged exploded view of the movable body.
Figure 7:
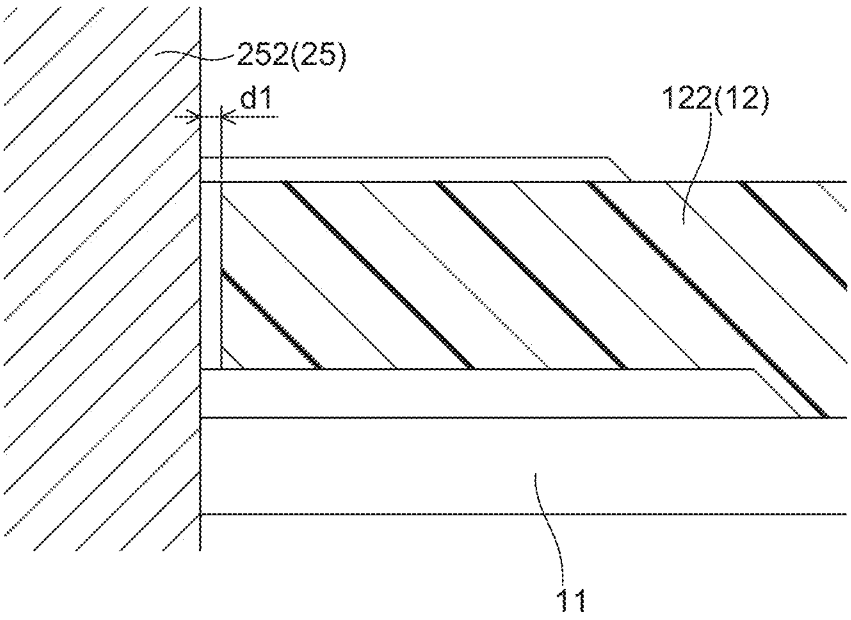
FIG. 7 is an enlarged partial sectional view of portion X1 of FIG. 2, illustrating a clearance between an opening portion and a protruding part.
Figure 8:
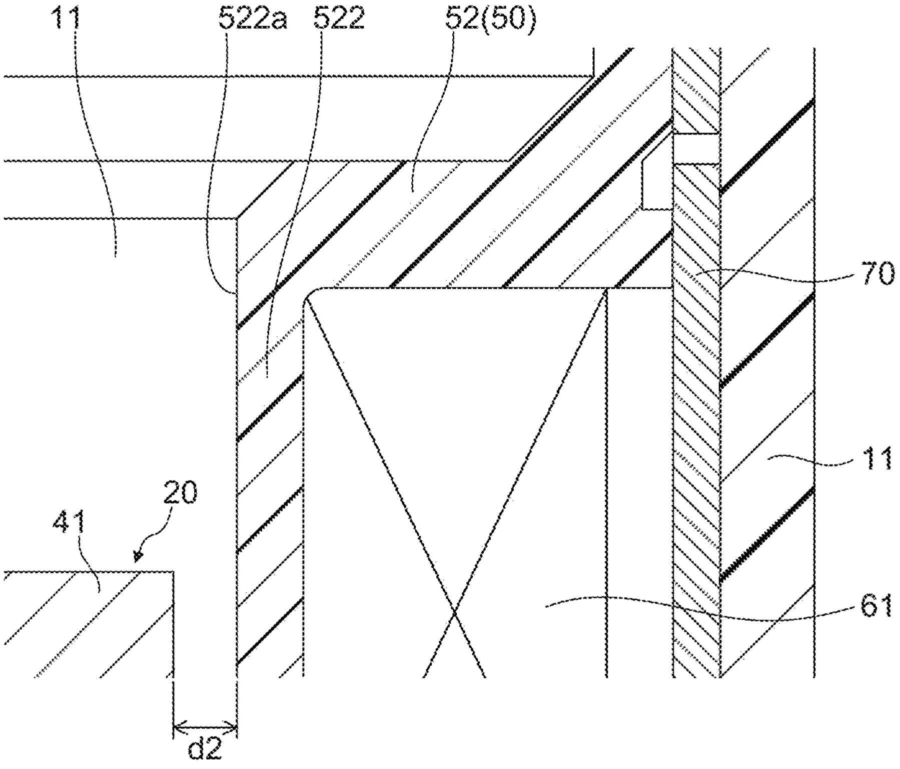
FIG. 8 is an enlarged partial sectional view of portion X2 of FIG. 2, illustrating a clearance between an outer circumferential surface of the movable body and an inner circumferential surface of a fixing body.

FIG. 5 is a perspective view of the movable body, and FIG. 6 is an enlarged exploded view of the movable body. FIG. 7 is an enlarged partial sectional view of portion X1 of FIG. 2, illustrating a clearance between an opening portion and a protruding part. Further, FIG. 8 is an enlarged partial sectional view of portion X2 of FIG. 2, illustrating a clearance between an outer circumferential surface of the movable body and an inner circumferential surface of the fixing body.

As illustrated in FIG. 2, movable body 20 is disposed such that the center of the length of the movable body in the reciprocation direction (the axial direction of the magnet and the upper-lower direction in FIG. 2) is positioned at the same height level as the center of the length of coil holding part 52 in the reciprocation direction via elastic supporting parts 81 and 82 during a non-moving time of the movable body. Here, the non-moving time means a state in which movable body 20 does not move (including the reciprocating motion or the vibration). In addition, being positioned at the same height level means being positioned so as to face each other with a predetermined distance therebetween in a direction orthogonal to the axial direction of movable body 20.

In the present embodiment, it is preferable that the center of the length of magnet 30 and yokes 41 and 42 in the reciprocation direction be disposed at a position facing, in a direction orthogonal to the reciprocation direction, the center of the length in the reciprocation direction between coils 61 and 62 spaced apart from each other in the upper-lower direction. Note that a magnetic fluid may be interposed between holding-portion main body 522 of coil holding part 52 and movable body 20.

As illustrated in FIGS. 2, 4, and 6, movable body 20 includes magnet 30, yokes 41 and 42, the spring retaining parts (first spring retaining part 22 and second spring retaining part 24), output shaft portion 252, first spring fixation portion 26, and second spring fixation portion 28.

In movable body 20, yoke (first yoke) 41, yoke (second yoke) 42, first spring retaining part 22, second spring retaining part 24, first spring fixation portion 26, and second spring fixation portion 28 are continuously disposed around magnet 30 on the front-back surface sides in the axial direction of magnet 30, that is, in both directions in the reciprocation direction.

Specifically, in movable body 20, a pair of yokes 41 and 42 are disposed on front and back surfaces 30*a* and 30*b* of magnet 30 in a stacked manner, and one end portions of the pair of springs retaining parts 22 and 24 are engaged with opening portions 412 and 422 of the pair of yokes 41 and 42.

Spring retaining parts 22 and 24 are engaged with elastic supporting parts 81 and 82 at the other end portions thereof. First spring retaining part 22 of spring retaining parts 22 and 24 is provided with output shaft portion 252 that protrudes from first spring retaining part 22 to one side of magnet 30 in the axial direction and passes through central opening portion 126 of lid portion 12 (see FIGS. 1 to 4 and 7).

In movable body 20, outer circumferential surface 20*a* of magnet 30 and yokes 41 and 42 face inner circumferential surface 522*a* of holding-portion main body 522 with a predetermined distance (gap d2 illustrated in FIG. 8) to inner circumferential surface 522*a*. When movable body 20 reciprocates, outer circumferential surface 20*a* reciprocates without coming into contact with inner circumferential surface 522*a*.

<Magnet 30>

Magnet 30 is, for example, solid and magnetized in the reciprocation direction. Magnet 30 is formed in a disk shape and has a shape including a cylindrical shape having a predetermined thickness. Magnet 30 has front and back surfaces 30*a* and 30*b* facing away from each other in the reciprocation direction (thickness direction) as magnetic pole surfaces of different polarities (for example, front surface 30*a* is an S-pole, and back surface 30*b* is an N-pole).

Magnet 30 is disposed so as to be spaced apart by a distance from coils 61 and 62 (to be described later in detail) inward of coils 61 and 62 in a radial direction. Here, the "radial direction" is a direction orthogonal to the axes of coils 61 and 62, and is also a direction orthogonal to the reciprocation direction. The "distance" in the radial direction is a distance between coils 61 and 62 including holding-portion main body 522 and magnet 30, and is a distance that allows movement in the reciprocation direction of movable body 20 without contact between the magnet and the movable body. In other words, in the present embodiment, the "distance" means a predetermined distance (gap d2) between holding-portion main body 522 and magnet 30.

In the present embodiment, magnet 30 is, at the center of the outer circumferential surface in the axial direction on the outer side in the radial direction, disposed so as to face the center of holding-portion main body 522 in a direction orthogonal to the axial direction. Note that magnet 30 may have a shape other than a disk shape, such as a cylindrical shape or a plate shape, as long as it is disposed inside coils 61 and 62 with two magnetized surfaces facing in the extending direction of the axes of coils 61 and 62, that is, in the reciprocation direction.

In the present embodiment, magnet 30 is a solid body. Thus, unlike the case of a tubular body, an effort to process an opening portion is saved, and the areas of the front and back surfaces serving as the magnetic pole surfaces are not reduced by formation of the opening portion. In addition, it is desirable that the center of magnet 30 in the axial direction coincide with the center of movable body 20 in the axial direction. The magnetization direction of magnet 30 is parallel to the moving direction of movable body 20.

<Yokes 41 and 42>

Yokes 41 and 42 are magnetic bodies, and the yokes together with magnet 30 form a movable-body-side magnetic circuit. Yokes 41 and 42 concentrate the magnetic flux of magnet 30 to allow efficient flow without leakage, and effectively distribute the magnetic flux flowing between magnet 30 and coils 61 and 62.

In addition, yokes 41 and 42 may have a function of fixing spring retaining parts 22 and 24 in addition to a function as a part of the magnetic circuit, and yokes 41 and 42 may further have a function as a main body portion of movable body 20 and a function as a weight in movable body 20.

In the present embodiment, yokes 41 and 42 are formed in an annular flat plate shape having the same outer diameter as that of magnet 30. Yokes 41 and 42 are fixed to magnet 30 such that the outer circumferential surfaces thereof are flush with the outer circumferential surface of the magnet, and form outer circumferential surface 20*a* of movable body 20 together with the outer circumferential surface of the magnet.

Yokes 41 and 42 are members with the same shape disposed to sandwich magnet 30 with magnet 30 interposed therebetween, but may be members with different shapes. Yokes 41 and 42 are attached to magnet 30 by being attracted to magnet 30, and are also fixed to magnet 30 via, for example, a thermosetting adhesive such as an epoxy resin or an anaerobic adhesive.

Opening portions 412 and 422 are formed in respective central portions of yokes 41 and 42 so as to extend therethrough in the axial direction, that is, in the thickness direction. One end portions of upper and lower spring retaining parts 22 and 24 are internally fitted and fixed to opening portions 412 and 422, respectively, and in addition, a base end portion of output shaft portion 252 is disposed inside spring retaining part 22 in opening portion 412 on one side. Thus, the state of opening portion 412 is such that spring retaining part 22 and output shaft portion 252 substantially prevent generation of any cavity in the opening portion.

In the present embodiment, when movable body 20 is not reciprocating, yokes 41 and 42 are positioned on the inner side (radially inner side) of coils 61 and 62 so as to face coils 61 and 62, respectively, in a direction orthogonal to the axial direction of coils 61 and 62.

Opening portions 412 and 422 support spring retaining parts 22 and 24 such that the respective axes of spring retaining parts 22 and 24 (here coinciding with the centers of elastic supporting parts 81 and 82) are located on the central axis of movable body 20. Opening portion 422 allows adjustment of the degree of opening in yoke 42 to adjust the weight of movable body 20 and set a suitable reciprocating output. Further, opening portion 412 allows adjustment of the degree of opening in yoke 41 and the insertion amount of output shaft portion 252 to adjust the weight of movable body 20, and set a suitable reciprocating output.

<Spring Retaining Parts 22 and 24>

The pair of spring retaining parts 22 and 24 function as a weight of movable body 20. Spring retaining parts 22 and 24 are disposed on an object so as to sandwich magnet 30 and yokes 41 and 42, and increase the reciprocating output of movable body 20. In the present embodiment, spring retaining parts 22 and 24 are formed in the same shape to reduce the manufacturing cost of the parts. Regarding details of second spring retaining part 24 of spring retaining parts 22 and 24, a description of first spring retaining part 22 is mainly given while the spring retaining parts are provided with respective reference numbers as in "spring retaining parts 22 and 24" in description of first spring retaining part 22 and a description of second spring retaining part 24 will be omitted.

In the present embodiment, spring retaining parts 22 and 24 also function as a shaft of the movable body extending along the central axis of movable body 20, and are interposed between yokes 41 and 42 and elastic supporting parts 81 and 82.

Spring retaining parts 22 and 24 include joint portions 222 and 242, which are one end portions of spring retaining parts 22 and 24, and spring connection portions 224 and 244, which are the other end portions of spring retaining parts 22 and 24. Joint portions 222 and 242 and spring connection portions 224 and 244 are connected to each other in the reciprocation direction.

Spring retaining parts 22 and 24 are tubular bodies and have through-hole 23 extending inside. Spring retaining parts 22 and 24 may also function as a weight. In this case, spring retaining part 24 may have a function as a weight adjustment portion to adjust the weight balance by adding a weight inside through-hole 23. By adding a weight inside through-hole 23 of spring retaining part 24, movable body 20 can be made heavier, and the vibration output of movable body 20 can be increased. The base end portion of output shaft portion 252 is inserted into through-hole 23 of first spring retaining part 22 and is firmly fixed thereto.

Joint portions 222 and 242 are tubular bodies disposed on the axis of movable body 20, and are joined to yokes 41 and 42, respectively. Joint portions 222 and 242 are joined by inserting one end portion sides into opening portions 412 and 422 of yokes 41 and 42, respectively. On the other hand, the other end portions of joint portions 222 and 242 are disposed so as to protrude from yokes 41 and 42 in opposite directions from magnet 30, and are connected to spring connection portions 224 and 244.

In the present embodiment, spring retaining parts 22 and 24 are bonded to yokes 41 and 42 by press-fitting, but the present invention is not limited thereto, and may be bonded by bonding using a thermosetting adhesive such as an epoxy resin or an anaerobic adhesive, for example. Joint portions 222 and 242 are tubular bodies, but they may be solid cylindrical bodies or rod-shaped bodies having recessed portions on the axis.

Spring connection portion 224 is a tubular body that is provided so as to protrude from joint portion 222 to the other side (upward) of spring retaining part 22 and has an outer diameter larger than that of joint portion 222.

Spring connection portions 224 and 244 serve as opposite end portions of movable body 20 separated from each other in the moving direction, and elastic supporting parts 81 and 82 which will be described later are joined respectively to the spring connection portions.

In spring connection portion 224, a joining surface, which is a distal end (upper end) surface thereof, is disposed around output shaft portion 252 and makes contact with inner circumferential portion 802 of elastic supporting part 81.

<Output Shaft Portion 252 (Protruding Part 25)>

Output shaft portion 252 is connected to movable body 20, is movable together with movable body 20, and outputs a motion of movable body 20 to the outside. Output shaft portion 252 is disposed on the axis of movable body 20, the base end side is fixed to movable body 20 directly by being internally fitted to spring retaining part 22, and the other end side is exposed to the outside of actuator 1 through central opening portion 126 of lid portion 12.

Cap 254 is attached to a distal end of output shaft portion 252. Cap 254 together with output shaft portion 252 forms protruding part 25, but output shaft portion 252 may be protruding part 25. Regarding cap 254, the user may touch cap 254 itself, or a separate member may be attached to cap 254 to apply a haptic feeling to the user via the separate member. Cap 254 may be formed from a material different from the output shaft portion, for example, resin or the like, and may be formed from a material that is easily joined to another member such as an operation section.

Output shaft portion 252 is formed from a durable material, for example, a metallic material, and may be formed from either a magnetic material or a non-magnetic material although a non-magnetic material is preferable. When output shaft portion 252 is a non-magnetic material, it is possible to suppress the leakage magnetic flux near an operation range of the operation section (not illustrated) to which cap 254 is connected. In the case where output shaft portion 252 is formed from a magnetic material, a configuration in which the output shaft portion does not make contact with magnet 30 is desirable.

Output shaft portion 252 is a solid cylindrical body, but is not limited thereto, and may be hollow. Output shaft portion 252 has a circular cross section, but is not limited thereto. Note that the outer shape (outer diameter because of the cylindrical shape) of output shaft portion 252 is smaller than the inner diameter of central opening portion 126 of lid portion 12, and is a diameter allowing extension through central opening portion 126 without contact.

Output shaft portion 252 together with first spring retaining part 22 is disposed in opening portion 412 of the first yoke 41 on magnet 30. In a case of a configuration in which output shaft portion 252 is disposed so as to be in contact with magnet 30 through opening portion 412, it is possible to assemble the parts in a state in which the parts are positioned on the axis, only by inserting output shaft portion 252 into through-hole 23 of spring retaining part 22 and fitting the output shaft portion to opening portion 412 of yoke 41.

Output shaft portion 252 protrudes to the outside of actuator 1 through inner circumferential portion 802, which is the end portion (the other end portion) of elastic supporting part 81 (the upper leaf spring) as elastic supporting part 81 on the inner diameter side and through central opening portion 126 of lid portion 12. Inner circumferential portion 802 of elastic supporting part 81 is sandwiched between the joining surface of spring connection portion 224 and first spring fixation portion 26 in a state of being in contact with the joining surface which is the distal end (upper end) surface of spring connection portion 224.

First spring fixation portion 26 is formed in an annular shape and is a press-fit ring that is externally fitted to output shaft portion 252 by press-fitting. Inner circumferential portion 802 of elastic supporting part 81 is firmly sandwiched and fixed by spring connection portion 224 and first spring fixation portion (press-fit ring) 26 in a state of being externally fitted to output shaft portion 252. An adhesive may be used for the sandwiching. As a result, spring connection portion 224 is joined to elastic supporting part 81.

As described above, in movable body 20, output shaft portion 252 extends upward from magnet 30 on the one direction (upper side) side in the moving direction of movable body 20, is disposed through elastic supporting part 81 and lid portion 12, and the other end portion is movable forward and backward outside fixing body 50. The drive of movable body 20 is directly transmitted to the user via output shaft portion 252. Quick response and strong feedback can thus be performed. Further, by displacing movable body 20 in accordance with the operation, a haptic feedback can be performed, and a haptic feeling corresponding to an operation in a long stroke can be expressed.

On the other hand, spring connection portion (lower spring connection portion) 244 of second spring retaining part 24 disposed on the opposite side of spring connection portion 224 of the first spring retaining part 22 across magnet 30 is joined to inner circumferential portion 802, which is an end portion of the lower leaf spring being elastic supporting part 82 on the inner diameter side.

Spring connection portion 244 is a tubular body that is provided so as to protrude from joint portion 242 to the other side (downward) in spring retaining part 24 and has an outer diameter larger than that of joint portion 242. At spring connection portion 244, inner circumferential portion 802 is held between the joining surface being the distal end (lower end) surface of the spring connection portion and second spring fixation portion 28 inserted into a through-hole opened in the joining surface in a state in which inner circumferential portion 802 of the lower leaf spring serving as elastic supporting part 82 is in contact with the joining surface.

Specifically, second spring fixation portion 28 is inserted at shaft-shaped insertion portion 282 into the through-hole in spring connection portion 244, thereby holding inner circumferential portion 802 of elastic supporting part 82 between flange 284 disposed on the outer circumference of the base end portion of the insertion portion and the joining surface of spring connection portion 244. As a result, spring connection portion 244 and elastic supporting part 82 are joined to each other.

Second spring fixation portion 28 may be a rivet such as a blind rivet, for example. Second spring fixation portion 28 fixes shaft-shaped insertion portion 282 in the through-hole in spring connection portion 244 by press-fitting such as caulking.

Spring retaining parts 22 and 24 may be formed from a magnetic material, but are preferably formed from a non-magnetic material. When spring retaining parts 22 and 24 are formed from a non-magnetic material, the magnetic flux from yoke 41 does not flow upward, and the magnetic flux from yoke 42 does not flow downward, and the magnetic fluxes can thus efficiently flow toward coils 61 and 62 located on the outer circumferential side of yokes 41 and 42.

Since movable body 20 is formed from the separate parts including magnet 30, yokes 41 and 42, spring retaining parts 22 and 24, and output shaft portion 252, it is easy to secure the dimensional accuracy required for each part. In addition, it is possible to improve the surface accuracy (the accuracy of the joining surfaces) of spring connection portions 224A and 244 of spring retaining parts 22 and 24, and the dimensional accuracy of the outer diameter of protruding part 25 (output shaft portion 252).

<Elastic Supporting Parts 81 and 82>

Elastic supporting parts 81 and 82 are disposed on opposite sides of movable body 20 in the moving direction, and support movable body 20 movably in the moving direction. Elastic supporting parts 81 and 82 are leaf springs, and are disposed so as to sandwich movable body 20 in the vibration direction of movable body 20, and are disposed on both movable body 20 and fixing body 50 so as to intersect the vibration direction.

Specifically, elastic supporting parts 81 and 82 are disposed to straddle, on one hand, the opposite end portions (upper and lower end portions) of movable body 20 that are spaced apart from each other in the reciprocation direction and, on the other hand, the opening edge portions of fixing body 50 (coil holding part 52) that are disposed radially outward from the opposite end portions. In the present embodiment, elastic supporting parts 81 and 82 are disposed along a direction orthogonal to the reciprocation direction and face each other to sandwich movable body 20 in the reciprocation direction.

Elastic supporting parts 81 and 82 may be non-magnetic materials or magnetic materials (specifically, ferromagnetic materials). Elastic supporting parts 81 and 82 may be formed from a stainless-steel plate such as SUS304, SUS316 as long as they are non-magnetic leaf springs. When elastic supporting parts 81 and 82 are formed from a magnetic material, a stainless-steel plate such as SUS301 may be used. As a material of elastic supporting parts 81 and 82, for example, a magnetic material (for example, SUS301) is known to be more durable and inexpensive than a non-magnetic material (for example, SUS304, SUS316, or the like).

Elastic supporting parts 81 and 82 support movable body 20 such that the movable body does not come into contact with fixing body 50 regardless of whether or not movable body 20 is in a reciprocating motion. Elastic supporting parts 81 and 82 may be formed from any material as long as they are configured to elastically support movable body 20 movably.

Each of elastic supporting parts 81 and 82 is a plurality of plate-shaped spiral springs which have a flat plate shape in a normal state. In each of elastic supporting parts 81 and 82, arc-shaped deformation arm portions 804 extend radially outward at regular intervals from the outer edge portion of inner circumferential portion 802 having the annular plate shape, and are connected to outer circumferential fixing portion 806 having the annular plate shape at the end portions of deformation arm portions 804.

Inner circumferential portions 802 have a shape disposed on the joining surfaces of spring connection portions 224 and 244 of spring retaining parts 22 and 24, and have, for example, an outer diameter substantially the same as the outer diameter of the joining surfaces of spring connection portions 224 and 244.

Deformation arm portions 804 are elastically deformable, are joined to outer circumferential fixing portion 806 at one end portions, are joined to inner circumferential portion 802 at the other end portions, and connect outer circumferential fixing portion 806 and inner circumferential portion 802 to each other. A plurality of deformation arm portions 804 are disposed in a spiral shape between inner circumferential portion 802 and outer circumferential fixing portion 806 while being spaced from one another by a predetermined interval in the circumferential direction. Movable body 20 may be supported by three or more elastic supporting parts (leaf springs) 81 and 82. The plurality of leaf springs are attached to extend along a direction orthogonal to the reciprocation direction.

In elastic supporting parts 81 and 82, inner circumferential portions 802 are joined respectively to the opposite end portions (spring connection portions 224 and 244) that are separated from each other in the axial direction (reciprocation direction) of movable body 20. Further, the outer circumferential fixing portion 806 sides of elastic supporting parts 81 and 82 are disposed so as to protrude radially outward (in the radial direction) at the opposite end portions of movable body 20.

Outer circumferential fixing portions 806 include notches formed in the outer circumferential edges, and are sandwiched between the opposite opening edges of coil holding part 52 and case 10 in a state in which movable-range forming portions (positioning piece portions) 54 of coil holding part 52 are engaged with the notches.

Specifically, in elastic supporting part 81, outer circumferential fixing portion 806 is sandwiched and fixed in case 10 between ring-shaped upper end surface 527_a_ of flange portion 527 and pressing portion 128 of lid portion 12. Note that, upper end surface 527_a_ means an upper (one-side) end surface of the portion of the upper side (one side) of upper (one-side) flange portion 527 other than movable-range forming portions 54.

Further, in lower elastic supporting part 82, outer circumferential fixing portion 806 is fixed to the lower end portion of coil holding part 52 at the outside of movable body 20 in the radial direction in actuator 1. Specifically, outer circumferential fixing portion 806 of elastic supporting part 82 is fixed to a portion of annular lower end surface 528*a* of lower flange portion 528 forming the lower end portion of coil holding part 52, the portion being other than movable-range forming portions 54.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 such that the directions of the whirls of elastic supporting parts 81 and 82 are the same, for example.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the vibration direction, and elastically support movable body 20 with respect to fixing body 50. Thus, when the movement amount of movable body 20 is large, the movable body moves in a translational direction (here, the direction on a plane perpendicular to the vibration direction) even slightly while rotating. When the whirl directions of the plurality of leaf springs are opposite each other, the plurality of leaf springs move in a buckling direction or a pulling direction to each other, whereby smooth movement is prevented.

Actuator 1 can cause the movement of movable body 20, in particular, output shaft portion 252 being protruding part 25 with an increased rectilinearity by the pair of elastic supporting parts 81 and 82.

As a result, movable body 20 can be stably moved without being affected by an external impact or disturbance. In particular, since the stability of the linear driving can be increased, both characteristics of the stability of a magnetic sensor output and the stability of a haptic feeling output can be increased.

Elastic supporting parts 81 and 82 of the present embodiment are fixed to movable body 20 such that the whirl directions are the same. Thus, even when the movement amount of movable body 20 is large, elastic supporting parts 81 and 82 can move smoothly, i.e., can be deformed to produce a greater output, so that the output serving as a force feedback can be increased.

However, depending on a desired moving range of movable body 20, the whirl directions of the plurality of elastic supporting parts 81 and 82 may be designed to be opposite directions to each other.

Meanwhile, outer circumferential fixing portion 806 of upper elastic supporting part 81 is, at the outside in the radial direction, fixed to the upper end portion of coil holding part 52. Specifically, outer circumferential fixing portion 806 of elastic supporting part 81 is fixed to a portion of annular upper end surface 527*a* of upper flange portion 527 forming the upper end portion of coil holding part 52 (see FIG. 2), the portion being other than movable-range forming portions 54. Details of the configuration of coil holding part 52 will be described later.

Outer circumferential fixing portion 806 of elastic supporting part 82 is clamped and fixed by annular lower end surface 528*a* of flange portion 528 and step portion 118 formed on a circumferential edge portion of bottom portion 114 within case 10. Note that, lower end surface 528*a* means an upper (other-side) end surface of the portion of the lower side (other side) of lower (other-side) flange portion 528 other than movable-range forming portions 54.

Outer circumferential fixing portions 806 are formed in an annular shape. The outer circumferential portions of the outer circumferential fixing portions are sandwiched between upper and lower end surfaces 527*a* and 528*a* of coil holding part 52 (see FIG. 2) and pressing portion 128 and step portion 118. With this configuration, outer circumferential fixing portions 806 are fixed to fixing body 50.

<Fixing Body 50>

As illustrated in FIG. 2, fixing body 50 holds coils 61 and 62, and supports, via elastic supporting parts 81 and 82, movable body 20 inside coils 61 and 62 in the radial direction such that movable body 20 is freely movable in the moving direction (the axial direction of the magnet, the coil axial direction, or the axial direction of movable body 20).

Fixing body 50 includes coils 61 and 62, outer yoke 70, and coil holding part 52 that holds coils 61 and 62.

Actuator 1 is formed by connecting, to coil holding part 52, substantially all the components for generating vibrations, such as coils 61 and 62, movable body 20, and case 10 via elastic supporting parts 81 and 82.

Coil holding part 52 is a tubular body, holds coils 61 and 62 disposed on the outer circumferential surface, and surrounds magnet 30 with inner circumferential surface 522*a*. Movable body 20 including magnet 30 is movably disposed inside the coil holding part. Coil holding part 52 may be formed in a bobbin shape, and in this case, coils 61 and 62 are wound on the outer circumference of the inner tubular holding-portion main body (protective wall) of coil holding part 52.

Coil holding part 52 is a tubular body formed from a resin such as a phenolic resin or polybutylene terephthalate (PBT). In the present embodiment, coil holding part 52 is formed from a material containing a phenolic resin such as Bakelite having high flame retardancy.

When coil holding part 52 is formed from a material containing a phenolic resin, a higher flame retardancy is obtained. It is thus possible to improve the safety at the time of driving even when heat is generated by Joule heat when a current flows through coils 61 and 62 held by coil holding part 52. Moreover, the dimensional accuracy is increased and the positional accuracy of coils 61 and 62 is increased accordingly. It is thus possible to reduce variations in vibration characteristics.

Specifically, coil holding part 52 includes tubular holding-portion main body 522, middle flange portion 526, and flange portions 527 and 528 protruding in the radial direction from the outer circumference of holding-portion main body 522, terminal part 75, and movable-range forming portions 54.

Holding-portion main body 522 functions as a protective wall portion for protecting coils 61 and 62 against collision by movable body 20 when movable body 20 disposed inside is being driven. The thickness of holding-portion main body 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of holding-portion main body 522 side by side in the coil axial direction between middle flange portion 526 and flange portions 527 and 528 (on coil attachment portions 52*b* and 52*c*). Holding-portion main body 522 positions coils 61 and 62 such that the coils radially externally surround the outer circumferential surfaces of yokes 41 and 42 (the outer circumferential surfaces of magnet 30 and yokes 41 and 42) of movable body 20.

Specifically, the outer circumferential surface of holding-portion main body 522 is partitioned by middle flange portion 526 and flange portions 527 and 528, and is provided with recessed coil attachment portions 52*b* and 52*c* that open radially outward on the outer circumferential side.

Terminal part 75 functions as a connector connection portion to which coil windings of coils 61 and 62 are tied for connection to an external device. Connection is made between coils 61 and 62 and the external device via terminal part 75, which allows power supply from the external device to coils 61 and 62.

Terminal part 75 is an electrically conductive member disposed to protrude from the outer circumferential portion of holding-portion main body 522. In the present embodiment, terminal part 75 is press-fitted to the outer circumferential surface of middle flange portion 526 disposed on the outer circumference of holding-portion main body 522 centrally in the vibration direction. Terminal part 75 is thus disposed to protrude from the outer circumferential surface of middle flange portion 526.

Flange portions 527 and 528 are disposed respectively on opposite end portions of holding-portion main body 522 which are separate from each other in the axial direction of the bobbin main-body portion (which is also the vibration direction and the upper-lower direction in the present embodiment), so as to form the upper and lower end portions of coil holding part 52.

Elastic supporting parts 81 and 82 are fixed to end portions of flange portions 527 and 528 on the sides facing away from middle flange portion 526 (upper and lower end portions in the present embodiment).

Movable-range forming portions 54 are projecting portions disposed on the upper and lower end portions of coil holding part 52 to protrude in the axial direction, and form a vibration range between lid portion 12 and bottom portion 114 of case 10 and movable body 20 when coil holding part 52 is accommodated in case 10. Movable-range forming portions 54 are disposed at predetermined intervals on upper and lower annular end surfaces (also referred to as "upper end surface and lower end surface" or "opening end surfaces") 527*a* and 528*a* of flange portions 527 and 528. Upper end surface 527*a* is an opening end surface on one side, and lower end surface 528*a* is an opening end surface on the other side.

Movable-range forming portions 54 are fitted into the notches formed in elastic supporting parts 81 and 82, to perform radial positioning of elastic supporting parts 81 and 82. Movable-range forming portions 54 are fitted in the notches. Accordingly, it is possible to uniformly set the attachment positions of elastic supporting parts 81 and 82 with respect to coil holding part 52 of each individual unit 13, so as to perform stable position determination of elastic supporting parts 81 and 82 with respect to coil holding part 52. Further, with respect to coil holding part 52, elastic supporting parts 81 and 82 are not fixed to the fixing body side via a plurality of components. Thus, a structure less susceptible to component tolerances is achieved, and movement in the circumferential direction and the radial direction such as rotation is restricted. It is thus possible to suppress variations in elastic supporting parts 81 and 82 in products, and to achieve stable characteristics.

Coil holding part 52 is accommodated in case 10 such that movable-range forming portions 54 at the upper and lower end surfaces are in contact with the edge portion of lid portion 12 and the edge portion of bottom portion 114, and is fixed to the edge portion of lid portion 12 and the edge portion of bottom portion 114.

<Coil>

In actuator 1, coils 61 and 62, together with magnet 30 and yokes 41 and 42, are used for generating a drive source of actuator 1, in which case the axial direction of coils 61 and 62 (magnetization direction of magnet 30) is the vibration direction.

Coils 61 and 62 generate a magnetic field by energization and move movable body 20. Coils 61 and 62 are disposed radially outside movable body 20. Coils 61 and 62 together with magnet 30 constitute a magnetic circuit similar to a voice coil motor.

Coils 61 and 62 are disposed on coil attachment portions 52*b* and 52*c*, and coils 61 and 62 are disposed at positions facing yokes 41 and 42 in a direction orthogonal to the reciprocation direction in the present embodiment.

Coils 61 and 62 are held by coil holding part 52 such that the center position of the length of the coils in the coil axial direction (reciprocation direction) is substantially the same position (including the same position) in the reciprocation direction as the center position of the length of movable body 20 in the reciprocation direction (the center position of magnet 30 in the reciprocation direction). Note that, coils 61 and 62 of the present embodiment are configured to be wound in directions opposite to each other, through which currents flow in the opposite directions during energization. Coils 61 and 62 are fixed by bonding or the like to recessed coil attachment portions 52*b* and 52*c*, and the outer circumferential surfaces of the coils are surrounded by outer yoke 70 inside case 10.

The end portions of coils 61 and 62 are tied and connected to terminal part 75 of middle flange portion 526. Coils 61 and 62 are connected to an external power supply section via terminal part 75. For example, the respective end portions of coils 61 and 62 may be connected to a direct-current supply section, and direct-current power may be supplied from the direct-current supply section to coils 61 and 62. Thus, coils 61 and 62 can generate, between the magnet and coils 61 and 62, thrust allowing movement on one side in a direction toward each other or away from each other in their axial direction.

Further, the respective end portions of coils 61 and 62 may be connected to a power supply section such as an alternating-current supply section or a direct-current supply section, and an alternating-current power supply (alternating-current voltage) and a direct-current power supply (direct-current voltage) may be supplied from the power supply section to coils 61 and 62. Thus, coils 61 and 62 can generate, between the magnet and coils 61 and 62, thrust allowing movement in a direction toward each other or away from each other in their axial direction.

The power supplied to coils 61 and 62 may be either the alternating current or direct current, which generates a thrust of movable body 20 corresponding to the power supply, and it is needless to say that both the alternating current and direct current may be supplied to coils 61 and 62. Actuator 1 may move movable body 20 by superimposing an alternating current on an input direct current. For example, actuator 1 first pushes out or lowers movable body 20, that is, protruding part 25, by an input direct current. Subsequently, when protruding part 25 is pressed by a user's operation, actuator 1 can detect the press or the like and superimpose an input alternating current or pulse on the input direct current, so as to provide a haptic feeling such as force feedback. In addition, at least one of the direct current supply section and the alternating current supply section connected to the respective end portions of coils 61 and 62 may be disposed in the actuator itself.

<Outer Yoke 70>

Outer yoke 70 is a cylindrical magnetic body that surrounds the outer circumferential surface of coil holding part 52 and is disposed at a position that covers coils 61 and 62 radially outward. Outer yoke 70 prevents leakage magnetic flux from actuator 1 to the outside in the radial direction in the magnetic circuit.

Outer yoke 70 is disposed such that the center of the length of outer yoke 70 in the reciprocation direction is located at the same height as the center of magnet 30 in the reciprocation direction that is disposed inside outer yoke 70. The shielding effect of outer yoke 70 makes it possible to reduce the leakage magnetic flux to the outside of the reciprocating actuator.

Outer yoke 70 also makes it possible to increase the thrust constant so as to increase the electromagnetic conversion efficiency in the magnetic circuit. Outer yoke 70 utilizes the magnetic attraction force of magnet 30, and functions as a magnetic spring together with magnet 30. The magnetic spring makes it possible to reduce a stress that would be caused when elastic supporting parts 81 and 82 are mechanical springs, so as to improve the durability of elastic supporting parts 81 and 82.

<Case 10>

Case 10 accommodates movable body 20 together with coils 61 and 62 such that the protruding end side of protruding part 25 protrudes to the outside. Case 10 accommodates movable body 20 together with coils 61 and 62, and includes central opening portion 126 allowing protruding part 25 to be loosely inserted in a non-contact manner.

Specifically, case 10 includes: bottomed cylindrical case main body 11 having circumferential wall portion 112 and bottom portion 114; and lid portion 12 for closing opening portion 115 of case main body 11. Case 10 has a columnar shape. The columnar shape is a shape having a height (thickness) allowing generation of sufficient thrust in the reciprocation direction in cooperation with coils 61 and 62 facing the outer circumference of the movable body. For example, case 10 of the present embodiment is formed in a cylindrical shape by bottomed cylindrical case main body 11 and lid portion 12. However, the case is not limited to this shape. The case may be elliptical cylindrical or polygonal prismatic. The length of the case in the reciprocation direction is longer or shorter than the length of the case in a direction perpendicular to the reciprocation direction. The elliptical shape of the elliptical cylindrical shape in the present embodiment is mainly an ellipse including parallel straight-line-like portions, and thus means an oval shape.

Lid portion 12 and bottom portion 114 respectively form top surface portion 122 and the lower surface portion (bottom portion 114) of actuator 1 in the present embodiment, and are disposed to face movable body 20 of unit 13 with a predetermined gap being interposed between the lid portion and the bottom portion, on the one hand, and the movable body, on the other hand, in the reciprocation direction of movable body 20.

Lid portion 12 includes projecting portion 124 on top surface portion 122 having central opening portion 126. Projecting portion 124 projects radially outward from a part of the outer circumference of top surface portion 122 and is engaged with cutout portion 102 of case main body 11. Projecting portion 124 can engage lid portion 12 with cutout portion 102 of case main body 11 to perform positioning when lid portion 12 is attached to case main body 11. Note that each of lid portion 12 and bottom portion 114 functions as a movable-range reducing part that is a hard stop (movable range limitation) of movable body 20.

The opening direction of central opening portion 126 is parallel to the moving direction of movable body 20 and output shaft portion 252. Specifically, it is desirable that central opening portion 126 be formed such that output shaft portion 252 is vertically inserted in the central opening portion.

Central opening portion 126 is formed in top surface portion 122 with a diameter larger than the outer diameter of output shaft portion 252 to extend on the axis of movable body 20 and the axis of output shaft portion 252.

As illustrated in FIG. 7, central opening portion 126 is formed in top surface portion 122 to form gap d1 between the central opening portion and output shaft portion 252 to be inserted, such that output shaft portion 252 to be inserted does not make contact with the central opening portion while not moving or while moving.

Central opening portion 126 is formed in top surface portion 122 such that gap d1 between the outer diameter of output shaft portion 252 and the inner diameter of central opening portion 126 is smaller than gap d2 between outer circumferential surface 20*a* of movable body 20 and the inner circumferential surface of fixing body 50 (inner circumferential surface 522*a* of holding-portion main body 522) illustrated in FIG. 8.

When lid portion 12 is attached to case main body 11, projecting portion 124 of lid portion 12 is disposed above terminal part 75 exposed in cutout portion 102 of case main body 11 to the outside at the central portion of cutout portion 102 in the longitudinal direction. Thus, the position of terminal part 75 of actuator 1 can be grasped only in plan view of lid portion 12.

<Operation of Actuator 1>

Figure 9:
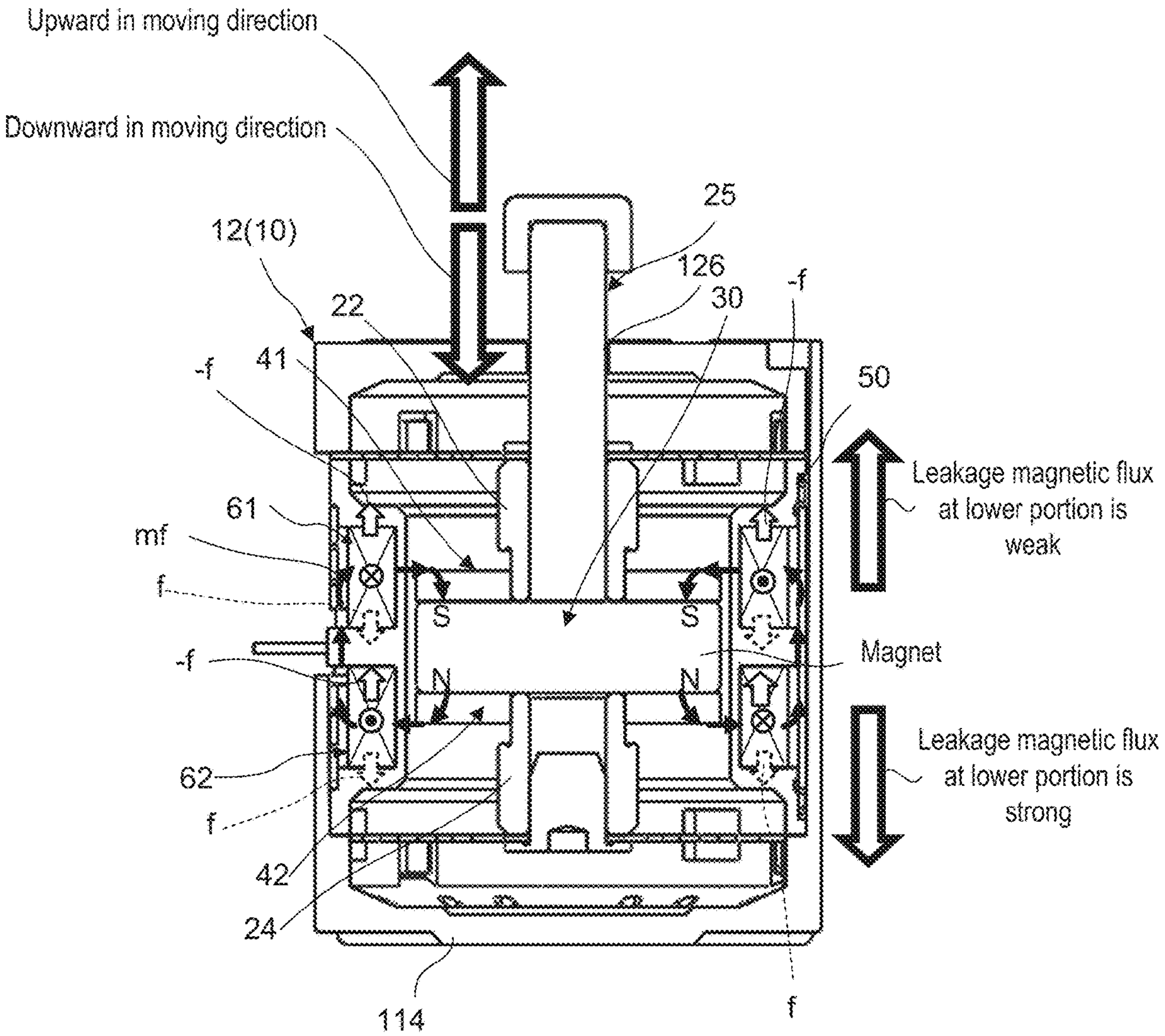
FIG. 9 is a diagram for explaining an operation of the actuator according to Embodiment 1 of the present invention.

With reference to FIG. 9, a description will be given of operation of actuator 1 in relation to one example in which magnet 30 is magnetized such that the side of front surface 30*a*, which is one side of magnet 30 in the magnetization direction (upper side in the present embodiment), is the S-pole, and the side of back surface 30*b*, which is the other side in the magnetization direction (lower side in the present embodiment), is the N-pole.

FIG. 9 is a diagram for explaining the operation of the actuator according to Embodiment 1 of the present invention.

In actuator 1, movable body 20 is driven to move on at least one side in the vibration direction by supplying a pulse current (a direct current pulse or an alternating current pulse) to coils 61 and 62. Note that power may be supplied to coils 61 and 62 for resonance.

By supplying the pulse current, flow mf of the magnetic flux is formed, which is emitted from the back surface 30*b* side of magnet 30 to yoke 42 and then toward the coil 62 side and passes through outer yoke 70 and coil 61 to enter magnet 30 via yoke 41 on the upper side of magnet 30.

Accordingly, when energization is performed as illustrated in FIG. 9, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62. Since coils 61 and 62 are fixed to fixing body 50 (coil holding part 52), the opposite force to this Lorentz force in the −f direction is generated in movable body 20 including magnet 30 as thrust in the f direction in accordance with the law of action and reaction. As a result, the movable body 20 side including magnet 30 moves toward the f direction, that is, toward bottom portion 114 (bottom surface of case main body 11).

On the other hand, when the energization direction of coils 61 and 62 is switched in the opposite direction and coils 61 and 62 are energized, the Lorentz force in a direction reverse to the f direction is generated. The generation of the Lorentz force in this f direction causes in movable body 20 the force opposite to the Lorentz force in the f direction as thrust (thrust in the −f direction) in accordance with the law of action and reaction, so that movable body 20 moves in the −f direction, i.e., toward the top surface of lid portion 12 of fixing body 50.

Actuator 1 makes it possible to provide the operator with a so-called haptic feeling and force feedback via output shaft portion 252 in response to the user's operation by moving movable body 20 toward only one of lid portion 12 and bottom portion 114.

At this time, output shaft portion 252 passes through central opening portion 126 of case 10 without making contact with the central opening portion, and moves at the outside of case 10 in the moving direction (the axial direction or the advancing/retreating direction of magnet 30) without making contact with central opening portion 126.

Further, movement can be achieved by supplying coils 61 and 62 with currents alternately in opposite directions, and it is possible by using this technique to provide the user with a haptic feedback and a force feeling feedback according to movement by driving depending on the movement of movable body 20 caused by the operation of the operator.

In addition, in actuator 1, a magnetic attraction force acts between magnet 30 and outer yoke 70, which functions as a magnetic spring in a non-driven (motionless) state in which actuator 1 is not energized. The magnetic attraction force generated between magnet 30 and outer yoke 70 and a restoring force that brings elastic supporting parts 81 and 82 back to their original shapes cause movable body 20 to return to its original position.

Actuator 1 includes: fixing body 50 including coils 61 and 62; and movable body 20 disposed radially inside coils 61 and 62 and including magnet 30 magnetized in the axial direction of coils 61 and 62. In addition, actuator 1 includes flat plate-shaped elastic supporting parts 81 and 82 that elastically hold movable body 20 such that movable body 20 is freely movable in the moving direction that is the coil axial direction.

Further, coils 61 and 62 are disposed on the outer circumference of holding-portion main body 522 of coil holding part 52, outer circumferential surface 20*a* of movable body 20 is disposed on the inner circumferential side of holding-portion main body 522 with a gap being interposed between the outer circumferential surface of the movable body and the holding-portion main body, and coils 61 and 62 are, at the outer circumferential surface, surrounded by outer yoke 70.

Actuator 1 has a structure in which unit 13 is accommodated in case 10, and the outer circumferential surface of circumferential wall portion 112 of case 10 formed from a resin can thus be formed as a smooth surface. Thus, when actuator 1 is attached to an electronic device, it is possible to reliably and easily perform attachment of a cushioning material such as a sponge to be interposed between actuator 1 and a mounting point.

Moreover, since actuator 1 has the configuration in which unit 13 is disposed in case 10, fixation of elastic supporting parts 81 and 82, which requires high dimensional accuracy, can be achieved by attaching elastic supporting parts 81 and 82 to coil holding part 52.

Thus, arrangement of movable body 20 including the fixation of elastic supporting parts 81 and 82 can be determined with reference to coil holding part 52, so that it is possible to increase the accuracy of the haptic feeling generation direction of the product. Specifically, only increasing the dimensional accuracy of coil holding part 52 formed as one component from a resin or the like makes it possible to easily dispose coils 61 and 62 and movable body 20 (magnet 30) attached via elastic supporting parts 81 and 82 in an accurate positional relationship, for example.

Further, terminal part 75 are disposed on coil holding part 52 to protrude outward, so that tying and soldering of the coil wire of the coils are facilitated, and connection between an external device and coils 61 and 62 can be facilitated.

As described above, actuator 1 can perform haptic feeling presentation while having impact resistance.

Actuator 1 is driven by a pulse (a direct current pulse or an alternating current pulse) input to coils 61 and 62. That is, the energization direction of coils 61 and 62 may be appropriately set so that thrust in the −f direction toward top surface portion 122 of lid portion 12 or thrust in the f direction toward bottom portion 114 acts on movable body 20, or so that these thrusts in the −f direction and the f direction alternately act on the movable body. As a result, movable body 20 moves in the moving direction and thus in the moving direction, and the haptic feedback can be performed via actuator 1 itself or output shaft portion 252.

As described above, actuator 1 can be easily manufactured at a low cost, and has a detection function and a haptic feedback function that are easier to use.

<Driving Principle of Actuator 1>

The driving principle of actuator 1 will be briefly described below. Actuator 1 is driven, for example, by a supplied pulse in one direction (which means the same here as the axial direction, the vibration direction, or the upper-lower direction of the magnet) based on following Equation 1 of motion and Circuit Equation 2. In the present embodiment, the driving is performed by inputting a short pulse, but the driving may be performed so as to generate an arbitrary reciprocating motion and without using the short pulse.

Movable body 20 in actuator 1 performs reciprocating motion based on Equations 1 and 2.

(Equation 1)

$$m\frac{d^2x(t)}{dt^2} = K_f i(t) - K_{sp} \times (t) - D\frac{dx(t)}{dt} \quad [1]$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

(Equation 2)

$$e(t) = Ri(t) + L\frac{di(t)}{dt} + K_e\frac{dx(t)}{dt} \quad [2]$$

e(t): Voltage [V]

R: Resistance [Ω]

L: Inductance [H]

$K_e$: Reverse electromotive force constant [V/(m/s)]

Mass m [Kg], displacement x(t) [m], thrust constant $K_f$ [N/A], current i(t) [A], spring constant $K_{sp}$ [N/m], damping coefficient D [N/(m/s)], and the like in actuator 1 may be changed appropriately as long as Equation 1 is satisfied. In addition, voltage e(t) [V], resistance R [Ω], inductance L[H], and reverse electromotive force constant $K_e$ [V/(m/s)] may be changed appropriately as long as Equation 2 is satisfied.

Accordingly, actuator 1 is determined by mass m of movable body 20 and spring constant $K_{sp}$ of metallic springs (the elastic bodies or the leaf springs in the present embodiment) as elastic supporting parts 81 and 82.

<Variations>

FIGS. 10 to 23 illustrate Variations 1 to 7 of actuator 1 of the present embodiment.

It should be noted that actuators 1A to 1G that are Variations 1 to 7 of actuator 1 illustrated in FIGS. 10 to 23 have the same basic configuration as that of actuator 1 corresponding to Embodiment 1 illustrated in FIG. 1. Therefore, in the description of Variations 1 to 7, the same components as those in Embodiment 1 are denoted by the same reference numerals and the same names, and duplicate descriptions are omitted, and different components will be described with the same names and the same reference numerals as those of the subject components as appropriate. Since the operations of actuators 1A to 1G are the same as that of actuator 1, the explanation thereof will be omitted as appropriate. In respective actuators 1A to 1G, output shaft portions 252, 252C, 252D, and 252F that are inserted through central opening portion 126 of the case move within central opening portion 126 of the case in a non-contact manner, with gap d1 therebetween, as movable body 20, 20A to 20D, and 20F move.

<Variation 1>

Figure 10:
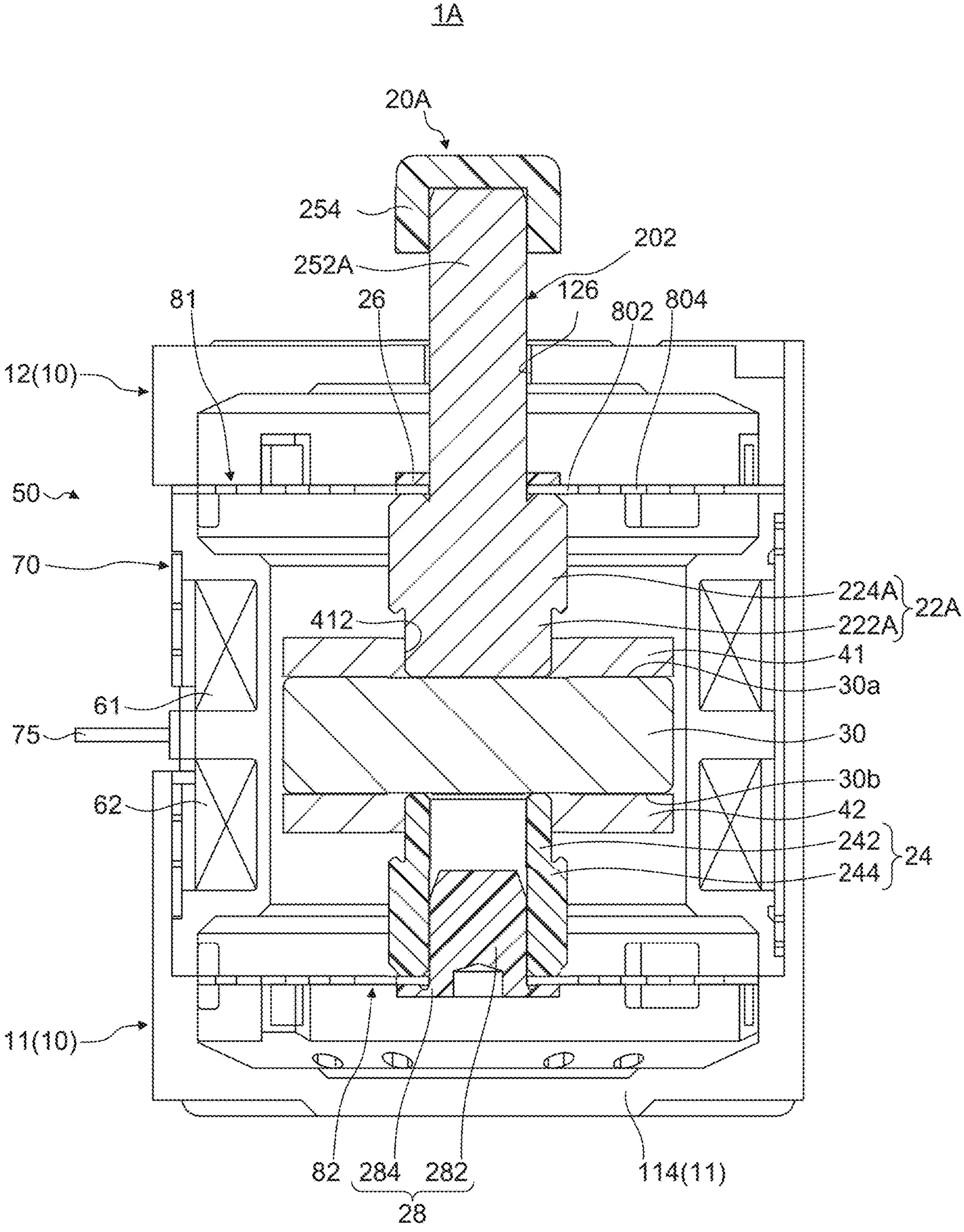
FIG. 10 is a longitudinal sectional view illustrating a configuration of a principal part of Variation 1 of the actuator.
Figure 11:
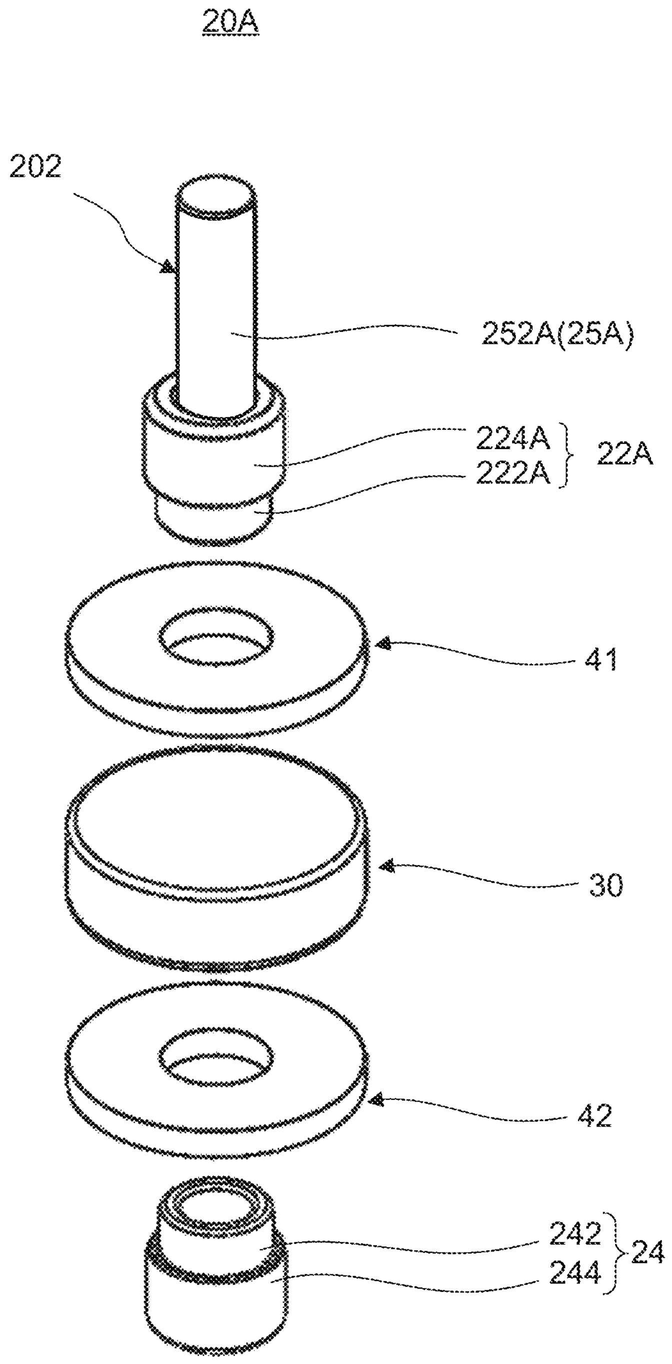
FIG. 11 is an enlarged exploded view of the movable body.

FIG. 10 is a longitudinal sectional view illustrating a configuration of a principal part of Variation 1 of the actuator, and FIG. 11 is an enlarged exploded view of the movable body.

Since actuator 1A as Variation 1 of the present embodiment differs from actuator 1 only in the configuration of movable body 20A and the other configurations are the same, the configuration of movable body 20A will be mainly described below.

Movable body 20A of actuator 1A illustrated in FIG. 10 differs in that output shaft portion 252 and first spring retaining part 22 are integrally formed in components of movable body 20 of actuator 1.

Figure 12:
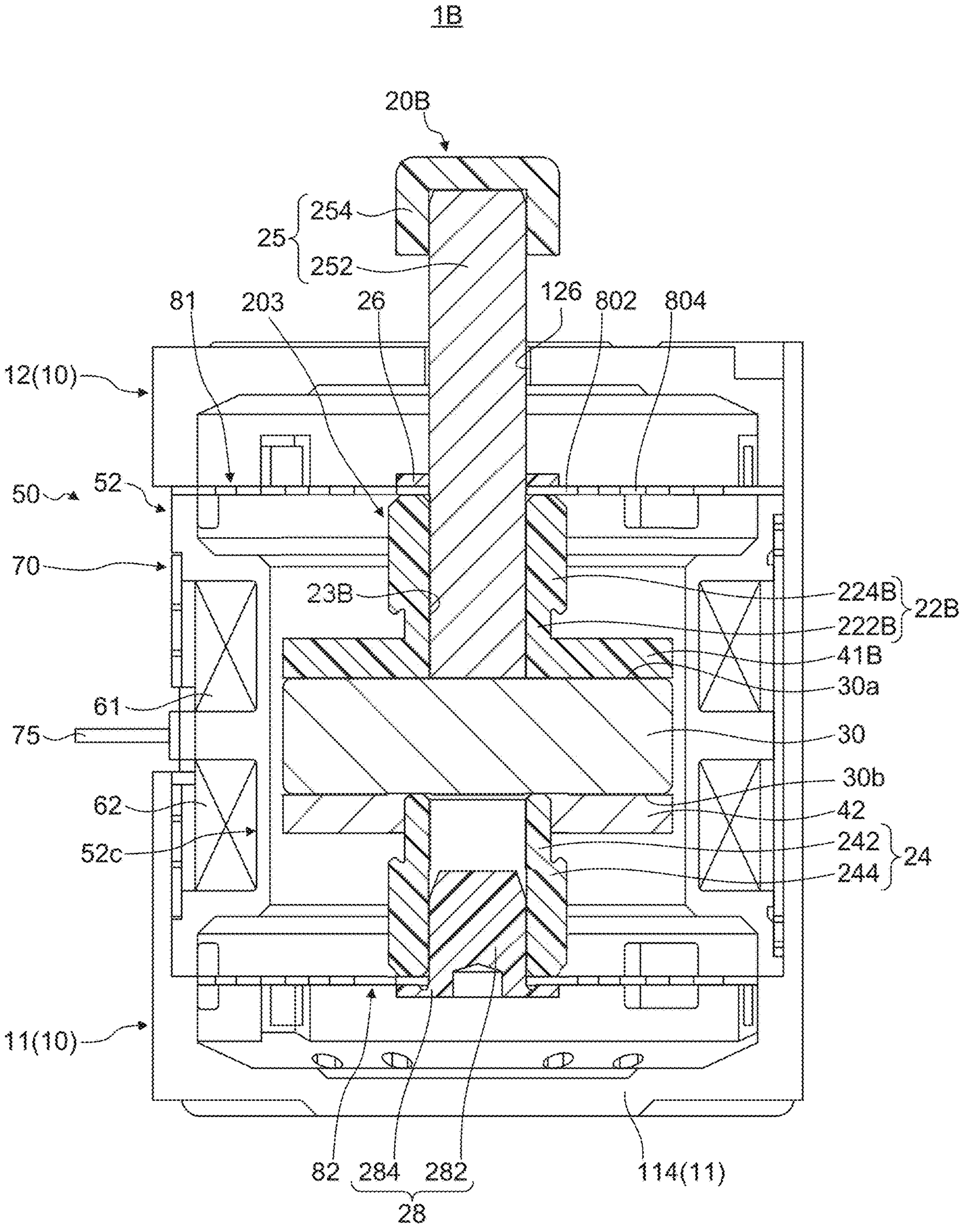
FIG. 12 is a longitudinal sectional view illustrating a configuration of a principal part of Variation 2 of the actuator.

Movable body 20A illustrated in FIGS. 11 and 12 includes shaft unit 202 in addition to magnet 30, yokes 41 and 42, second spring retaining part 24, first spring fixation portion 26, and second spring fixation portion 28, which have the same configurations as those of movable body 20.

Shaft unit 202 is a rod-shaped member in which first spring retaining part 22A having a function similar to that of first spring retaining part 22 and output shaft portion 252A having a function similar to that of output shaft portion 252 are integrally formed. Shaft unit 202 is configured such that joint portion 222A of spring connection portion 22A, spring connection portion 224A of spring connection portion 22A, and output shaft portion 252A continuously extend from magnet 30 in this order on the same axis. It is preferable that shaft unit 202 be formed from a non-magnetic material, and when shaft unit 202 is formed from a non-magnetic material, it is possible to prevent leakage of the magnetic flux via output shaft portion 252A in the axial direction.

In shaft unit 202, joint portion 222A of spring retaining part 22A at one end is fitted to opening portion 412 of yoke 41. In addition, shaft unit 202 connects and fixes elastic supporting part 81 between, on one hand, the distal end surface of spring connection portion 224A on one side, which forms a stepped surface on the outer circumference of output shaft portion 252 and, on the other hand, a press-fit ring, which is first spring fixation portion 26.

As described above, in Variation 1, a plurality of constituent elements of movable body 20A are integrated together, and it is thus possible to improve the assemblability. By setting the strengths of parts, spring retaining parts 22 and 24 and output shaft portion 252A can be molded from a resin to reduce the assembly time and the manufacturing cost.

<Variation 2>

Figure 13:
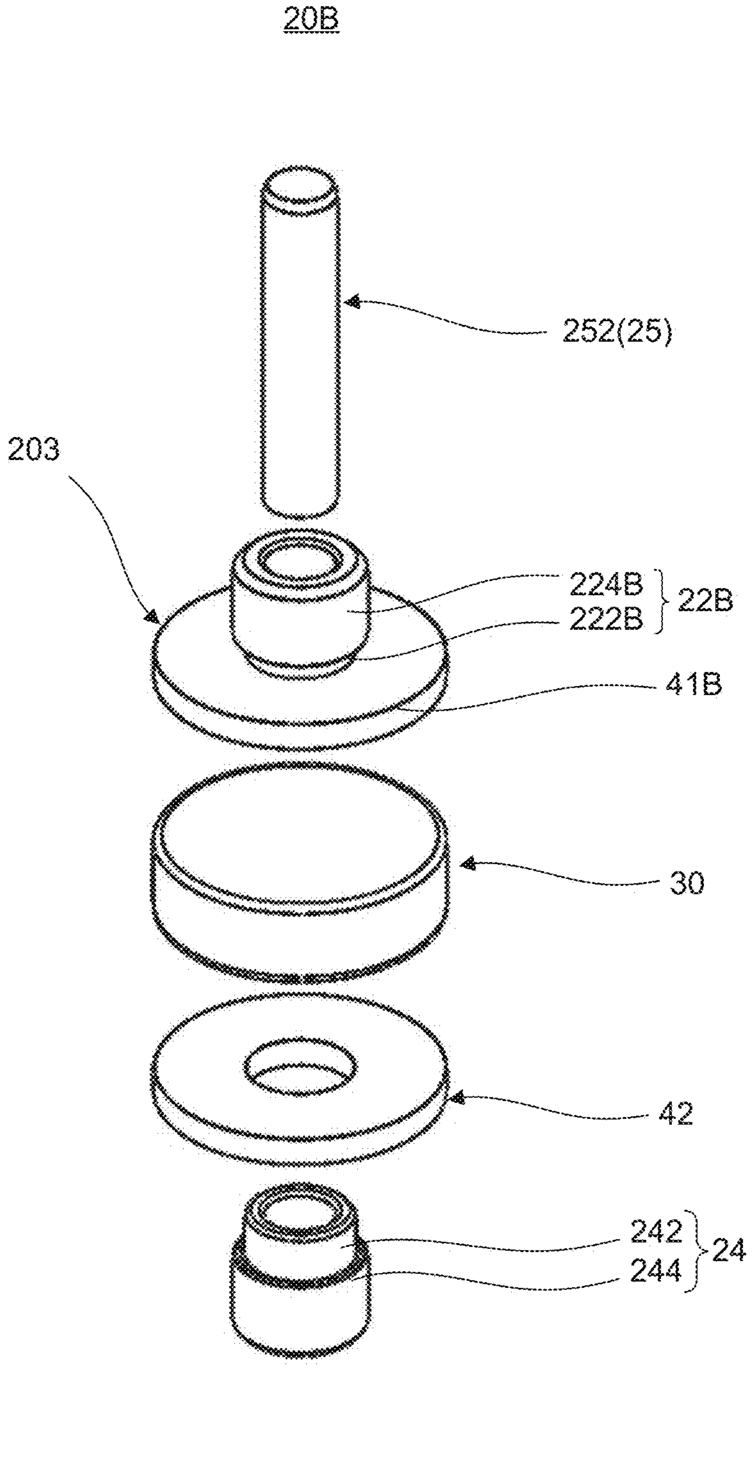
FIG. 13 is an enlarged exploded view of the movable body.

FIG. 12 is a longitudinal sectional view illustrating a configuration of a principal part of Variation 2 of the actuator, and FIG. 13 is an enlarged exploded view of the movable body.

Since actuator 1B as Variation 2 of the present embodiment differs from actuator 1 only in the configuration of movable body 20B and the other configurations are the same, the configuration of movable body 20B will be mainly described below.

Movable body 20B of actuator 1B illustrated in FIG. 10 differs in that yoke 41 and first spring retaining part 22 in the constituent elements of movable body 20 of actuator 1 are integrally formed.

Movable body 20B illustrated in FIGS. 12 and 13 includes sleeve unit 203 in addition to magnet 30, yoke 42, second spring retaining part 24, first spring fixation portion 26, second spring fixation portion 28, and output shaft portion 252, which have the same configurations as those of movable body 20. In sleeve unit 203, yoke 41B having a function similar to that of yoke 41 and first spring retaining part 22B having a function similar to that of first spring retaining part 22 are integrally formed as a single member.

Axially penetrating opening portion 23B is formed in an axial central portion of sleeve unit 203, and a base end portion of output shaft portion 252 is inserted in and fixed to the opening portion. Sleeve unit 203 may be formed from a non-magnetic material such as a resin material, or may be formed from the same magnetic material as yoke 41. When sleeve unit 203 is a non-magnetic material formed from resin, yoke 42 on the back surface 30$b$ side of magnet 30 may further be formed from a resin material to secure the weight balance of magnet 30 between the front and back surface 30$a$ and 30$b$ sides. When sleeve unit 203 is formed from a magnetic material, it is possible to prevent a leakage magnetic flux in the axial direction through output shaft portion 252 by forming output shaft portion 252 from a non-magnetic material.

Sleeve unit 203 is attached to front surface 30$a$ of magnet 30 such that yoke 41B is stacked on the magnet, output shaft portion 252 is inserted into opening portion 23B in the sleeve unit, and a base-end-side portion of output shaft portion 252 is internally fitted to the sleeve unit. Further, sleeve unit 203 connects and fixes elastic supporting part 81 between, on one hand, the distal end surface of spring connection portion 224B on one side, which forms a stepped surface on the outer circumference of output shaft portion 252 and, on the other hand, first spring fixation portion 26 being a press-fit ring.

As described above, in Variation 2, a plurality of constituent elements of movable body 20B are integrated together, and it is thus possible to improve the assemblability. By setting the strengths of parts, spring retaining parts 22 and 24 and output shaft portion 252 can be molded from a resin to reduce the assembly time and the manufacturing cost.

<Variation 3>

Figure 14:
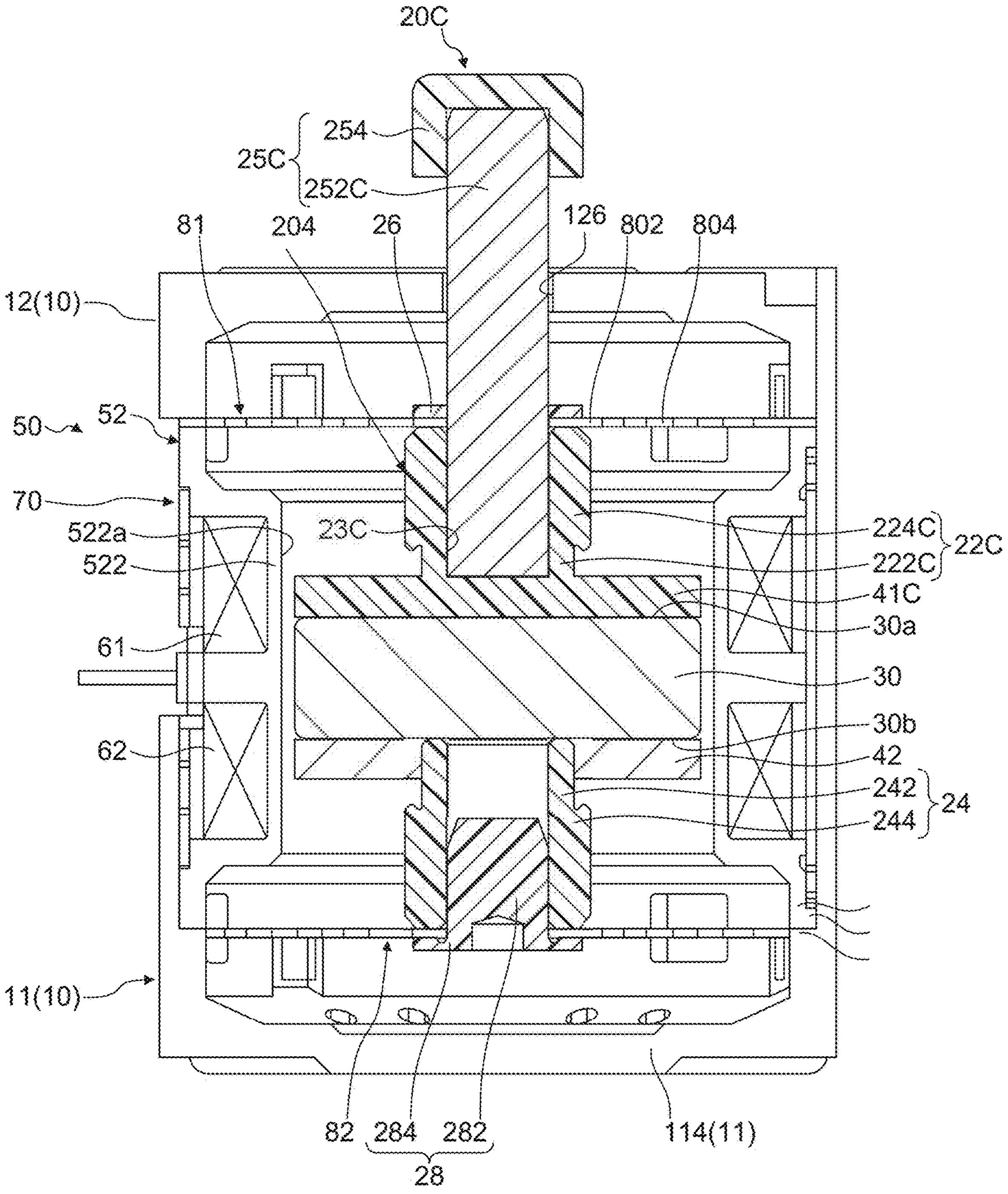
FIG. 14 is a longitudinal sectional view illustrating a configuration of a principal part of Variation 3 of the actuator.
Figure 15:
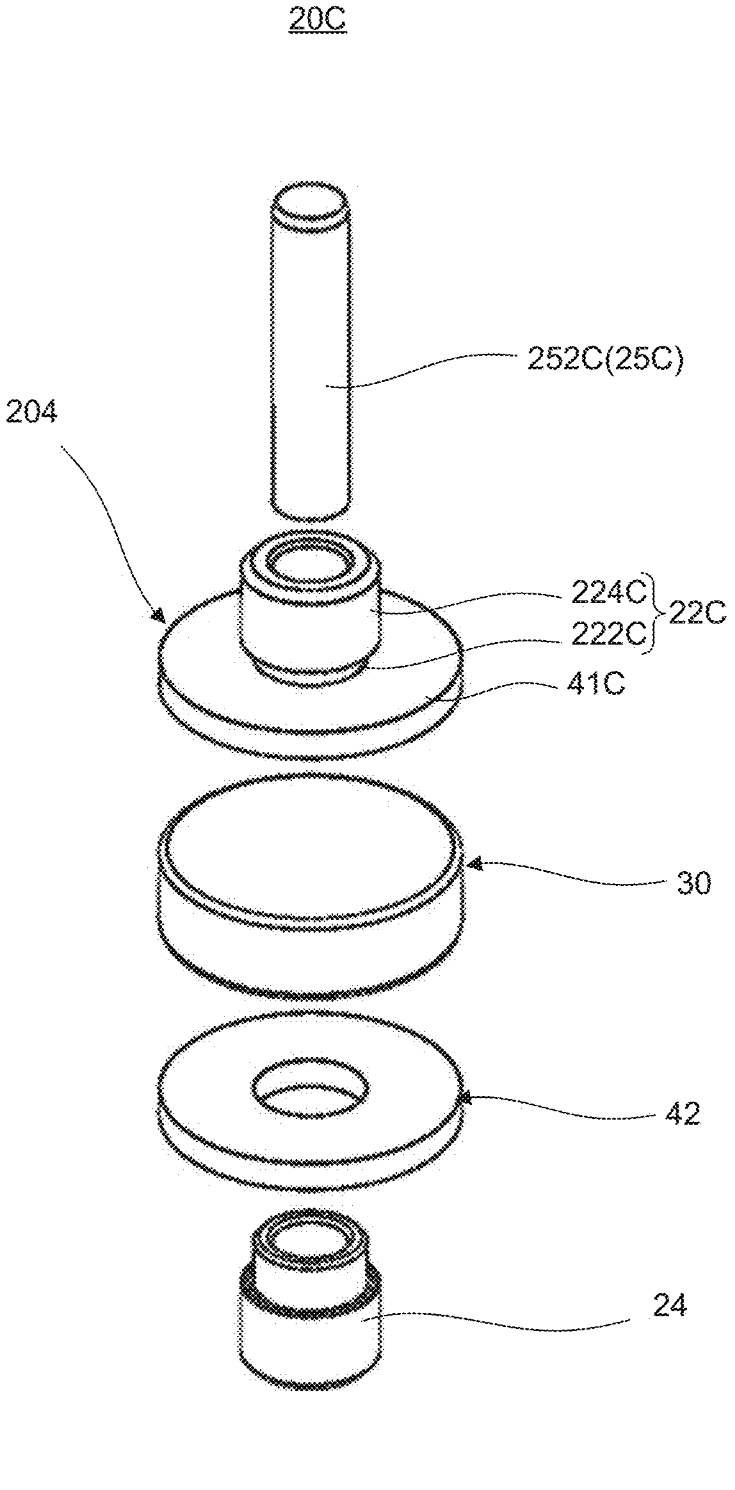
FIG. 15 is an enlarged exploded view of the movable body.

FIG. 14 is a longitudinal sectional view illustrating a configuration of a principal part of Variation 3 of the actuator, and FIG. 15 is an enlarged exploded view of the movable body.

Since actuator 1C as Variation 3 of the present embodiment differs from actuator 1 only in the configuration of movable body 20C and the other configurations are the same, the configuration of movable body 20C will be mainly described below.

Movable body 20C of actuator 1C illustrated in FIG. 14 differs in that parts corresponding to yoke 41 and first spring retaining part 22 in the components of movable body 20 of actuator 1 are integrally formed.

Movable body 20C illustrated in FIGS. 14 and 15 includes sleeve unit 204 and protruding part 25C in addition to magnet 30, yoke 42, second spring retaining part 24, first spring fixation portion 26, and second spring fixation portion 28, which have the same configuration as those of movable body 20.

Sleeve unit 204 is configured as a single member by integrating together yoke 41C having a function similar to that of yoke 41 and spring retaining part 22C having a function similar to that of spring retaining part 22. In sleeve unit 204, yoke 41C unlike yoke 41 is a solid member and is formed by, for example, a disk.

That is, opening portion 23C in the center of spring retaining part 22C of sleeve unit 204 is formed in a recessed shape with the top surface of yoke 41C serving as a bottom surface, and output shaft portion 252C is inserted in the opening portion. Output shaft portion 252C is positioned and fixed on the axis of movable body 20C by being inserted into opening portion 23C.

Thus, output shaft portion 252C does not come into contact with magnet 30 via sleeve unit 204. Note that sleeve unit 204 may be formed from a non-magnetic material such as a resin material or the like, or may be formed from the same magnetic material as yoke 41. When sleeve unit 203 is formed from resin, yoke 42 on back surface 30*b* of magnet 30 may also be formed from resin. When sleeve unit 204 is formed from a magnetic material, it is possible to prevent a leakage magnetic flux in the axial direction through output shaft portion 252C by forming output shaft portion 252C from a non-magnetic material.

Sleeve unit 204 is attached to front surface 30*a* of magnet 30 such that yoke 41C is stacked on the front surface, and the base end portion of output shaft portion 252C is internally fitted to opening portion 23C while making contact with the bottom surface of opening portion 23C. In addition, sleeve unit 204 connects and fixes the inner circumferential surface of elastic supporting part 81 between, on one hand, the distal end surface of spring connection portion 224C on one side, which forms a stepped surface on the outer circumference of output shaft portion 252C and, on the other hand, first spring fixation portion 26.

As described above, in Variation 3, a plurality of constituent elements of movable body 20C are integrally formed, and it is thus possible to improve assemblability. By setting the strengths of parts, spring retaining part 24 and output shaft portion 252C can be molded from a resin to reduce the assembly time and the manufacturing cost.

<Variation 4>

Figure 16:
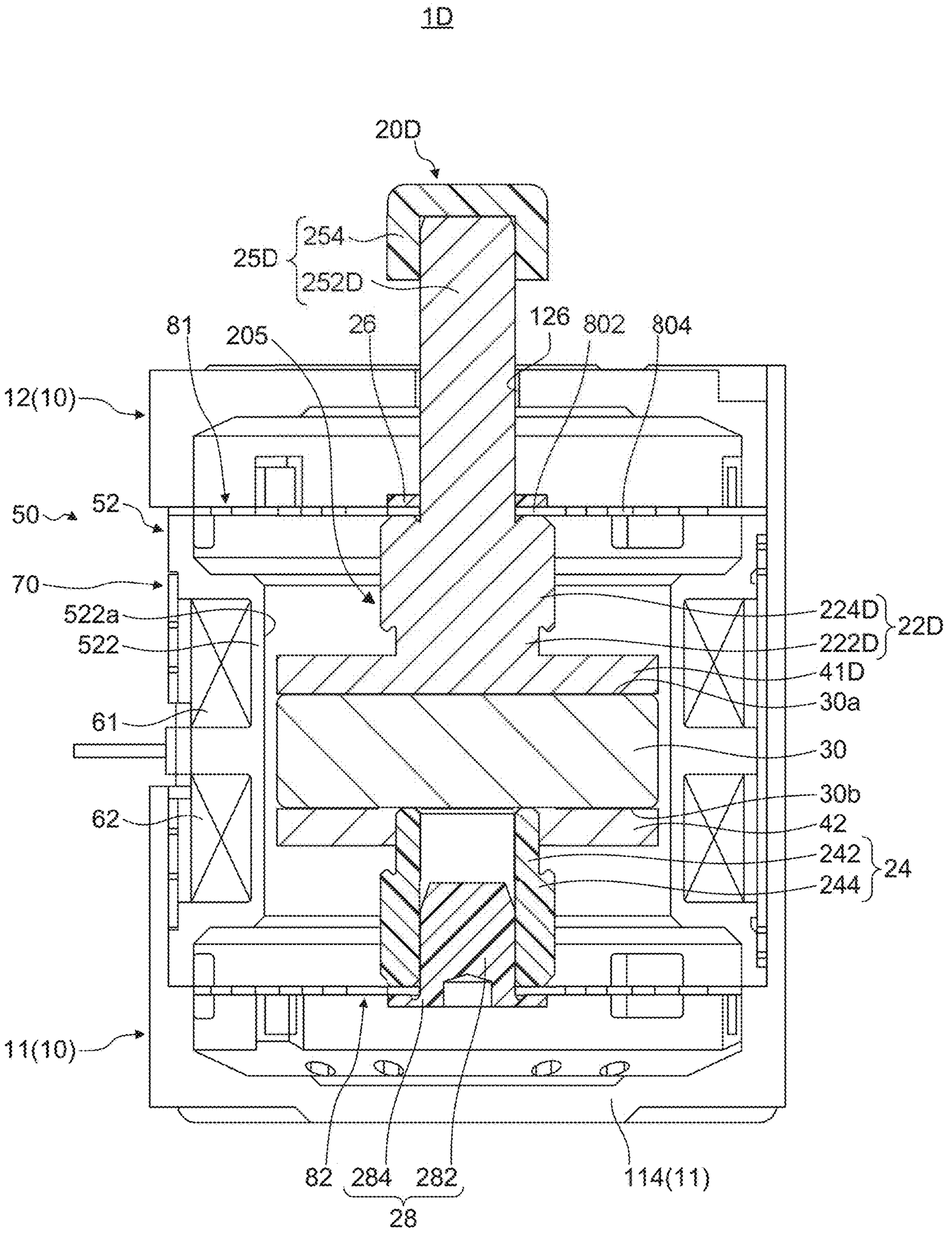
FIG. 16 is a longitudinal sectional view illustrating a configuration of a principal part of Variation 4 of the actuator.
Figure 17:
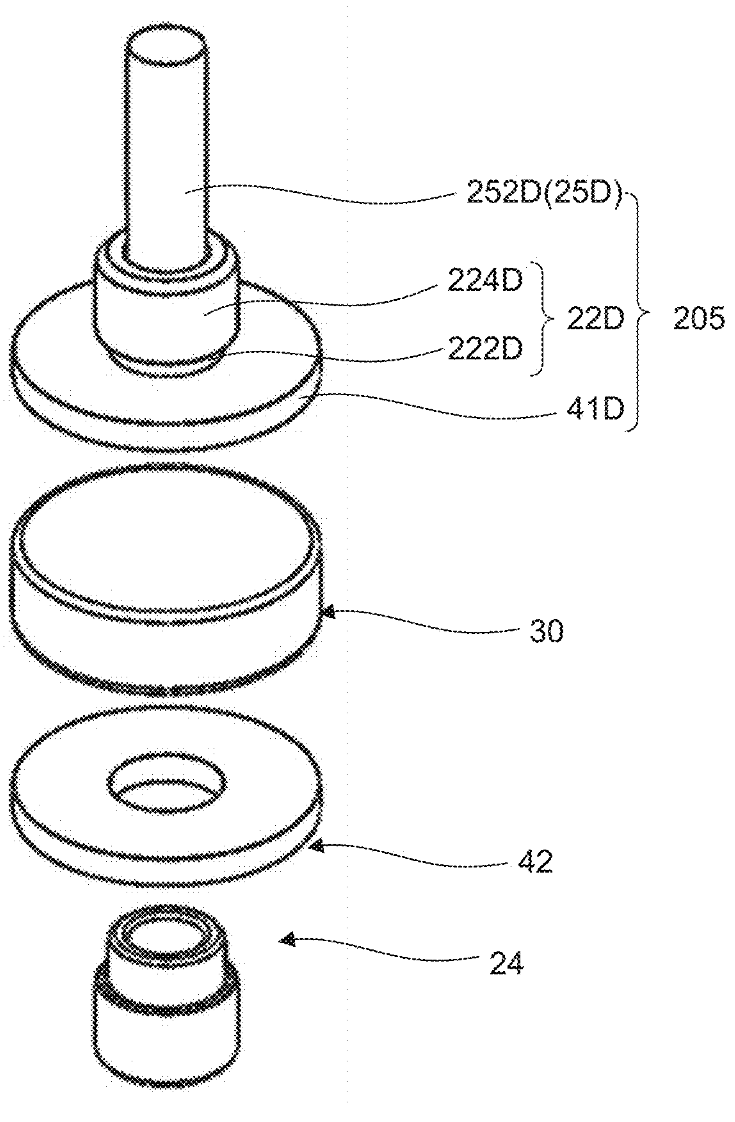
FIG. 17 is an enlarged exploded view of the movable body.

FIG. 16 is a longitudinal sectional view illustrating a configuration of a principal part of Variation 4 of the actuator, and FIG. 17 is an enlarged exploded view of the movable body.

Since actuator 1D as Variation 4 of the present embodiment differs from actuator 1 only in the configuration of movable body 20D and the other configurations are the same, the configuration of movable body 20D will be mainly described below.

Movable body 20D of actuator 1D illustrated in FIG. 16 differs in that parts corresponding to yoke 41, first spring retaining part 22, and output shaft portion 252 in the constituent elements of movable body 20 of actuator 1 are integrally formed.

Movable body 20D illustrated in FIGS. 16 and 17 includes shaft unit 205 in addition to magnet 30, yoke 42, second spring retaining part 24, first spring fixation portion 26, and second spring fixation portion 28, which have the same configurations as those of movable body 20.

Shaft unit 205 is configured as a single member by integrating yoke 41D having a function similar to that of yoke 41, spring retaining part 22D having a function similar to that of spring retaining part 22, and output shaft portion 252D having a function similar to that of output shaft portion 252. In shaft unit 205, yoke 41D unlike yoke 41 is a solid member, and is formed by, for example, a disk.

That is, in shaft unit 205, joint portion 222D of spring retaining part 22D, spring connection portion 224D, and output shaft portion 252 are continuously disposed on the center portion of yoke 41D in this order in one direction (upper direction) on the axis of movable body 20D.

As a result, the yoke, the spring retaining part, and the output shaft portion can be assembled at once only by attaching shaft unit 205 to front surface 30*a* of magnet 30. Shaft unit 205 may be formed from a non-magnetic material such as a resin material or the like, or may be formed from the same magnetic material as yoke 41.

Shaft unit 205 is attached to front surface 30*a* of magnet 30 such that stack yoke 41D is stacked on the front surface. In addition, shaft unit 205 connects and fixes the inner circumferential surface of elastic supporting part 81 between, on one hand, the distal end surface of spring connection portion 224D on one side, which forms a stepped surface on the outer circumference of output shaft portion 252D and, on the other hand, first spring fixation portion 26.

As described above, in Variation 4, a plurality of the components of movable body 20D are integrally formed. Specifically, three members are manufactured as shaft unit 205 as a single integral component. Thus, the assembly is facilitated, and shaft unit 205 itself can secure a high rigidity.

<Variation 5>

Figure 18:
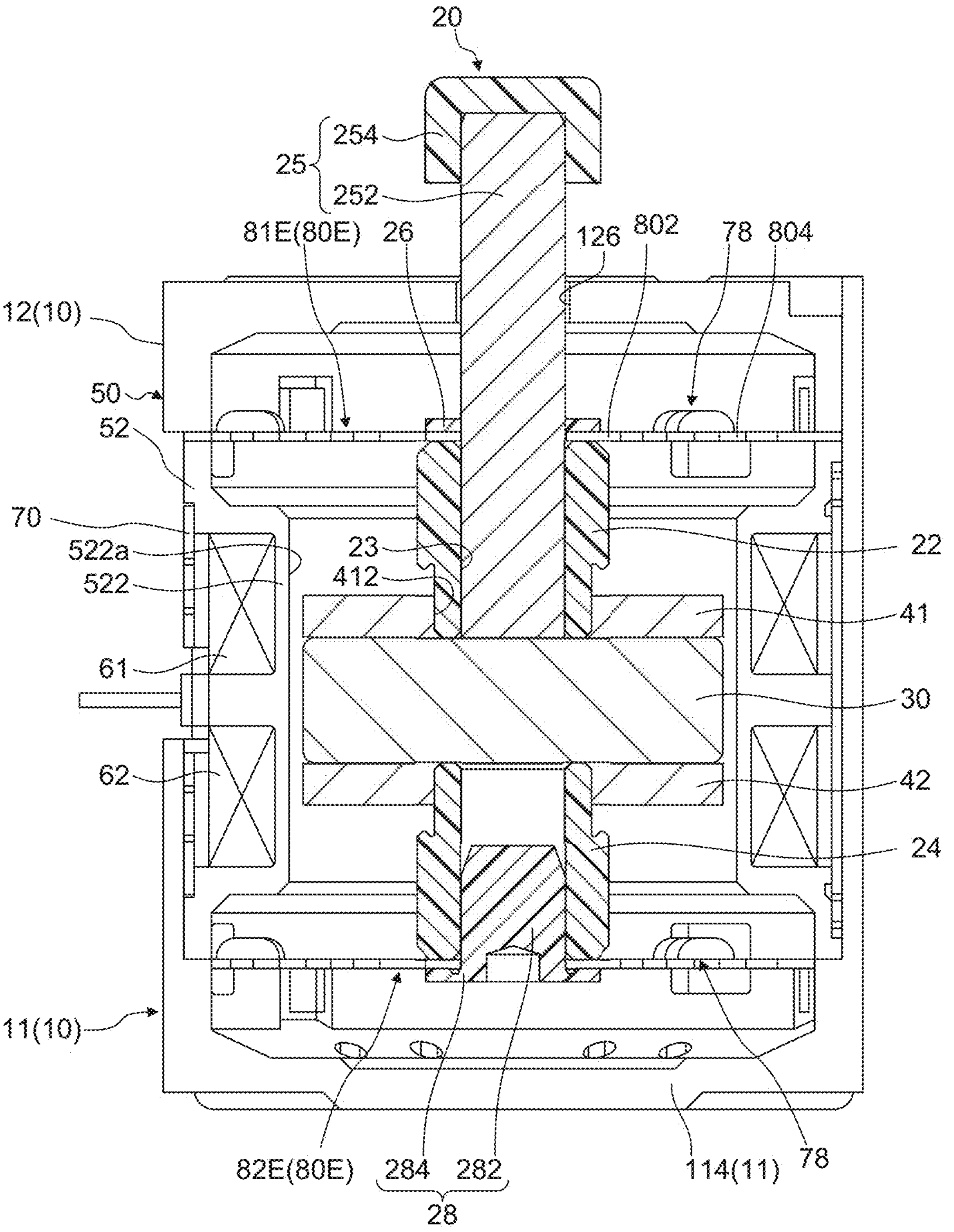
FIG. 18 is a longitudinal sectional view illustrating a configuration of a principal part of Variation 5 of the actuator.
Figure 19:
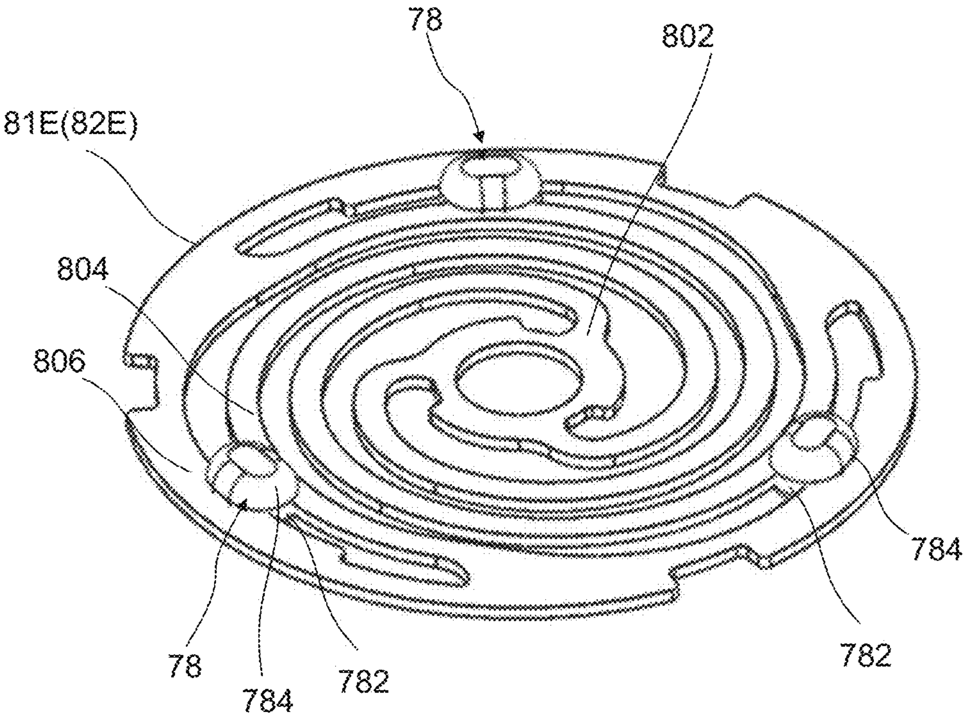
FIG. 19 is a perspective view of a leaf spring.

FIG. 18 is a longitudinal sectional view illustrating a configuration of a principal part of Variation 5 of the actuator, and FIG. 19 is a perspective view of a leaf spring.

Actuator 1E according to Variation 5 of the present embodiment differs from actuator 1 only in the configurations of elastic supporting parts 81 and 82, and the other configurations are the same.

Actuator 1E illustrated in FIG. 18 further includes damping parts 78 disposed on each of elastic supporting parts 81 and 82, additionally to the configuration of actuator 1.

As illustrated in FIG. 19, damping parts 78 are disposed such that, for example, portions thereof are inserted between spring portions from one surface side of each of elastic supporting parts 81E and 82E, specifically, between outer circumferential fixing portion 806 and deformation arm portions 804, and spans between the spring portions.

Each of damping parts 78 includes elastically deformable push-in portion 782 and flange 784 formed continuously with elastically deformable push-in portion 782.

Damping parts 78 are disposed such that when elastic push-in portions 782 are inserted between the spring portions from one surface side of elastic supporting part 81 (82), specifically, between outer circumferential fixing portion 806 and deformation arm portions 804, flanges 784 span between the spring portions.

Note that push-in portions 784 may be fixed on the back surface side of elastic supporting part 81E (82E) via a thermosetting resin, an adhesive which is not adhered to elastic supporting part 81E (82E) (not illustrated), or the like in such a manner that push-in portions 782 do not come off from between the spring portions. Note that damping parts 78 do not have to be an elastomer as long as they are formed from a material having a damping function, and may be formed from a thermosetting resin, an adhesive material, or the like.

Damping parts 78 may have any configuration as long as they sandwich elastic supporting part 81 (82) from opposite sides by the plate-shaped flanges and separate members joined at push-in portions to a member having the same function as the flanges.

With this configuration, damping parts 78 damp a sharp spring resonance in elastic supporting part 81E (82E), so as to prevent a significant increase in vibrations at frequencies close to the resonance frequency and, thus, to prevent an increase in difference in vibration due to frequencies. Thus, movable body 20 suppresses the resonance peak before plastic deformation, and can thus generate stable vibration over a wide range without making contact with lid portion 12 and bottom portion 114 and prevent abnormal noise due to contact. Damping parts 78 may be formed in any shape, from any material, or the like as long as they prevent the occurrence of sharp vibrations in elastic supporting part 81 (82).

<Variation 6>

Figure 20:
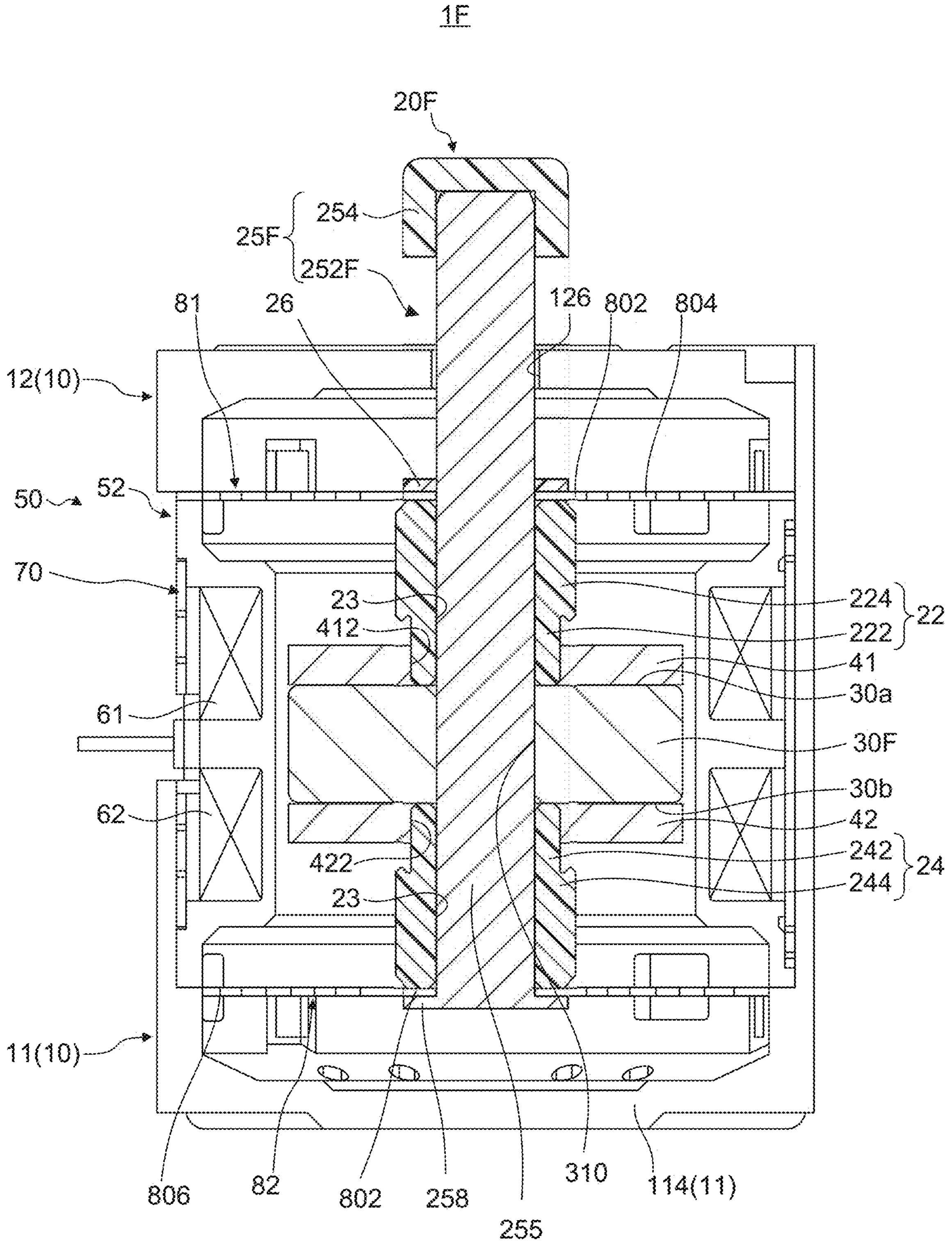
FIG. 20 is a longitudinal sectional view illustrating a configuration of a principal part of Variation 6 of the actuator.
Figure 21:
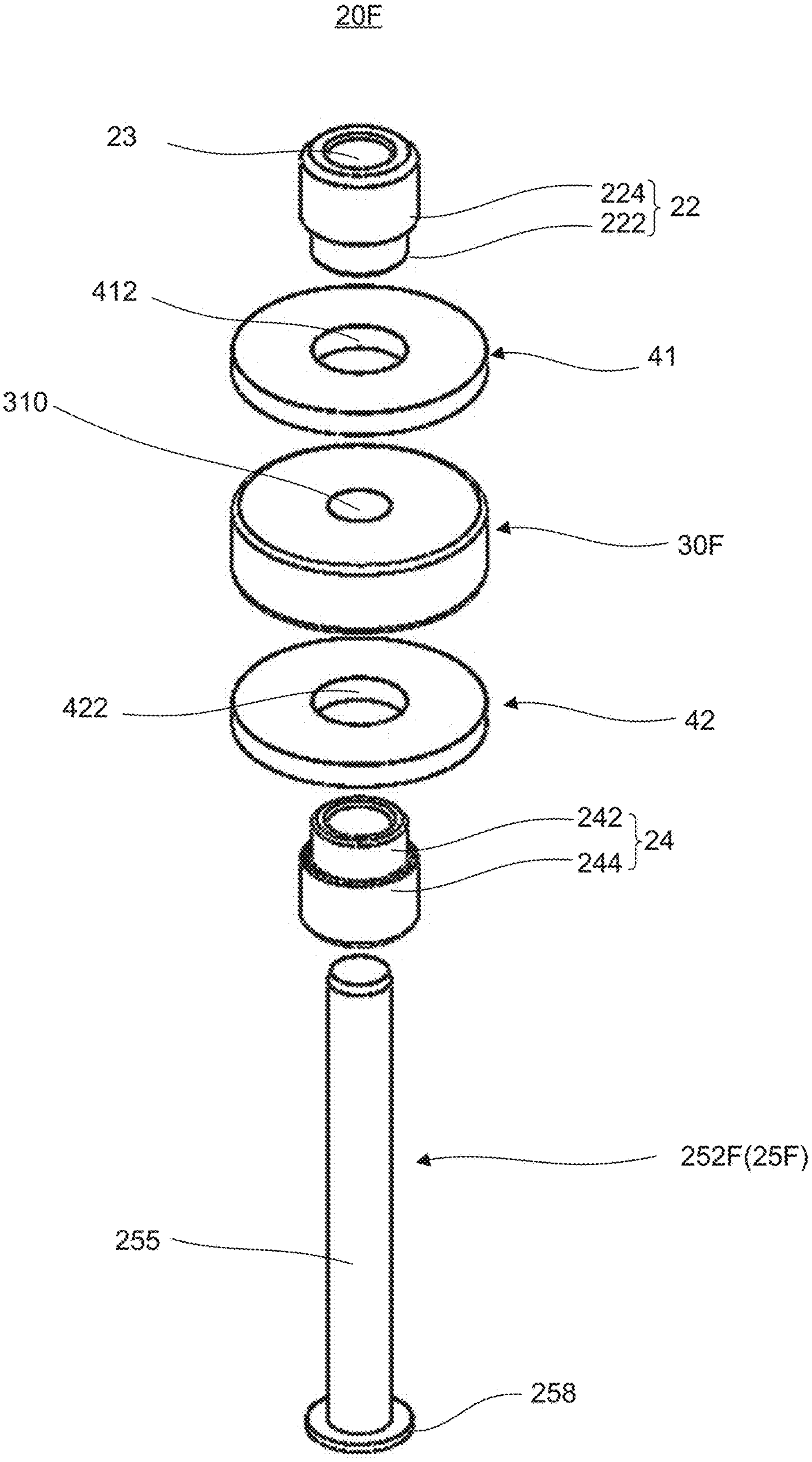
FIG. 21 is an enlarged exploded view of the movable body.

FIG. 20 is a longitudinal sectional view illustrating a configuration of a principal part of Variation 6 of the actuator, and FIG. 21 is an enlarged exploded view of the movable body.

Since actuator 1F as Variation 6 of the present embodiment differs from actuator 1 only in the configuration of movable body 20F and the other configurations are the same, the configuration of movable body 20F will be mainly described below.

Movable body 20F of actuator 1F illustrated in FIG. 20 differs in that, in the constituent elements of movable body 20 of actuator 1, output shaft portion 252F passes through magnet 30F, yokes 41 and 42, first spring retaining part 22, and second spring retaining part 24.

Movable body 20F illustrated in FIGS. 20 and 21 includes output shaft portion 252F (protruding part 25F) and magnet 30F in addition to yokes 41 and 42, first spring retaining part 22, second spring retaining part 24, first spring fixation portion 26, and second spring fixation portion 28 having the same configurations as those of movable body 20.

Movable body 20F includes magnet 30F provided with an opening portion penetrating through the center of magnet 30, and yokes 41 and 42 having the same outer diameter as magnet 30F are disposed on front and back surfaces 30*a* and 30*b* of magnet 30F, respectively.

Opening portion 310 of magnet 30F has an inner diameter allowing insertion of output shaft portion 252F in the opening portion. The inner diameter of opening portion 310 of magnet 30F is substantially the same as the outer diameter of output shaft portion 252F, and is smaller than the inner diameter of yoke 41.

Joint portions 222 and 242, which are one ends of spring retaining parts 22 and 24, are inserted in and fixed to the opening portions of yokes 41 and 42 on the opposite sides of magnet 30F, respectively.

Output shaft portion 252F is a flanged shaft, and has the function of second spring fixation portion 26 and the function of output shaft portion 252.

Output shaft portion 252F includes cylindrical shaft portion 255 and flanged portion 258 integrally formed on the base end portion of shaft portion 255.

Output shaft portion 252F extends between the opposite end portions of the movable body.

Inner circumferential portion 802 of elastic supporting part 82 is sandwiched between flange portion 258 of output shaft portion 252F and the ring-shaped end surface of spring connection portion 244 of first spring retaining part 22.

Output shaft portion 252F integrally fixes elastic supporting part 82, second spring retaining part 24, yoke 42, magnet 30F, yoke 41, first spring retaining part 22, elastic supporting part 81, and first spring fixation portion 26 by sandwiching them between flange portion 258 and first spring fixation portion 26 while piercing them with shaft portion 255.

That is, since output shaft portion 252F is disposed so as to be inserted movable body 20F along the axis, it is possible to assemble the other members without the axis of movable body 20F being displaced. Note that output shaft portion 252F may be formed from a non-magnetic material formed from a resinous material or the like, or may be formed from the same magnetic material as yoke 41. Further, it is preferable that one or more of elastic supporting part 82, second spring retaining part 24, yoke 42, magnet 30F, yoke 41, first spring retaining part 22, and elastic supporting part 81 be fixed to shaft portion 255 by press-fitting, welding, adhesive, or the like.

With this configuration, when movable body 20F is formed, magnet 30F, yokes 41 and 42, and spring retaining parts 22 and 24 are fixed by output shaft portion 252F being a flanged shaft penetrating therethrough and first spring fixation portion 26 being is a press-fit ring. In addition, output shaft portion 252F can securely and stably connect elastic supporting parts 81 and 82 to movable body 20F. It is thus possible to manufacture a stable movable body by structurally fastening the members to one another without relying solely on adhesion.

<Variation 7>

Figure 22:
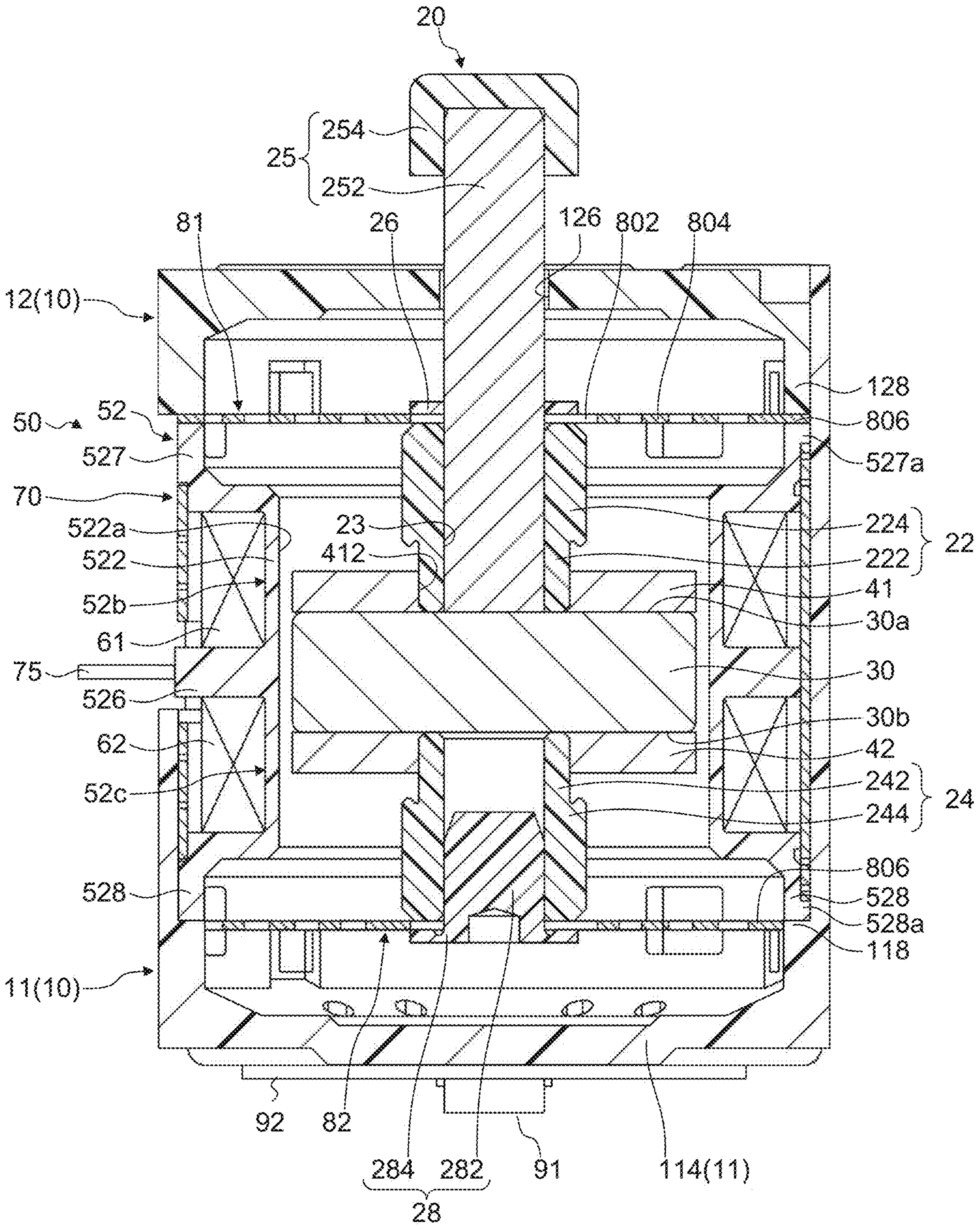
FIG. 22 is a longitudinal sectional view illustrating a configuration of a principal part of Variation 7 of the actuator.
Figure 23:
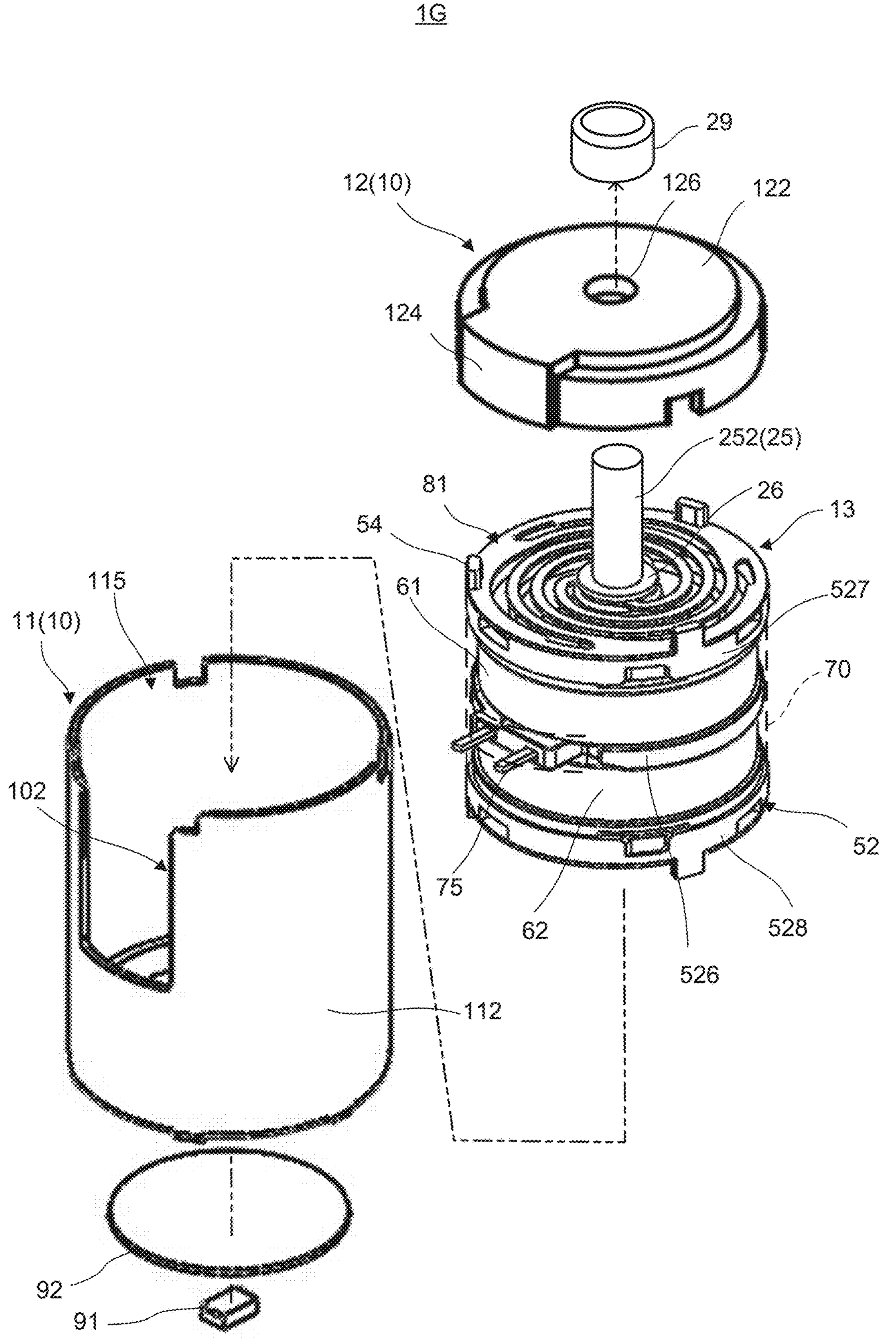
FIG. 23 is an exploded view illustrating an internal configuration of Variation 7 of the actuator from which a case is removed.

FIG. 22 is a longitudinal sectional view illustrating a configuration of a principal part of Variation 7 of the actuator, and FIG. 23 is an exploded view illustrating an internal configuration of Variation 7 of the actuator without the case.

Actuator 1G according to Variation 7 of the present embodiment is different from actuator 1 in that it includes magnetic sensor 91, and the other configurations are the same. Therefore, a different configuration will be described in detail below, and a description of the same configuration as that of actuator 1 will be omitted.

Actuator 1G includes movable body 20 accommodated in hollow case 10 such that the movable body is capable of reciprocating between the upper and lower end surfaces of case 10 in the axial direction (vertical direction) as a moving direction, and magnetic sensor 91 that detects the movement position of movable body 20.

Actuator 1G is connected to the operation section via output shaft portion 25 disposed in movable body 20, and transmits the movement of the movable body to the operation section (not illustrated) to perform so-called force feedback.

Magnetic sensor 91 is disposed at a distance from movable body 20 in the moving direction of movable body 20.

Magnetic sensor 91 is mounted on circuit board 92, detects a change in the magnetic flux caused by the movement of magnet 30 of movable body 20, and detects the displacement of movable body 20.

Magnetic sensor 91 is disposed at a position facing movable body 20 while being spaced apart from movable body 20 in the moving (reciprocating) direction. Note that magnetic sensor 91 may be disposed on movable body 20 and fixing body 50 in any configuration. The moving direction of movable body 20 may be, for example, the side opposite to the side on which movable body 20 moves. That is, the position of magnetic sensor 91 may be the same side or a different side as long as it is in the moving direction of movable body 20.

It is preferable that magnetic sensor 91 be disposed on a central axis extending in the reciprocation direction of movable body 20 (a position overlapping the axis of output shaft portion 252) or in the vicinity of the central axis.

Magnetic sensor 91 together with circuit board 92 is attached to the bottom surface of case main body 11, and magnetic sensor 91 is positioned on the axis of output shaft portion 252 of movable body 20.

Since magnetic sensor 91 is disposed on the outer surface of case 10, it can be assembled outside actuator 1, and the assemblability of actuator 1 can thus be improved.

In addition, it is possible to easily attach or replace magnetic sensor 91 without disassembling actuator 1. In addition, magnetic sensor 91 included in actuator 1 can be easily inspected.

It is preferable that magnetic sensor 91 be a Hall sensor incorporating an amplifier, such as a linear Hall IC, in which the output voltage range is defined by a power supply, and the output of the Hall element is amplified by the amplifier for linear output.

Accordingly, peripheral circuitry can be configured inexpensively and easily without using other sensors, amplifiers, and transducers such as dedicated AD converters. Note that circuit configuration of the magnetic sensor at a subsequent stage is preferably easier than, for example, in that case of simply using a Hall element, and the magnetic sensor may also be a Hall IC which compares an output of the Hall element with a threshold value for output of High/Low. The output voltage range is defined by the power supply also in the Hall IC, and the subsequent-stage circuitry (microcomputer) can thus be easily created.

<Circuit Board (Control Part) 92>

A microcomputer, an actuator driver, and the like in addition to magnetic sensor 91 are mounted on circuit board 92, and the circuit board includes a control part that controls the actuator.

In circuit board 92, magnetic sensor 91 detects an operation load received by movable body 20 via output shaft portion 252, and coils 61 and 62 are energized according to the detection result to control the movement of movable body 20. Note that the control part may not be disposed in actuator 1.

As a result, actuator 1 can detect the operation load and perform haptic feedback specialized for a corresponding pressing operation. In particular, by the load detection, it is possible to perform detection specialized for the pressing operation.

As described above, in actuator 1, the operation load is received by output shaft portion 252, and the force feedback can be generated and presented based on the operation load received by output shaft portion 252. It is thus possible to accurately reproduce a user operation also as a switch haptic feeling, a slider haptic feeling, or the like in quick response to the user operation to easily present it as a feedback.

When magnetic sensor 91 is used, magnet 30 required as an actuator is used for the sensor. It is thus possible to provide an inexpensive movable-body-position detecting means.

Since case 10 is formed from a non-magnetic material, a case lower surface provided with magnetic sensor 91 is formed from a non-magnetic material. As a result, magnetic sensor 91 can detect the stable magnetic flux density in the magnetic circuit including magnet 30 and accurately detect the position of movable body 20.

Further, since the magnetization direction of magnet 30 is parallel to the moving direction of movable body 20, magnetic sensor 91 is to detect the magnetic flux density of the distribution of a single magnetic pole. It is thus possible to enhance the sensor detectability, so as to perform a stable sensor output.

Movable body 20 is accommodated inside annular coils 61 and 62 in an axially drivable state. Thus, it is possible to form a magnetic circuit capable of generating a thrust more efficiently. Further, in this magnetic circuit, the flow of the magnetic flux outward of magnet 30 in the radial direction is restricted by outer yoke 70, and the magnetic flux density to the bottom portion 114 side is thus increased. It is thus possible to accurately and easily detect magnetic sensor 91 disposed on bottom portion 114.

For example, in cases where magnetic sensor 91 and circuit board 92 are mounted in Variations 1A to 1F, the operation performed when the user pushes the operation section is transmitted to protruding parts 25, 25A, 25C, 25D, and 25F connected to the operation section. Protruding parts 25, 25A, 25C, 25D, and 25F move in response to the pushing of the operation section, and movable bodies 20, 20A to 20D, and 20F connected to the protruding parts are also displaced.

At this time, magnetic sensor 91 detects the position of pushed movable bodies 20, 20A to 20D, and 20F by detecting the intensity of the magnetic flux (detected magnetic flux) flowing toward bottom portion 114. Further, magnetic sensor 91 detects the intensity of the detected magnetic flux on the time axis, the speed at the time of pushing can be recognized based on the change of the intensity. In addition, in accordance with the relationship with the spring reaction force relative to the elastic deformation of pushed-in elastic supporting parts 81 and 82, the control part also can determine that the positions of elastic supporting parts 81 and 82 are positions enabling exertion of a force of pushing back, so as to detect a pushing amount from the spring reaction force. Therefore, actuator 1G including magnetic sensor 91 is an actuator having a detection function of detecting a position and a load, which is capable of performing feedback in response to information on the position and speed or information on the load on a movable portion, a push-in load, or the like.

Further, as an actuator of a haptic feeling presenting device, it is possible to perform haptic feedback in response to an operation load and to apply a haptic feeling the same between products even when there is a variation in product performance due to component dimensional tolerances or assembly variations between the products.

That is, according to actuator 1G, when movable body 20 moves, magnet 30 moves. Accordingly, the distribution of the magnetic flux changes, and the position and the speed of the movable part can be detected by detecting the amount of the change. Further, by controlling the current based on the position and speed information, it is possible to control the movement of movable body 20 to perform excellent haptic feeling expression and to suppress variations in haptic feeling. Further, elastic supporting parts 81 and 82 are leaf springs, and it is thus possible to detect the operation load based on a reaction force to the pressing obtained by adding together the elasticities of the leaf springs and the operation section (not illustrated) and the detection result of the movable part position. Accordingly, it is possible to perform haptic feedback corresponding to the pressing force.

Note that actuators 1, 1A, 1B, 1C, 1D, 1E, 1F, and 1G may be configured to vibrate at a resonance frequency of from 30 Hz through 500 Hz that is a resonance frequency used in a typical speaker and allows easier emission of a sound in an audible range. When configured to vibrate in this frequency band, actuators 1, 1A, 1B, 1C, 1D, 1E, 1F, and 1G can be used as a so-called exciter having not only a force feedback function but also a sound reproduction function by vibration as a vibration actuator.

According to actuators 1, 1A, 1B, 1C, 1D, 1E, 1F, and 1G, it is possible to perform quick and strong feedback by directly touching movable bodies 20, 20A, 20B, 20C, 20D, and 20F. Further, it is also possible to perform force feedback of a force corresponding to an input current, to perform force feedback with displacement in accordance with a user's operation, and to perform haptic feeling expression by a long stroke operation at the time of the operation.

Further, the pair of elastic supporting parts 81 and 82 are circular leaf springs, and can secure the rectilinearity of movable bodies 20, 20A, 20B, 20C, 20D, and 20F. Further, even when movement larger than the gap is caused by an external operation load due to an external impact or the like, contact with opening portion 126 of case 10 prevents a further increase in displacement. Thus, it is possible to prevent movable bodies 20, 20A, 20B, 20C, 20D, and 20F from making contact with inner circumferential surface 522*a* of the fixing body.

Embodiment 2

<Overall Structure of Actuator 1H>

Figure 24:
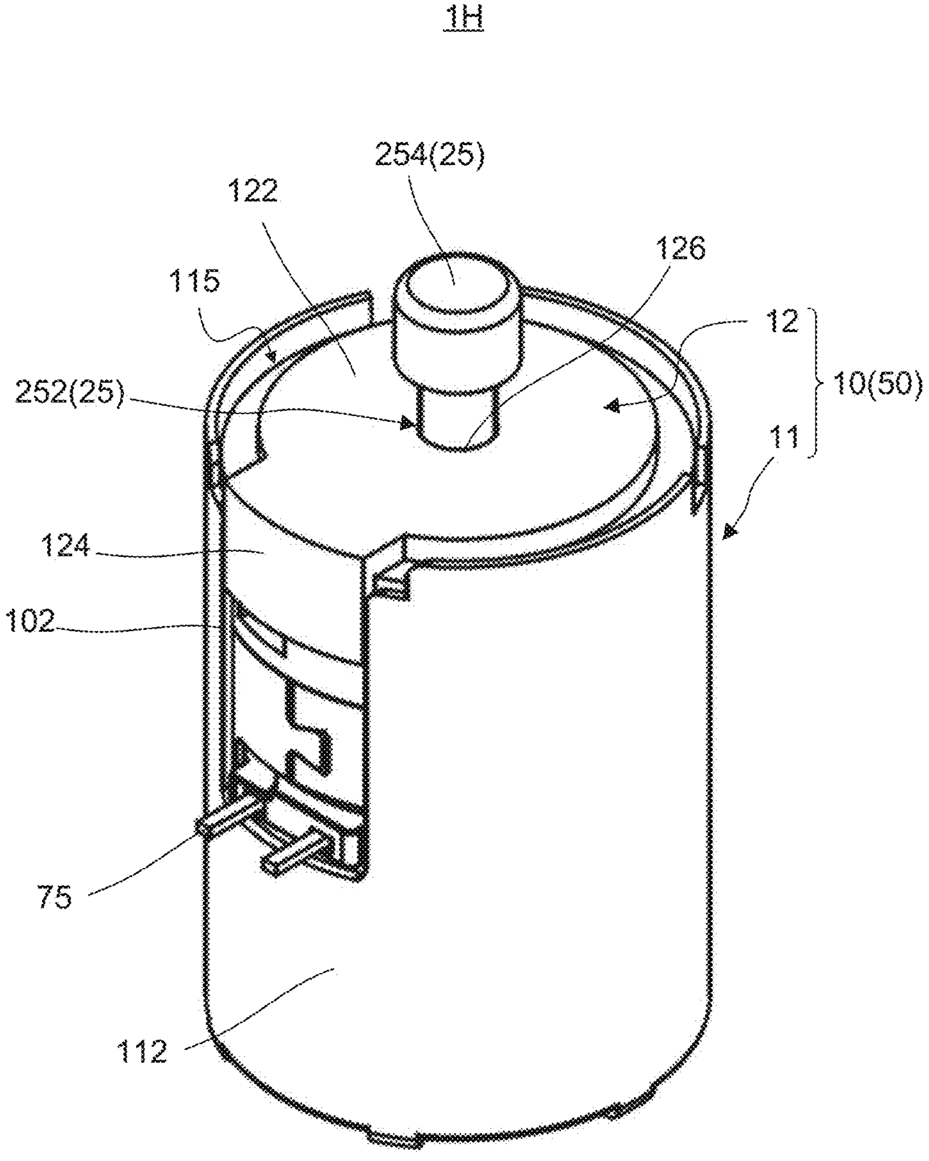
FIG. 24 is an external perspective view of an actuator according to Embodiment 2 of the present invention.
Figure 25:
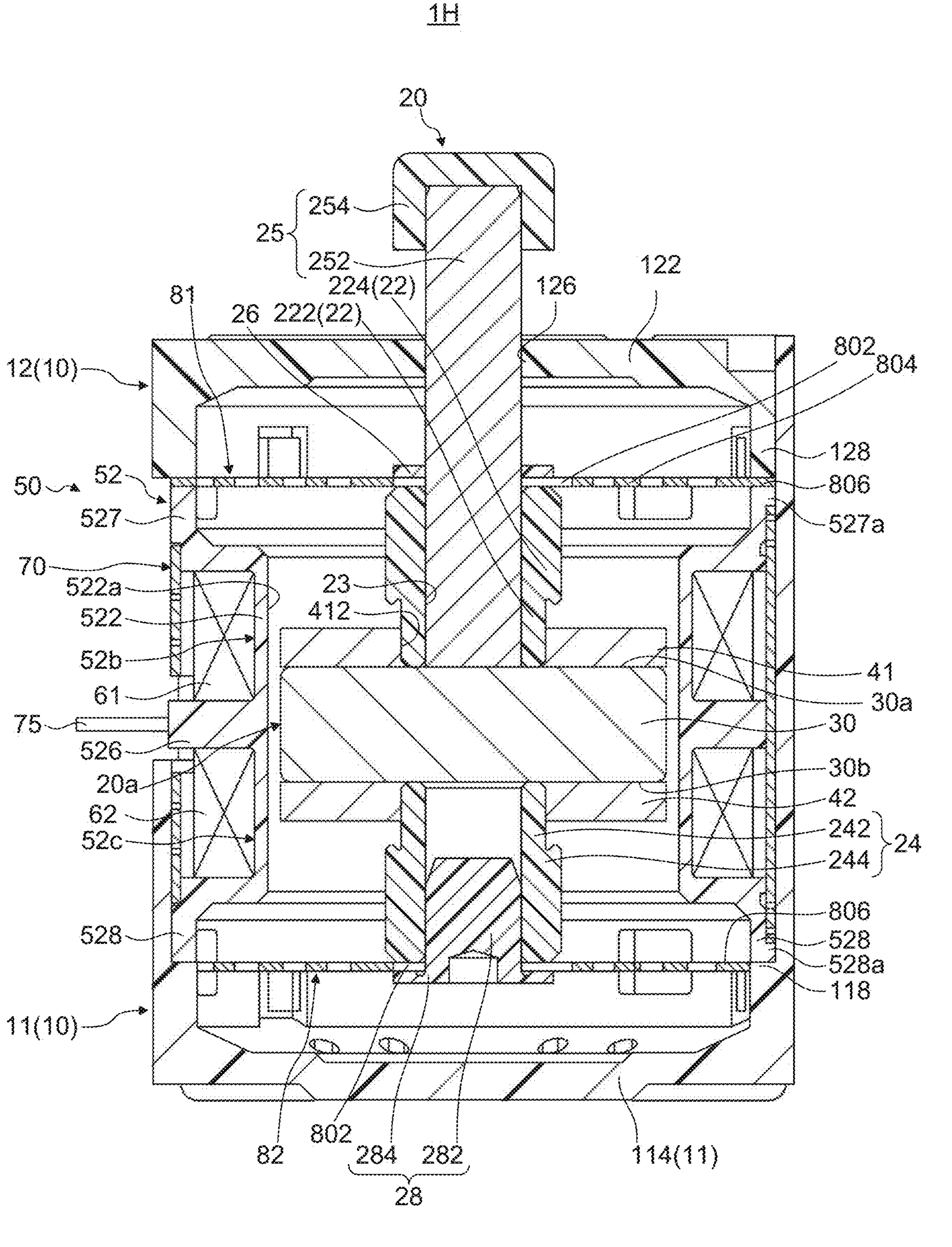
FIG. 25 is a longitudinal sectional view illustrating a configuration of a principal part of the actuator.
Figure 26:
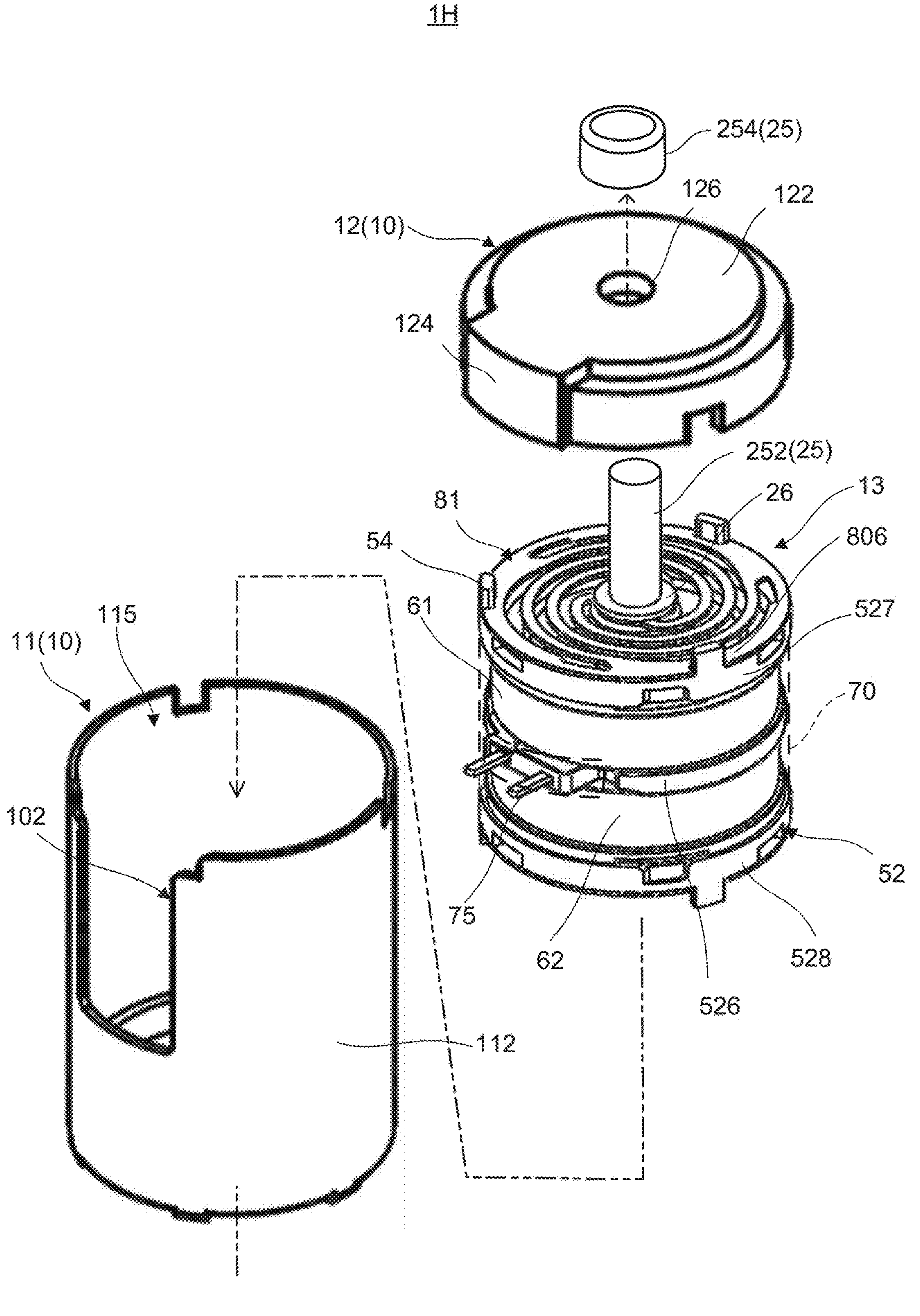
FIG. 26 illustrates an internal structure of the actuator from which a case is removed.
Figure 27:
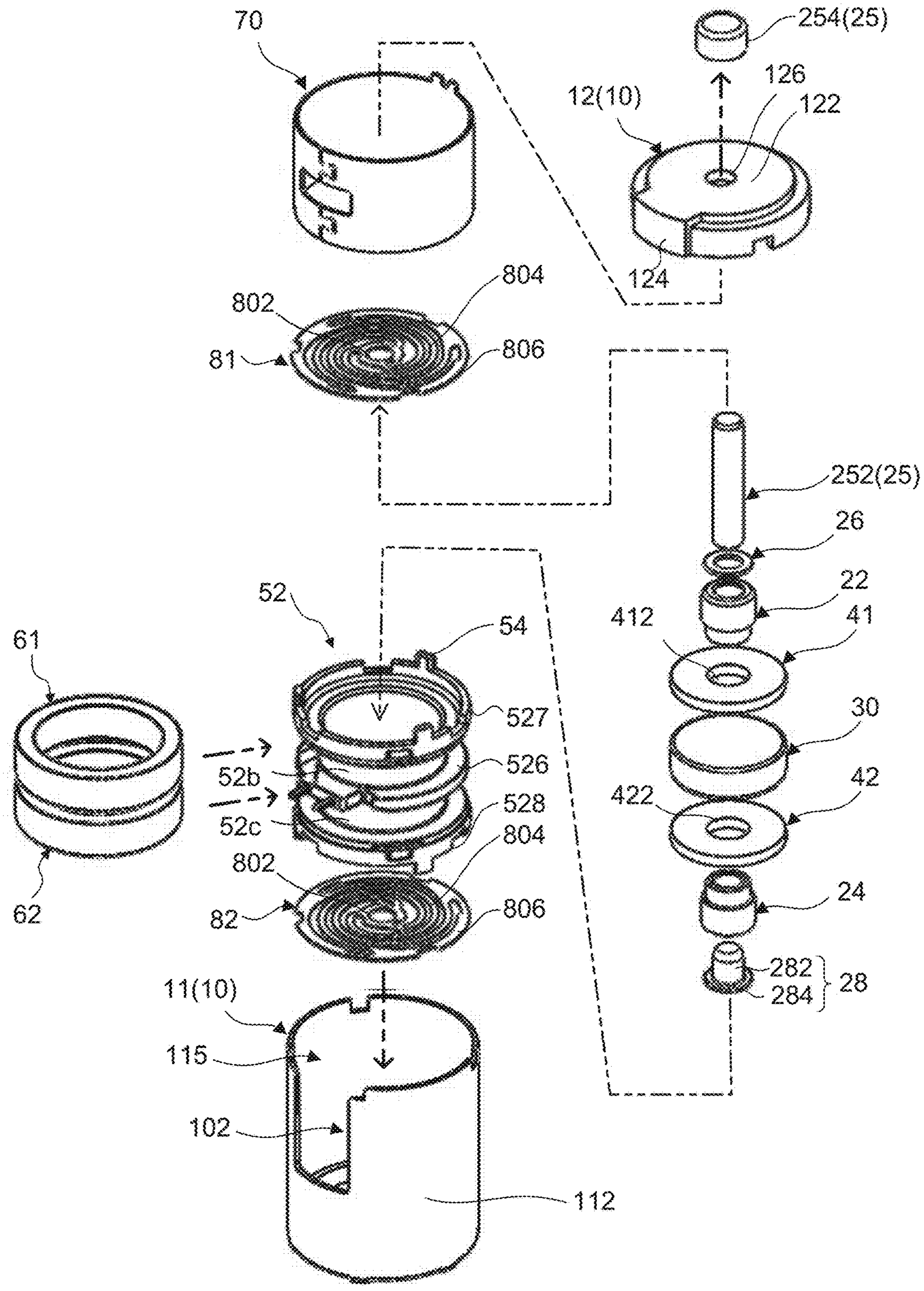
FIG. 27 is an exploded perspective view of the actuator.

FIG. 24 is an external perspective view of an actuator according to Embodiment 2 of the present invention, and FIG. 25 is a longitudinal sectional view illustrating a configuration of a principal part of the actuator. FIG. 26 is a view illustrating an internal structure of the actuator from which a case is removed, and FIG. 27 is an exploded perspective view of the actuator. In FIG. 26, outer yoke 70 is illustrated as transparent for convenience.

Note that the "upper" side and the "lower" side in the present embodiment are given for convenience in order to facilitate understanding, and mean one side and the other side in a reciprocation direction of the movable body in the actuator. That is, when the actuator is mounted on an electronic device (not illustrated), the upper and lower sides of the actuator may be reversed and may also be oriented left and right, but it is preferable that a forward/backward movement direction of output shaft portion 252 (protruding part 25) protruding from the actuator be identical to a direction in which the user touches an operation section. The same applies to the following variations.

Actuator 1H according to Embodiment 2 is used for haptics including tactile sensation presentation technology, for example, and transmits, as a haptic feeling or a force sensation of the user, a reciprocating motion of movable body 20 in response to a touch operation by the user on an operation section. In addition, actuator 1H may present a sound to the user in order to appeal to auditory sensation.

Actuator 1H illustrated in FIGS. 24 and 25 includes protruding part 25 (output shaft portion 252) protruding from case 10 so as to be movable forward and backward, and protruding part 25 is directly connectable to an operation section (for example, a touch panel or the like) operated by the user making contact therewith. Protruding part 25 is a portion of movable body 20 movably accommodated in case 10. Actuator 1H drives the movable body in accordance with the movement of movable body 20 by the operation of the user, to present the user with an output perceptible by the user.

Note that it is preferable that actuator 1H be used as a haptics device that performs operation detection and feedback of a haptic feeling, but the present invention is not limited thereto, and may be implemented as a vibration generation source in an electronic device such as a portable game terminal device. In addition, actuator 1H may be a vibration actuator and may simply be used as a vibration generator, or may be used for a resonant pump, a character input keyboard, an exciter, or the like.

Actuator 1H includes output shaft portion 252 and magnet 30 in movable body 20 and coils 61 and 62 in fixing body 50, and movable body 20 can reciprocate in a straight line direction by cooperation of energized coils 61 and 62 and magnet 30. Actuator 1H includes elastic supporting parts 81 and 82 for supporting movable body 20 such that the movable body can reciprocate with respect to fixing body 50, and when movable body 20 reciprocates, output shaft portion 252 moves forward and backward in the axial direction, or in the upper-lower direction in the figure, at the outside of top surface portion 122 of case 10.

Specifically, actuator 1H includes movable body 20 including a pair of yokes 41 and 42 and a pair of spring retaining parts 22 and 24 in addition to magnet 30, and fixing body 50 including outer yoke 70 in addition to a pair of annular coils 61 and 62. A pair of elastic supporting parts 81 and 82 are provided between movable body 20 and fixing body 50.

Note that a configuration in which a pair of yokes 41 and 42, a pair of spring retaining parts 22 and 24, and a pair of coils 61 and 62 are disposed is employed, but the present invention is not limited thereto, and the number of yokes, spring retaining parts, and coils may also be one, three, or more as long as it is possible to achieve movability on one side or both side in one linear direction.

In actuator 1H, coils 61 and 62, outer yoke 70, magnet 30, and yokes 41 and 42 constitute a magnetic circuit for moving movable body 20. In actuator 1H, coils 61 and 62 are energized from a power supply section (not illustrated) via terminal part 75, and movable body 20 is moved. Movable body 20 can reciprocate in both directions in the axial direction which is a reciprocation direction, or in one direction which is one side in the axial direction. For example, actuator 1H moves in both directions in the axial direction (see the arrow directions indicated by "Upward in moving direction" and "Downward in moving direction" in FIG. 30).

In actuator 1H of present Embodiment 2, movable body 20 reciprocates in the moving direction (also referred to as the axial direction of coils 61 and 62) along a holding-portion main body (protective wall portion) 522 disposed between the coils and movable body 20 inside coils 61 and 62 held by coil holding part 52. The moving direction is not only the axial direction of coils 61 and 62, but also the magnetization direction of magnet 30, and is also the axial direction of coil holding part 52.

In addition, as illustrated in FIG. 26, actuator 1H has a configuration in which case 10 including case main body 11 and lid portion 12 accommodates therein unit 13 including fixing body 50 and movable body 20 connected to each other by elastic supporting parts 81 and 82. Accordingly, assembly of the principal part of actuator 1H can be accurately performed in a process separate from a process for case 10.

<Movable Body 20>

Figure 28:
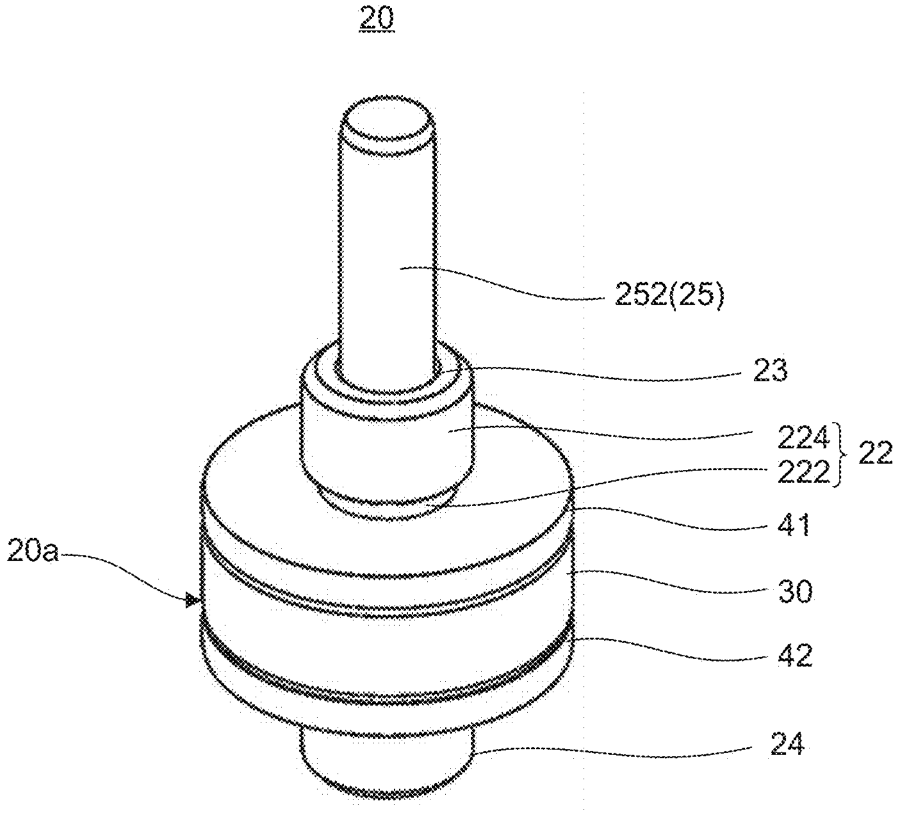
FIG. 28 is a perspective view of the movable body.
Figure 29:
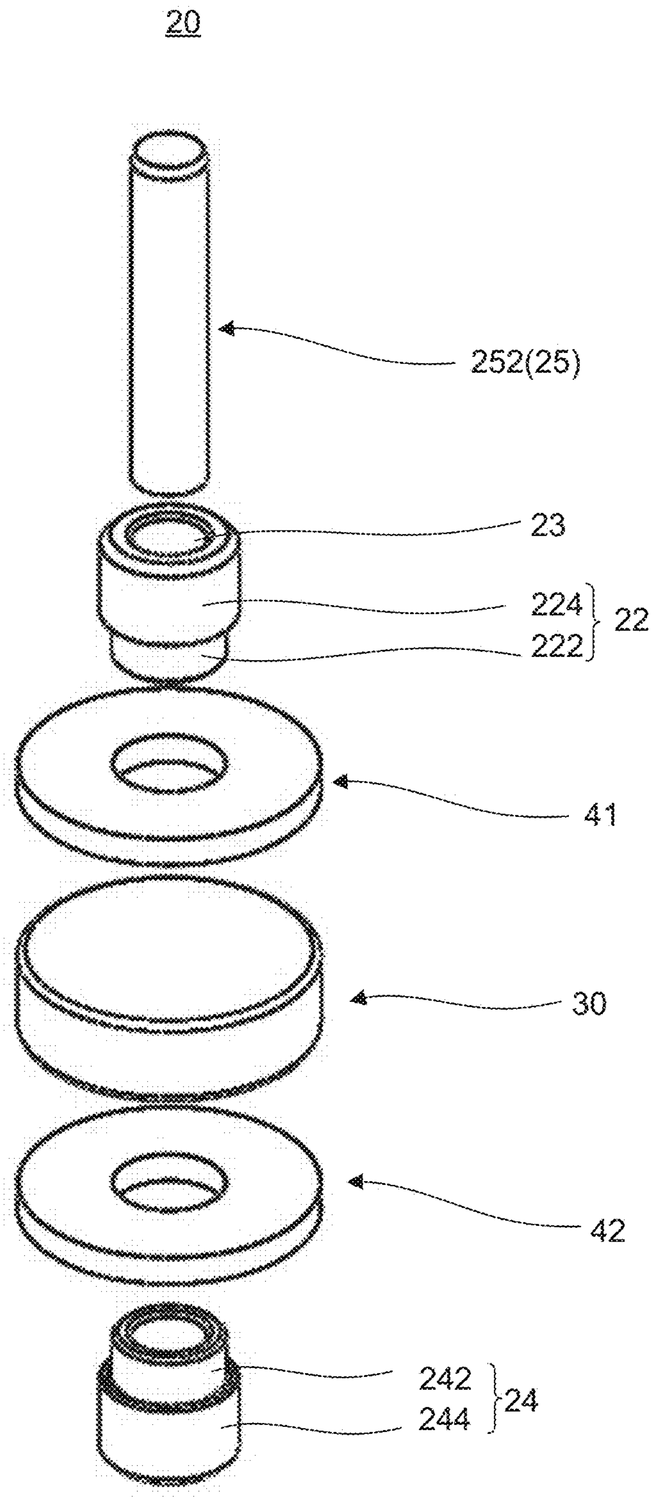
FIG. 29 is an enlarged exploded view of the movable body.

FIG. 28 is a perspective view of the movable body, and FIG. 29 is an enlarged exploded view of the movable body.

As illustrated in FIG. 25, movable body 20 is disposed such that the center of the length of the movable body in the reciprocation direction (the axial direction of the magnet and the upper-lower direction in FIG. 25) is positioned at the same height level as the center of the length of coil holding part 52 in the reciprocation direction via elastic supporting parts 81 and 82 during a non-driven time of the movable body. Here, the non-driven time means a state in which movable body 20 is not driven (including the reciprocating motion or the vibration). In addition, being positioned at the same height level means being positioned so as to face each other with a predetermined distance therebetween in a direction orthogonal to the axial direction of movable body 20.

In present Embodiment 2, it is preferable that the center of the length of magnet 30 and yokes 41 and 42 in the reciprocation direction be disposed at a position facing, in a direction orthogonal to the reciprocation direction, the center of the length in the reciprocation direction between coils 61 and 62 spaced apart from each other in the upper-lower direction. Note that a magnetic fluid may be interposed between holding-portion main body 522 of coil holding part 52 and movable body 20.

As illustrated in FIGS. 25 and 27 to 29, movable body 20 includes magnet 30, yokes 41 and 42, the spring retaining parts (first spring retaining part 22 and second spring retaining part 24), output shaft portion 252, first spring fixation portion 26, and second spring fixation portion 28.

In movable body 20, yoke (first yoke) 41, yoke (second yoke) 42, first spring retaining part 22, second spring retaining part 24, first spring fixation portion 26, and second spring fixation portion 28 are continuously disposed around magnet 30 on the front-back surface sides in the axial direction of magnet 30, that is, in both directions in the reciprocation direction.

Specifically, in movable body 20, a pair of yokes 41 and 42 are disposed on front and back surfaces 30*a* and 30*b* of magnet 30 in a stacked manner, and one end portions of the pair of springs retaining parts 22 and 24 are engaged with opening portions 412 and 422 of the pair of yokes 41 and 42.

Spring retaining parts 22 and 24 are engaged with elastic supporting parts 81 and 82 at the other end portions thereof. First spring retaining part 22 of spring retaining parts 22 and 24 is provided with output shaft portion 252 that protrudes from first spring retaining part 22 to one side of magnet 30 in the axial direction and passes through central opening portion 126 that is an opening portion of lid portion 12 (see FIGS. 24 to 27 and 30).

In movable body 20, outer circumferential surface 20*a* of magnet 30 and yokes 41 and 42 face inner circumferential surface 522*a* of holding-portion main body 522 with a predetermined distance (gap d2 illustrated in FIG. 31) to inner circumferential surface 522*a*. When movable body 20 reciprocates, outer circumferential surface 20*a* reciprocates without coming into contact with inner circumferential surface 522*a*.

<Magnet 30>

Magnet 30 is, for example, solid and magnetized in the reciprocation direction. Magnet 30 is formed in a disk shape and has a shape including a cylindrical shape having a predetermined thickness. Magnet 30 has front and back surfaces 30*a* and 30*b* facing away from each other in the reciprocation direction (thickness direction) as magnetic pole surfaces of different polarities (for example, front surface 30*a* is an S-pole, and back surface 30*b* is an N-pole).

Magnet 30 is disposed so as to be spaced apart by a distance from coils 61 and 62 (to be described later in detail) inward of coils 61 and 62 in a radial direction. Here, the "radial direction" is a direction orthogonal to the axes of coils 61 and 62, and is also a direction orthogonal to the reciprocation direction. The "distance" in the radial direction is a distance between coils 61 and 62 including holding-portion main body 522 and magnet 30, and is a distance that allows movement in the reciprocation direction of movable body 20 without contact between the magnet and the movable body. In other words, in the present embodiment, the "distance" means a predetermined distance between holding-portion main body 522 and magnet 30.

In the present embodiment, magnet 30 is, at the center of the outer circumferential surface in the axial direction on the outer side in the radial direction, disposed so as to face the center of holding-portion main body 522 in a direction orthogonal to the axial direction. Note that magnet 30 may have a shape other than a disk shape, such as a cylindrical shape or a plate shape, as long as it is disposed inside coils 61 and 62 with two magnetized surfaces facing in the extending direction of the axes of coils 61 and 62, that is, in the reciprocation direction.

In the present embodiment, magnet 30 is a solid body. Thus, unlike the case of a tubular body, an effort to process an opening portion is saved, and the areas of the front and back surfaces serving as the magnetic pole surfaces are not reduced by formation of the opening portion. In addition, it is desirable that the center of magnet 30 in the axial direction coincide with the center of movable body 20 in the axial direction. The magnetization direction of magnet 30 is parallel to the moving direction of movable body 20.

<Yokes 41 and 42>

Yokes 41 and 42 are magnetic bodies, and the yokes together with magnet 30 form a movable-body-side magnetic circuit. Yokes 41 and 42 concentrate the magnetic flux of magnet 30 to allow efficient flow without leakage, and effectively distribute the magnetic flux flowing between magnet 30 and coils 61 and 62.

In addition, yokes 41 and 42 may have a function of fixing spring retaining parts 22 and 24 in addition to a function as a part of the magnetic circuit, and yokes 41 and 42 may further have a function as a main body portion of movable body 20 and a function as a weight in movable body 20.

In the present embodiment, yokes 41 and 42 are formed in an annular flat plate shape having the same outer diameter as that of magnet 30. Yokes 41 and 42 are fixed to magnet 30 such that the outer circumferential surfaces thereof are flush with the outer circumferential surface of the magnet, and form outer circumferential surface 20*a* of movable body 20 together with the outer circumferential surface of the magnet.

Yokes 41 and 42 are members with the same shape disposed to sandwich magnet 30 with magnet 30 interposed therebetween, but may be members with different shapes. Yokes 41 and 42 are attached to magnet 30 by being attracted to magnet 30, and are also fixed to magnet 30 via, for example, a thermosetting adhesive such as an epoxy resin or an anaerobic adhesive.

Opening portions 412 and 422 are formed in respective central portions of yokes 41 and 42 so as to extend therethrough in the axial direction, that is, in the thickness direction. One end portions of upper and lower spring retaining parts 22 and 24 are internally fitted and fixed to opening portions 412 and 422, respectively, and in addition, a base end portion of output shaft portion 252 is disposed inside spring retaining part 22 in opening portion 412 on one side. Thus, the state of opening portion 412 is such that spring retaining part 22 and output shaft portion 252 substantially prevent generation of any cavity in the opening portion.

In the present embodiment, when movable body 20 is not reciprocating, yokes 41 and 42 are positioned on the inner side (radially inner side) of coils 61 and 62 so as to face coils 61 and 62, respectively, in a direction orthogonal to the axial direction of coils 61 and 62.

Opening portions 412 and 422 support spring retaining parts 22 and 24 such that the respective axes of spring retaining parts 22 and 24 (here coinciding with the centers of elastic supporting parts 81 and 82) are located on the central axis of movable body 20. Opening portion 422 allows adjustment of the degree of opening in yoke 42 to adjust the weight of movable body 20 and set a suitable reciprocating output. Further, opening portion 412 allows adjustment of the degree of opening in yoke 41 and the insertion amount of output shaft portion 252 to adjust the weight of movable body 20, and set a suitable reciprocating output.

<Spring Retaining Parts 22 and 24>

The pair of spring retaining parts 22 and 24 function as a weight of movable body 20. Spring retaining parts 22 and 24 are disposed on an object so as to sandwich magnet 30 and yokes 41 and 42, and increase the reciprocating output of movable body 20. In the present embodiment, spring retaining parts 22 and 24 are formed in the same shape to reduce the manufacturing cost of the parts. Regarding details of second spring retaining part 24 of spring retaining parts 22 and 24, a description of first spring retaining part 22 is mainly given while the spring retaining parts are provided with respective reference numbers as in "spring retaining parts 22 and 24" in description of first spring retaining part 22 and a description of second spring retaining part 24 will be omitted.

In the present embodiment, spring retaining parts 22 and 24 also function as a shaft of the movable body extending along the central axis of movable body 20, and are interposed between yokes 41 and 42 and elastic supporting parts 81 and 82.

Spring retaining parts 22 and 24 include joint portions 222 and 242, which are one end portions of spring retaining parts 22 and 24, and spring connection portions 224 and 244, which are the other end portions of spring retaining parts 22 and 24. Joint portions 222 and 242 and spring connection portions 224 and 244 are connected to each other in the reciprocation direction.

Spring retaining parts 22 and 24 are tubular bodies and have through-hole 23 extending inside. Spring retaining parts 22 and 24 may also function as a weight. In this case, spring retaining part 24 may have a function as a weight adjustment portion to adjust the weight balance by adding a weight inside through-hole 23. By adding a weight inside through-hole 23 of spring retaining part 24, movable body 20 can be made heavier, and the vibration output of movable body 20 can be increased. The base end portion of output shaft portion 252 is inserted into through-hole 23 of first spring retaining part 22 and is firmly fixed thereto.

Joint portions 222 and 242 are tubular bodies disposed on the axis of movable body 20, and are joined to yokes 41 and 42, respectively. Joint portions 222 and 242 are joined by inserting one end portion sides into opening portions 412 and 422 of yokes 41 and 42, respectively. On the other hand, the other end portions of joint portions 222 and 242 are disposed so as to protrude from yokes 41 and 42 in opposite directions from magnet 30, and are connected to spring connection portions 224 and 244.

In the present embodiment, spring retaining parts 22 and 24 are bonded to yokes 41 and 42 by press-fitting, but the present invention is not limited thereto, and may be bonded by bonding using a thermosetting adhesive such as an epoxy resin or an anaerobic adhesive, for example. Joint portions 222 and 242 are tubular bodies, but they may be solid cylindrical bodies or rod-shaped bodies having recessed portions on the axis.

Spring connection portion 224 is a tubular body that is provided so as to protrude from joint portion 222 to the other side (upward) of spring retaining part 22 and has an outer diameter larger than that of joint portion 222.

Spring connection portions 224 and 244 serve as opposite end portions of movable body 20 separated from each other in the moving direction, and elastic supporting parts 81 and 82 which will be described later are joined respectively to the spring connection portions.

In spring connection portion 224, a joining surface, which is a distal end (upper end) surface thereof, is disposed around output shaft portion 252 and makes contact with inner circumferential portion 802 of elastic supporting part 81.

<Output Shaft Portion 252 (Protruding Part 25)>

Output shaft portion 252 is connected to movable body 20, is movable together with movable body 20, and outputs a motion of movable body 20 to the outside. Output shaft portion 252 is disposed on the axis of movable body 20, the base end side is fixed to movable body 20 directly by being internally fitted to spring retaining part 22, and the protruding end side (other end side) is exposed to the outside of actuator 1H through central opening portion 126 of lid portion 12.

Cap 254 is attached to a distal end of output shaft portion 252. Cap 254 together with output shaft portion 252 forms protruding part 25, but output shaft portion 252 may be protruding part 25. Regarding cap 254, the user may touch cap 254 itself, or a separate member may be attached to cap 254 to apply a haptic feeling to the user via the separate member. Cap 254 may be formed from a material different from the output shaft portion, for example, resin or the like, and may be formed from a material that is easily joined to another member such as an operation section.

Output shaft portion 252 is formed from a durable material, for example, a metallic material, and may be formed from either a magnetic material or a non-magnetic material although a non-magnetic material is preferable. When output shaft portion 252 is a non-magnetic material, it is possible to suppress the leakage magnetic flux near an operation range of the operation section (not illustrated) to which cap 254 is connected. In the case where output shaft portion 252 is formed from a magnetic material, a configuration in which the output shaft portion does not make contact with magnet 30 is desirable.

Output shaft portion 252 is a solid cylindrical body, but is not limited thereto, and may be hollow. Output shaft portion 252 has a circular cross section, but is not limited thereto. Note that the outer shape (outer diameter because of the cylindrical shape) of output shaft portion 252 is substantially the same in size as the inner diameter of central opening portion 126 of lid portion 12, and is an outer diameter allowing the output shaft portion to move while sliding within central opening portion 126.

Output shaft portion 252 together with first spring retaining part 22 is disposed in opening portion 412 of the first yoke 41 on magnet 30. In a case of a configuration in which output shaft portion 252 is disposed so as to be in contact with magnet 30 through opening portion 412, it is possible to assemble the parts in a state in which the parts are positioned on the axis, only by inserting output shaft portion 252 into through-hole 23 of spring retaining part 22 and fitting the output shaft portion to opening portion 412 of yoke 41.

Output shaft portion 252 extends through central opening portion 126 of lid portion 12 to protrude to the outside of actuator 1H through inner circumferential portion 802, which is the end portion (the other end portion) of elastic supporting part 81 (the upper leaf spring) as elastic supporting part 81 on the inner diameter side. Inner circumferential portion 802 of elastic supporting part 81 is sandwiched between the joining surface of spring connection portion 224 and first spring fixation portion 26 in a state of being in contact with the joining surface which is the distal end (upper end) surface of spring connection portion 224. First spring fixation portion 26 is formed in an annular shape and is a press-fit ring that is externally fitted to output shaft portion 252 by press-fitting. Inner circumferential portion 802 of elastic supporting part 81 is firmly sandwiched and fixed by spring connection portion 224 and first spring fixation portion (press-fit ring) 26 in a state of being externally fitted to output shaft portion 252. An adhesive may be used for the sandwiching. As a result, spring connection portion 224 is joined to elastic supporting part 81.

As described above, in movable body 20, output shaft portion 252 extends upward from magnet 30 on the one direction (upper side) side in the moving direction of movable body 20, is disposed slidably through elastic supporting part 81 and lid portion 12, and the other end portion is movable forward and backward outside fixing body 50. The drive of movable body 20 is directly transmitted to the user via output shaft portion 252. Quick response and strong feedback can thus be performed. Further, by displacing movable body 20 in accordance with the operation, a haptic feedback can be performed, and a haptic feeling corresponding to an operation in a long stroke can be expressed.

On the other hand, spring connection portion (lower spring connection portion) 244 of second spring retaining part 24 disposed on the opposite side of spring connection portion 224 of the first spring retaining part 22 across magnet 30 is joined to inner circumferential portion 802, which is an end portion of the lower leaf spring being elastic supporting part 82 on the inner diameter side.

Spring connection portion 244 is a tubular body that is provided so as to protrude from joint portion 242 to the other side (downward) in spring retaining part 24 and has an outer diameter larger than that of joint portion 242. At spring connection portion 244, inner circumferential portion 802 is held between the joining surface being the distal end (lower end) surface of the spring connection portion and second spring fixation portion 28 inserted into a through-hole opened in the joining surface in a state in which inner circumferential portion 802 of the lower leaf spring serving as elastic supporting part 82 is in contact with the joining surface.

Specifically, second spring fixation portion 28 is inserted at shaft-shaped insertion portion 282 into the through-hole in spring connection portion 244, thereby holding inner circumferential portion 802 of elastic supporting part 82 between flange 284 disposed on the outer circumference of the base end portion of the insertion portion and the joining surface of spring connection portion 244. As a result, spring connection portion 244 and elastic supporting part 82 are joined to each other.

Second spring fixation portion 28 may be a rivet such as a blind rivet, for example. Second spring fixation portion 28 fixes shaft-shaped insertion portion 282 in the through-hole in spring connection portion 244 by press-fitting such as caulking.

Spring retaining parts 22 and 24 may be formed from a magnetic material, but are preferably formed from a non-magnetic material. When spring retaining parts 22 and 24 are formed from a non-magnetic material, the magnetic flux from yoke 41 does not flow upward, and the magnetic flux from yoke 42 does not flow downward, and the magnetic fluxes can thus efficiently flow toward coils 61 and 62 located on the outer circumferential side of yokes 41 and 42.

Since movable body 20 is formed from the separate parts including magnet 30, yokes 41 and 42, spring retaining parts 22 and 24, and output shaft portion 252, it is easy to secure the dimensional accuracy required for each part. In addition, it is possible to improve the surface accuracy (the accuracy of the joining surfaces) of spring connection portions 224J and 244 of spring retaining parts 22 and 24, and the dimensional accuracy of the outer diameter of protruding part 25 (output shaft portion 252).

<Elastic Supporting Parts 81 and 82>

Elastic supporting parts 81 and 82 are disposed on opposite sides of movable body 20 in the moving direction, and support movable body 20 movably in the moving direction. Elastic supporting parts 81 and 82 are leaf springs, and are disposed so as to sandwich movable body 20 in the vibration direction of movable body 20, and are disposed on both movable body 20 and fixing body 50 so as to intersect the vibration direction.

Specifically, elastic supporting parts 81 and 82 are disposed to straddle, on one hand, the opposite end portions (upper and lower end portions) of movable body 20 that are spaced apart from each other in the reciprocation direction and, on the other hand, the opening edge portions of fixing body 50 (coil holding part 52) that are disposed radially outward from the opposite end portions. In the present embodiment, elastic supporting parts 81 and 82 are disposed along a direction orthogonal to the reciprocation direction and face each other to sandwich movable body 20 in the reciprocation direction.

Elastic supporting parts 81 and 82 may be non-magnetic materials or magnetic materials (specifically, ferromagnetic materials). Elastic supporting parts 81 and 82 may be formed from a stainless-steel plate such as SUS304, SUS316 as long as they are non-magnetic leaf springs. When elastic supporting parts 81 and 82 are formed from a magnetic material, a stainless-steel plate such as SUS301 may be used. As a material of elastic supporting parts 81 and 82, for example, a magnetic material (for example, SUS301) is known to be more durable and inexpensive than a non-magnetic material (for example, SUS304, SUS316, or the like).

Elastic supporting parts 81 and 82 support movable body 20 so as not to come into contact with fixing body 50 regardless of whether movable body 20 is not driven (not reciprocating) or movable body 20 is driven (reciprocating). Elastic supporting parts 81 and 82 may be formed from any material as long as they are configured to elastically support movable body 20 movably.

Each of elastic supporting parts 81 and 82 is a plurality of plate-shaped spiral springs which have a flat plate shape in a normal state. In each of elastic supporting parts 81 and 82, arc-shaped deformation arm portions 804 extend radially outward at regular intervals from the outer edge portion of inner circumferential portion 802 having the annular plate shape, and are connected to outer circumferential fixing portion 806 having the annular plate shape at the end portions of deformation arm portions 804.

Inner circumferential portions 802 have a shape disposed on the joining surfaces of spring connection portions 224 and 244 of spring retaining parts 22 and 24, and have, for example, an outer diameter substantially the same as the outer diameter of the joining surfaces of spring connection portions 224 and 244.

Deformation arm portions 804 are elastically deformable, are joined to outer circumferential fixing portion 806 at one end portions, are joined to inner circumferential portion 802 at the other end portions, and connect outer circumferential fixing portion 806 and inner circumferential portion 802 to each other. A plurality of deformation arm portions 804 are disposed in a spiral shape between inner circumferential portion 802 and outer circumferential fixing portion 806 while being spaced from one another by a predetermined interval in the circumferential direction. Movable body 20 may be supported by three or more elastic supporting parts (leaf springs) 81 and 82. The plurality of leaf springs are attached to extend along a direction orthogonal to the reciprocation direction.

In elastic supporting parts 81 and 82, inner circumferential portions 802 are joined respectively to the opposite end portions (spring connection portions 224 and 244) that are separated from each other in the axial direction (reciprocation direction) of movable body 20. Further, outer circumferential fixing portion 806 sides of elastic supporting parts 81 and 82 are disposed so as to protrude radially outward (in the radial direction) at the opposite end portions of movable body 20.

Outer circumferential fixing portions 806 include notches formed in the outer circumferential edges, and are sandwiched between the opposite opening edges of coil holding part 52 and case 10 in a state in which movable-range forming portions (positioning piece portions) 54 of coil holding part 52 are engaged with the notches.

Specifically, in elastic supporting part 81, outer circumferential fixing portion 806 is sandwiched and fixed in case 10 between ring-shaped upper end surface 527*a* of flange portion 527 and pressing portion 128 of lid portion 12. Note that, upper end surface 527*a* means an upper (one-side) end surface of the portion of the upper side (one side) of upper (one-side) flange portion 527 other than movable-range forming portions 54.

Further, in lower elastic supporting part 82, outer circumferential fixing portion 806 is fixed to the lower end portion of coil holding part 52 at the outside of movable body 20 in the radial direction in actuator 1H. Specifically, outer circumferential fixing portion 806 of elastic supporting part 82 is fixed to a portion of annular lower end surface 528*a* of lower flange portion 528 forming the lower end portion of coil holding part 52, the portion being other than movable-range forming portions 54.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 such that the directions of the whirls of elastic supporting parts 81 and 82 are the same, for example.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the vibration direction, and elastically support movable body 20 with respect to fixing body 50. Thus, when the movement amount of movable body 20 is large, the movable body moves in a translational direction (here, the direction on a plane perpendicular to the vibration direction) even slightly while rotating. When the whirl directions of the plurality of leaf springs are opposite each other, the plurality of leaf springs move in a buckling direction or a pulling direction to each other, whereby smooth movement is prevented.

Actuator 1H can cause the movement of movable body 20, in particular, output shaft portion 252 being protruding part 25 with an increased rectilinearity by the pair of elastic supporting parts 81 and 82.

As a result, movable body 20 can be stably moved without being affected by an external impact or disturbance. In particular, since the stability of the linear driving can be increased, both characteristics of the stability of a magnetic sensor output and the stability of a haptic feeling output can be increased.

Elastic supporting parts 81 and 82 of the present embodiment are fixed to movable body 20 such that the whirl directions are the same. Thus, even when the movement amount of movable body 20 is large, elastic supporting parts 81 and 82 can move smoothly, i.e., can be deformed to produce a greater output, so that the output serving as a force feedback can be increased.

However, depending on a desired moving range of movable body 20, the whirl directions of the plurality of elastic supporting parts 81 and 82 may be designed to be opposite directions to each other.

Meanwhile, outer circumferential fixing portion 806 of upper elastic supporting part 81 is, at the outside in the radial direction, fixed to the upper end portion of coil holding part 52. Specifically, outer circumferential fixing portion 806 of elastic supporting part 81 is fixed to a portion of annular upper end surface 527*a* of upper flange portion 527 forming the upper end portion of coil holding part 52 (see FIG. 25), the portion being other than movable-range forming portions 54. Details of the configuration of coil holding part 52 will be described later.

Outer circumferential fixing portion 806 of elastic supporting part 82 is clamped and fixed by annular lower end surface 528*a* of flange portion 528 and step portion 118 formed on a circumferential edge portion of bottom portion 114 within case 10. Note that, lower end surface 528*a* means an upper (other-side) end surface of the portion of the lower side (other side) of lower (other-side) flange portion 528 other than movable-range forming portions 54.

Outer circumferential fixing portions 806 are formed in an annular shape. The outer circumferential portions of the outer circumferential fixing portions are sandwiched between upper and lower end surfaces 527*a* and 528*a* of coil holding part 52 (see FIG. 25) and pressing portion 128 and step portion 118. With this configuration, outer circumferential fixing portions 806 are fixed to fixing body 50.

<Fixing Body 50>

As illustrated in FIG. 25, fixing body 50 holds coils 61 and 62, and supports, via elastic supporting parts 81 and 82, movable body 20 inside coils 61 and 62 in the radial direction such that movable body 20 is freely movable in the moving direction (the coil axial direction, or the axial direction of movable body 20).

Fixing body 50 includes coils 61 and 62, outer yoke 70, and coil holding part 52 that hold coils 61 and 62.

Actuator 1H is formed by connecting, to coil holding part 52, substantially all the components for generating vibrations, such as coils 61 and 62, movable body 20, and case 10 via elastic supporting parts 81 and 82.

Coil holding part 52 is a tubular body, holds coils 61 and 62 disposed on the outer circumferential surface, and surrounds magnet 30 with inner circumferential surface 522*a*. Movable body 20 including magnet 30 is movably disposed inside the coil holding part. Coil holding part 52 may be formed in a bobbin shape, and in this case, coils 61 and 62 are wound on the outer circumference of the inner tubular holding-portion main body (protective wall) of coil holding part 52.

Coil holding part 52 is a tubular body formed from a resin such as a phenolic resin or polybutylene terephthalate (PBT). In the present embodiment, coil holding part 52 is formed from a material containing a phenolic resin such as Bakelite having high flame retardancy.

When coil holding part 52 is formed from a material containing a phenolic resin, a higher flame retardancy is obtained. It is thus possible to improve the safety at the time of driving even when heat is generated by Joule heat when a current flows through coils 61 and 62 held by coil holding part 52. Moreover, the dimensional accuracy is increased and the positional accuracy of coils 61 and 62 is increased accordingly. It is thus possible to reduce variations in vibration characteristics.

Specifically, coil holding part 52 includes tubular holding-portion main body 522, middle flange portion 526, and flange portions 527 and 528 protruding in the radial direction from the outer circumference of holding-portion main body 522, terminal part 75, and movable-range forming portions 54.

Holding-portion main body 522 functions as a protective wall portion for protecting coils 61 and 62 against collision by movable body 20 when movable body 20 disposed inside is being driven. The thickness of holding-portion main body 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of holding-portion main body 522 side by side in the coil axial direction between middle flange portion 526 and flange portions 527 and 528 (coil attachment portions 52*b* and 52*c*). Holding-portion main body 522 positions coils 61 and 62 such that the coils radially externally surround the outer circumferential surfaces of yokes 41 and 42 (the outer circumferential surfaces of magnet 30 and yokes 41 and 42) of movable body 20.

Specifically, the outer circumferential surface of holding-portion main body 522 is partitioned by middle flange portion 526 and flange portions 527 and 528, and is provided with recessed coil attachment portions 52*b* and 52*c* that open radially outward on the outer circumferential side.

Terminal part 75 functions as a connector connection portion to which coil windings of coils 61 and 62 are tied for connection to an external device. Coils 61 and 62 are connected to the external device via terminal part 75, and power can be supplied from the external device to coils 61 and 62.

Terminal part 75 is an electrically conductive member disposed to protrude from the outer circumferential portion of holding-portion main body 522. In the present embodiment, terminal part 75 is press-fitted to the outer circumferential surface of middle flange portion 526 disposed on the outer circumference of holding-portion main body 522 centrally in the vibration direction. Terminal part 75 is thus disposed to protrude from the outer circumferential surface of middle flange portion 526.

Flange portions 527 and 528 are disposed respectively on opposite end portions of holding-portion main body 522 which are separate from each other in the axial direction of the bobbin main-body portion (which is also the vibration direction and the upper-lower direction in the present embodiment), so as to form the upper and lower end portions of coil holding part 52.

Elastic supporting parts 81 and 82 are fixed to end portions of flange portions 527 and 528 on the sides away from middle flange portion 526 (upper and lower end portions in the present embodiment).

Movable-range forming portions 54 are projecting portions disposed on the upper and lower end portions of coil holding part 52 to protrude in the axial direction, and form a vibration range between lid portion 12 and bottom portion 114 of case 10 and movable body 20 when coil holding part 52 is accommodated in case 10. Movable-range forming portions 54 are disposed at predetermined intervals on upper and lower annular end surfaces (also referred to as "upper end surface and lower end surface" or "opening end surfaces") 527*a* and 528*a* of flange portions 527 and 528. Upper end surface 527*a* is an opening end surface on one side, and lower end surface 528*a* is an opening end surface on the other side.

Movable-range forming portions 54 are fitted into the notches formed in elastic supporting parts 81 and 82, to perform radial positioning of elastic supporting parts 81 and 82. Movable-range forming portions 54 are fitted in the notches. Accordingly, it is possible to uniformly set the attachment positions of elastic supporting parts 81 and 82 with respect to coil holding part 52 of each individual unit 13, so as to perform stable position determination of elastic supporting parts 81 and 82 with respect to coil holding part 52. Further, with respect to coil holding part 52, elastic supporting parts 81 and 82 are not fixed to the fixing body side via a plurality of components. Thus, a structure less susceptible to component tolerances is achieved, and movement in the circumferential direction and the radial direction such as rotation is restricted. It is thus possible to suppress variations in elastic supporting parts 81 and 82 in products, and to achieve stable characteristics.

Coil holding part 52 is accommodated in case 10 such that movable-range forming portions 54 at the upper and lower end surfaces are in contact with the edge portion of lid portion 12 and the edge portion of bottom portion 114, and is fixed to the edge portion of lid portion 12 and the edge portion of bottom portion 114.

<Coil>

In actuator 1H, coils 61 and 62, together with magnet 30 and yokes 41 and 42, are used for generating a drive source of actuator 1H, in which case the axial direction of coils 61 and 62 (magnetization direction of magnet 30) is the vibration direction.

Coils 61 and 62 generate a magnetic field by energization and move movable body 20. Coils 61 and 62 are disposed radially outside movable body 20. Coils 61 and 62 together with magnet 30 constitute a magnetic circuit similar to a voice coil motor.

Coils 61 and 62 are disposed on coil attachment portions 52*b* and 52*c*, and coils 61 and 62 are disposed at positions facing yokes 41 and 42 in a direction orthogonal to the reciprocation direction in the present embodiment.

Coils 61 and 62 are held by coil holding part 52 such that the center position of the length of the coils in the coil axial direction (reciprocation direction) is substantially the same position (including the same position) in the reciprocation direction as the center position of the length of movable body 20 in the reciprocation direction (the center position of magnet 30 in the reciprocation direction). Coils 61 and 62 of the present embodiment are wound in opposite directions to each other, and are configured such that a current flows in the opposite direction during energization. Coils 61 and 62 are fixed by bonding or the like to recessed coil attachment portions 52*b* and 52*c*, and the outer circumferential surfaces of the coils are surrounded by outer yoke 70 inside case 10.

The end portions of coils 61 and 62 are tied and connected to terminal part 75 of middle flange portion 526. Coils 61 and 62 are connected to an external power supply section via terminal part 75. For example, the respective end portions of coils 61 and 62 may be connected to a direct current supply section, and direct current power may be supplied from the direct current supply section to coils 61 and 62. Thus, coils 61 and 62 can generate, between the magnet and coils 61 and 62, thrust allowing movement on one side in a direction toward each other or away from each other in their axial direction.

Further, the respective end portions of coils 61 and 62 may be connected to an alternating current supply section, and an alternating current power supply (alternating current voltage) may be supplied from the alternating current supply section to coils 61 and 62. Thus, coils 61 and 62 can generate, between the magnet and coils 61 and 62, thrust allowing movement in a direction toward each other or away from each other in their axial direction.

The power supplied to coils 61 and 62 may be either the alternating current or direct current, which generates a thrust of movable body 20 corresponding to the power supply, and it is needless to say that both the alternating current and direct current may be supplied to coils 61 and 62. Actuator 1H may move movable body 20 by superimposing an alternating current on an input direct current. For example, actuator 1H first pushes out or lowers movable body 20, that is, protruding part 25, by an input direct current. Subsequently, when protruding part 25 is pressed by a user's operation, actuator 1H can detect the press or the like and superimpose an input alternating current or pulse on the input direct current, so as to provide a haptic feeling such as force feedback. In addition, at least one of the direct current supply section and the alternating current supply section connected to the respective end portions of coils 61 and 62 may be disposed in the actuator itself.

<Outer Yoke 70>

Outer yoke 70 is a cylindrical magnetic body that surrounds the outer circumferential surface of coil holding part 52 and is disposed at a position that covers coils 61 and 62 radially outward. Outer yoke 70 prevents leakage magnetic flux from actuator 1H to the outside in the radial direction in the magnetic circuit.

Outer yoke 70 is disposed such that the center of the length of outer yoke 70 in the reciprocation direction is located at the same height as the center of magnet 30 in the reciprocation direction that is disposed inside outer yoke 70. The shielding effect of outer yoke 70 makes it possible to reduce the leakage magnetic flux to the outside of the reciprocating actuator.

Outer yoke 70 also makes it possible to increase the thrust constant so as to increase the electromagnetic conversion efficiency in the magnetic circuit. Outer yoke 70 utilizes the magnetic attraction force of magnet 30, and functions as a magnetic spring together with magnet 30. The magnetic spring makes it possible to reduce a stress that would be caused when elastic supporting parts 81 and 82 are mechanical springs, so as to improve the durability of elastic supporting parts 81 and 82.

<Case 10>

Case 10 accommodates movable body 20 together with coils 61 and 62, and includes central opening portion 126 through which protruding part 25 protrudes from spring retaining part 22 of movable body 20.

Specifically, case 10 includes: bottomed cylindrical case main body 11 having circumferential wall portion 112 and bottom portion 114; and lid portion 12 for closing opening portion 115 of case main body 11. Case 10 has a columnar shape. The columnar shape is a shape having a height (thickness) allowing generation of sufficient thrust in the reciprocation direction in cooperation with coils 61 and 62 facing the outer circumference of the movable body. For example, case 10 of present Embodiment 2 is formed in a cylindrical shape by bottomed cylindrical case main body 11 and lid portion 12. However, the case is not limited to this shape. The case may be elliptical cylindrical or polygonal prismatic. The length of the case in the reciprocation direction is longer or shorter than the length of the case in a direction perpendicular to the reciprocation direction. The elliptical shape of the elliptical cylindrical shape and elliptical shape in the present embodiment is mainly an ellipse including parallel straight-line-like portions, and thus means an oval shape.

Lid portion 12 and bottom portion 114 respectively form top surface portion 122 and the lower surface portion (bottom portion 114) of actuator 1H in present Embodiment 2, and are disposed to face movable body 20 of unit 13 with a predetermined gap being interposed between the lid portion and the bottom portion, on the one hand, and the movable body, on the other hand, in the reciprocation direction of movable body 20.

In lid portion 12, central opening portion 126 penetrates top surface portion 122 at the central portion, and top surface portion 112 is provided with projecting portion 124.

Lid portion 12 is formed from, for example, a resin such as polyacetal resin (POM), is excellent in slidability on output shaft portion 252 at central opening portion 126, and is formed from a durable material that is hardly deteriorated. Further, when the material having excellent slidability is used, it is possible to drive the movable body without impairing sliding even when the load of movable body 20 increases.

Projecting portion 124 projects radially outward from a part of the outer circumference of top surface portion 122 and is engaged with cutout portion 102 of case main body 11. Projecting portion 124 can engage lid portion 12 with cutout portion 102 of case main body 11 to perform positioning when lid portion 12 is attached to case main body 11. Note that each of lid portion 12 and bottom portion 114 functions as a movable-range reducing part that is a hard stop (movable range limitation) of movable body 20.

The opening direction of central opening portion 126 is parallel to the moving direction of movable body 20 and output shaft portion 252. Specifically, it is desirable that central opening portion 126 be formed such that output shaft portion 252 is vertically inserted in the central opening portion.

Central opening portion 126 supports the outer circumference of protruding part 25 so as to allow movement of the protruding end side of protruding part 25 (output shaft portion 252) forward and backward along the axial direction at the outside. This prevents the vibration of the protruding end of protruding part 25 from deviating from the axial direction and causing a wobble.

Central opening portion 126 is formed in top surface portion 122 so as to have a shape allowing output shaft portion 252 to slide on the axis of movable body 20 and the axis of output shaft portion 252, and preferably has an inner diameter substantially the same as the outer diameter of the shaft of movable body 20 and output shaft portion 252.

In motion and in a motionless state of output shaft portion 252, central opening portion 126 is in contact with output shaft portion 252 to be inserted. Accordingly, lid portion 12 and thus case 10 support output shaft portion 252 stably movably via such a sliding state.

When lid portion 12 is attached to case main body 11, projecting portion 124 of lid portion 12 is disposed above terminal part 75 exposed in cutout portion 102 of case main body 11 to the outside at the central portion of cutout portion 102 in the longitudinal direction. Thus, the position of terminal part 75 of actuator 1H can be grasped only in plan view of lid portion 12.

<Operation of Actuator 1H>

Figure 30:
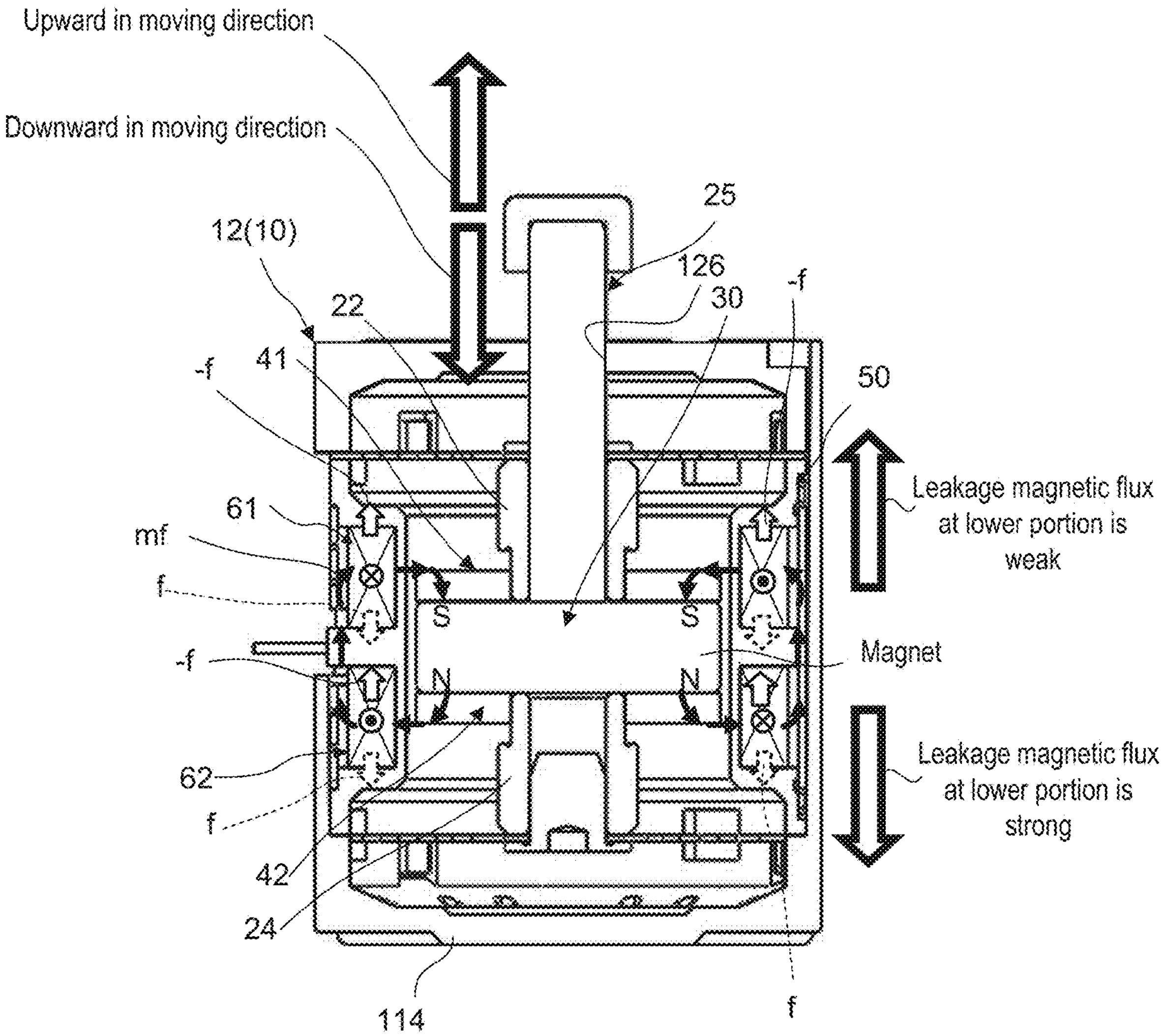
FIG. 30 is a diagram for explaining an operation of the actuator according to Embodiment 2 of the present invention.

With reference to FIG. 30, a description will be given of operation of actuator 1H in relation to one example in which magnet 30 is magnetized such that the side of front surface 30*a*, which is one side of magnet 30 in the magnetization direction (upper side in the present embodiment), is the S-pole, and the side of back surface 30*b*, which is the other side in the magnetization direction (lower side in the present embodiment), is the N-pole.

FIG. 30 is a diagram for explaining the operation of the actuator according to Embodiment 2 of the present invention.

In actuator 1H, movable body 20 is driven to move on at least one side in the vibration direction by supplying a pulse current (a direct current pulse or an alternating current pulse) to coils 61 and 62. Note that power may be supplied to coils 61 and 62 for resonance.

By supplying the pulse current, flow mf of the magnetic flux is formed, which is emitted from the back surface 30*b* side of magnet 30 to yoke 42 and then toward the coil 62 side and passes through outer yoke 70 and coil 61 to enter magnet 30 via yoke 41 on the upper side of magnet 30.

Accordingly, when energization is performed as illustrated in FIG. 30, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62. Since coils 61 and 62 are fixed to fixing body 50 (coil holding part 52), in accordance with the law of action and reaction, a force opposed to the Lorentz force in-f direction is generated as a thrust force in the f direction in movable body 20 having magnet 30. As a result, the movable body 20 side including magnet 30 moves toward the f direction, that is, toward bottom portion 114 (bottom surface of case main body 11).

On the other hand, when the energization direction of coils 61 and 62 is switched in the opposite direction and coils 61 and 62 are energized, the Lorentz force in a direction reverse to the f direction is generated. The generation of the Lorentz force in this f direction causes in movable body 20 the force opposite to the Lorentz force in the f direction as thrust (thrust in the −f direction) in accordance with the law of action and reaction, so that movable body 20 moves in the −f direction, i.e., toward the top surface of lid portion 12 of fixing body 50.

Actuator 1H makes it possible to provide the operator with a so-called haptic feeling and force feedback via output shaft portion 252 in response to the user's operation by moving movable body 20 toward only one of lid portion 12 and bottom portion 114.

At this time, output shaft portion 252 slides on central opening portion 126 of case 10, and moves at the outside of case 10 in the moving direction (the axial direction or the advancing/retreating direction of magnet 30).

That is, output shaft portion 252 is always supported in a stable state by lid portion 12 and thus case 10 via central opening portion 126 both in motion and in the motionless state of the output shaft portion.

Further, movement can be achieved by supplying coils 61 and 62 with currents alternately in opposite directions, and it is possible by using this technique to provide the user with a haptic feedback and a force feeling feedback according to movement by driving depending on the movement of movable body 20 caused by the operation of the operator.

In addition, in actuator 1H, a magnetic attraction force acts between magnet 30 and outer yoke 70, which functions as a magnetic spring in a non-driven (motionless) state in which actuator 1 is not energized. The magnetic attraction force generated between magnet 30 and outer yoke 70 and a restoring force that brings elastic supporting parts 81 and 82 back to their original shapes cause movable body 20 to return to its original position.

Actuator 1H includes: fixing body 50 including coils 61 and 62; and movable body 20 disposed radially inside coils 61 and 62 and including magnet 30 magnetized in the axial direction of coils 61 and 62. In addition, actuator 1H includes flat plate-shaped elastic supporting parts 81 and 82 that elastically hold movable body 20 such that movable body 20 is freely movable in the moving direction that is the coil axial direction.

Further, coils 61 and 62 are disposed on the outer circumference of holding-portion main body 522 of coil holding part 52, outer circumferential surface 20*a* of movable body 20 is disposed on the inner circumferential side of holding-portion main body 522 with a gap being interposed between the outer circumferential surface of the movable body and the holding-portion main body, and coils 61 and 62 are, at the outer circumferential surface, surrounded by outer yoke 70.

Actuator 1H has a structure in which unit 13 is accommodated in case 10, and the outer circumferential surface of circumferential wall portion 112 of case 10 formed from a resin can thus be formed as a smooth surface. Thus, when actuator 1H is attached to an electronic device, it is possible to reliably and easily perform attachment of a cushioning material such as a sponge to be interposed between actuator 1 and a mounting point.

Moreover, since actuator 1H has the configuration in which unit 13 is disposed in case 10, fixation of elastic supporting parts 81 and 82, which requires high dimensional accuracy, can be achieved by attaching elastic supporting parts 81 and 82 to coil holding part 52.

Thus, arrangement of movable body 20 including the fixation of elastic supporting parts 81 and 82 can be determined with reference to coil holding part 52, so that it is possible to increase the accuracy of the haptic feeling generation direction of the product. Specifically, only increasing the dimensional accuracy of coil holding part 52 formed as one component from a resin or the like makes it possible to easily dispose coils 61 and 62 and movable body 20 (magnet 30) attached via elastic supporting parts 81 and 82 in an accurate positional relationship, for example.

Further, terminal part 75 are disposed on coil holding part 52 to protrude outward, so that tying and soldering of the coil wire of the coils are facilitated, and connection between an external device and coils 61 and 62 can be facilitated.

As described above, actuator 1H can perform haptic feeling presentation while having impact resistance.

Actuator 1H is driven by a pulse (a direct current pulse or an alternating current pulse) input to coils 61 and 62. That is, the energization direction of coils 61 and 62 may be appropriately set so that thrust in the −f direction toward top surface portion 122 of lid portion 12 or thrust in the f direction toward bottom portion 114 acts on movable body 20, or so that these thrusts in the −f direction and the f direction alternately act on the movable body. As a result, movable body 20 moves in the moving direction and thus in the moving direction, and the haptic feedback can be performed via actuator 1H itself or output shaft portion 252.

As described above, actuator 1H can be easily manufactured at a low cost, and has a detection function and a haptic feedback function that are easier to use.

<Driving Principle of Actuator 1H>

The driving principle of actuator 1H will be briefly described below. Actuator 1H is driven, for example, by a supplied pulse in one direction (which means the same here as the axial direction, the vibration direction, or the upper-lower direction of the magnet) based on following Equation 1 of motion and Circuit Equation 2. In the present embodiment, the driving is performed by inputting a short pulse, but the driving may be performed so as to generate an arbitrary reciprocating motion and without using the short pulse.

Movable body 20 in actuator 1H performs reciprocating motion based on Equations 1 and 2.

(Equation 1)

$$m\frac{d^2x(t)}{dt^2} = K_f i(t) - K_{sp}x(t) - D\frac{dx(t)}{dt} \quad [3]$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

(Equation 2)

$$e(t) = Ri(t) + L\frac{di(t)}{dt} + K_e\frac{dx(t)}{dt} \quad [4]$$

e(t): Voltage [V]
R: Resistance [Ω]
L: Inductance [H]
$K_e$: Reverse electromotive force constant [V/(m/s)]

Mass m [Kg], displacement x(t) [m], thrust constant $K_f$ [N/A], current i(t) [A], spring constant $K_{sp}$ [N/m], damping coefficient D [N/(m/s)], and the like in actuator 1H may be changed appropriately as long as Equation 1 is satisfied. In addition, voltage e(t) [V], resistance R[Ω], inductance L [H], and reverse electromotive force constant $K_e$ [V/(m/s)] may be changed appropriately as long as Equation 2 is satisfied.

Accordingly, actuator 1H is determined by mass m of movable body 20 and spring constant $K_{sp}$ of metallic springs (the elastic bodies or the leaf springs in the present embodiment) as elastic supporting parts 81 and 82.

Central opening portion 126 of case 10 (specifically, lid portion 12) supports the outer circumference of output shaft portion 252 of protruding part 25 so as to allow movement of the protruding end side of protruding part 25 (the cap 254 side attached to the end portion of output shaft portion 252) forward and backward along the axial direction outside case 10. Accordingly, even when an external load is applied, it is possible to prevent the protruding end of protruding part 25 from deviating from the axial direction being the moving direction of the magnet and from wobbling, and it is possible to stably perform strong haptic feeling to the user in response to the user's operation.

Output shaft portion 252 of movable body 20 moving in case 10 is slidably inserted in central opening portion 126 formed in lid portion 12 of case 10 and protrudes to the outside, and can be directly connected to the operation section outside actuator 1H.

With this configuration, the operation section operated by the user and movable body 20 are directly connected to each other, and thus quick and strong feedback can be performed in response to the operation by the user. In particular, even when an external load is expected to be applied to actuator 1H, stable driving can be performed.

Further, this actuator 1H can perform force feedback depending on an inputted current, and can perform force feedback corresponding to a long-stroke operation even in the case of the long-stroke operation.

<Variations>

FIGS. 31 to 47 illustrate Variations 1 to 7 8 of actuator 1H of present Embodiment 2.

It should be noted that actuators 100 and 1J to 1Q that are Variations 1 to 8 of actuator 1H illustrated in FIGS. 31 to 47 have the same basic configuration as that of actuator 1H corresponding to Embodiment 2 illustrated in FIG. 24. Therefore, in the description of Variations 1 to 8, the same components as those in Embodiment 2 are denoted by the same reference numerals and the same names, and duplicate descriptions are omitted, and different components will be described with the same names and the same reference numerals as those of the subject components as appropriate.

Since the operations of actuators 100 and 1J to 1Q are the same as that of actuator 1H, the explanation thereof will be omitted as appropriate. In actuators 100 and 1J to 1Q, output shaft portions 252, 252L, 252M, and 252P are disposed in central opening portions 126 and 1260 of the case slidably with movement of movable body 20, 20J to 20M, and 20P, and are always in contact with central opening portions 126 and 1260. In addition, in actuators 100 and 1J to 1Q, particularly the opening portions support the outer circumferences of output shaft portions 252, 252J to 252M, and 252P of protruding parts 25, 25J to 25M, and 25P so as to move the protruding end sides of output shaft portions 252, 252L, 252M, and 252P forward and backward along the axial direction outside cases 10 and 10J to 10M. Therefore, the same advantageous effects as those of actuator 1H of Embodiment 2 described above can be obtained.

<Variation 1>

Figure 31:
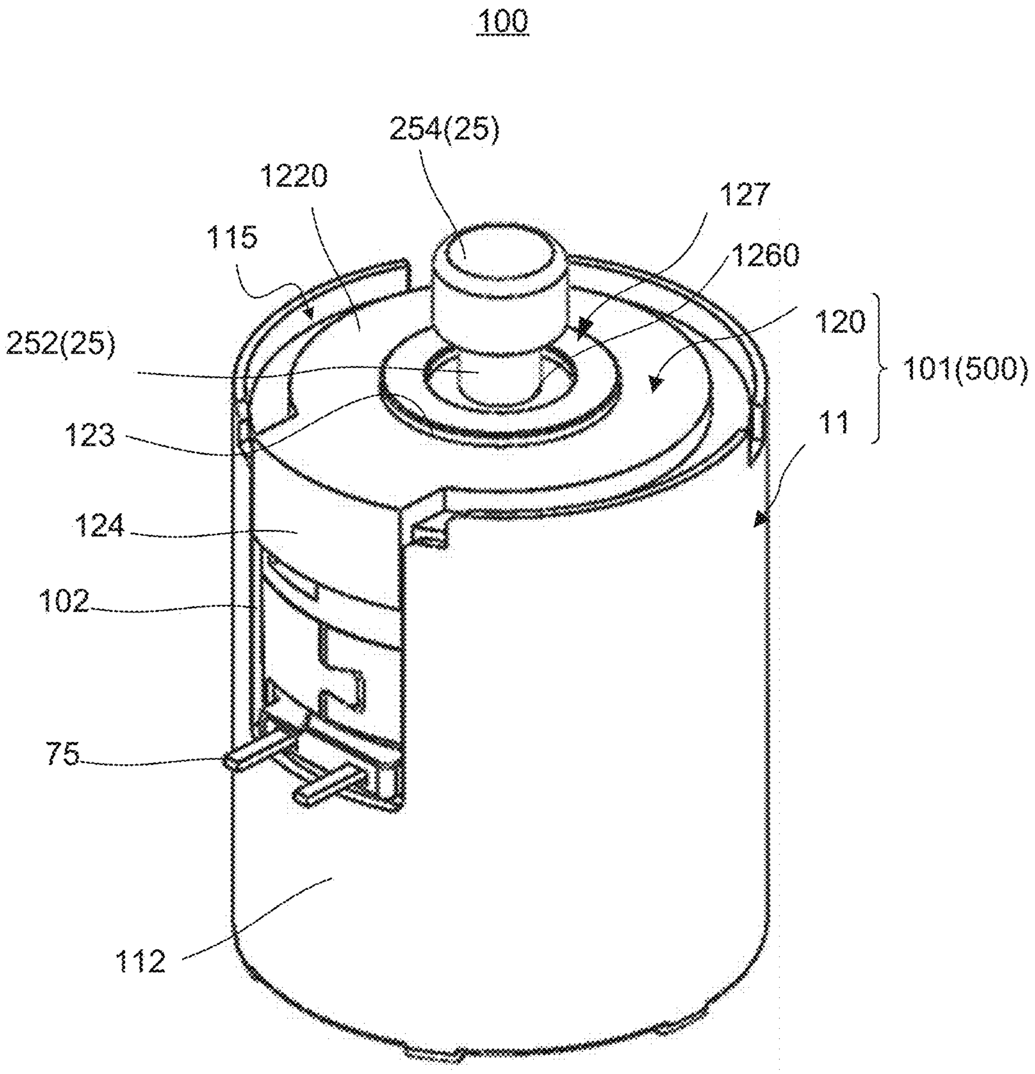
FIG. 31 is an external perspective view of Variation 1 of the actuator.
Figure 32:
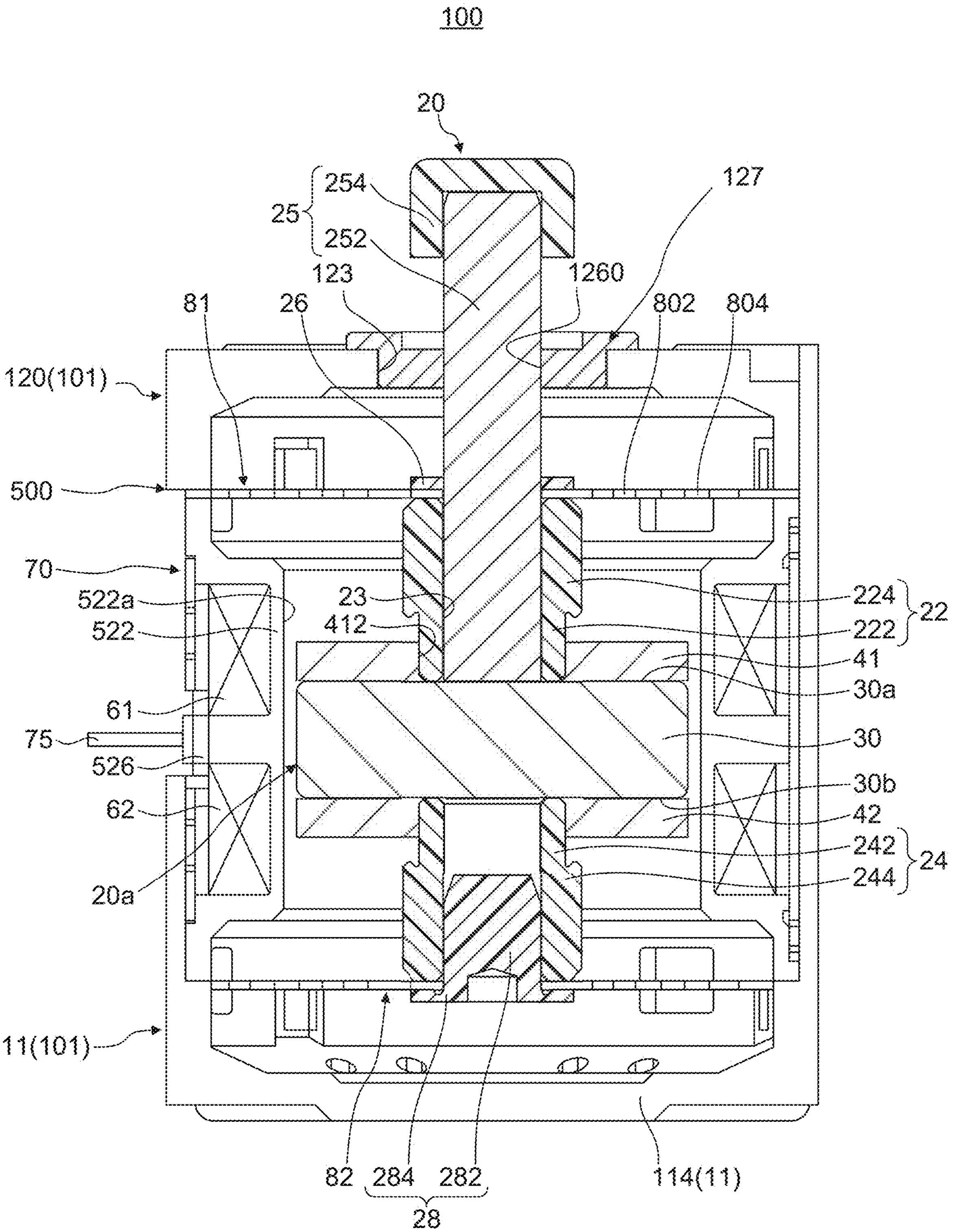
FIG. 32 is a longitudinal sectional view illustrating a configuration of a principal part of the actuator as Variation 1.

FIG. 31 is an external perspective view of Variation 1 of the actuator, and FIG. 32 is a longitudinal sectional view illustrating a configuration of a principal part of the actuator as Variation 1. Further, FIG. 33 is an exploded perspective view of the actuator.

Actuator 100 according to Variation 1 of Embodiment 2 differs from actuator 1H only in the configuration of central opening portion 1260 of case 10, and the other configurations are the same. Therefore, the configuration of movable body 20J will be mainly described below.

Figure 33:
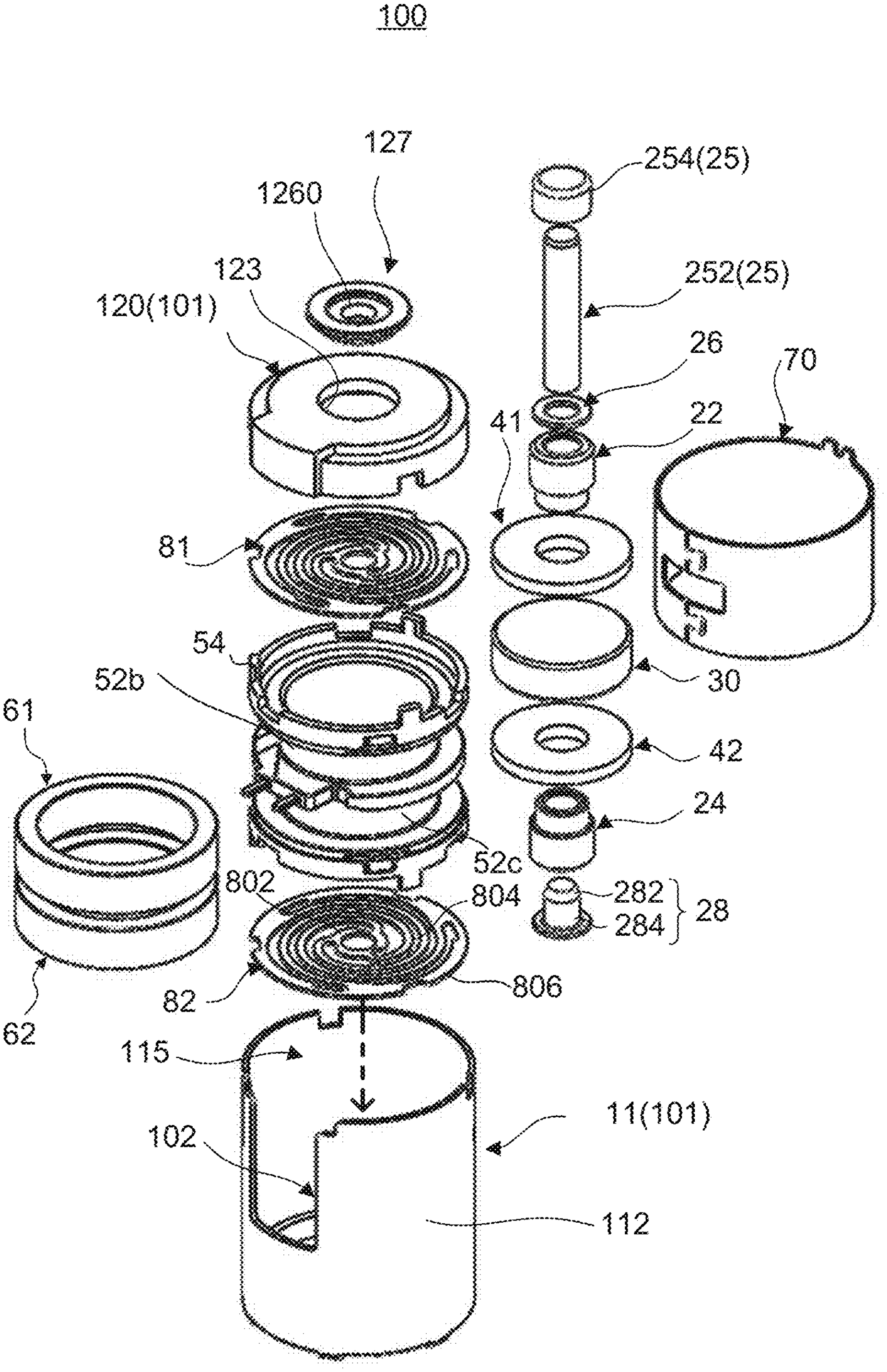
FIG. 33 is an exploded perspective view of the actuator.

In case 101 of actuator 100 illustrated in FIGS. 31 to 33, central opening portion 1260 through which output shaft portion 252 is inserted is provided in sliding member 127 separate from lid portion 120.

That is, actuator 100 differs from actuator 1H only in the configuration of lid portion 120 that closes opening portion 115 of case main body 11 forming case 101.

Movable body 20 of actuator 100 includes protruding part 25, magnet 30, a pair of yokes 41 and 42, and a pair of spring retaining parts 22 and 24 the same as those of actuator 1H. Fixing body 500 of actuator 100 includes a pair of annular coils 61 and 62, an outer yoke 70, and case 101. Note that, a pair of elastic supporting parts 81 and 82 are provided between movable body 20 and fixing body 500. Movable body 20 reciprocates in a straight line direction by the cooperation of energized coils 61 and 62 and magnet 30.

Sliding member 127 is an annular member having central opening portion 1260 at its center, and is fitted and fixed to opening portion 123 formed in lid portion 120. Sliding member 127 is attached such that central opening portion 1260 is positioned on the axis of output shaft portion 252, and output shaft portion 252 to be inserted slides. Incidentally, the upper surface of sliding member 127 is provided with a recessed portion in which central opening portion 1260 is opened.

Sliding member 127 is formed from a material having high slidability allowing output shaft portion 252 to slide smoothly. Sliding member 127 is formed from, for example, polyacetal resin (POM).

As described above, central opening portion 1260 of case 101 is provided in a member separate from lid portion 120 of case 101. Thus, in actuator 100, irrespective of the material of case 101, only a change to sliding member 127 having central opening portion 1260 having excellent slidability makes it possible to always suitably support output shaft portion 252 via central opening portion 1260 irrespective of whether output shaft portion 252 is driven or not.

In Variation 1, sliding member 127 is described as a sliding member formed from POM, but a sliding member of an oil-impregnated bearing may also be used instead of the sliding member formed from POM. Note that the shape in the case where the sliding member is an oil-impregnated bearing may be the same shape as that of sliding member 127. Further, a sliding member including an oil-impregnated bearing portion may be formed in the same shape as sliding member 127. Even in a configuration in which output shaft portion 252 is supported by central opening portion 1260 of the oil-impregnated bearing, the output shaft portion slides smoothly and also a durable support structure is provided. Even when the load of movable body 20 is increased, the movable body can be smoothly slid and driven.

<Variation 2>

Figure 34:
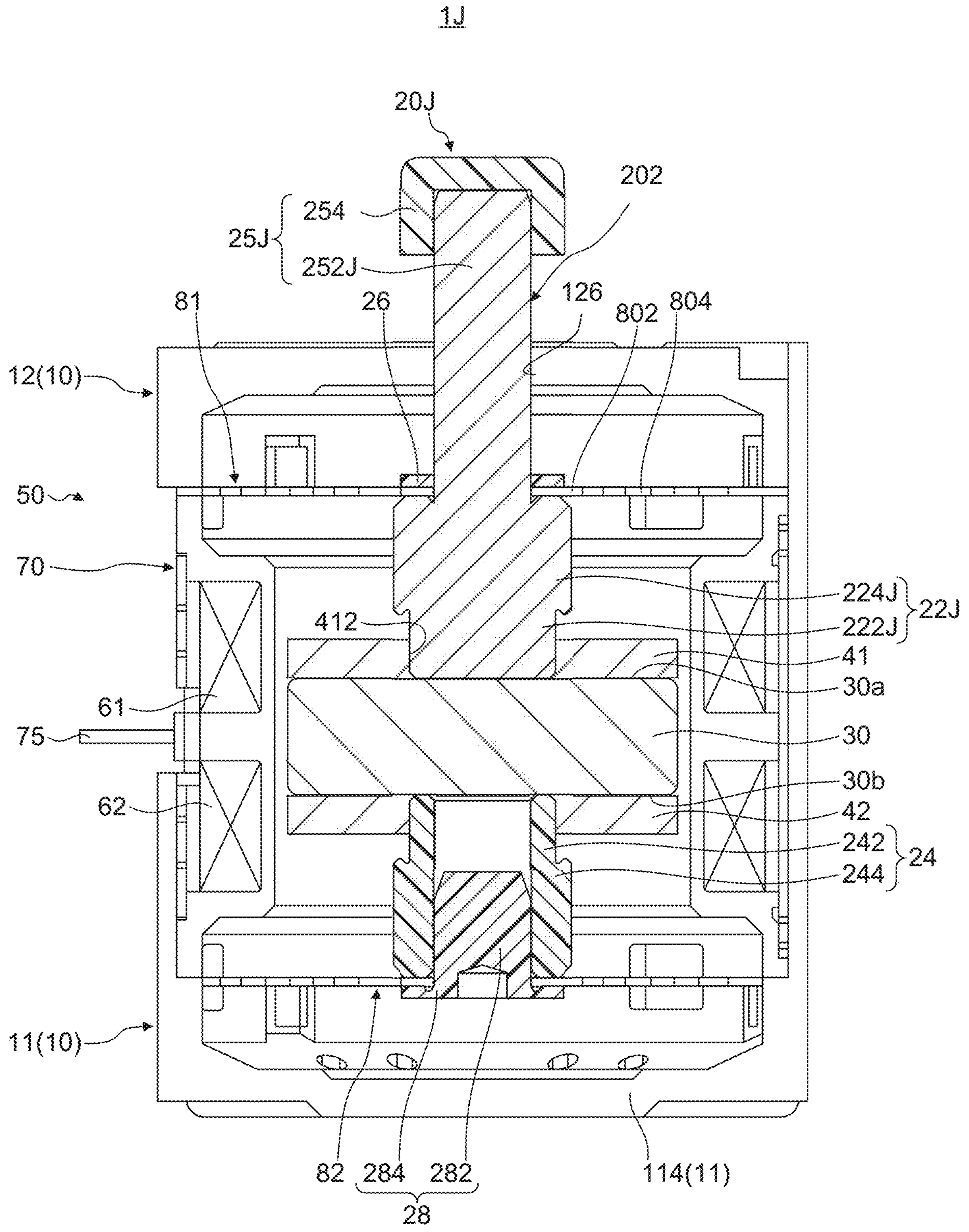
FIG. 34 is a longitudinal sectional view illustrating a configuration of a principal part of Variation 2 of the actuator.
Figure 35:
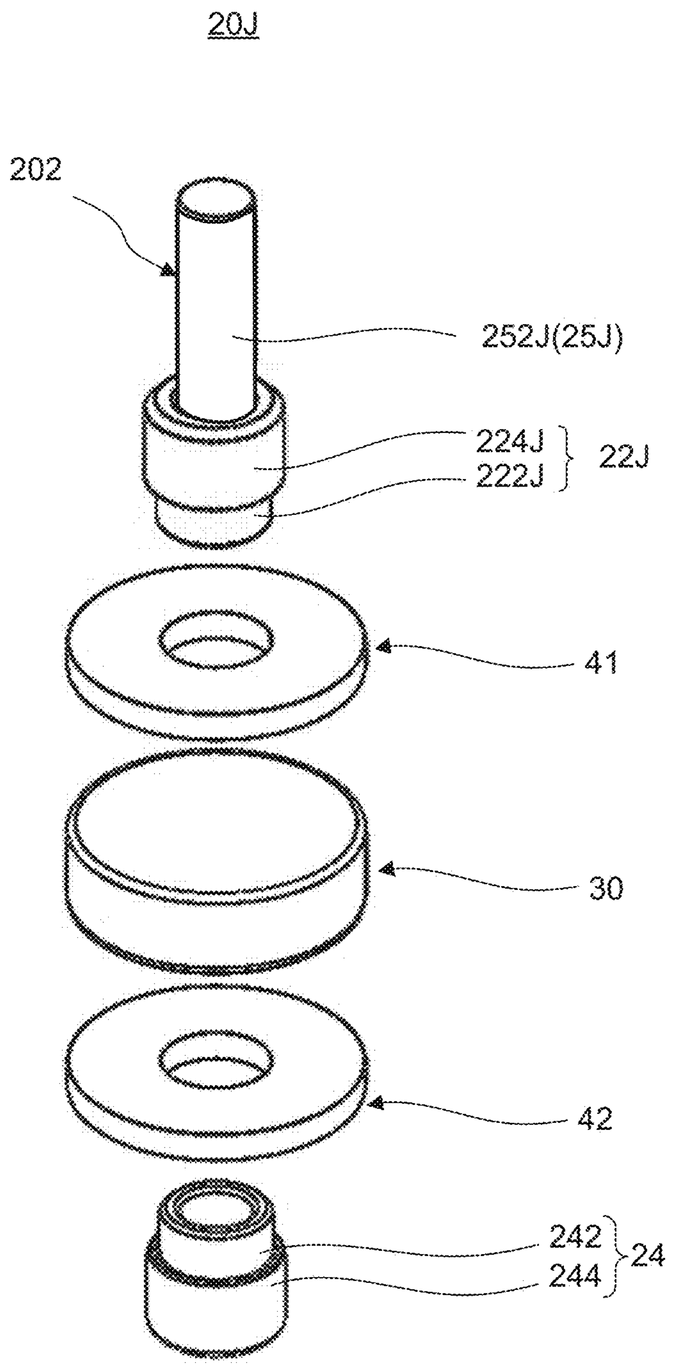
FIG. 35 is an enlarged exploded view of the movable body.

FIG. 34 is a longitudinal sectional view illustrating a configuration of a principal part of Variation 2 of the actuator, and FIG. 35 is an enlarged exploded view of the movable body.

Actuator 1J according to Variation 2 of present Embodiment 2 differs from actuator 1 only in the configuration of movable body 20J, and the other configurations are the same. Therefore, the configuration of movable body 20J will be mainly described below.

Movable body 20J of actuator 1J illustrated in FIG. 34 differs in that output shaft portion 252 and first spring retaining part 22 are integrally formed in components of movable body 20 of actuator 1.

Figure 36:
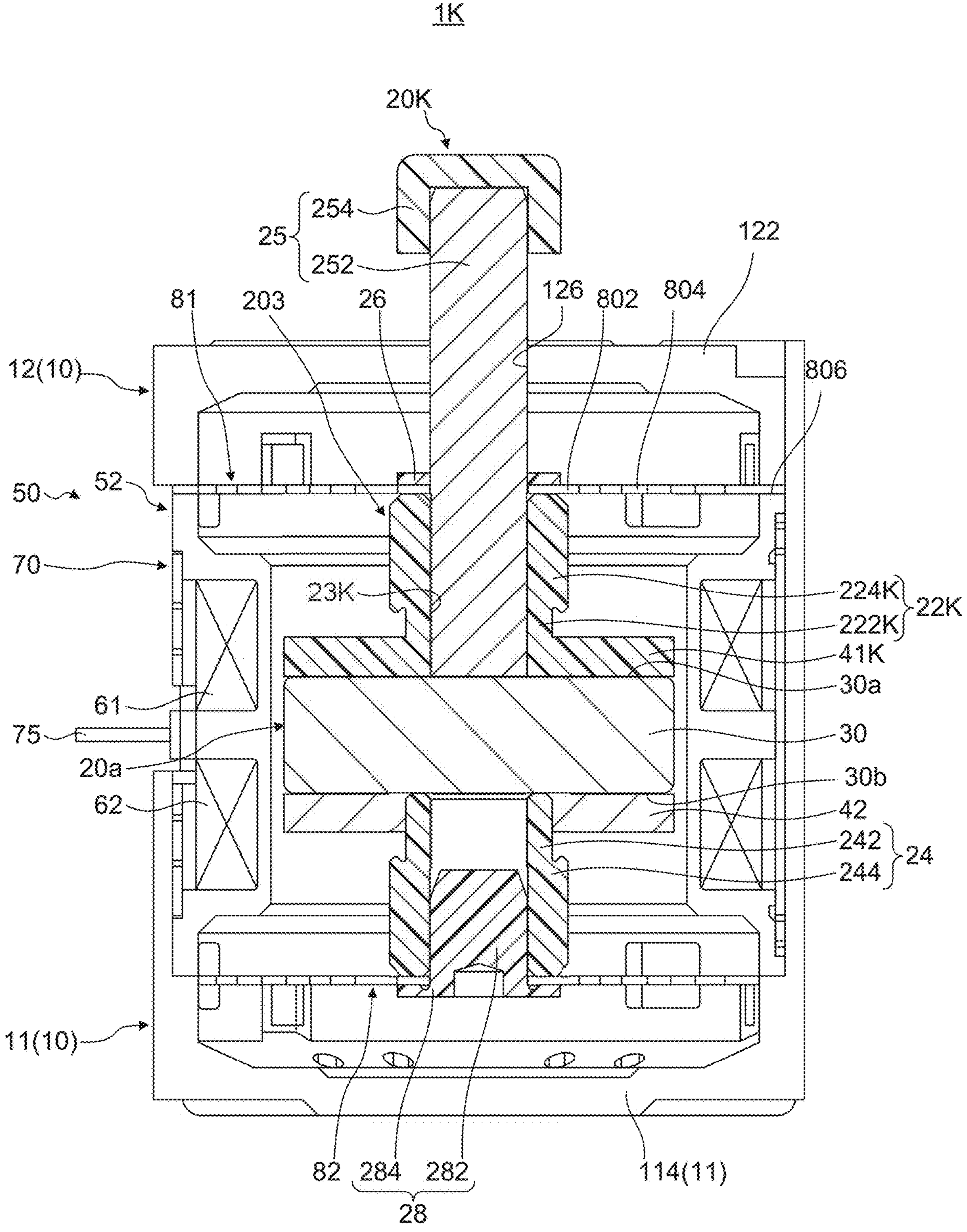
FIG. 36 is a longitudinal sectional view illustrating a configuration of a principal part of Variation 3 of the actuator.

Movable body 20J illustrated in FIGS. 35 and 36 includes shaft unit 202 in addition to magnet 30, yokes 41 and 42, second spring retaining part 24, first spring fixation portion 26, and second spring fixation portion 28, which have the same configurations as those of movable body 20.

Shaft unit 202 is a rod-shaped member in which first spring retaining part 22J having a function similar to that of first spring retaining part 22 and output shaft portion 252J having a function similar to that of output shaft portion 252 are integrally formed. Shaft unit 202 is configured such that joint portion 222J of spring connection portion 22J, spring connection portion 224J of spring connection portion 22J, and output shaft portion 252J continuously extend from magnet 30 in this order on the same axis. It is preferable that shaft unit 202 be formed from a non-magnetic material, and when shaft unit 202 is formed from a non-magnetic material, it is possible to prevent leakage of the magnetic flux via output shaft portion 252J in the axial direction.

In shaft unit 202, joint portion 222J of spring retaining part 22J at one end is fitted to opening portion 412 of yoke 41. In addition, shaft unit 202 connects and fixes elastic supporting part 81 between, on one hand, the distal end surface of spring connection portion 224J on one side, which forms a stepped surface on the outer circumference of output shaft portion 252 and, on the other hand, a press-fit ring, which is first spring fixation portion 26.

As described above, in Variation 2, a plurality of constituent elements of movable body 20J are integrated together, and it is thus possible to improve the assemblability. By setting the strengths of parts, spring retaining parts 22 and 24 and output shaft portion 252J can be molded from a resin to reduce the assembly time and the manufacturing cost.

<Variation 3>

Figure 37:
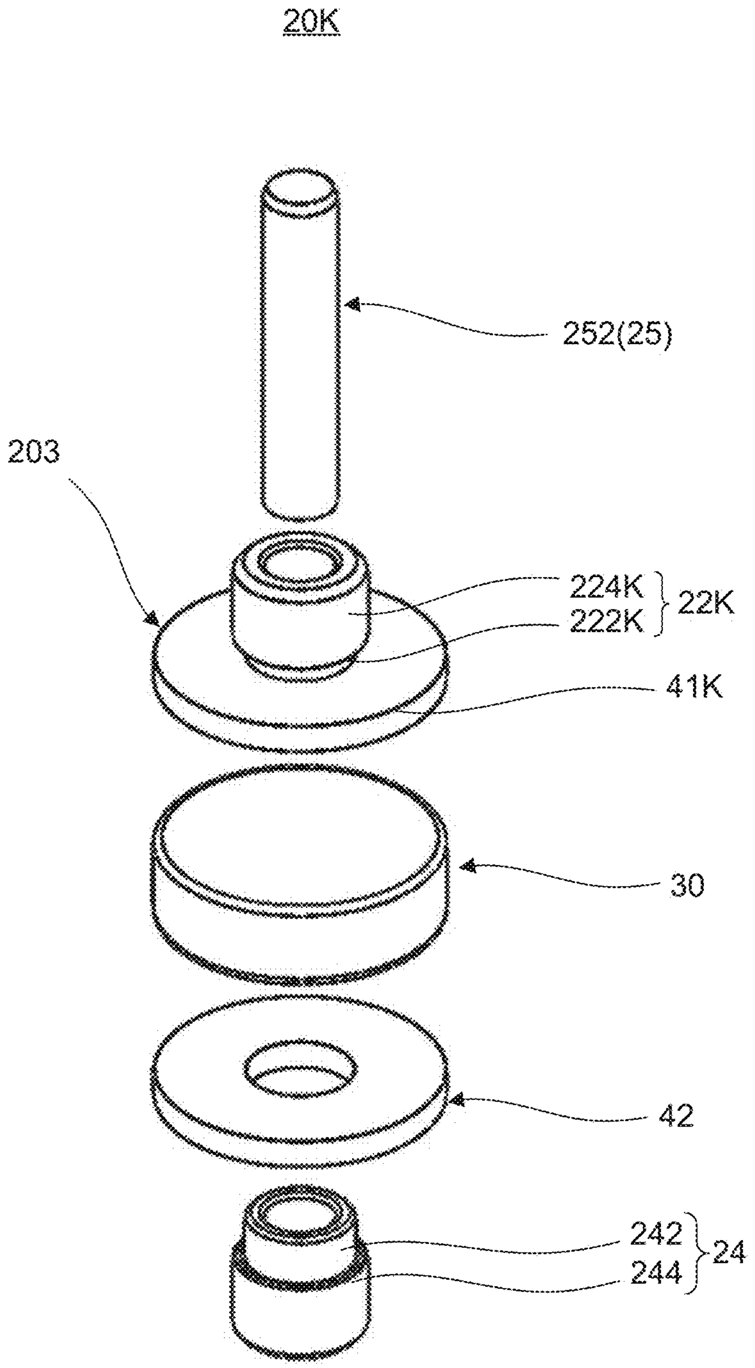
FIG. 37 is an enlarged exploded view of the movable body.

FIG. 36 is a longitudinal sectional view illustrating a configuration of a principal part of Variation 3 of the actuator, and FIG. 37 is an enlarged exploded view of the movable body.

Actuator 1K according to Variation 3 of present Embodiment 2 differs from actuator 1H only in the configuration of movable body 20K, and the other configurations are the same. Therefore, the configuration of movable body 20K will be mainly described below.

Movable body 20K of actuator 1K illustrated in FIG. 34 differs in that yoke 41 and first spring retaining part 22 in the constituent elements of movable body 20 of actuator 1H are integrally formed.

Movable body 20K illustrated in FIGS. 36 and 37 includes sleeve unit 203 in addition to magnet 30, yoke 42, second spring retaining part 24, first spring fixation portion 26, second spring fixation portion 28, and output shaft portion 252, which have the same configurations as those of movable body 20. In sleeve unit 203, yoke 41K having a function similar to that of yoke 41 and first spring retaining part 22K having a function similar to that of first spring retaining part 22 are integrally formed as a single member.

Axially penetrating opening portion 23K is formed in an axial central portion of sleeve unit 203, and a base end portion of output shaft portion 252 is inserted in and fixed to the opening portion. Sleeve unit 203 may be formed from a non-magnetic material such as a resin material, or may be formed from the same magnetic material as yoke 41. When sleeve unit 203 is a non-magnetic material formed from resin, yoke 42 on the back surface 30*b* side of magnet 30 may further be formed from a resin material to secure the weight balance of magnet 30 between the front and back surface 30*a* and 30*b* sides. When sleeve unit 203 is formed from a magnetic material, it is possible to prevent a leakage magnetic flux in the axial direction through output shaft portion 252 by forming output shaft portion 252 from a non-magnetic material.

Sleeve unit 203 is attached to front surface 30*a* of magnet 30 such that yoke 41K is stacked on the magnet, output shaft portion 252 is inserted into opening portion 23K in the sleeve unit, and a base-end-side portion of output shaft portion 252 is internally fitted to the sleeve unit. Further, sleeve unit 203 connects and fixes elastic supporting part 81 between, on one hand, the distal end surface of spring connection portion 224K on one side, which forms a stepped surface on the outer circumference of output shaft portion 252 and, on the other hand, first spring fixation portion 26 being a press-fit ring.

As described above, in Variation 3, a plurality of constituent elements of movable body 20K are integrated together, and it is thus possible to improve the assemblability. By setting the strengths of parts, spring retaining parts 22 and 24 and output shaft portion 252 can be molded from a resin to reduce the assembly time and the manufacturing cost.

<Variation 4>

Figure 38:
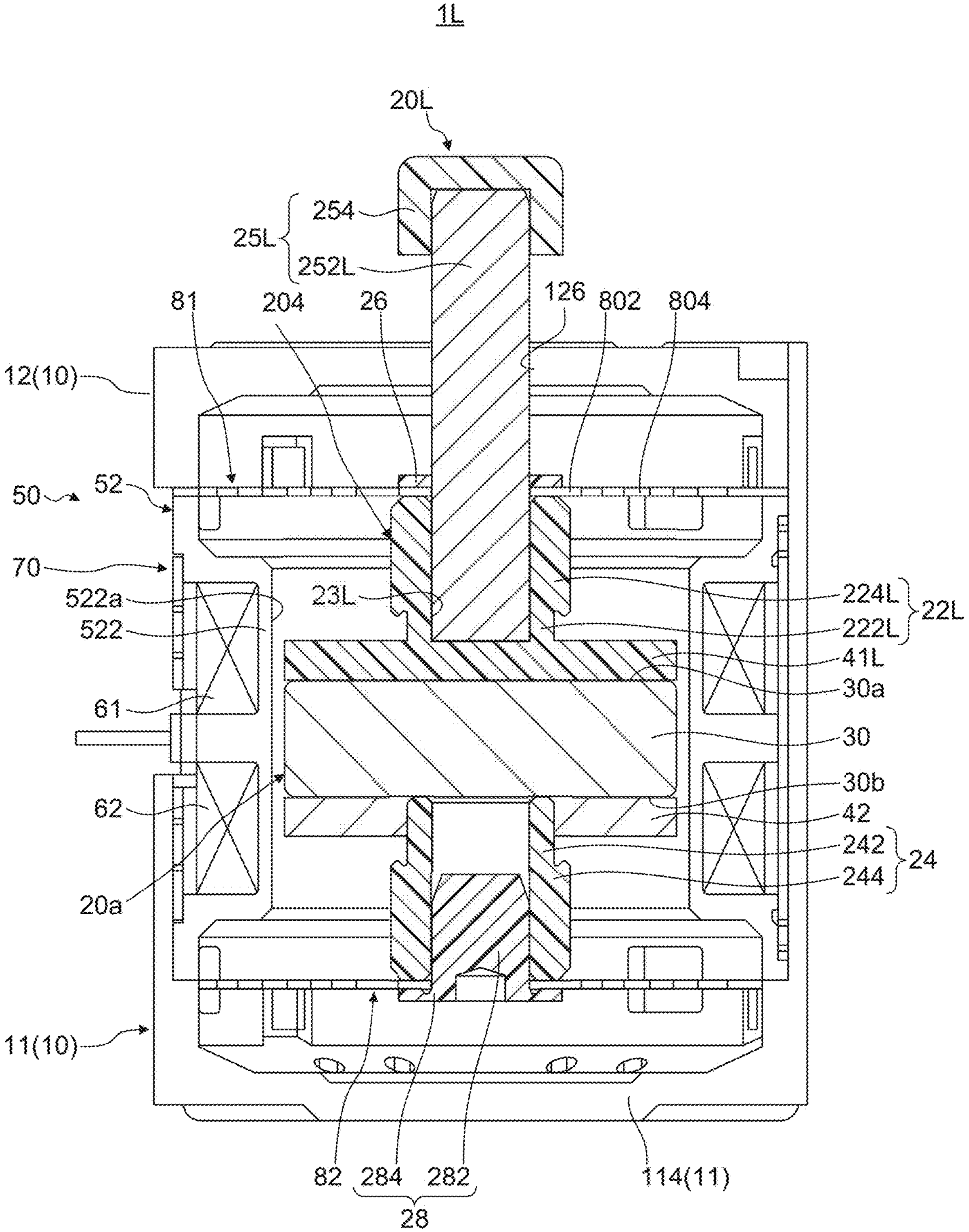
FIG. 38 is a longitudinal sectional view illustrating a configuration of a principal part of Variation 4 of the actuator.
Figure 39:
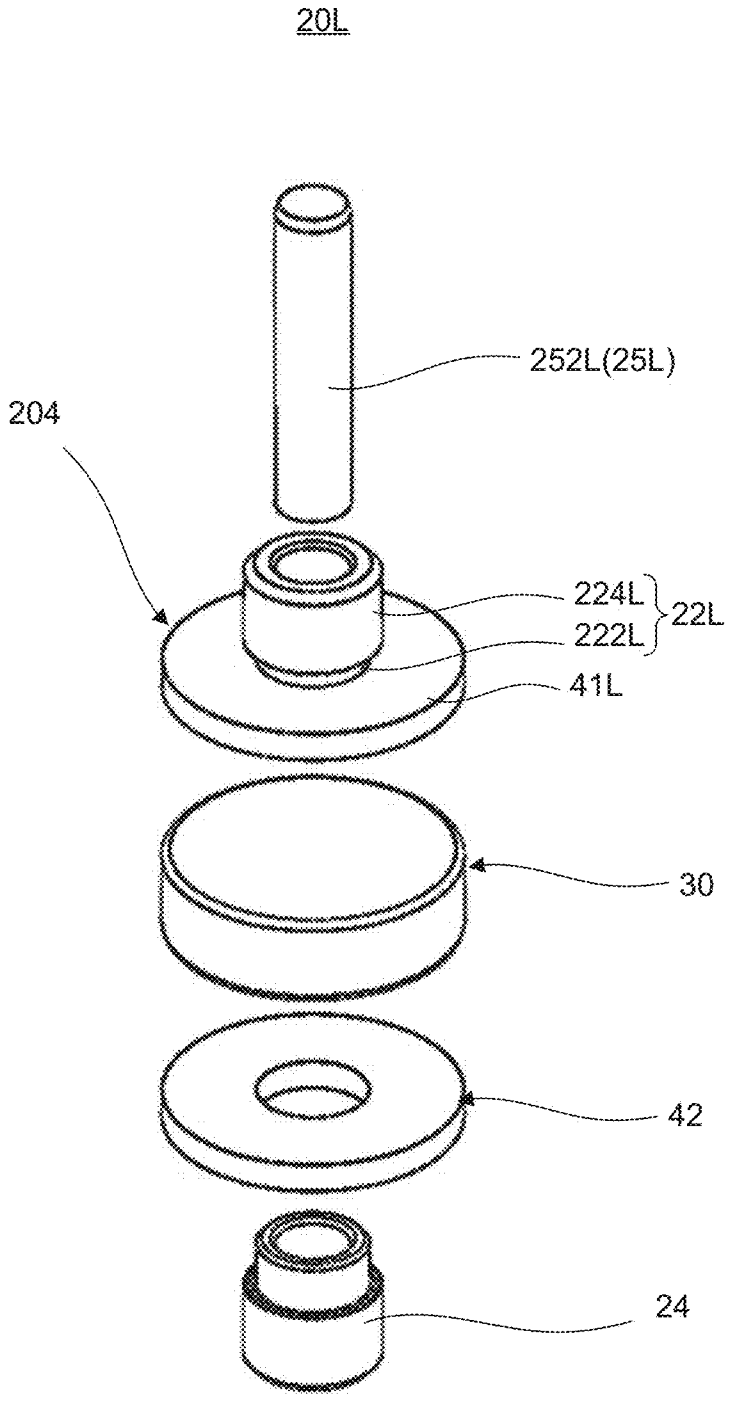
FIG. 39 is an enlarged exploded view of the movable body.

FIG. 38 is a longitudinal sectional view illustrating a configuration of a principal part of Variation 4 of the actuator, and FIG. 39 is an enlarged exploded view of the movable body.

Actuator 1L according to Variation 4 of present Embodiment 2 differs from actuator 1H only in the configuration of movable body 20L, and the other configurations are the same. Therefore, the configuration of movable body 20L will be mainly described below.

Movable body 20L of actuator 1L illustrated in FIG. 38 differs in that parts corresponding to yoke 41 and first spring retaining part 22 in the components of movable body 20 of actuator 1H are integrally formed.

Movable body 20L illustrated in FIGS. 38 and 39 includes sleeve unit 204 and protruding part 25L in addition to magnet 30, yoke 42, second spring retaining part 24, first spring fixation portion 26, and second spring fixation portion 28, which have the same configuration as those of movable body 20.

Sleeve unit 204 is configured as a single member by integrating together yoke 41L having a function similar to that of yoke 41 and spring retaining part 22L having a function similar to that of spring retaining part 22. In sleeve unit 204, yoke 41L unlike yoke 41 is a solid member and is formed by, for example, a disk.

That is, opening portion 23L in the center of spring retaining part 22L of sleeve unit 204 is formed in a recessed shape with the top surface of yoke 41L serving as a bottom surface, and output shaft portion 252L is inserted in the opening portion. Output shaft portion 252L is positioned and fixed on the axis of movable body 20L by being inserted into opening portion 23L.

Thus, output shaft portion 252L does not come into contact with magnet 30 via sleeve unit 204. Note that sleeve unit 204 may be formed from a non-magnetic material such as a resin material or the like, or may be formed from the same magnetic material as yoke 41. When sleeve unit 203 is formed from resin, yoke 42 on back surface 30*b* of magnet 30 may also be formed from resin. When sleeve unit 204 is formed from a magnetic material, it is possible to prevent a leakage magnetic flux in the axial direction through output shaft portion 252L by forming output shaft portion 252L from a non-magnetic material.

Sleeve unit 204 is attached to front surface 30*a* of magnet 30 such that yoke 41L is stacked on the front surface, and the base end portion of output shaft portion 252L is internally fitted to opening portion 23L while making contact with the bottom surface of opening portion 23L. In addition, sleeve unit 204 connects and fixes the inner circumferential surface of elastic supporting part 81 between, on one hand, the distal end surface of spring connection portion 224L on one side, which forms a stepped surface on the outer circumference of output shaft portion 252L and, on the other hand, first spring fixation portion 26.

As described above, in Variation 4, a plurality of constituent elements of movable body 20L are integrally formed, and it is thus possible to improve assemblability. By setting the strengths of parts, spring retaining part 24 and output shaft portion 252L can be molded from a resin to reduce the assembly time and the manufacturing cost.

<Variation 5>

Figure 40:
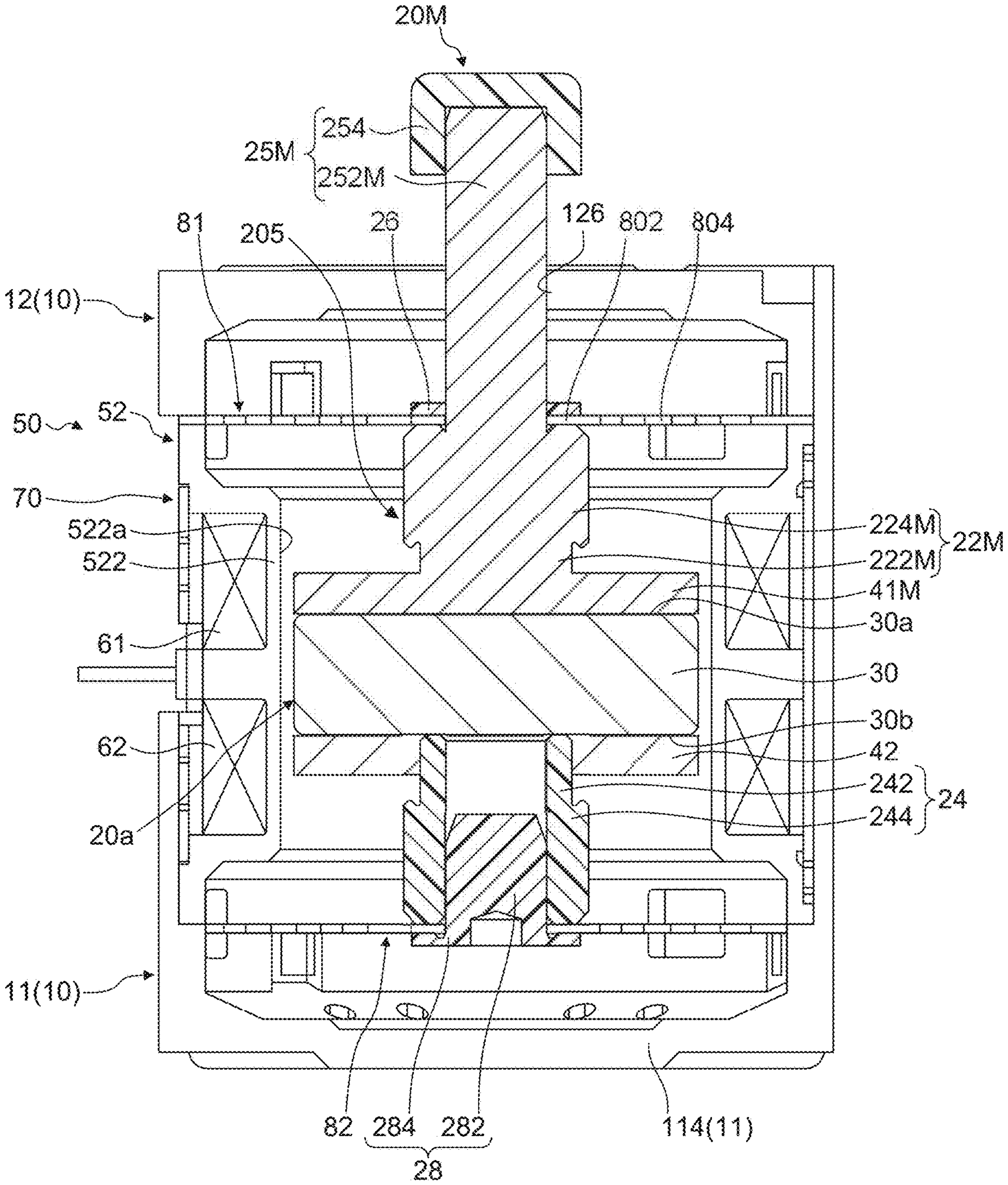
FIG. 40 is a longitudinal sectional view illustrating a configuration of a principal part of Variation 5 of the actuator.
Figure 41:
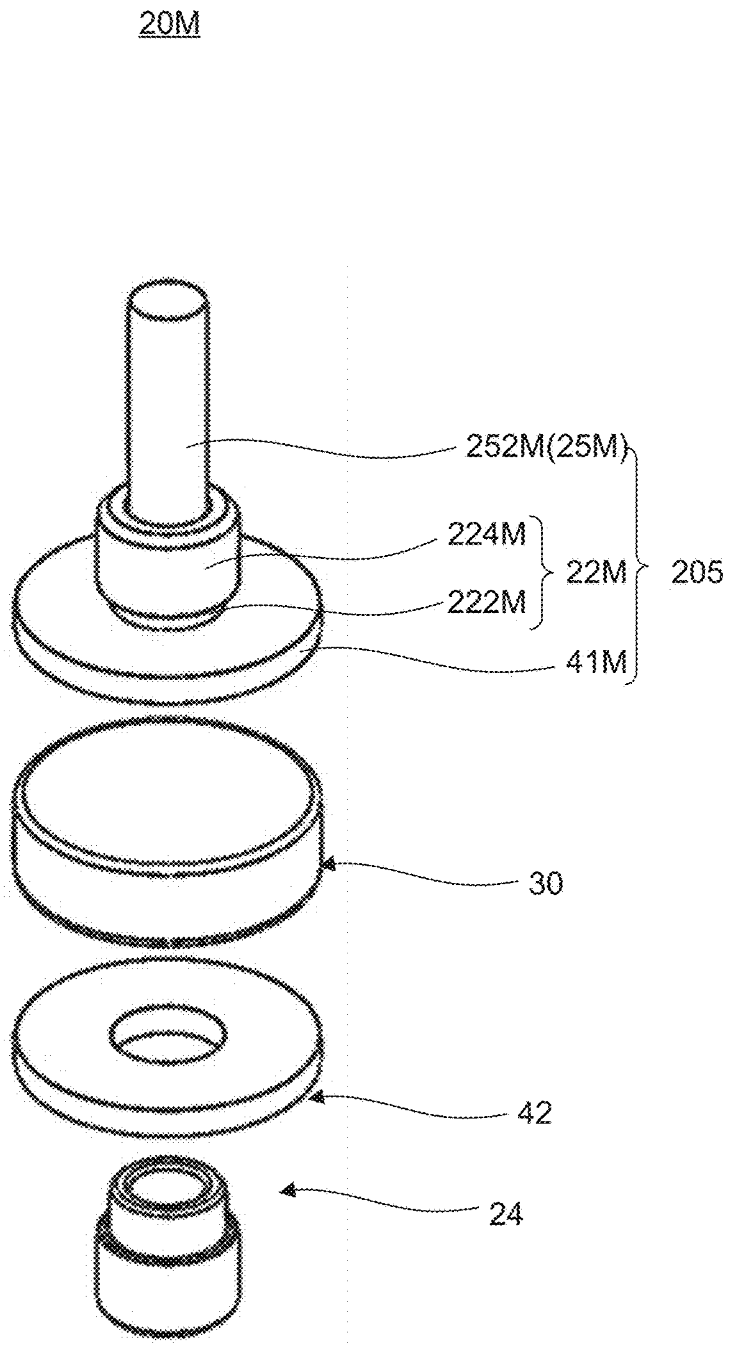
FIG. 41 is an enlarged exploded view of the movable body.

FIG. 40 is a longitudinal sectional view illustrating a configuration of a principal part of Variation 5 of the actuator, and FIG. 41 is an enlarged exploded view of the movable body.

Actuator 1M according to Variation 5 of present Embodiment 2 differs from actuator 1H only in the configuration of movable body 20M, and the other configurations are the same. Therefore, the configuration of movable body 20M will be mainly described below.

Movable body 20M of actuator 1M illustrated in FIG. 40 differs in that parts corresponding to yoke 41, first spring retaining part 22, and output shaft portion 252 in the constituent elements of movable body 20 of actuator 1H are integrally formed.

Movable body 20M illustrated in FIGS. 40 and 41 includes shaft unit 205 in addition to magnet 30, yoke 42, second spring retaining part 24, first spring fixation portion 26, and second spring fixation portion 28, which have the same configurations as those of movable body 20.

Shaft unit 205 is configured as a single member by integrating yoke 41M having a function similar to that of yoke 41, spring retaining part 22M having a function similar to that of spring retaining part 22, and output shaft portion 252M having a function similar to that of output shaft portion 252. In shaft unit 205, yoke 41M unlike yoke 41 is a solid member, and is formed by, for example, a disk.

That is, in shaft unit 205, joint portion 222M of spring retaining part 22M, spring connection portion 224M, and output shaft portion 252 are continuously disposed on the center portion of yoke 41M in this order in one direction (upper direction) on the axis of movable body 20M.

As a result, the yoke, the spring retaining part, and the output shaft portion can be assembled at once only by attaching shaft unit 205 to front surface 30*a* of magnet 30. Shaft unit 205 may be formed from a non-magnetic material such as a resin material or the like, or may be formed from the same magnetic material as yoke 41.

Shaft unit 205 is attached to front surface 30*a* of magnet 30 such that stack yoke 41M is stacked on the front surface. In addition, shaft unit 205 connects and fixes the inner circumferential surface of elastic supporting part 81 between, on one hand, the distal end surface of spring connection portion 224M on one side, which forms a stepped surface on the outer circumference of output shaft portion 252M and, on the other hand, first spring fixation portion 26.

As described above, in Variation 5, a plurality of the components of movable body 20M are integrally formed. Specifically, three members are manufactured as shaft unit 205 as a single integral component. Thus, the assembly is facilitated, and shaft unit 205 itself can secure a high rigidity.

<Variation 6>

Figure 42:
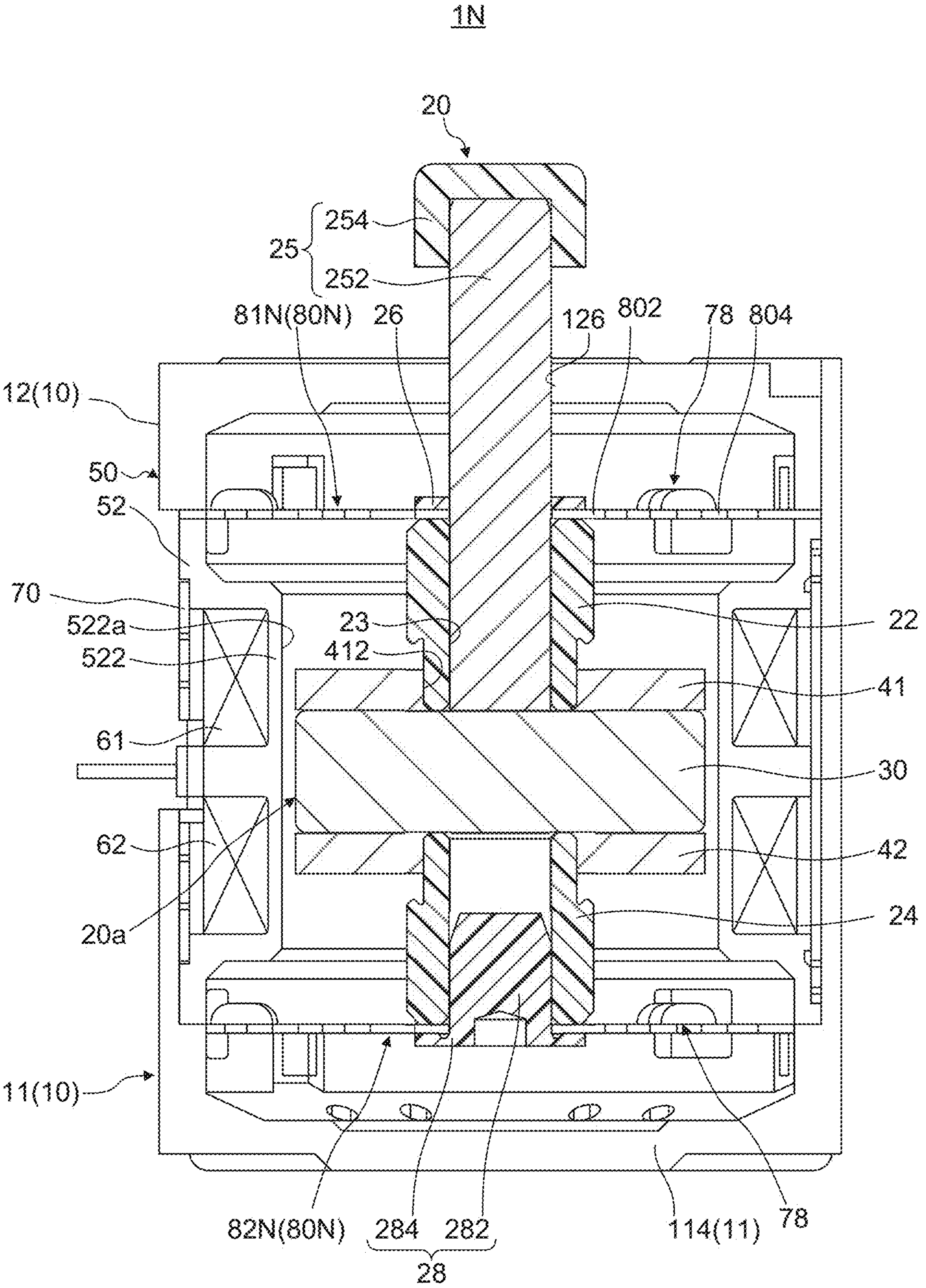
FIG. 42 is a longitudinal sectional view illustrating a configuration of a principal part of Variation 6 of the actuator.
Figure 43:
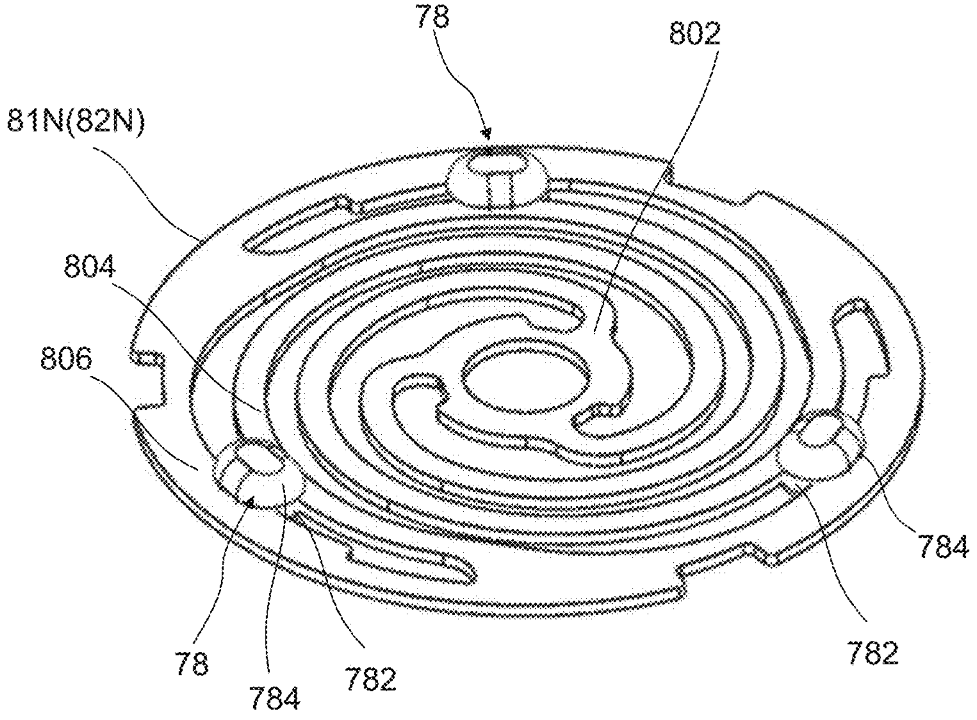
FIG. 43 is a perspective view of a leaf spring.

FIG. 42 is a longitudinal sectional view illustrating a configuration of a principal part of Variation 6 of the actuator, and FIG. 43 is a perspective view of a leaf spring.

Actuator 1N according to Variation 6 of present Embodiment 2 differs from actuator 1H only in the configurations of elastic supporting parts 81 and 82, and the other configurations are the same.

Actuator 1N illustrated in FIG. 42 further includes damping parts 78 disposed on each of elastic supporting parts 81 and 82, additionally to the configuration of actuator 1H.

As illustrated in FIG. 43, damping parts 78 are disposed such that, for example, portions thereof are inserted between spring portions from one surface side of each of elastic supporting parts 81N and 82N, specifically, between outer circumferential fixing portion 806 and deformation arm portions 804, and spans between the spring portions.

Each of damping parts 78 includes elastically deformable push-in portion 782 and flange 784 formed continuously with elastically deformable push-in portion 782.

Damping parts 78 are disposed such that when elastic push-in portions 782 are inserted between the spring portions from one surface side of elastic supporting part 81 (82), specifically, between outer circumferential fixing portion 806 and deformation arm portions 804, flanges 784 span between the spring portions.

Note that push-in portions 784 may be fixed on the back surface side of elastic supporting part 81N (82N) via a thermosetting resin, an adhesive which is not adhered to elastic supporting part 81N (82N) (not illustrated), or the like in such a manner that push-in portions 782 do not come off from between the spring portions. Note that damping parts 78 do not have to be an elastomer as long as they are formed from a material having a damping function, and may be formed from a thermosetting resin, an adhesive material, or the like.

Damping parts 78 may have any configuration as long as they sandwich elastic supporting part 81 (82) from opposite sides by the plate-shaped flanges and separate members joined at push-in portions to a member having the same function as the flanges.

With this configuration, damping parts 78 damp a sharp spring resonance in elastic supporting part 81N (82N), so as to prevent a significant increase in vibrations at frequencies close to the resonance frequency and, thus, to prevent an increase in difference in vibration due to frequencies. Thus, movable body 20 suppresses the resonance peak before plastic deformation, and can thus generate stable vibration over a wide range without making contact with lid portion 12 and bottom portion 114 and prevent abnormal noise due to contact. Damping parts 78 may be formed in any shape, from any material, or the like as long as they prevent the occurrence of sharp vibrations in elastic supporting part 81 (82).

<Variation 7>

Figure 44:
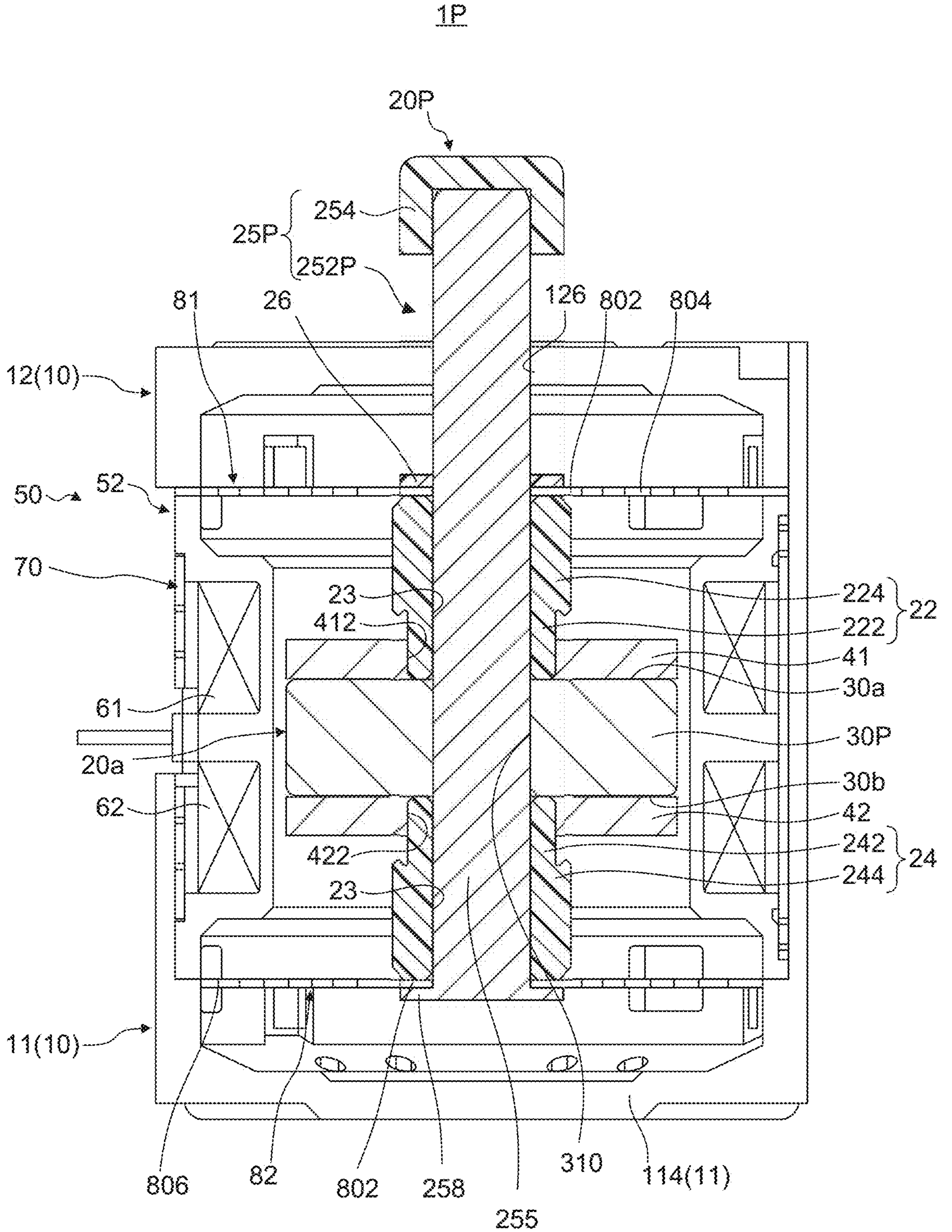
FIG. 44 is a longitudinal sectional view illustrating a configuration of a principal part of Variation 7 of the actuator.
Figure 45:
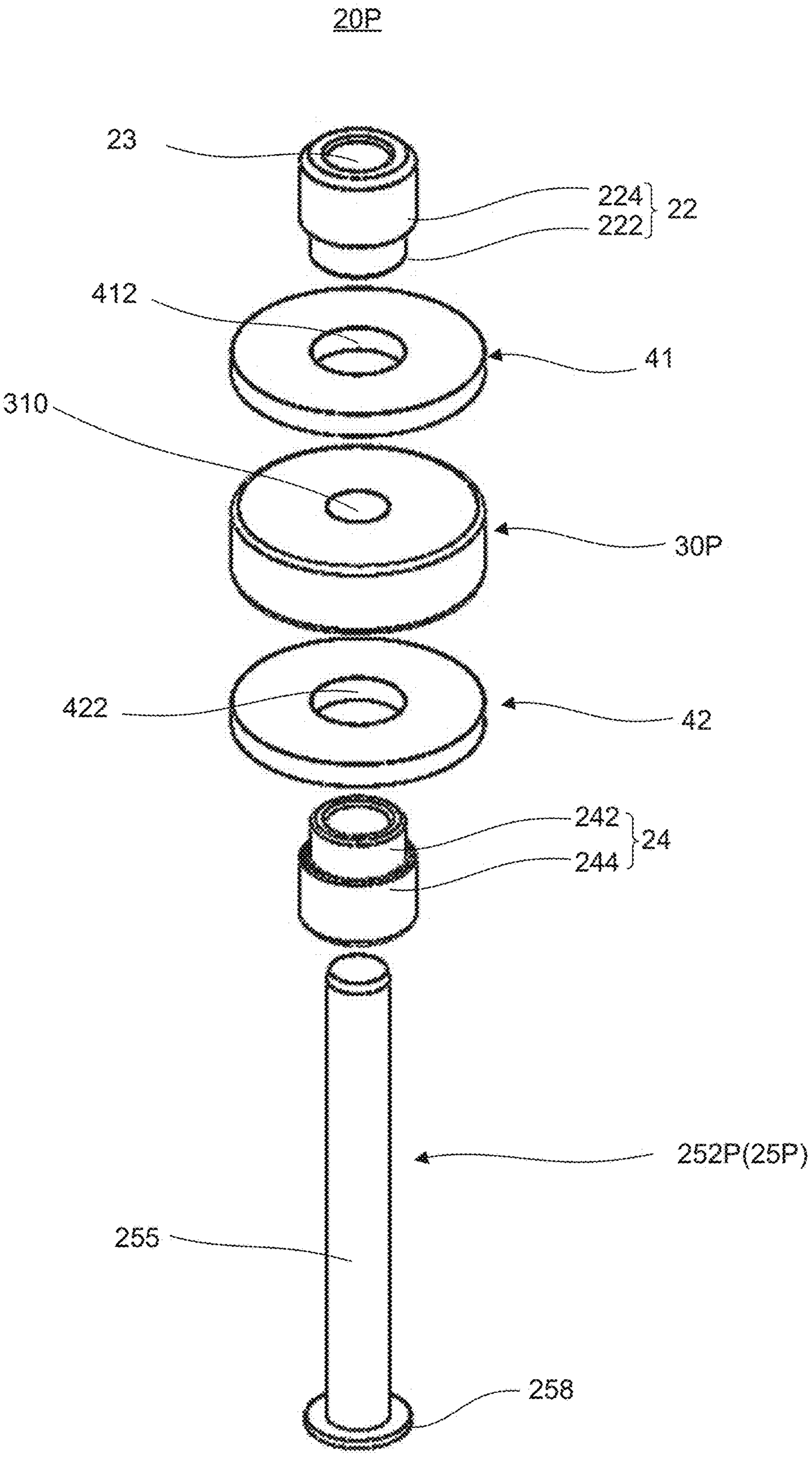
FIG. 45 is an enlarged exploded view of the movable body.

FIG. 44 is a longitudinal sectional view illustrating a configuration of a principal part of Variation 7 of the actuator, and FIG. 45 is an enlarged exploded view of the movable body.

Actuator 1P according to Variation 7 of present Embodiment 2 differs from actuator 1H only in the configuration of movable body 20P, and the other configurations are the same. Therefore, the configuration of movable body 20P will be mainly described below.

Movable body 20P of actuator 1P illustrated in FIG. 44 differs in that, in the constituent elements of movable body 20 of actuator 1H, output shaft portion 252P passes through magnet 30P, yokes 41 and 42, first spring retaining part 22, and second spring retaining part 24.

Movable body 20P illustrated in FIGS. 44 and 45 includes output shaft portion 252P and magnet 30P in addition to yokes 41 and 42, first spring retaining part 22, second spring retaining part 24, first spring fixation portion 26, and second spring fixation portion 28 having the same configurations as those of movable body 20.

Movable body 20P includes magnet 30P provided with an opening portion penetrating through the center of magnet 30, and yokes 41 and 42 having the same outer diameter as magnet 30P are disposed on front and back surfaces 30*a* and 30*b* of magnet 30P, respectively.

Opening portion 310 of magnet 30P has an inner diameter allowing insertion of output shaft portion 252P in the opening portion. The inner diameter of opening portion 310 of magnet 30P is substantially the same as the outer diameter of output shaft portion 252P, and is smaller than the inner diameter of yoke 41.

Joint portions 222 and 242, which are one ends of spring retaining parts 22 and 24, are inserted in and fixed to the opening portions of yokes 41 and 42 on the opposite sides of magnet 30P, respectively.

Output shaft portion 252P is a flanged shaft, and has the function of second spring fixation portion 26 and the function of output shaft portion 252.

Output shaft portion 252P includes cylindrical shaft portion 255 and flange portion 258 integrally formed on the base end portion of shaft portion 255.

Output shaft portion 252P extends between the opposite end portions of the movable body. Inner circumferential portion 802 of elastic supporting part 82 is sandwiched between flange portion 258 of output shaft portion 252P and the ring-shaped end surface of spring connection portion 244 of first spring retaining part 22.

Output shaft portion 252P integrally fixes elastic supporting part 82, second spring retaining part 24, yoke 42, magnet 30P, yoke 41, first spring retaining part 22, elastic supporting part 81, and first spring fixation portion 26 by sandwiching them between flange portion 258 and first spring fixation portion 26 while piercing them with shaft portion 255.

That is, since output shaft portion 252P is disposed in movable body 20P so as to be inserted movable body 20P along the axis, it is possible to assemble the other members without the axis of movable body 20P being displaced. Note that output shaft portion 252P may be formed from a non-magnetic material formed from a resinous material or the like, or may be formed from the same magnetic material as yoke 41. Further, it is preferable that one or more of elastic supporting part 82, second spring retaining part 24, yoke 42, magnet 30P, yoke 41, first spring retaining part 22, and elastic supporting part 81 be fixed to shaft portion 255 by press-fitting, welding, adhesive, or the like.

With this configuration, when movable body 20P is formed, magnet 30P, yokes 41 and 42, and spring retaining parts 22 and 24 are fixed by output shaft portion 252P being a flanged shaft penetrating therethrough and first spring fixation portion 26 being is a press-fit ring. In addition, output shaft portion 252P can securely and stably connect elastic supporting parts 81 and 82 to movable body 20P. It is thus possible to manufacture a stable movable body by structurally fastening the members to one another without relying solely on adhesion.

<Variation 8>

Figure 46:
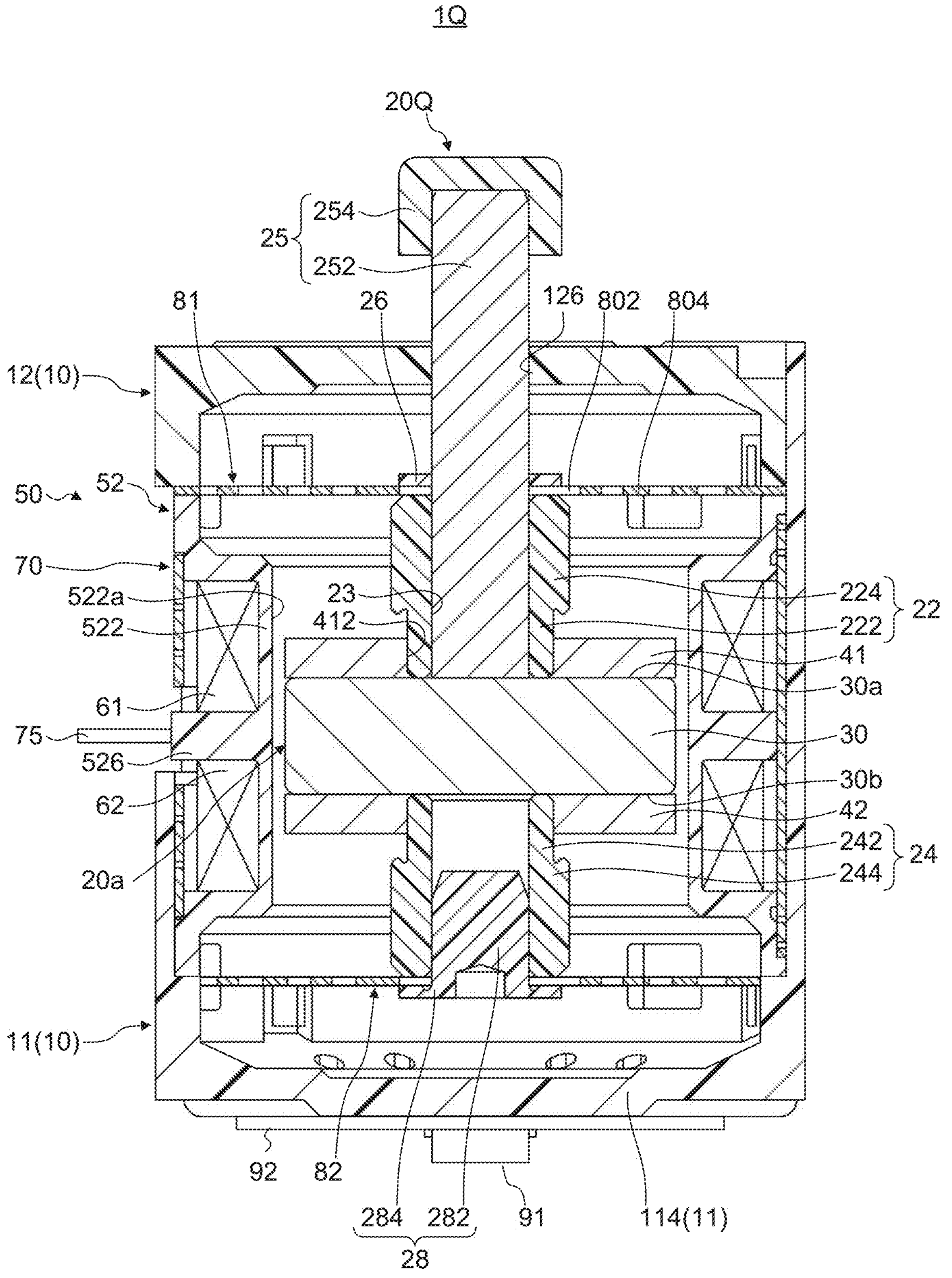
FIG. 46 is a longitudinal sectional view illustrating a configuration of a principal part of Variation 8 of the actuator.
Figure 47:
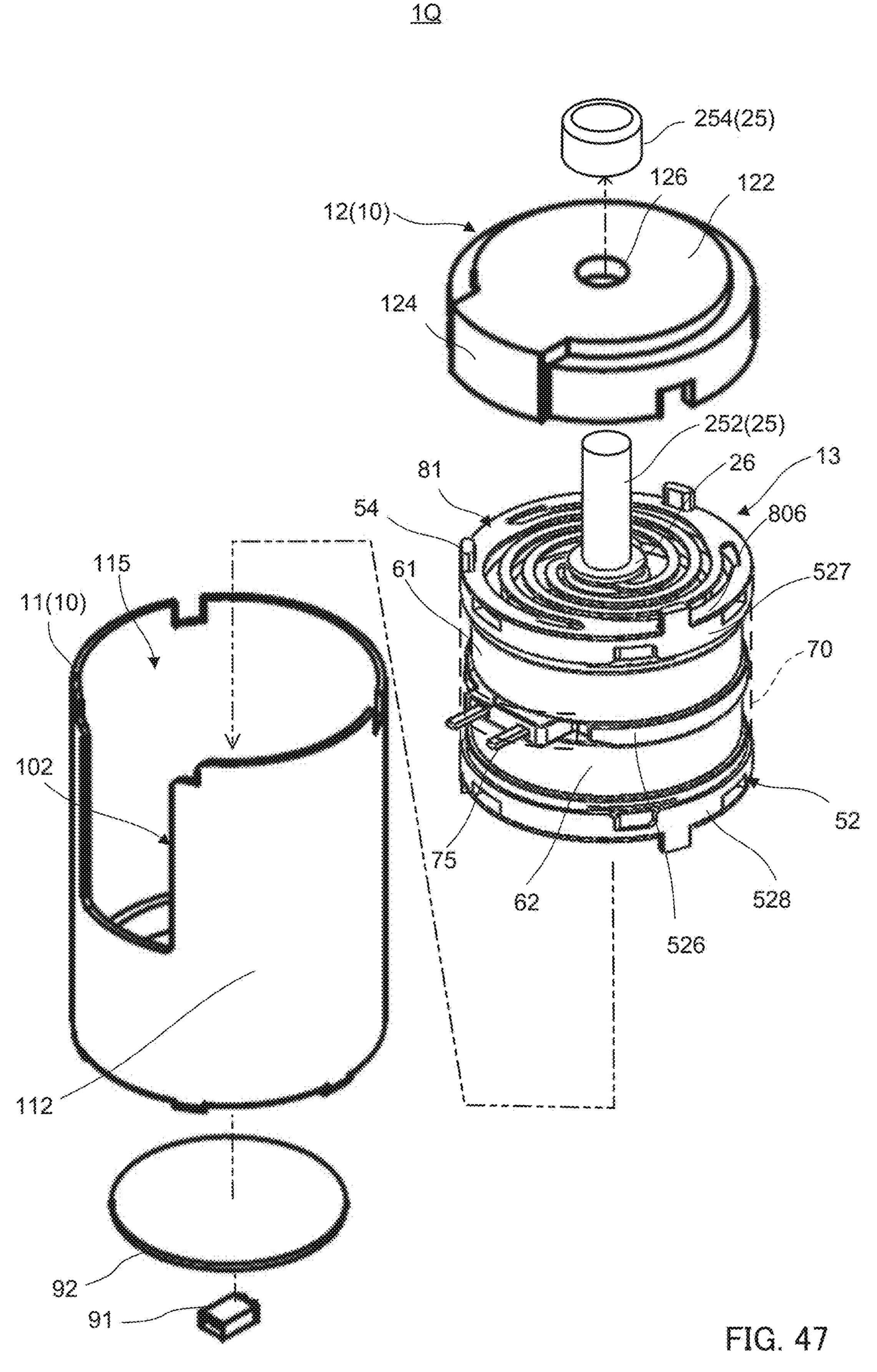
FIG. 47 is an exploded view illustrating an internal configuration of Variation 8 of the actuator from which a case is removed.

FIG. 46 is a longitudinal sectional view illustrating a configuration of a principal part of Variation 8 of the actuator, and FIG. 47 is an exploded view illustrating an internal configuration of Variation 8 of the actuator without the case.

Actuator 1Q according to Variation 8 of present Embodiment 2 is different from actuator 1H in that it includes magnetic sensor 91, and the other configurations are the same. Therefore, a different configuration will be described in detail below, and a description of the same configuration as that of actuator 1H will be omitted.

Actuator 1Q includes movable body 20 accommodated in hollow case 10 such that the movable body is capable of reciprocating between the upper and lower end surfaces of case 10 in the axial direction (vertical direction) as a moving direction, and magnetic sensor 91 that detects the movement position of movable body 20.

Actuator 1Q is connected to the operation section via output shaft portion 25 disposed in movable body 20, and transmits the movement of the movable body to the operation section (not illustrated) to perform so-called force feedback.

Magnetic sensor 91 is disposed at a distance from movable body 20 in the moving direction of movable body 20.

Magnetic sensor 91 is mounted on circuit board 92, detects a change in the magnetic flux caused by the movement of magnet 30 of movable body 20, and detects the displacement of movable body 20.

Magnetic sensor 91 is disposed at a position facing movable body 20 while being spaced apart from movable body 20 in the moving (reciprocating) direction. Note that magnetic sensor 91 may be disposed on movable body 20 and fixing body 50 in any configuration. The moving direction of movable body 20 may be the side opposite to the side on which movable body 20 moves. That is, the position of magnetic sensor 91 may be the same side or a different side as long as it is in the moving direction of movable body 20.

It is preferable that magnetic sensor 91 be disposed on a central axis extending in the reciprocation direction of movable body 20 (a position overlapping the axis of output shaft portion 252) or in the vicinity of the central axis.

Magnetic sensor 91 together with circuit board 92 is attached to the bottom surface of case main body 11, and magnetic sensor 91 is positioned on the axis of output shaft portion 252 of movable body 20.

Since magnetic sensor 91 is disposed on the outer surface of case 10, it can be assembled outside actuator 1H, and the assemblability of actuator 1H can be improved.

In addition, it is possible to easily attach or replace magnetic sensor 91 without disassembling actuator 1H. In addition, magnetic sensor 91 included in actuator 1H can be easily inspected.

It is preferable that magnetic sensor 91 be a Hall sensor incorporating an amplifier, such as a linear Hall IC, in which the output voltage range is defined by a power supply, and the output of the Hall element is amplified by the amplifier for linear output.

Accordingly, peripheral circuitry can be configured inexpensively and easily without using other sensors, amplifiers, and transducers such as dedicated AD converters. Note that circuit configuration of the magnetic sensor at a subsequent stage is preferably easier than, for example, in that case of simply using a Hall element, and the magnetic sensor may also be a Hall IC which compares an output by a Hall element with a threshold value for output of High/Low. The output voltage range is defined by the power supply also in the Hall IC, and the subsequent-stage circuitry (microcomputer) can thus be easily created.

<Circuit Board (Control Part) 92>

A microcomputer, an actuator driver, and the like in addition to magnetic sensor 91 are mounted on circuit board 92, and the circuit board includes a control part that controls the actuator.

In circuit board 92, magnetic sensor 91 detects an operation load received by movable body 20 via output shaft portion 252, and coils 61 and 62 are energized according to the detection result to control the movement of movable body 20. Note that the control part may not be disposed in actuator 1H.

As a result, actuator 1H can detect the operation load and perform haptic feedback specialized for the corresponding pressing operation. In particular, by the load detection, it is possible to perform detection specialized for the pressing operation.

As described above, in actuator 1H, the force feedback can be generated and presented based on the operation load received by output shaft portion 252 and the operation load received by output shaft portion 252. It is thus possible to accurately reproduce a user operation also as a switch haptic feeling, a slider haptic feeling, or the like in quick response to the user operation to easily present it as a feedback.

When magnetic sensor 91 is used, magnet 30 required as an actuator is used for the sensor. It is thus possible to provide an inexpensive movable-body-position detecting means.

Since case 10 is formed from a non-magnetic material, the case lower surface provided with magnetic sensor 91 is formed from a non-magnetic material. As a result, magnetic sensor 91 can detect the stable magnetic flux density in the magnetic circuit including magnet 30 and accurately detect the position of movable body 20.

Further, since the magnetization direction of magnet 30 is parallel to the moving direction of movable body 20, magnetic sensor 91 is to detect the magnetic flux density of the distribution of a single magnetic pole. It is thus possible to enhance the sensor detectability, so as to perform a stable sensor output.

Movable body 20 is accommodated inside annular coils 61 and 62 in an axially movable state. Thus, it is possible to form a magnetic circuit capable of generating a thrust more efficiently. Further, in this magnetic circuit, the flow of the magnetic flux outward of magnet 30 in the radial direction is restricted by outer yoke 70, and the magnetic flux density to the bottom portion 114 side is thus increased. It is thus possible to accurately and easily detect magnetic sensor 91 disposed on bottom portion 114.

For example, in cases where magnetic sensor 91 and circuit board 92 are mounted in Variations 1J to 1P, the operation performed when the user pushes the operation section is transmitted to protruding parts 25, 25J, 25L, 25M, and 25P connected to the operation section. Protruding parts 25, 25J, 25L, 25M, and 25P move in response to the pushing of the operation section, and movable bodies 20, 20J to 20M, and 20P connected to the protruding parts are also displaced.

At this time, magnetic sensor 91 detects the position of pushed movable bodies 20, 20J to 20M, and 20P by detecting the intensity of the magnetic flux (detected magnetic flux) flowing toward bottom portion 114. Further, magnetic sensor 91 detects the intensity of the detected magnetic flux on the time axis, the speed at the time of pushing can be recognized based on the change of the intensity. In addition, in accordance with the relationship with the spring reaction force relative to the elastic deformation of pushed-in elastic supporting parts 81 and 82, the control part also can determine that the positions of elastic supporting parts 81 and 82 are positions enabling exertion of a force of pushing back, so as to detect a pushing amount from the spring reaction force. Therefore, actuator 1Q including magnetic sensor 91 is an actuator having a detection function of detecting a position and a load, which is capable of performing feedback in response to information on the position and speed or information on the load on a movable portion, a push-in load, or the like.

Further, as an actuator of a haptic feeling presenting device, it is possible to perform haptic feedback in response to an operation load and to apply a haptic feeling the same between products even when there is a variation in product performance due to component dimensional tolerances or assembly variations between the products.

That is, according to actuator 1Q, when movable body 20 moves, magnet 30 moves. Accordingly, the distribution of the magnetic flux changes, and the position and the speed of the movable part can be detected by detecting the amount of the change. Further, by controlling the current based on the position and speed information, it is possible to control the movement of movable body 20 to perform excellent haptic feeling expression and to suppress variations in haptic feeling. Further, elastic supporting parts 81 and 82 are leaf springs, and it is thus possible to detect the operation load based on a reaction force to the pressing obtained by adding together the elasticities of the leaf springs and the operation section (not illustrated) and the detection result of the movable part position. Accordingly, it is possible to perform haptic feedback corresponding to the pressing force.

According to actuators 1H, 1J to 1Q, and 100 of Variations 1 to 8, it is possible to obtain the same advantageous effects as in Embodiment 2, in particular, to stably drive the actuator even in a mounting environment in which an external load is expected to be applied.

Note that actuators 1H, 1J to 1Q, and 100 may be configured to vibrate at a resonance frequency of from 30 Hz through 500 Hz that is a resonance frequency used in a typical speaker and allows easier emission of a sound in an audible range. When configured to vibrate in this frequency band, actuators 1H, 1J, 1K, 1L, 1M, IN, 1P, 1Q, and 100 can be used as a so-called exciter having not only a force feedback function but also a sound reproduction function by vibration as a vibration actuator.

According to actuators 1H, 1J to 1Q, and 100, it is possible to perform quick and strong feedback by directly touching movable bodies 20, 20J, 20K, 20L, 20M, and 20P. Further, it is also possible to perform force feedback of a force corresponding to an input current, to perform force feedback with displacement in accordance with a user's operation, and to perform haptic feeling expression by a long stroke operation at the time of the operation.

Further, the pair of elastic supporting parts 81 and 82 are circular leaf springs, and can secure the rectilinearity of movable bodies 20, 20J, 20K, 20L, 20M, and 20P. Further, even when the vehicle moves with an external operation load greater than or equal to the gap due to an external impact or the like, the vehicle is brought into contact with the opening portion 126 of case 10, and the displacement does not increase further. Thus, it is possible to prevent movable bodies 20, 20J, 20K, 20L, 20M, and 20P from making contact with inner circumferential surface 522*a* of the fixing body.

Embodiment 3

<Overall Configuration of Actuator>

Figure 48:
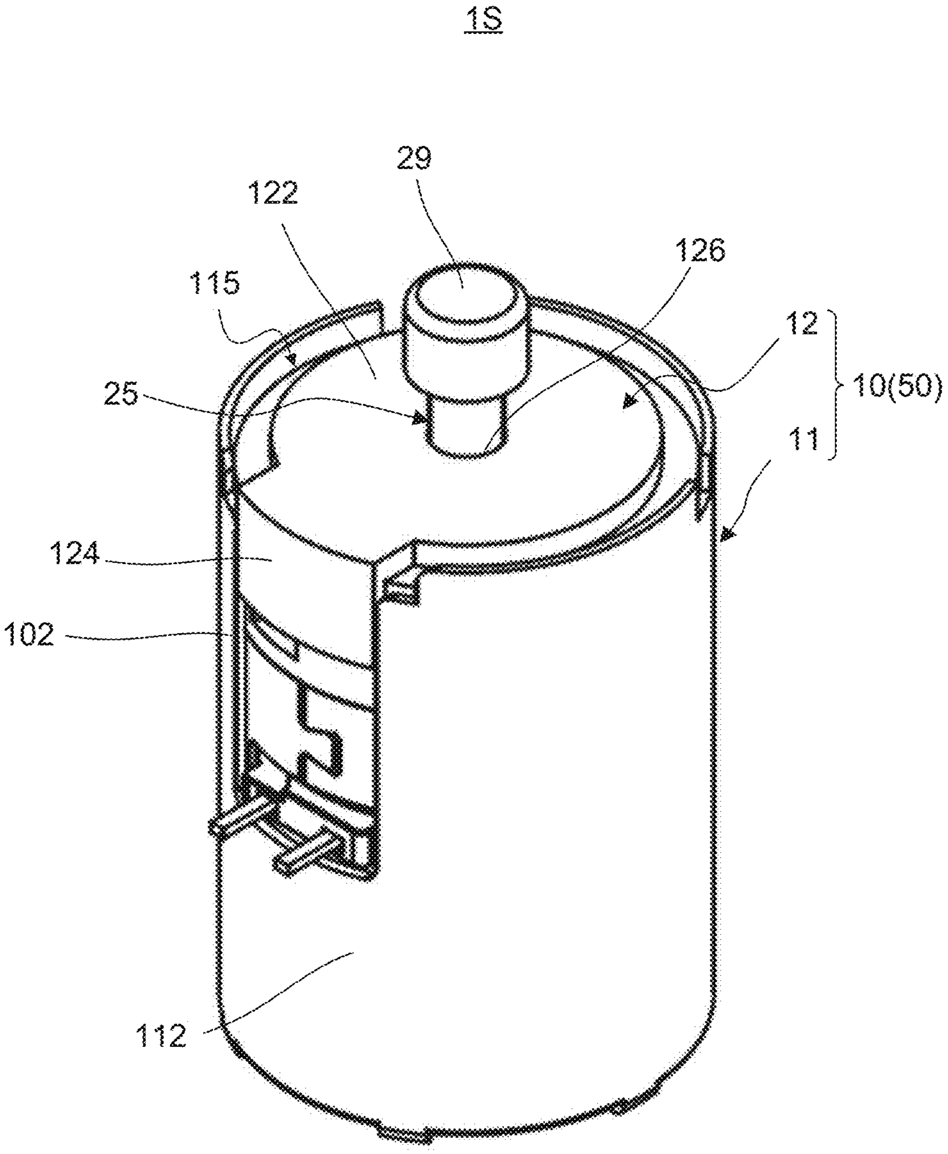
FIG. 48 is an external perspective view of an actuator according to Embodiment 3 of the present invention.
Figure 49:
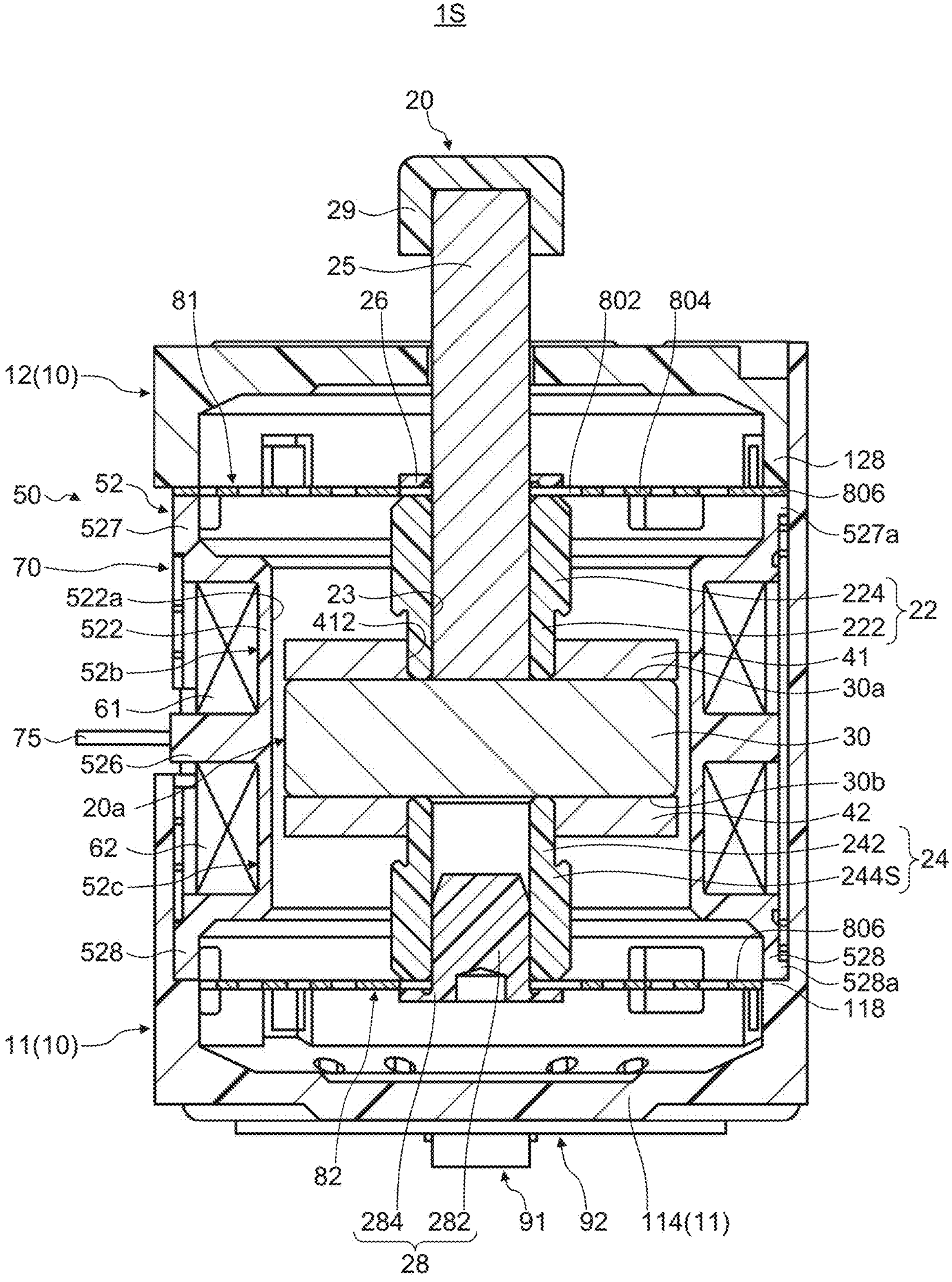
FIG. 49 is a longitudinal sectional view illustrating a configuration of a principal part of the actuator.
Figure 50:
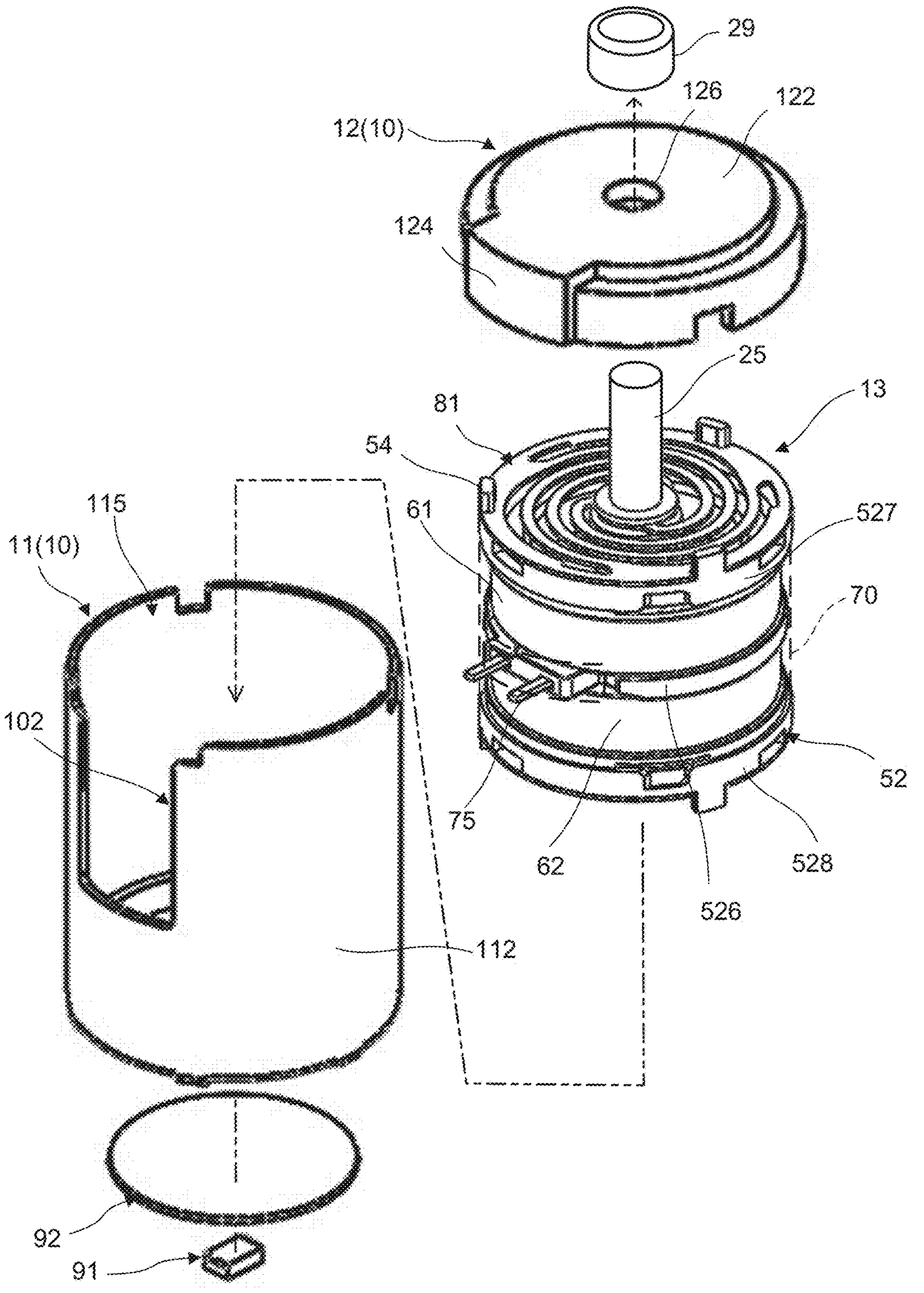
FIG. 50 illustrates an internal structure of the actuator from which a case is removed.
Figure 51:
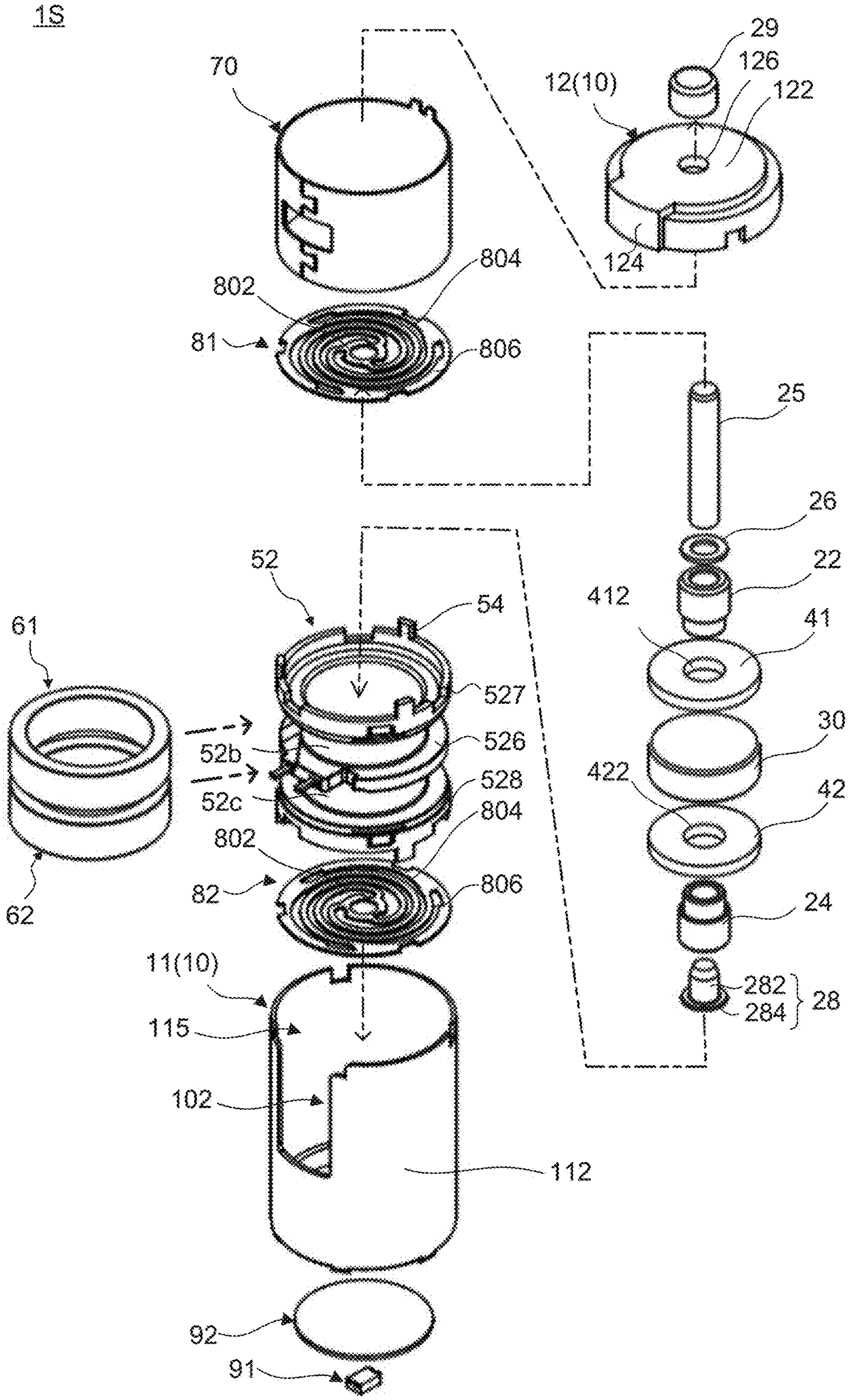
FIG. 51 is an exploded perspective view of the actuator.
Figure 52:
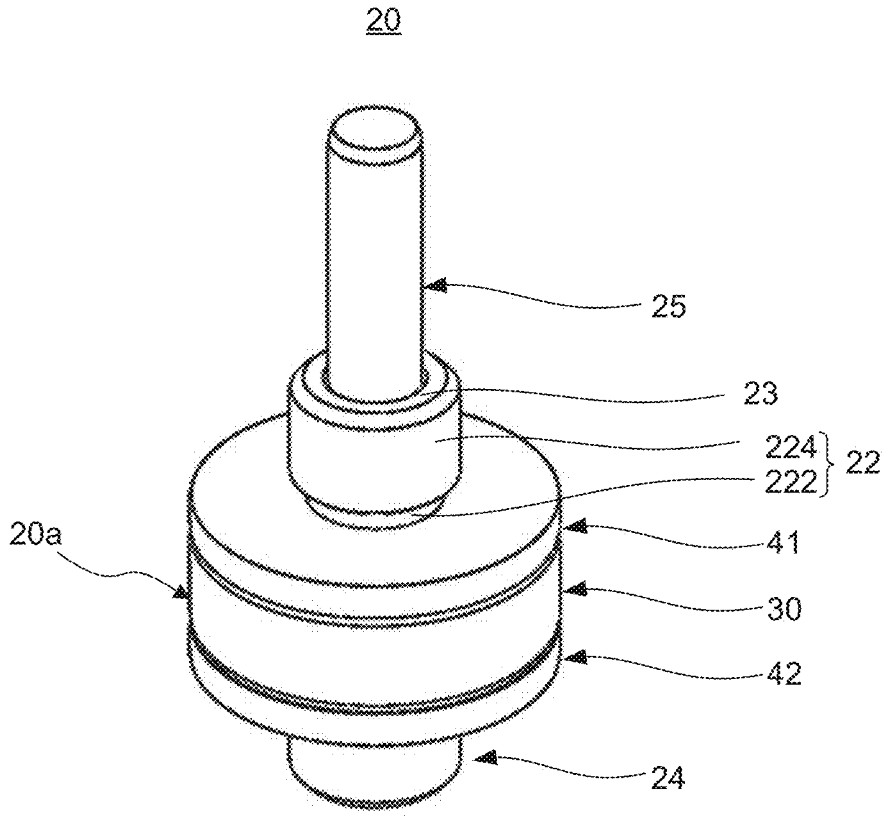
FIG. 52 is a perspective view of the movable body.
Figure 53:
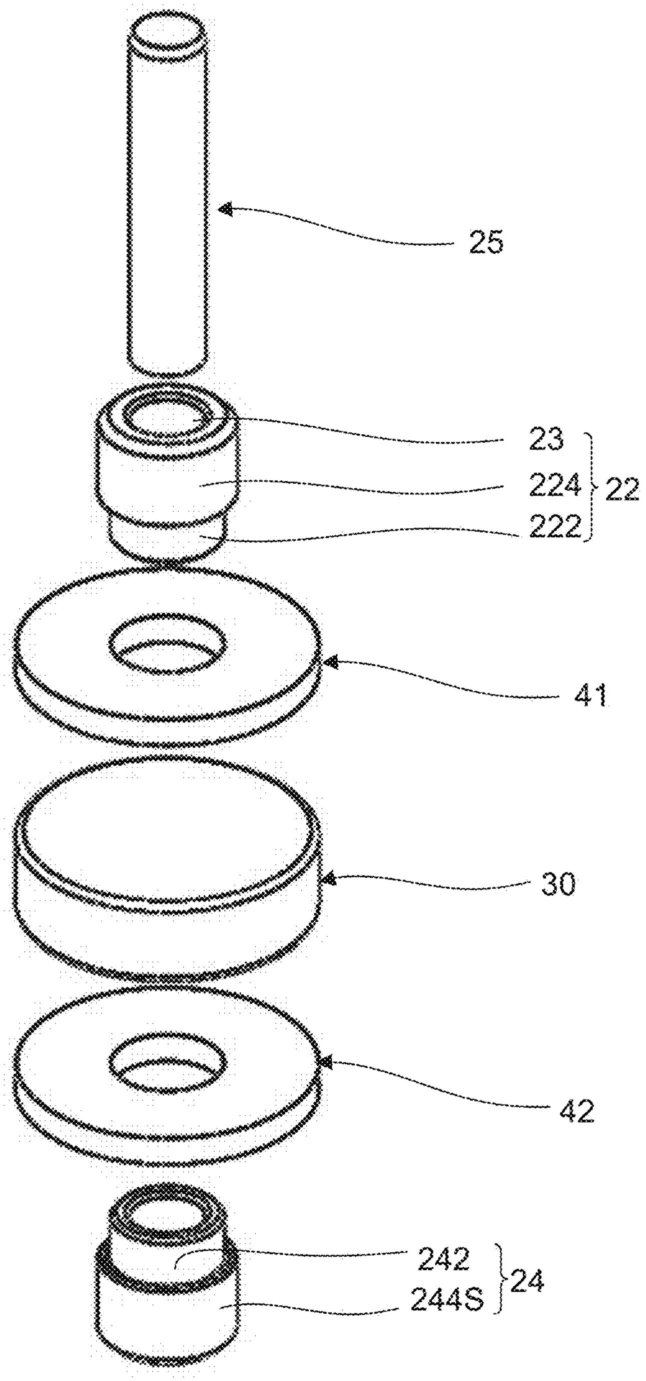
FIG. 53 is an enlarged exploded view of the movable body.

FIG. 48 is an external perspective view of an actuator according to Embodiment 3 of the present invention, and FIG. 49 is a longitudinal sectional view illustrating a configuration of a principal part of the actuator. FIG. 50 is a view illustrating an internal structure of the actuator from which a case is removed, and FIG. 51 is an exploded perspective view of the actuator. Further, FIG. 52 is a perspective view of the movable body, and FIG. 53 is an enlarged exploded view of the movable body.

Note that the "upper" side and the "lower" side in the present embodiment are given for convenience in order to facilitate understanding, and mean one side and the other side in a reciprocation direction of the movable body in the actuator. That is, when the actuator is mounted on an electronic device (not illustrated), the upper and lower sides of the actuator may be reversed and may also be oriented left and right, but it is preferable that a forward/backward movement direction of output shaft portion 25 protruding from the actuator be identical to a direction in which the user touches an operation section. The same applies to the following embodiments.

Actuator 1S according to Embodiment 3 is connected to, for example, an operation section (for example, a touch panel or the like) operated by a user touching movable body 20, and drives the movable body in accordance with the movement of the movable body caused by the user's operation, so as to present an output that the user can perceive.

Actuator 1S is, for example, a perception presentation actuator, and is configured to transmit reciprocating motion of movable body 20 in response to a touch operation on the operation section by the user as a haptic sensation or a force sensation of the user, but may also present the reciprocating motion to the user as a sound in order to appeal to hearing.

It should be noted that actuator 1S is preferably used as a device that performs operation detection and haptic feedback in haptics. Actuator 1S is not limited to this, and may be mounted as a vibrating source in an electronic device such as a portable gaming terminal device. Note that the haptic feedback in the present embodiment is to perform feedback of a haptic feeling, a force sensation, and/or the like by the movement, vibration, or the like of the movable body. For example, haptic sensation feedback and force sensation feedback or force feedback are a function used in haptics.

As illustrated in FIGS. 48 and 49, actuator 1S of the present embodiment includes movable body 20 accommodated in hollow case 10 such that the movable body is capable of reciprocating between the upper and lower end surfaces of case 10 in the axial direction (vertical direction) as a moving direction, and magnetic sensor 91 that detects the movement position of movable body 20.

Actuator 1S is connected to the operation section via output shaft portion 25 disposed in movable body 20, and transmits the movement of the movable body to the operation section (not illustrated).

<Overall Configuration of Actuator 1S>

Actuator 1S includes magnet 30 in movable body 20 and coils 61 and 62 in fixing body 50, and movable body 20 can reciprocate in a straight line direction by cooperation of energized coils 61 and 62 and magnet 30. In addition, actuator 1S can detect the displacement of movable body 20 by magnetic sensor 91.

Actuator 1S may include any form of movable body 20 and fixing body 50 as long as the actuator includes magnetic sensor 91 at a position spaced apart from and facing movable body 20 in the reciprocation direction of movable body 20. Actuator 1S includes elastic supporting parts 81 and 82 that support movable body 20 such that the movable body is capable of freely reciprocating with respect to fixing body 50.

Specifically, actuator 1S includes movable body 20 including a pair of yokes 41 and 42 and a pair of spring retaining parts 22 and 24 in addition to magnet 30, and fixing body 50 including outer yoke 70 in addition to a pair of annular coils 61 and 62. A pair of elastic supporting parts 81 and 82 are disposed between movable body 20 and fixing body 50.

Note that a configuration in which a pair of yokes 41 and 42, a pair of spring retaining parts 22 and 24, and a pair of coils 61 and 62 are disposed is employed, but the present invention is not limited thereto, and the number of yokes, spring retaining parts, and coils may also be one, three, or more as long as it is possible to achieve movability on one side or both side in one linear direction.

In actuator 1S, coils 61 and 62, outer yoke 70, magnet 30, and yokes 41 and 42 constitute a magnetic circuit for moving movable body 20. In actuator 1S, coils 61 and 62 are energized from a power supply section (not illustrated) via terminal part 75, and movable body 20 is moved. Movable body 20 can reciprocate in both directions in the axial direction which is a reciprocation direction, or in one direction which is one side in the axial direction. For example, actuator 1S moves in both directions in the axial direction (see the arrow directions in FIG. 54).

In actuator 1S of the present Embodiment, movable body 20 reciprocates in the moving direction (also referred to as the axial direction of coils 61 and 62) along a holding-portion main body (protective wall portion) 522 disposed between the coils and movable body 20 inside coils 61 and 62 held by coil holding part 52. The moving direction is not only the axial direction of coils 61 and 62, but also the magnetization direction of magnet 30, and is also the axial direction of coil holding part 52.

In addition, as illustrated in FIG. 50, actuator 1S may also have a configuration in which case 10 including case main body 11 and lid portion 12 accommodates therein unit 13 including fixing body 50 and movable body 20 connected to each other by elastic supporting parts 81 and 82. Accordingly, assembly of the principal part of actuator 1S can be accurately performed in a process separate from a process for case 10.

<Movable Body 20>

Movable body 20 is disposed such that, in a motionless state in which the movable body is not moving (including reciprocating and vibrating), the center of the length of the movable body in the reciprocation direction faces the center of the length of coil holding part 52 in the reciprocation direction 52 at a predetermined distance therebetween in a direction orthogonal to the axial direction of movable body 20 via elastic supporting parts 81 and 82. In the present embodiment, it is preferable that the center of the length of magnet 30 and yokes 41 and 42 in the reciprocation direction be disposed at a position facing, in a direction orthogonal to the reciprocation direction, the center of the length in the reciprocation direction between coils 61 and 62 spaced apart from each other in the upper-lower direction. Note that a magnetic fluid may be interposed between holding-portion main body 522 and movable body 20.

As illustrated in FIGS. 49 and 51 to 53, movable body 20 includes magnet 30, yokes 41 and 42, spring retaining parts 22 and 24, output shaft portion 25, first spring fixation portion 26, and second spring fixation portion 28.

In movable body 20, yokes 41 and 42, spring retaining parts 22 and 24, first spring fixation portion 26, and second spring fixation portion 28 are continuously disposed in opposite directions in the reciprocation direction around magnet 30. Specifically, in movable body 20, yokes 41 and 42 are disposed on front and back surfaces 30*a* and 30*b* of magnet 30 in a stacked manner, and elastic supporting parts 81 and 82 are engaged with one end portions of spring retaining parts 22 and 24 that are, at the other end portions, engaged with opening portions 412 and 422 of yokes 41 and 42.

In movable body 20, outer circumferential surface 20*a* of magnet 30 and yokes 41 and 42 face inner circumferential surface 522*a* of holding-portion main body 522 with a predetermined distance to inner circumferential surface 522*a*. When movable body 20 reciprocates, outer circumferential surface 20*a* reciprocates without coming into contact with inner circumferential surface 522*a*.

Magnet 30 is solid and magnetized in the reciprocation direction. Specifically, magnet 30 is formed in a disk shape and has front and back surfaces 30*a* and 30*b* facing away from each other in the reciprocation direction (thickness direction) as magnetic pole surfaces of different polarities (for example, front surface 30*a* is an S-pole, and back surface 30*b* is an N-pole).

Magnet 30 is disposed so as to be spaced apart by a distance from coils 61 and 62 (to be described later in detail) inward of coils 61 and 62 in a radial direction. Here, the "radial direction" is a direction orthogonal to the axes of coils 61 and 62, and is also a direction orthogonal to the reciprocation direction. The "distance" in the radial direction is a distance between coils 61 and 62 including holding-portion main body 522 and magnet 30, and is a distance that allows movement in the reciprocation direction of movable body 20 without contact between the magnet and the movable body. In other words, in the present embodiment, the "distance" means a predetermined distance between holding-portion main body 522 and magnet 30.

In the present embodiment, magnet 30 is, at the center of the outer circumferential surface in the axial direction on the outer side in the radial direction, disposed so as to face the center of holding-portion main body 522 in a direction orthogonal to the axial direction. Note that magnet 30 may have a shape other than a disk shape, such as a cylindrical shape or a plate shape, as long as it is disposed inside coils 61 and 62 with two magnetized surfaces facing in the extending direction of the axes of coils 61 and 62, that is, in the reciprocation direction.

In the present embodiment, magnet 30 is a solid body. Thus, unlike the case of a tubular body, an effort to process an opening portion is saved, and the areas of the front and back surfaces serving as the magnetic pole surfaces are not reduced by formation of the opening portion. In addition, it is desirable that the center of magnet 30 in the axial direction coincide with the center of movable body 20 in the axial direction.

The magnetization direction of magnet 30 is parallel to the moving direction of movable body 20.

Yokes 41 and 42 are magnetic bodies, and the yokes together with magnet 30 form a movable-body-side magnetic circuit. Yokes 41 and 42 concentrate the magnetic flux of magnet 30 to allow efficient flow without leakage, and effectively distribute the magnetic flux flowing between magnet 30 and coils 61 and 62.

In addition, yokes 41 and 42 may have a function of fixing spring retaining parts 22 and 24 in addition to a function as a part of the magnetic circuit, and yokes 41 and 42 may further have a function as a main body portion of movable body 20 and a function as a weight in movable body 20.

In the present embodiment, yokes 41 and 42 are formed in an annular flat plate shape having the same outer diameter as that of magnet 30. Yokes 41 and 42 are fixed to magnet 30 such that the outer circumferential surfaces thereof are flush with the outer circumferential surface of the magnet, and form outer circumferential surface 20*a* of movable body 20 together with the outer circumferential surface of the magnet.

Yokes 41 and 42 are members with the same shape disposed to sandwich magnet 30 with magnet 30 interposed therebetween, but may be members with different shapes. Yokes 41 and 42 are attached to magnet 30 by being attracted to magnet 30, and are also fixed to magnet 30 via, for example, a thermosetting adhesive such as an epoxy resin or an anaerobic adhesive.

Opening portions 412 and 422 are formed in respective central portions of yokes 41 and 42 so as to extend therethrough in the axial direction, that is, in the thickness direction. One end portions of upper and lower spring retaining parts 22 and 24 are internally fitted and fixed to opening portions 412 and 422, respectively.

Opening portions 412 and 422 support spring retaining parts 22 and 24 such that the respective axes of spring retaining parts 22 and 24 (here coinciding with the centers of elastic supporting parts 81 and 82) are located on the central axis of movable body 20. Opening portions 412 and 422 allow adjustment of the degree of opening in yokes 41 and 42 to adjust the weight of movable body 20 and set a suitable reciprocating output.

In the present embodiment, when movable body 20 is not reciprocating, yokes 41 and 42 are positioned on the inner side (radially inner side) of coils 61 and 62 so as to face coils 61 and 62, respectively, in a direction orthogonal to the axial direction of coils 61 and 62.

In yokes 41 and 42, the height position of the upper surface of yoke 41 on the upper side (front side) of magnet 30 is preferably opposed to the position of the center of the upper coil 61 in the height direction (reciprocation direction). In addition, the height position of the lower surface of yoke 42 on the lower side (back surface side) of magnet 30 is preferably opposed to the position of the center of lower coil 62 in the height direction (reciprocation direction).

Spring retaining parts 22 and 24 have a function of fixing a movable-body-side magnetic circuit to elastic supporting parts 81 and 82, and have a function as a weight of movable body 20. Spring retaining parts 22 and 24 are disposed on an object so as to sandwich magnet 30 and yokes 41 and 42, and increase the reciprocating output of movable body 20. In the present embodiment, spring retaining parts 22 and 24 are formed in the same shape to reduce the manufacturing cost of the parts. Regarding details of second spring retaining part 24, a description of spring retaining part 22 is mainly given while the spring retaining parts are provided with respective reference numbers as in “spring retaining parts 22 and 24” in description of spring retaining part 22 and a description of spring retaining part 24 will be omitted.

In the present embodiment, spring retaining parts 22 and 24 also function as a shaft of the movable body extending along the central axis of movable body 20, and are interposed between yokes 41 and 42 and elastic supporting parts 81 and 82.

Spring retaining parts 22 and 24 include joint portions 222 and 242 and spring fixation portions 224 and 244. Joint portions 222 and 242 and spring fixation portions 224 and 244 are continuously disposed in the reciprocation direction.

Spring retaining parts 22 and 24 are tubular bodies and have through-hole 23 extending inside. The base end portion of output shaft portion 25 is inserted into through-hole 23 of spring retaining part 22 and is firmly fixed thereto.

Joint portions 222 and 242 are tubular bodies disposed on the axis of movable body 20, and are joined to yokes 41 and 42, respectively. Joint portions 222 and 242 are joined by inserting one end portion sides into opening portions 412 and 422 of yokes 41 and 42, respectively. On the other hand, the other end portions of joint portions 222 and 242 are disposed to face away from each other in the opposite directions across magnet 30, and form opposite end portions of movable body 20 which are separated from each other in the moving direction. Elastic supporting parts 81 and 82, which will be described later, are joined to the other end portions, respectively.

In the present embodiment, spring retaining parts 22 and 24 are bonded to yokes 41 and 42 by press-fitting, but the present invention is not limited thereto, and may be bonded by bonding using a thermosetting adhesive such as an epoxy resin or an anaerobic adhesive, for example. Joint portions 222 and 242 are tubular bodies, but they may be solid cylindrical bodies or rod-shaped bodies having recessed portions on the axis.

Spring fixation portion 224 is a tubular body that is provided so as to protrude from joint portion 222 to the other side (upward) of spring retaining part 22 and has an outer diameter larger than that of joint portion 222. In spring fixation portion 224, a joining surface, which is a distal end (upper end) surface thereof, is disposed around output shaft portion 25.

Output shaft portion 25 is connected to movable body 20, is movable together with movable body 20, and outputs a motion of movable body 20 to the outside. Output shaft portion 25 is disposed on the axis of movable body 20, the base end side is fixed to movable body 20 by being internally fitted to spring retaining part 22, and the other end side is exposed to the outside of actuator 1S through central opening portion 126 of lid portion 12. Cap 29 is attached to a distal end of output shaft portion 25. The user may touch cap 29 itself, or a separate member may be attached to cap 29 to apply a haptic feeling to the user via the separate member.

Output shaft portion 25 is inserted through inner circumferential portion 802 which is an end portion (the other end portion) of the upper leaf spring as elastic supporting part 81 on the inner diameter side, and inner circumferential portion 802 is sandwiched between spring fixation portion 224 and first spring fixation portion 26 in a state of being in contact with the joining surface of spring fixation portion 224. Spring fixation portion 224 is thus joined to elastic supporting part 81.

As described above, output shaft portion 25 protrudes from movable body 20 to the side of elastic supporting part 81 opposite to magnet 30 in one direction in the moving direction of movable body 20, and is movable forward and backward outside fixing body 50. The drive of movable body 20 is directly transmitted to the user via output shaft portion 25. Quick response and strong feedback can thus be performed. Further, by displacing movable body 20 in accordance with the operation, a haptic feedback can be performed, and a haptic feeling corresponding to an operation in a long stroke can be expressed.

On the other hand, spring fixation portion (lower spring fixation portion) 244 disposed on the side opposite to spring fixation portion 224 of first spring retaining part 22 across magnet 30 is joined to inner circumferential portion 802 which is an end portion of the lower leaf spring being elastic supporting part 82 on the inner diameter side.

Spring fixation portion 244S is a tubular body that is provided so as to protrude from joint portion 242 to the other side (lower side) of spring retaining part 24 and has an outer diameter larger than that of joint portion 242. At spring fixation portion 244S, inner circumferential portion 802 is held between the joining surface being the distal end (lower end) surface of the spring connection portion and second spring fixation portion 28 inserted into a through-hole opened in the joining surface in a state in which inner circumferential portion 802 of the lower leaf spring serving as elastic supporting part 82 is in contact with the joining surface.

Specifically, second spring fixation portion 28 is inserted at shaft-shaped insertion portion 282 into the through-hole in spring fixation portion 244S, thereby holding inner circumferential portion 802 of elastic supporting part 82 between flange 284 disposed on the outer circumference of the base end portion of the insertion portion and the joining surface of spring fixation portion 244S. Spring fixation portion 244S and elastic supporting part 82 are thus joined to each other.

Second spring fixation portion 28 may be a rivet such as a blind rivet, for example. Second spring fixation portion 28 fixes shaft-shaped insertion portion 282 in the through-hole in spring fixation portion 244S by press-fitting such as caulking.

It should be noted that only by disposing spring retaining parts 22 and 24 in the movable-body-side magnetic circuit, the upper leaf spring and the lower leaf spring as elastic supporting parts 81 and 82 can be easily assembled to movable body 20, and the assemblability can be improved.

Note that, spring retaining parts 22 and 24 may be formed from a magnetic material, but are preferably formed from a non-magnetic material. When spring retaining parts 22 and 24 are formed from a non-magnetic material, the magnetic flux from yoke 41 does not flow upward, and the magnetic flux from yoke 42 does not flow downward, and the magnetic fluxes can thus efficiently flow toward coils 61 and 62 located on the outer circumferential side of yokes 41 and 42.

<Elastic Supporting Parts 81 and 82>

Elastic supporting parts 81 and 82 are disposed on opposite sides of movable body 20 in the moving direction, and support movable body 20 movably in the moving direction. Elastic supporting parts 81 and 82 are leaf springs, and are disposed so as to sandwich movable body 20 in the moving direction of movable body 20, and are disposed on both movable body 20 and fixing body 50 so as to intersect the moving direction.

Specifically, elastic supporting parts 81 and 82 are disposed to straddle, on one hand, the opposite end portions (upper and lower end portions) of movable body 20 that are spaced apart from each other in the reciprocation direction and, on the other hand, the opening edge portions of fixing body 50 (coil holding part 52) that are disposed radially outward from the opposite end portions. In the present embodiment, elastic supporting parts 81 and 82 are disposed along a direction orthogonal to the reciprocation direction and face each other to sandwich movable body 20 in the reciprocation direction.

Elastic supporting parts 81 and 82 may be non-magnetic materials or magnetic materials (specifically, ferromagnetic materials). Elastic supporting parts 81 and 82 may be formed from a stainless-steel plate such as SUS304, SUS316 as long as they are non-magnetic leaf springs. When elastic supporting parts 81 and 82 are formed from a magnetic material, a stainless-steel plate such as SUS301 is applicable. As a material of elastic supporting parts 81 and 82, for example, a magnetic material (for example, SUS301) is known to be more durable and inexpensive than a non-magnetic material (for example, SUS304, SUS316, or the like). In the present embodiment, elastic supporting parts 81 and 82 are formed from SUS301.

Elastic supporting parts 81 and 82 support movable body 20 such that the movable body does not come into contact with fixing body 50 whether the movable body is in reciprocating motion and not in reciprocating motion. Elastic supporting parts 81 and 82 may be formed from any material as long as they are configured to elastically support movable body 20 movably.

Each of elastic supporting parts 81 and 82 is a plurality of plate-shaped spiral springs which have a flat plate shape in a normal state. In each of elastic supporting parts 81 and 82, arc-shaped deformation arm portions 804 extend radially outward at regular intervals from the outer edge portion of inner circumferential portion 802 having the annular plate shape, and are connected to outer circumferential fixing portion 806 having the annular plate shape at the end portions of deformation arm portions 804.

Inner circumferential portions 802 have a shape disposed on the joining surfaces of spring fixation portions 224 and 244 of spring retaining parts 22 and 24, and have, for example, an outer diameter substantially the same as the outer diameter of the joining surfaces of spring fixation portions 224 and 244.

Deformation arm portions 804 are elastically deformable, are joined to outer circumferential fixing portion 806 at one end portions, are joined to inner circumferential portion 802 at the other end portions, and connect outer circumferential fixing portion 806 and inner circumferential portion 802 to each other. A plurality of deformation arm portions 804 are disposed in a spiral shape between inner circumferential portion 802 and outer circumferential fixing portion 806 while being spaced from one another by a predetermined interval in the circumferential direction. Movable body 20 may be supported by three or more elastic supporting parts (leaf springs) 81 and 82. The plurality of leaf springs are attached to extend along a direction orthogonal to the reciprocation direction.

In elastic supporting parts 81 and 82, inner circumferential portions 802 are joined respectively to the opposite end portions (spring fixation portions 224 and 244) that are separated from each other in the axial direction (reciprocation direction) of movable body 20. Further, outer circumferential fixing portion 806 sides of elastic supporting parts 81 and 82 are disposed so as to protrude radially outward (in the radial direction) at the opposite end portions of movable body 20.

Outer circumferential fixing portions 806 include notches formed in the outer circumferential edges, and are sandwiched between the opposite opening edges of coil holding part 52 and case 10 in a state in which movable-range forming portions (positioning piece portions) 54 of coil holding part 52 are engaged with the notches.

Specifically, in elastic supporting part 81, outer circumferential fixing portion 806 is sandwiched and fixed in case 10 between ring-shaped upper end surface 527*a* of flange portion 527 and pressing portion 128 of lid portion 12. Note that, upper end surface 527*a* means an upper (one-side) end surface of the portion of the upper side (one side) of upper (one-side) flange portion 527 other than movable-range forming portions 54.

Further, in lower elastic supporting part 82, outer circumferential fixing portion 806 is fixed to the lower end portion of coil holding part 52 at the outside of movable body 20 in the radial direction in actuator 1S. Specifically, outer circumferential fixing portion 806 of elastic supporting part 82 is fixed to a portion of annular lower end surface 528*a* of lower flange portion 528 forming the lower end portion of coil holding part 52, the portion being other than movable-range forming portions 54.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 such that the directions of the whirls of elastic supporting parts 81 and 82 are the same, for example.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the moving direction, and elastically support movable body 20 with respect to fixing body 50. Thus, when the movement amount of movable body 20 is large, the movable body moves in a translational direction (here, the direction on a plane perpendicular to the moving direction) even slightly while rotating. When the whirl directions of the plurality of leaf springs are opposite each other, the plurality of leaf springs move in a buckling direction or a pulling direction to each other, whereby smooth movement is prevented.

Since actuator 1S includes the pair of elastic supporting parts 81 and 82, the rectilinearity of movable body 20 can be enhanced, and movable body 20 can be stably driven without being affected by external impact or disturbance. In particular, since the stability of the linear driving can be increased, both characteristics of the stability of a magnetic sensor output and the stability of a haptic feeling output can be increased.

Elastic supporting parts 81 and 82 of the present embodiment are fixed to movable body 20 such that the whirl directions are the same. Thus, even when the movement amount of movable body 20 is large, elastic supporting parts 81 and 82 can move smoothly, i.e., can be deformed to produce a greater amplitude, and can increase the output not only during movement but also during vibration.

However, depending on a desired vibration range of movable body 20, the whirl directions of the plurality of elastic supporting parts 81 and 82 may be designed to be opposite directions to each other.

Meanwhile, outer circumferential fixing portion 806 of upper elastic supporting part 81 is, at the outside in the radial direction, fixed to the upper end portion of coil holding part 52. Specifically, outer circumferential fixing portion 806 of elastic supporting part 81 is fixed to a portion of annular upper end surface 527*a* of upper flange portion 527 forming the upper end portion of coil holding part 52 (see FIG. 49), the portion being other than movable-range forming portions 54. Details of the configuration of coil holding part 52 will be described later.

Outer circumferential fixing portion 806 of elastic supporting part 82 is clamped and fixed by annular lower end surface 528*a* of flange portion 528 and step portion 118 formed on a circumferential edge portion of bottom portion 114 within case 10. Note that, lower end surface 528*a* means an upper (other-side) end surface of the portion of the lower side (other side) of lower (other-side) flange portion 528 other than movable-range forming portions 54.

Outer circumferential fixing portions 806 are formed in an annular shape. The outer circumferential portions of the outer circumferential fixing portions are sandwiched between upper and lower end surfaces 527*a* and 528*a* of coil holding part 52 (see FIG. 49) and pressing portion 128 and step portion 118. With this configuration, outer circumferential fixing portions 806 are fixed to fixing body 50.

<Fixing Body 50>

As illustrated in FIG. 49, fixing body 50 holds coils 61 and 62, and supports, via elastic supporting parts 81 and 82, movable body 20 inside coils 61 and 62 in the radial direction such that movable body 20 is freely movable in the moving direction (the coil axial direction, or the axial direction of movable body 20).

Fixing body 50 includes coils 61 and 62, outer yoke 70, and coil holding part 52 that hold coils 61 and 62.

Actuator 1S is formed by connecting, to coil holding part 52, substantially all the components for generating vibrations, such as coils 61 and 62, movable body 20, and case 10 via elastic supporting parts 81 and 82.

Coil holding part 52 is a tubular body, holds coils 61 and 62 disposed on the outer circumferential surface, and surrounds magnet 30 with inner circumferential surface 522*a*. Movable body 20 including magnet 30 is movably disposed inside the coil holding part. Coil holding part 52 may also be formed in a bobbin shape, and in this case, coils 61 and 62 are wound on the outer circumference of the inner tubular holding-portion main body (protective wall) of coil holding part 52.

Coil holding part 52 is a tubular body formed from a resin such as a phenolic resin or polybutylene terephthalate (PBT). In the present embodiment, coil holding part 52 is formed from a material containing a phenolic resin such as Bakelite having high flame retardancy.

When coil holding part 52 is formed from a material containing a phenolic resin, a higher flame retardancy is obtained. It is thus possible to improve the safety at the time of driving even when heat is generated by Joule heat when a current flows through coils 61 and 62 held by coil holding part 52. Moreover, the dimensional accuracy is increased and the positional accuracy of coils 61 and 62 is increased accordingly. It is thus possible to reduce variations in characteristics of movement, reciprocating motion or vibration.

Specifically, coil holding part 52 includes tubular holding-portion main body 522, middle flange portion 526, and flange portions 527 and 528 protruding in the radial direction from the outer circumference of holding-portion main body 522, terminal part 75, and movable-range forming portions 54.

Holding-portion main body 522 functions as a protective wall portion for protecting coils 61 and 62 against collision by movable body 20 when movable body 20 disposed inside is being driven. The thickness of holding-portion main body 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of holding-portion main body 522 side by side in the coil axial direction between middle flange portion 526 and flange portions 527 and 528 (coil attachment portions 52*b* and 52*c*). Holding-portion main body 522 positions coils 61 and 62 such that the coils radially externally surround the outer circumferential surfaces of yokes 41 and 42 (the outer circumferential surfaces of magnet 30 and yokes 41 and 42) of movable body 20.

Specifically, the outer circumferential surface of holding-portion main body 522 is partitioned by middle flange portion 526 and flange portions 527 and 528, and is provided with recessed coil attachment portions 52*b* and 52*c* that open radially outward on the outer circumferential side.

Terminal part 75 functions as a connector connection portion to which coil windings of coils 61 and 62 are tied for connection to an external device. Coils 61 and 62 are connected to the external device via terminal part 75, and power can be supplied from the external device to coils 61 and 62.

Terminal part 75 is an electrically conductive member disposed to protrude from the outer circumferential portion of holding-portion main body 522. In the present embodiment, terminal part 75 is press-fitted to the outer circumferential surface of middle flange portion 526 disposed on the outer circumference of holding-portion main body 522 centrally in the moving direction. Terminal part 75 is thus disposed to protrude from the outer circumferential surface of middle flange portion 526.

Flange portions 527 and 528 are disposed respectively on opposite end portions of holding-portion main body 522 which are separate from each other in the axial direction of the bobbin main-body portion (which is also the moving direction and the upper-lower direction in the present embodiment), so as to form the upper and lower end portions of coil holding part 52.

Elastic supporting parts 81 and 82 are fixed to end portions of flange portions 527 and 528 on the sides away from middle flange portion 526 (upper and lower end portions in the present embodiment).

Movable-range forming portions 54 are disposed on the upper and lower end portions of coil holding part 52, and form a moving range between lid portion 12 and bottom portion 114 of case 10 and movable body 20 when coil holding part 52 is accommodated in case 10.

Movable-range forming portions 54 are projecting side portions protruding from flange portions 527 and 528 in the reciprocation direction (upper-lower direction). Movable-range forming portions 54 are disposed at predetermined intervals on upper and lower annular end surfaces (also referred to as "upper end surface and lower end surface" or "opening end surfaces") 527*a* and 528*a* of flange portions 527 and 528. Upper end surface 527*a* is an opening end surface on one side, and lower end surface 528*a* is an opening end surface on the other side.

Flange portion 527 includes, on the opening end surface on one side, projecting movable-range forming portions 54 protruding in the moving direction. The one opening end surface functions as a top surface receiving portion that receives lid portion 12 via movable-range forming portions 54. Flange portion 528 includes, on the opening end surface on the other side, projecting movable-range forming portions 54 protruding in the moving direction. The other opening end surface functions as a bottom surface receiving portion that receives bottom portion 114 via movable-range forming portions 54.

Further, movable-range forming portions 54 are fitted into the notches formed in elastic supporting parts 81 and 82, to perform radial positioning of elastic supporting parts 81 and 82.

Movable-range forming portions 54 are fitted in the notches. Accordingly, it is possible to uniformly set the attachment positions of elastic supporting parts 81 and 82 with respect to coil holding part 52 of each individual unit 13, so as to perform stable position determination of elastic supporting parts 81 and 82 with respect to coil holding part 52. Further, with respect to coil holding part 52, elastic supporting parts 81 and 82 are not fixed to the fixing body side via a plurality of components. Thus, a structure less susceptible to component tolerances is achieved, and movement in the circumferential direction and the radial direction such as rotation is restricted. It is thus possible to suppress variations in elastic supporting parts 81 and 82 in products, and to achieve stable characteristics.

Coil holding part 52 is accommodated in case 10 such that movable-range forming portions 54 at the upper and lower end surfaces are in contact with the edge portion of lid portion 12 and the edge portion of bottom portion 114, and is fixed to the edge portion of lid portion 12 and the edge portion of bottom portion 114.

<Coil>

In actuator 1S, coils 61 and 62, together with magnet 30 and yokes 41 and 42, are used for generating a drive source of actuator 1S, in which case the axial direction of coils 61 and 62 (magnetization direction of magnet 30) is the moving direction.

Coils 61 and 62 generate a magnetic field by energization based on a detection result of magnetic sensor 91 to move movable body 20. Coils 61 and 62 are disposed radially outside movable body 20. Coils 61 and 62 together with magnet 30 constitute a magnetic circuit similar to a voice coil motor.

Coils 61 and 62 are disposed on coil attachment portions 52*b* and 52*c*, and coils 61 and 62 are disposed at positions facing yokes 41 and 42 in a direction orthogonal to the reciprocation direction in the present embodiment.

Coils 61 and 62 are held by coil holding part 52 such that the center position of the length of the coils in the coil axial direction (reciprocation direction) is substantially the same position (including the same position) in the reciprocation direction as the center position of the length of movable body 20 in the reciprocation direction (the center position of magnet 30 in the reciprocation direction). Coils 61 and 62 of the present embodiment are wound in opposite directions to each other, and are configured such that a current flows in the opposite direction during energization. Coils 61 and 62 are fixed by bonding or the like to recessed coil attachment portions 52*b* and 52*c*, and the outer circumferential surfaces of the coils are surrounded by outer yoke 70 inside case 10.

The end portions of coils 61 and 62 are tied and connected to terminal part 75 of middle flange portion 526. Coils 61 and 62 are connected to an external power supply section via terminal part 75. For example, the respective end portions of coils 61 and 62 may be connected to a direct current supply section, and direct current power may be supplied from the direct current supply section to coils 61 and 62. Thus, coils 61 and 62 can generate, between the magnet and coils 61 and 62, thrust allowing movement on one side in a direction toward each other or away from each other in their axial direction.

Further, the respective end portions of coils 61 and 62 may be connected to an alternating current supply section, and an alternating current power supply (alternating current voltage) may be supplied from the alternating current supply section to coils 61 and 62. Thus, coils 61 and 62 can generate, between the magnet and coils 61 and 62, thrust allowing movement in a direction toward each other or away from each other in their axial direction.

<Outer Yoke 70>

Outer yoke 70 is a cylindrical magnetic body that surrounds the outer circumferential surface of coil holding part 52 and is disposed at a position that covers coils 61 and 62 radially outward. Outer yoke 70 prevents leakage magnetic flux from actuator 1S to the outside in the radial direction in the magnetic circuit.

Outer yoke 70 is disposed such that the center of the length of outer yoke 70 in the reciprocation direction is located at the same height as the center of magnet 30 in the reciprocation direction that is disposed inside outer yoke 70. The shielding effect of outer yoke 70 makes it possible to reduce the leakage magnetic flux to the outside of the reciprocating actuator.

Outer yoke 70 also makes it possible to increase the thrust constant so as to increase the electromagnetic conversion efficiency in the magnetic circuit. Outer yoke 70 utilizes the magnetic attraction force of magnet 30, and functions as a magnetic spring together with magnet 30. The magnetic spring makes it possible to reduce a stress that would be caused when elastic supporting parts 81 and 82 are mechanical springs, so as to improve the durability of elastic supporting parts 81 and 82.

<Case 10>

Case 10 includes: bottomed cylindrical case main body 11 having circumferential wall portion 112 and bottom portion 114; and lid portion 12 for closing opening portion 115 of case main body 11. Case 10 has a columnar shape. The columnar shape is a shape having a height (thickness) allowing generation of sufficient thrust in the reciprocation direction in cooperation with coils 61 and 62 facing the outer circumference of the movable body. For example, case 10 of the present embodiment is formed in a cylindrical shape by bottomed cylindrical case main body 11 and lid portion 12. However, the case is not limited to this shape. The case may be elliptical cylindrical or polygonal prismatic. The length of the case in the reciprocation direction is longer or shorter than the length of the case in a direction perpendicular to the reciprocation direction. The elliptical shape of the elliptical cylindrical shape and elliptical shape in the present embodiment is mainly an ellipse including parallel straight-line-like portions, and thus means an oval shape.

Lid portion 12 and bottom portion 114 respectively form top surface portion 122 and the lower surface portion (bottom portion 114) of actuator 1S in present Embodiment 2, and are disposed to face movable body 20 of unit 13 with a predetermined gap being interposed between the lid portion and the bottom portion, on the one hand, and the movable body, on the other hand, in the reciprocation direction of movable body 20.

Lid portion 12 includes projecting portion 124 projecting radially outward from a part of the outer circumference of top surface portion 122 and is engaged with cutout portion 102 of case main body 11. Projecting portion 124 engages lid portion 12 with cutout portion 102 of case main body 11 to perform positioning when lid portion 12 is attached to case main body 11. Each of lid portion 12 and bottom portion 114 limits a movable range of movable body 20. Lid portion 12 and bottom portion 114 have a function as a movable-range reducing part that is a hard stop (movable range limitation) of movable body 20.

When lid portion 12 is attached to case main body 11, projecting portion 124 of lid portion 12 is disposed above terminal part 75 exposed in cutout portion 102 of case main body 11 to the outside at the central portion of cutout portion 102 in the longitudinal direction. Thus, the position of terminal part 75 of actuator 1S can be grasped only in plan view of lid portion 12.

Magnetic sensor 91 and circuit board 92 are disposed on case main body 11.

Magnetic sensor 91 is mounted on circuit board 92, detects a change in the magnetic flux caused by the movement of magnet 30 of movable body 20, and detects the displacement of movable body 20.

<Magnetic Sensor 91>

Magnetic sensor 91 detects the position of movable body 20 moving in response to a user's operation. Magnetic sensor 91 is disposed at a distance from movable body 20 in the moving direction of movable body 20. The moving direction of movable body 20 may be the side opposite to the side on which movable body 20 moves. That is, the position of magnetic sensor 91 may be the same side or a different side as long as it is in the moving direction of movable body 20.

It is preferable that magnetic sensor 91 be disposed on a central axis extending in the reciprocation direction of movable body 20 (a position overlapping the axis of output shaft portion 25) or in the vicinity of the central axis.

Magnetic sensor 91 together with circuit board 92 is attached to the outer surface of case main body 11, and the arrangement position of magnetic sensor 91 is positioned on the axis of output shaft portion 25 of movable body 20.

Since magnetic sensor 91 is disposed on the outer surface of case 10, it can be assembled outside actuator 1S, and the assemblability of actuator 1S can be improved.

In addition, it is possible to easily attach or replace magnetic sensor 91 without disassembling actuator 1S. In addition, magnetic sensor 91 included in actuator 1S can be easily inspected.

Magnetic sensor 91 preferably includes a Hall element. It is preferable that circuit configuration of the magnetic sensor at a subsequent stage be easier than, for example, in that case of simply using a Hall element, and it is also preferable that the magnetic sensor be a Hall IC which compares an output of the Hall element with a threshold value for output of High/Low. For the Hall IC, the output voltage range is defined by the power supply, and the subsequent-stage circuitry (microcomputer) can thus be easily created.

Further, as a magnetic sensor for which the output voltage range is defined by a power supply, a Hall sensor incorporating an amplifier, such as a linear Hall IC in which the output of the Hall element is amplified by the amplifier for linear output may also be used for magnetic sensor 91. Accordingly, peripheral circuitry can be configured inexpensively and easily without using other sensors, amplifiers, and transducers such as dedicated AD converters.

<Circuit Board (Control Part) 92>

Circuit board 92 includes a control part on which a microcomputer, an actuator driver, and the like are mounted and that controls the actuator. In circuit board 92, magnetic sensor 91 detects an operation load received by movable body 20 via output shaft portion 25, and coils 61 and 62 are energized according to the detection result to control the movement of movable body 20. Note that the control part may not be disposed in actuator 1S.

As a result, actuator 1S can detect the operation load and perform haptic feedback specialized for the corresponding pressing operation. In particular, by the load detection, it is possible to perform detection specialized for the pressing operation.

As described above, actuator 1S can receive the operation load by output shaft portion 25 and generate the haptic feedback based on the operation load received by output shaft portion 25 to present it. It is thus possible to more accurately reproduce a user operation also as an operation of a switch haptic feeling, a slider haptic feeling, or the like in response to the user operation to present it as a feedback.

When magnetic sensor 91 is used, a magnet originally necessary for forming an actuator is used for the sensor. It is thus possible to provide an inexpensive movable-body-position detecting means.

Since actuator 1S includes magnetic sensor 91 as a sensor for detecting the displacement of movable body 20, actuator 1S can easily detect the operation and provide haptic feedback.

Since case 10 is formed from a non-magnetic material, the case lower surface provided with magnetic sensor 91 is formed from a non-magnetic material. As a result, magnetic sensor 91 can detect the stable magnetic flux density in the magnetic circuit including magnet 30 and accurately detect the position of movable body 20.

Further, the magnetization direction of magnet 30 is parallel to the moving direction of movable body 20. Thus, magnetic sensor 91 detects the magnetic flux density of the distribution of a single magnetic pole, and thus can enhance the sensor detectability, so as to perform a stable sensor output.

Movable body 20 is accommodated inside annular coils 61 and 62 in an axially drivable state. Thus, it is possible to form a magnetic circuit capable of generating a thrust more efficiently. Further, the magnetic flux density to the bottom portion 114 side is increased. It is thus possible to accurately and easily detect magnetic sensor 91 disposed on bottom portion 114.

<Operation of Actuator 1S>

Figure 54:
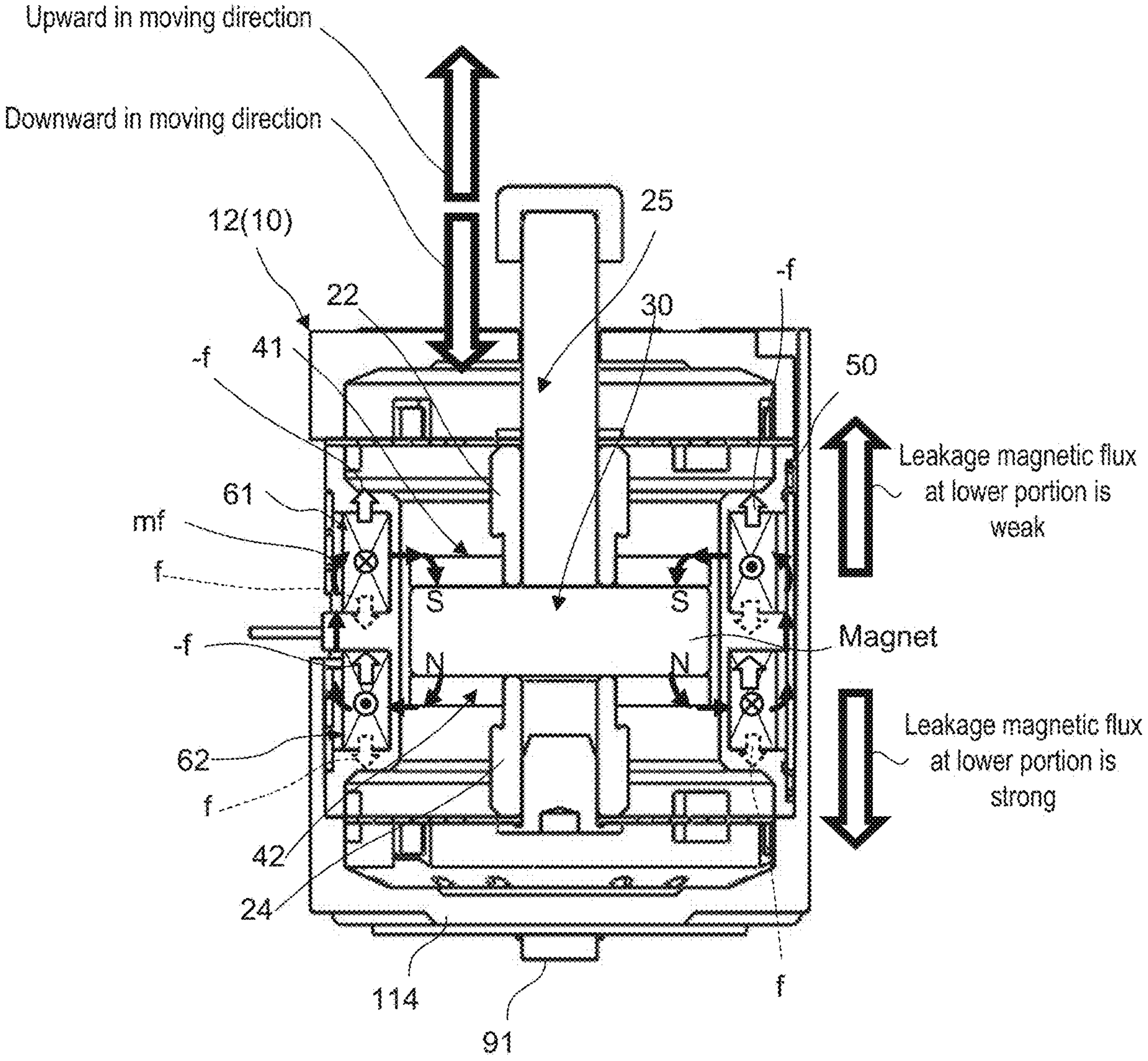
FIG. 54 is a diagram for explaining an operation of the actuator according to Embodiment 3 of the present invention.

FIG. 54 is a diagram for explaining the operation of the actuator according to Embodiment 3 of the present invention.

With reference to FIG. 54, a description will be given of operation of actuator 1S in relation to one example in which magnet 54 is magnetized such that the side of front surface 30*a*, which is one side of magnet 30 in the magnetization direction (upper side in the present embodiment), is the S-pole, and the side of back surface 30*b*, which is the other side in the magnetization direction (lower side in the present embodiment), is the N-pole.

In actuator 1S, movable body 20 is considered to correspond to a mass in a vibration model of a spring-mass system, and a sharp peak can be reduced by damping a reciprocating motion, for example, when a resonance is sharp (has a sharp peak). Damping the vibration makes the resonance less sharp, so that the maximum amplitude value and the maximum movement amount of movable body 20, for example, at the time of resonance do not vary, and vibrations of the suitable and stable maximum movement amount are output.

Flow mf of the magnetic flux is formed, which is emitted from the back surface 30*b* side of magnet 30 to yoke 42 and then toward the coil 62 side and passes through outer yoke 70 and coil 61 to enter magnet 30 via yoke 41 on the upper side of magnet 30.

Accordingly, when energization is performed as illustrated in FIG. 54, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62. Since coils 61 and 62 are fixed to fixing body 50 (coil holding part 52), in accordance with the law of action and reaction, a force opposed to the Lorentz force in-f direction is generated as a thrust force in the f direction in movable body 20 having magnet 30. As a result, the movable body 20 side including magnet 30 moves toward the f direction, that is, toward bottom portion 114 (bottom surface of case main body 11).

On the other hand, when the energization direction of coils 61 and 62 is switched in the opposite direction and coils 61 and 62 are energized, the Lorentz force in a direction reverse to the f direction is generated. The generation of the Lorentz force in this f direction causes in movable body 20 the force opposite to the Lorentz force in the f direction as thrust (thrust in the −f direction) in accordance with the law of action and reaction, so that movable body 20 moves in the −f direction, i.e., toward the top surface of lid portion 12 of fixing body 50.

Actuator 1S makes it possible to provide the operator with a so-called haptic feeling and force sensation feedback (which may also be referred to as force feedback) via output shaft portion 25 in response to the user's operation by moving movable body 20 toward only one of lid portion 12 and bottom portion 114.

Further, reciprocating motion or vibration can also be achieved by supplying coils 61 and 62 with currents alternately in opposite directions, and it is possible by using this technique to provide the user with a haptic feedback and a force feeling feedback according to vibration by driving depending on the movement of movable body 20 caused by the operation of the operator.

In addition, in actuator 1S, a magnetic attraction force acts between magnet 30 and outer yoke 70, which functions as a magnetic spring in a non-driven (non-vibrated) state in which actuator 1 is not energized. The magnetic attraction force generated between magnet 30 and outer yoke 70 and a restoring force that brings elastic supporting parts 81 and 82 back to their original shapes cause movable body 20 to return to its original position.

Actuator 1S includes: fixing body 50 including coils 61 and 62; and movable body 20 disposed radially inside coils 61 and 62 and including magnet 30 magnetized in the axial direction of coils 61 and 62. In addition, actuator 1S includes flat plate-shaped elastic supporting parts 81 and 82 that elastically hold movable body 20 such that movable body 20 is freely movable in the moving direction that is the coil axial direction.

Further, coils 61 and 62 are disposed on the outer circumference of holding-portion main body 522 of coil holding part 52, outer circumferential surface 20*a* of movable body 20 is disposed on the inner circumferential side of holding-portion main body 522 with a gap being interposed between the outer circumferential surface of the movable body and the holding-portion main body, and coils 61 and 62 are, at the outer circumferential surface, surrounded by outer yoke 70.

Accordingly, in actuator 1S, the leakage magnetic flux to the radially outer side is suppressed, and outer yoke 70 together with magnet 30, yokes 41 and 42, and coils 61 and 62 functions as a magnetic path. Thus, generation of thrust by the magnetic force can be improved. Further, the detection of the magnetic flux density by magnetic sensor 91 on the bottom surface side is not influenced at all.

As illustrated in FIG. 54, when movable body 20 moves to the lid portion 12 side, or the upper side (arrow "Upward in moving direction"), magnet 30 is separated from magnetic sensor 91. Thus, the leakage magnetic flux detected by magnetic sensor 91 at a lower portion of case 10 is weak.

Further, when movable body 20 moves toward the bottom portion 114 side (arrow "Downward in movable direction"), magnet 30 approaches magnetic sensor 91, and the leakage magnetic flux detected by magnetic sensor 91 becomes strong. Accordingly, magnetic sensor 91 can detect the magnetic flux density in response to the operation of movable body 20. It is thus possible to directly apply a haptic feeling directly reproducing movement, vibration, and/or impact via output shaft portion 25 based on the detection result.

Figure 55A:
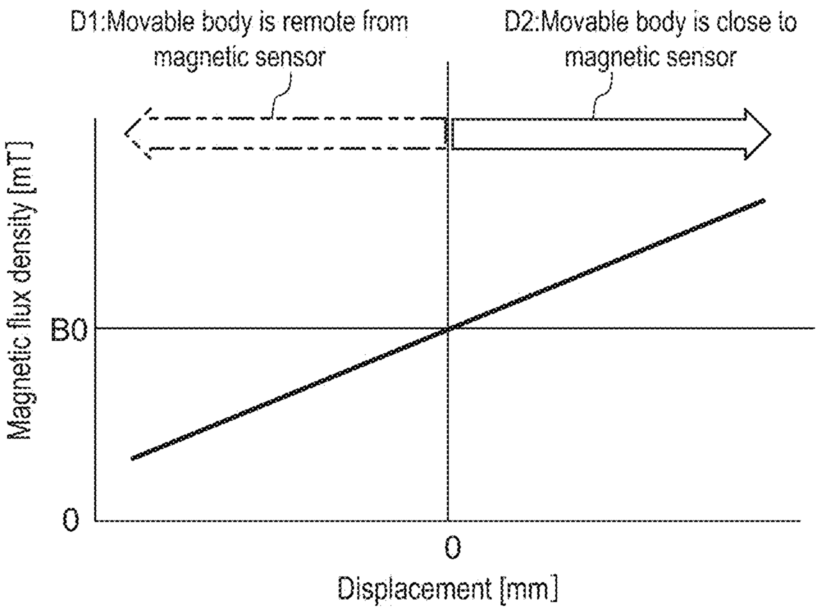
FIGS. 55A and 55B are views for explaining sensing of a magnetic sensor.
Figure 55B:
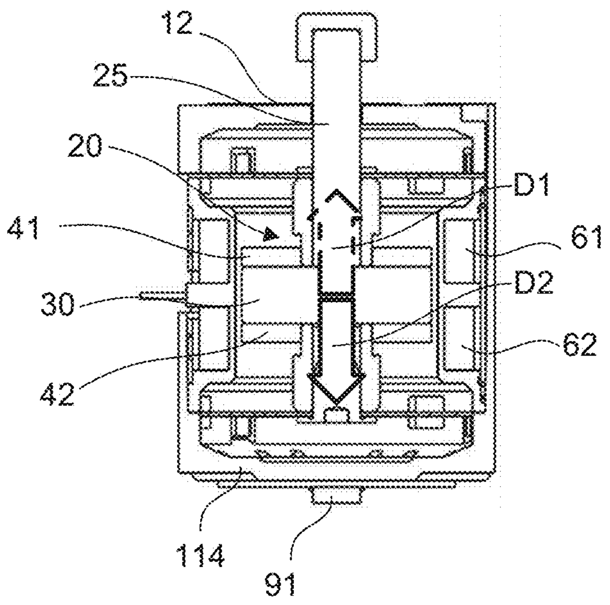

FIGS. 55A and 55B are diagrams for explaining sensing of the magnetic sensor, and FIG. 55A illustrates the relation between the magnetic flux density detected by the magnetic sensor and the displacement of the magnet, and FIG. 55B schematically illustrates the actual operation of the movable body corresponding to the detection of FIG. 55A.

As illustrated in FIGS. 55A and 55B, when movable body 20 having a configuration in which magnet 30 is sandwiched between magnet 30 and yokes 41 and 42 moves in direction D1, that is, toward lid portion 12, movable body 20 becomes remote from magnetic sensor 91, and the magnetic flux density decreases. In addition, when movable body 20 moves in direction D2, that is, toward bottom portion 114, or in this case, toward magnetic sensor 91 disposed at a lower portion, the detected magnetic flux density increases.

As described above, magnetic sensor 91 can linearly detect the relationship between the magnetic flux density and the displacement of the movable body, and can suitably detect the position of movable body 20 based on the relationship.

Actuator 1S has a structure in which unit 13 is accommodated in case 10, and the outer circumferential surface of circumferential wall portion 112 of case 10 formed from a resin can thus be formed as a smooth surface. Thus, when actuator 1S is attached to an electronic device, it is possible to reliably and easily perform attachment of a cushioning material such as a sponge to be interposed between actuator 1 and a mounting point.

Moreover, since actuator 1S has the configuration in which unit 13 is disposed in case 10, fixation of elastic supporting parts 81 and 82, which requires high dimensional accuracy, can be achieved by attaching elastic supporting parts 81 and 82 to coil holding part 52.

Thus, arrangement of movable body 20 including the fixation of elastic supporting parts 81 and 82 can be determined with reference to coil holding part 52, so that it is possible to increase the accuracy of the haptic feeling generation direction of the product. Specifically, only increasing the dimensional accuracy of coil holding part 52 formed as one component from a resin or the like makes it possible to easily dispose coils 61 and 62 and movable body 20 (magnet 30) attached via elastic supporting parts 81 and 82 in an accurate positional relationship, for example.

Further, terminal part 75 are disposed on coil holding part 52 to protrude outward, so that tying and soldering of the coil wire of the coils are facilitated, and connection between an external device and coils 61 and 62 can be facilitated.

As described above, actuator 1S can perform haptic feeling presentation while having impact resistance.

Actuator 1S is driven by a pulse (a direct current pulse or an alternating current pulse) input to coils 61 and 62. That is, the energization direction of coils 61 and 62 may be appropriately set so that thrust in the −f direction toward top surface portion 122 of lid portion 12 or thrust in the f direction toward bottom portion 114 acts on movable body 20, or so that these thrusts in the −f direction and the f direction alternately act on the movable body. As a result, movable body 20 moves in the moving direction or in the vibration direction, and the force feedback can be performed via actuator 1S itself or output shaft portion 25.

As described above, actuator 1S can be easily manufactured at a low cost, and has a detection function and a haptic feedback function that are easier to use.

<Driving Principle of Actuator 1S>

The driving principle of actuator 1S will be briefly described below. Actuator 1S is driven, for example, by a supplied pulse based on following Equation 1 of motion and Circuit Equation 2. In the present embodiment, the driving is performed by inputting a short pulse, but the driving may be performed so as to generate an arbitrary reciprocating motion and without using the short pulse.

Movable body 20 in actuator 1S performs reciprocating motion based on Equations 1 and 2.

(Equation 1)

$$m\frac{d^2x(t)}{dt^2} = K_f i(t) - K_{sp}x(t) - D\frac{dx(t)}{dt} \quad [5]$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

(Equation 2)

$$e(t) = Ri(t) + L\frac{di(t)}{dt} + K_e\frac{dx(t)}{dt} \quad [6]$$

e(t): Voltage [V]

R: Resistance [Ω]

L: Inductance [H]

$K_e$: Reverse electromotive force constant [V/(m/s)]

Mass m [Kg], displacement x(t) [m], thrust constant $K_f$ [N/A], current i(t) [A], spring constant $K_{sp}$ [N/m], damping coefficient D [N/(m/s)], and the like in actuator 1S may be changed appropriately as long as Equation 1 is satisfied. In addition, voltage e(t) [V], resistance R [Ω], inductance L [H], and reverse electromotive force constant $K_e$ [V/(m/s)] may be changed appropriately as long as Equation 2 is satisfied.

Accordingly, actuator 1S is determined by mass m of movable body 20 and spring constant $K_{sp}$ of metallic springs (the elastic bodies or the leaf springs in the present embodiment) as elastic supporting parts 81 and 82.

Embodiment 4

Figure 56:
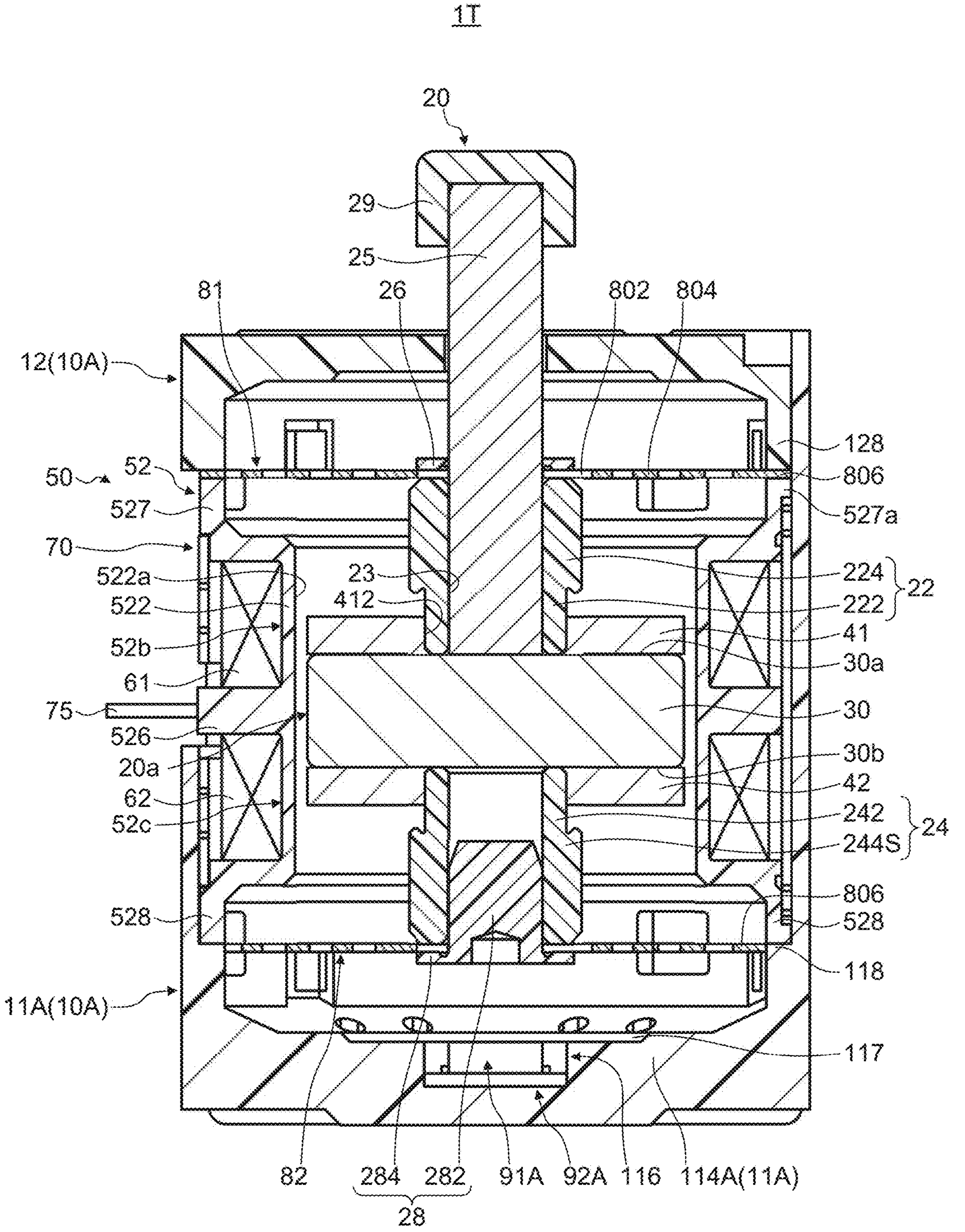
FIG. 56 is a longitudinal sectional view illustrating a configuration of a principal part of an actuator according to Embodiment 4 of the present invention.
Figure 57:
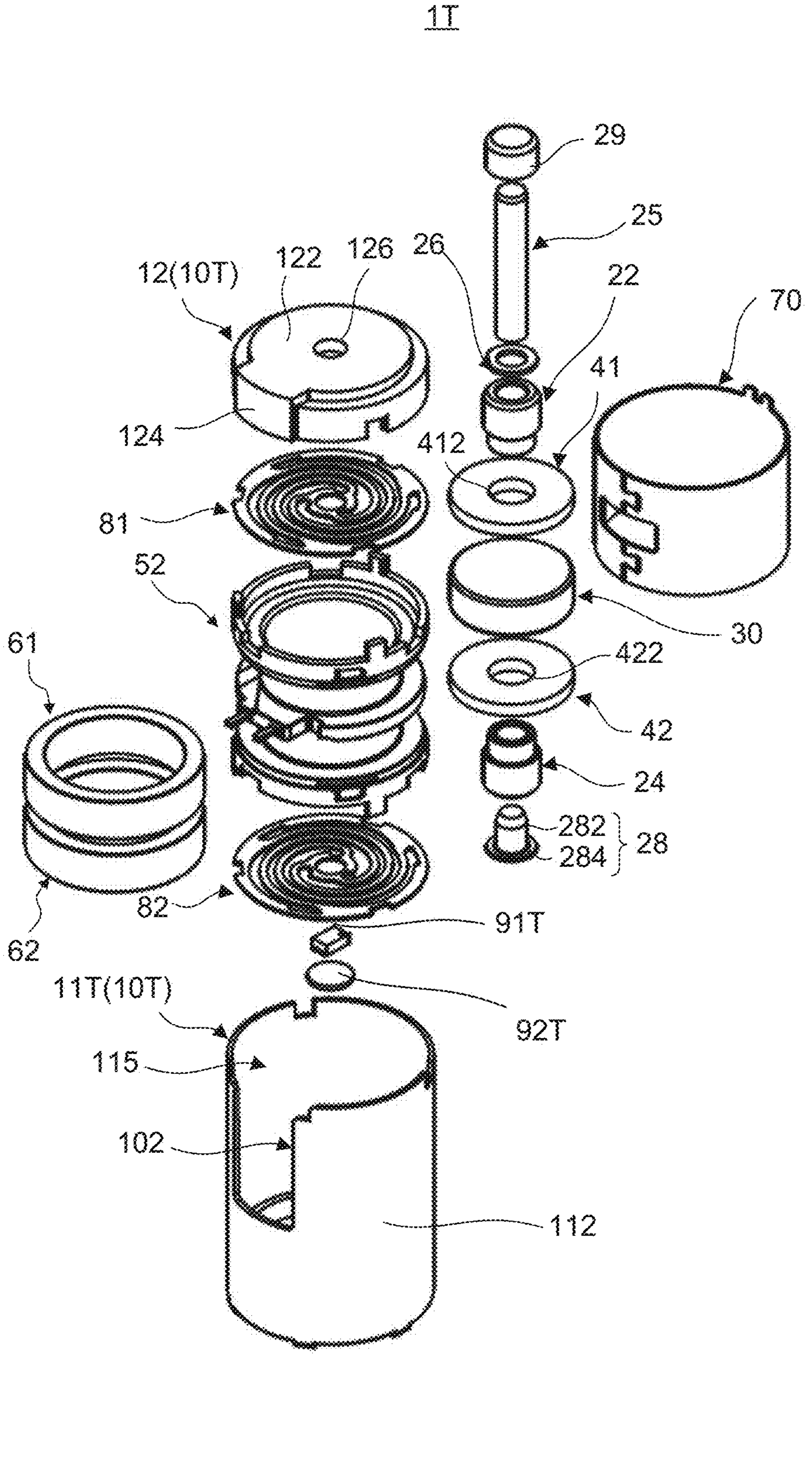
FIG. 57 is an exploded perspective view of the actuator.
Figure 58:
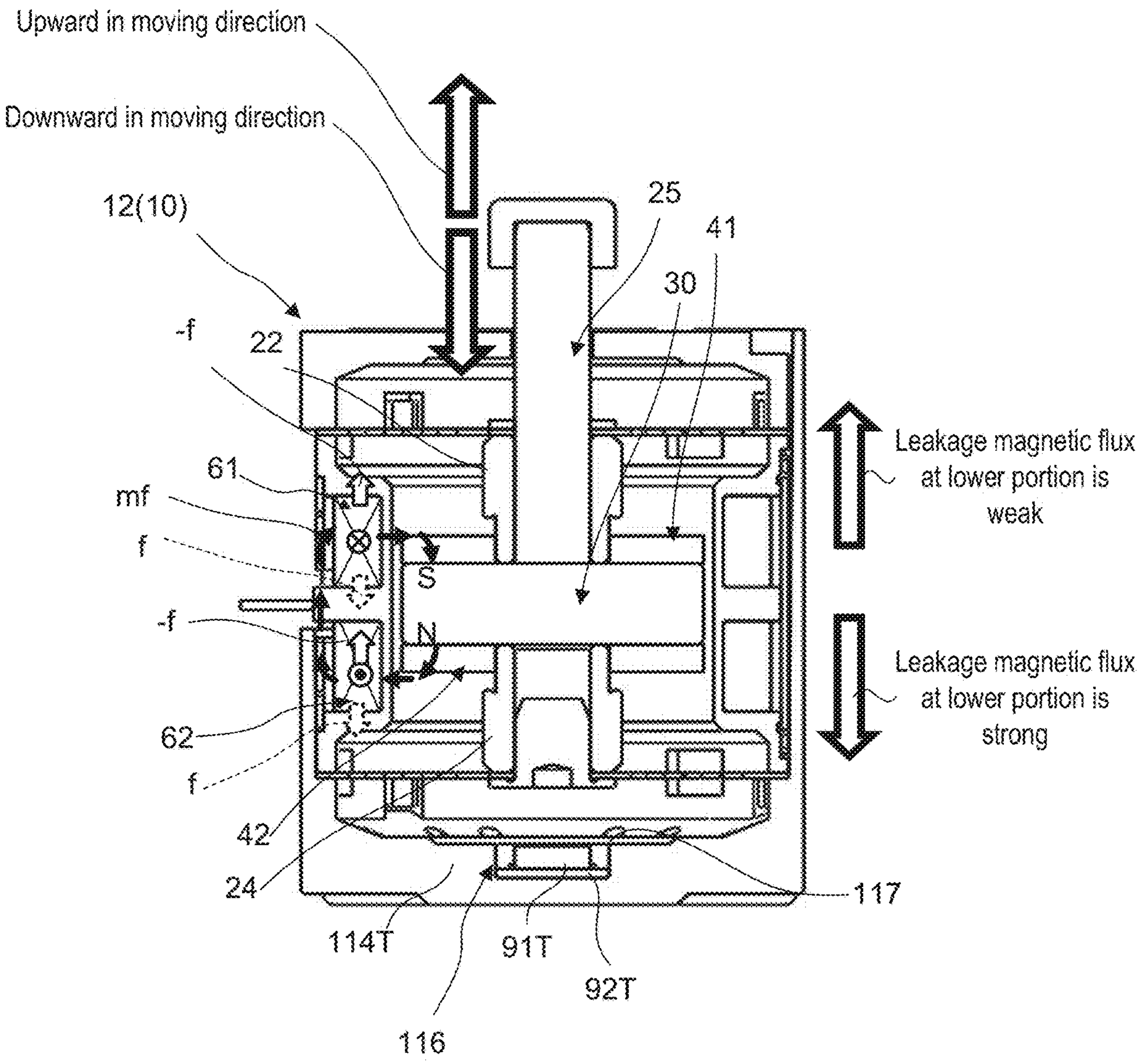
FIG. 58 is a diagram for explaining an operation of the actuator.

FIG. 56 is a longitudinal sectional view illustrating a configuration of a principal part of the actuator according to Embodiment 4 of the present invention, FIG. 57 is an exploded perspective view of the actuator, and FIG. 58 is a view for explaining an operation of the actuator.

Actuator 1T of Embodiment 4 has the same basic configuration as that of actuator 1S corresponding to Embodiment 3 illustrated in FIG. 48, and the same components as those of Embodiment 3 are denoted by the same reference numerals and the same names, and redundant explanation is omitted.

In actuator 1T illustrated in FIGS. 56 to 58, the position of magnetic sensor 91 is different from the position in actuator 1S, and the other configurations are the same between the actuators. The basic operation of actuator 1T is the same as that of actuator 1S as illustrated in FIG. 58.

Actuator 1T has a configuration in which only case 10T, more specifically, case main body 11 is changed as compared with the configuration of actuator 1S, and the other configurations are the same.

Actuator 1T includes: movable body 20 including magnet 30, a pair of yokes 41 and 42, and a pair of spring retaining parts 22 and 24; and fixing body 50 including coil holding part 52, a pair of annular coils 61 and 62, and outer yoke 70. A pair of elastic supporting parts 81 and 82 are disposed between movable body 20 and fixing body 50.

The difference of actuator 1T is that in case main body 11T for accommodating movable body 20 and fixing body 50, magnetic sensor 91T the same as magnetic sensor 91 disposed spaced apart from movable body 20 in the moving direction is disposed inside case 10T.

Specifically, magnetic sensor 91T is disposed in bottom-surface recessed portion 116 formed in bottom portion 114T of case main body 11T forming a bottomed tubular portion together with circuit board 92. Bottom-surface recessed portion 116 is formed on the central axis of movable body 20, and faces movable body 20 on the axis of movable body 20.

It is preferable that magnetic sensor 91T be disposed on the central axis extending in the vibration direction of movable body 20 (a position overlapping the axis of output shaft portion 25).

In case 10T, bottom-surface recessed-portion edge 117 as a circumferential portion of bottom-surface recessed portion 116 at bottom portion 114 functions as a inhibitory portion making contact with the movable body before the movable body enters bottom-surface recessed portion 116 when movable body 20 moves downward. That is, magnetic sensor 91T is disposed in bottom-surface recessed portion 116 whose diameter is smaller than the diameter of movable body 20 and that is farther from movable body 20 than bottom-surface recessed-portion edge 117 being the inhibitory portion is from the movable body.

As described above, even when magnetic sensor 91T is disposed in case 10 and is disposed in the moving direction of movable body 20, movable body 20 does not collide with the magnetic sensor, and it is thus possible to realize a highly reliable actuator.

Embodiment 5

Figure 59:
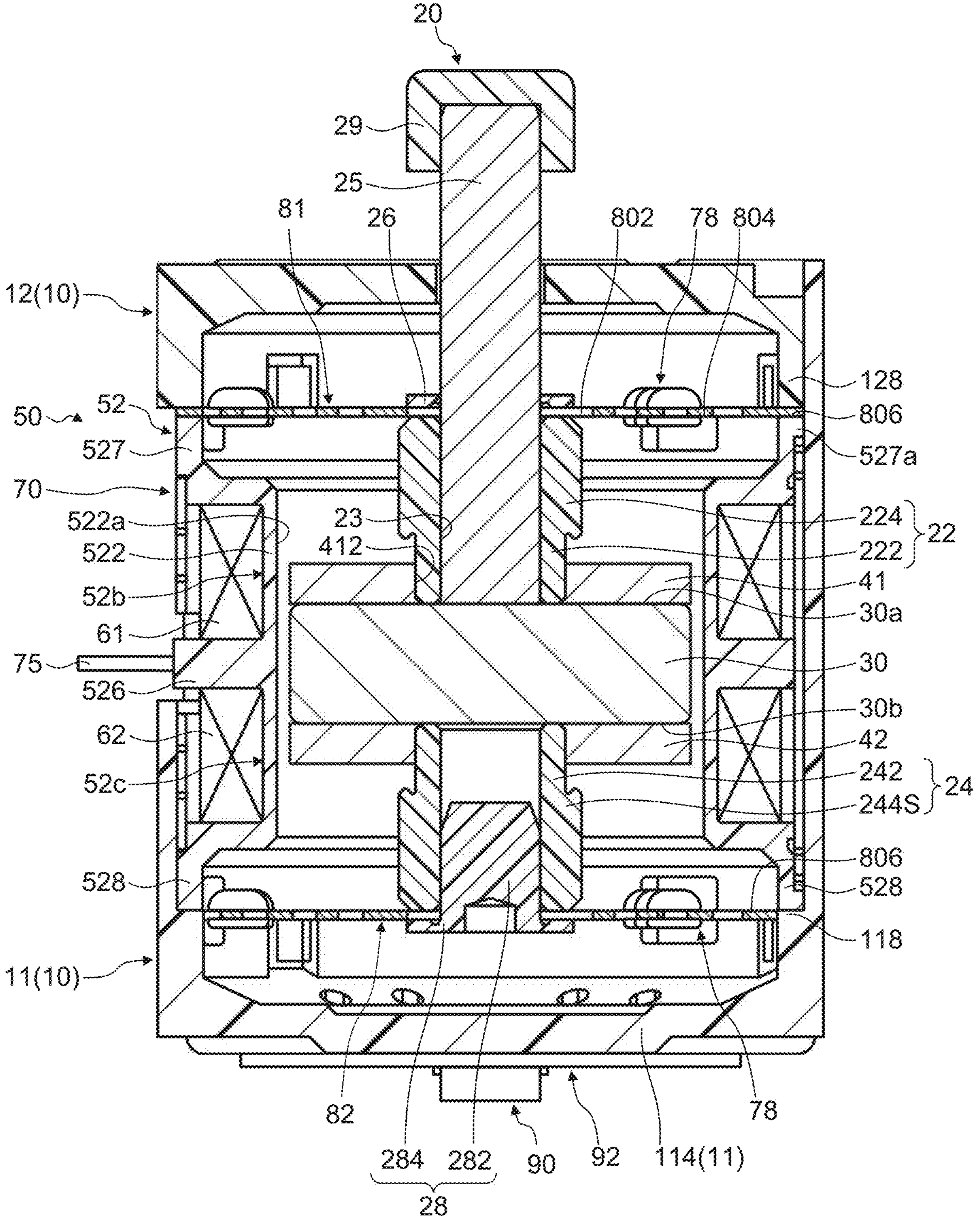
FIG. 59 is a longitudinal sectional view illustrating a configuration of a principal part of an actuator according to Embodiment 5 of the present invention.
Figure 60:
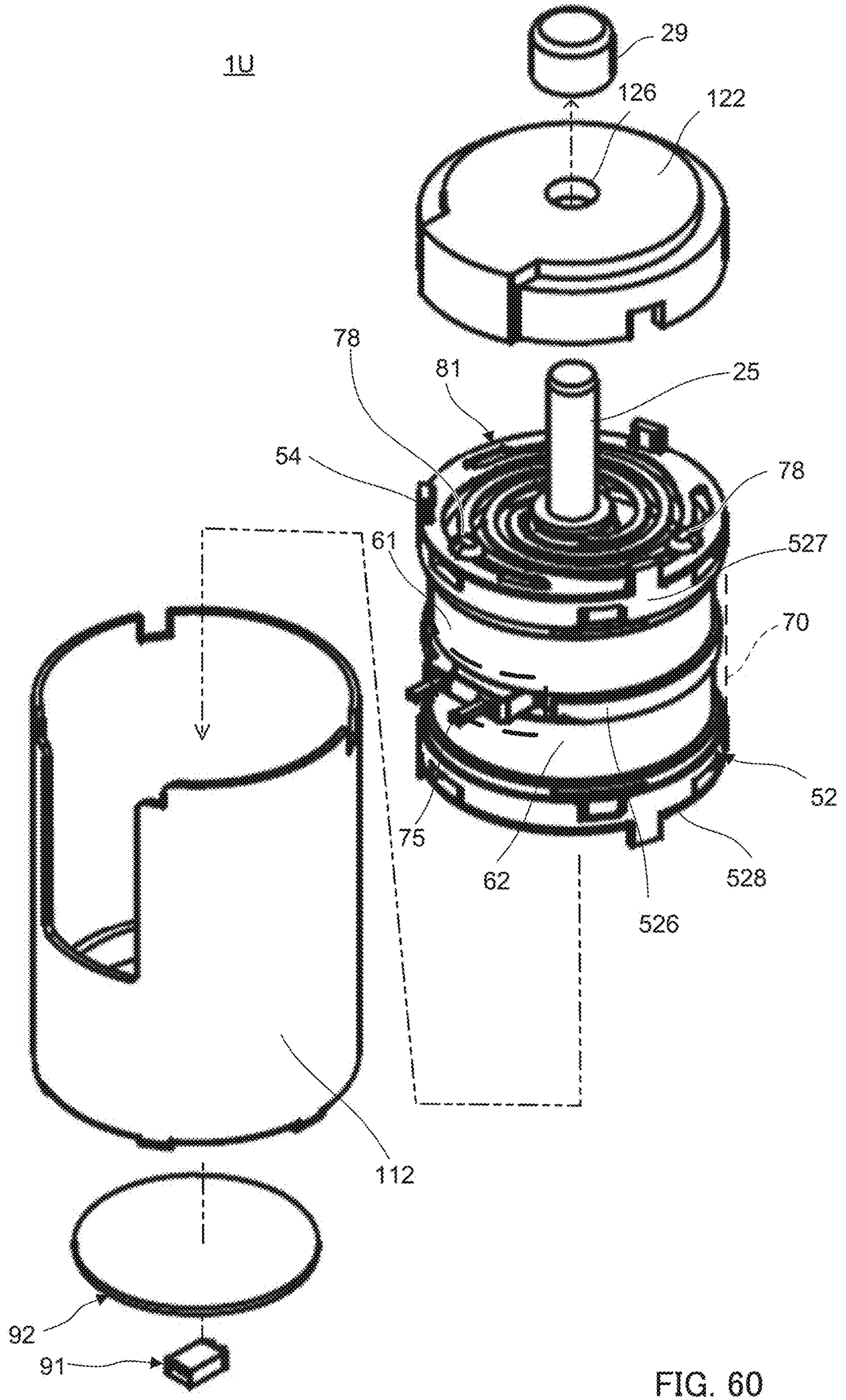
FIG. 60 illustrates an internal structure of the actuator from which a case is removed.
Figure 61:
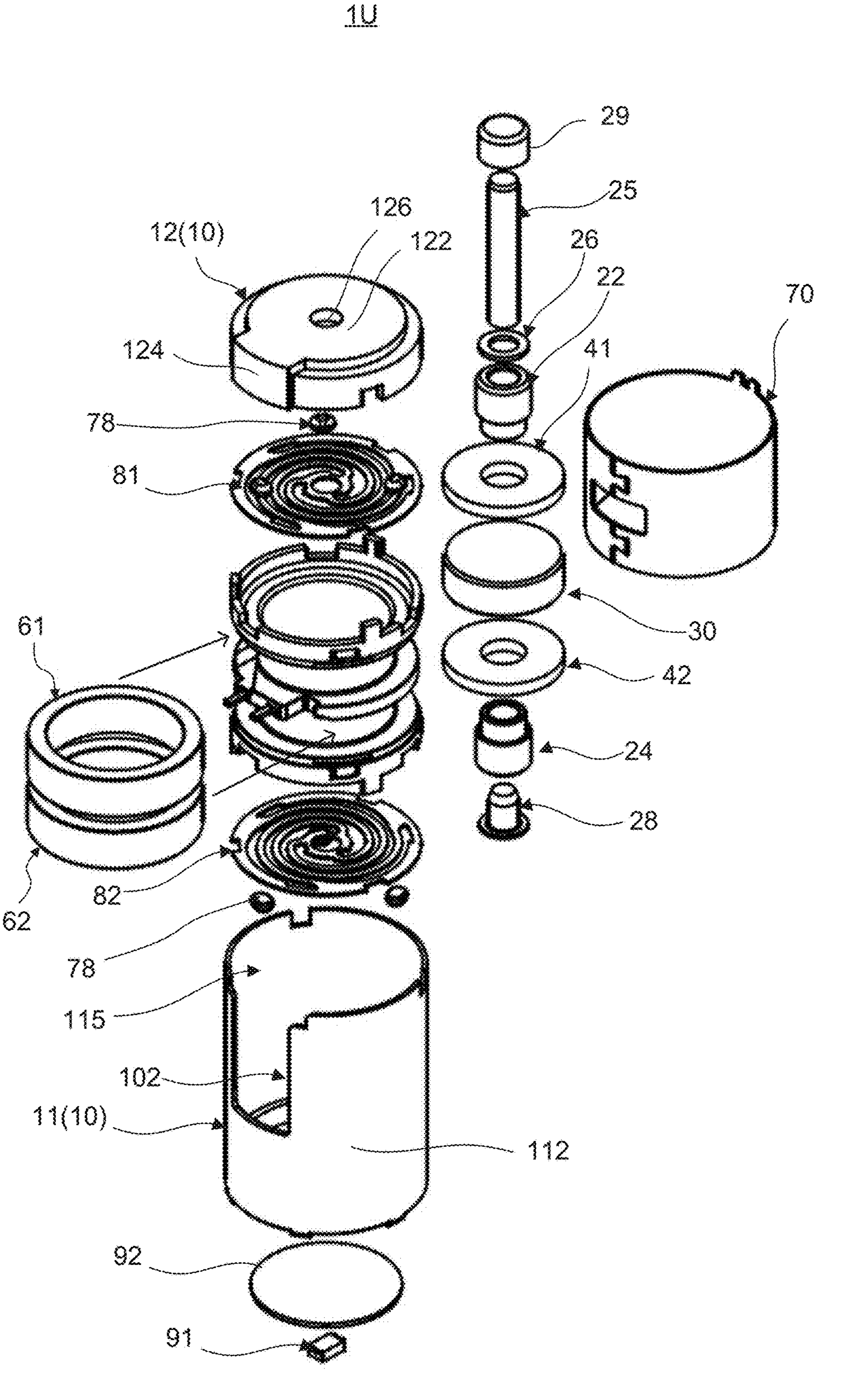
FIG. 61 is an exploded perspective view of the actuator.

FIG. 59 is a longitudinal sectional view illustrating a configuration of a principal part of the actuator according to Embodiment 5 of the present invention, FIG. 60 illustrates an internal structure of the actuator from which the case is removed, and FIG. 61 is an exploded perspective view of the actuator.

Actuator 1U of Embodiment 5 has the same basic configuration as that of actuator 1S corresponding to Embodiment 3 illustrated in FIG. 48, and the same components as those of Embodiment 3 are denoted by the same reference numerals and the same names, and redundant explanation is omitted.

Actuator 1U illustrated in FIGS. 59 to 61 differ from actuator 1S in that damping parts 78 are disposed on elastic supporting parts 81 and 82, and the other configurations are the same. Since the operation of actuator 1U is the same as that of actuator 1S, the explanation thereof will be omitted.

In actuator 1U, damping parts 78 are disposed on both of elastic supporting parts 81 and 82.

Damping parts 78 damp movement and vibration generated in elastic supporting parts 81 and 82. Damping parts 78 suppresses a resonant peak in the case of resonance in elastic supporting parts 81 and 82, and generates stable vibration over a wide range.

Damping parts 72 are disposed such that, for example, portions thereof are inserted between spring portions from one surface side of each of elastic supporting parts 81 and 82, specifically, between outer circumferential fixing portion 806 and deformation arms 804, and spans between the spring portions.

Actuator 1U can obtain the same advantageous effects as actuator 1S, and includes damping parts 78 on elastic supporting parts 81 and 82. It is thus possible to appropriately damp the vibration, thereby settling generation of a haptic feeling so as to providing a highly haptic feeling as a haptic feeling to be applied.

Embodiment 6

Figure 62:
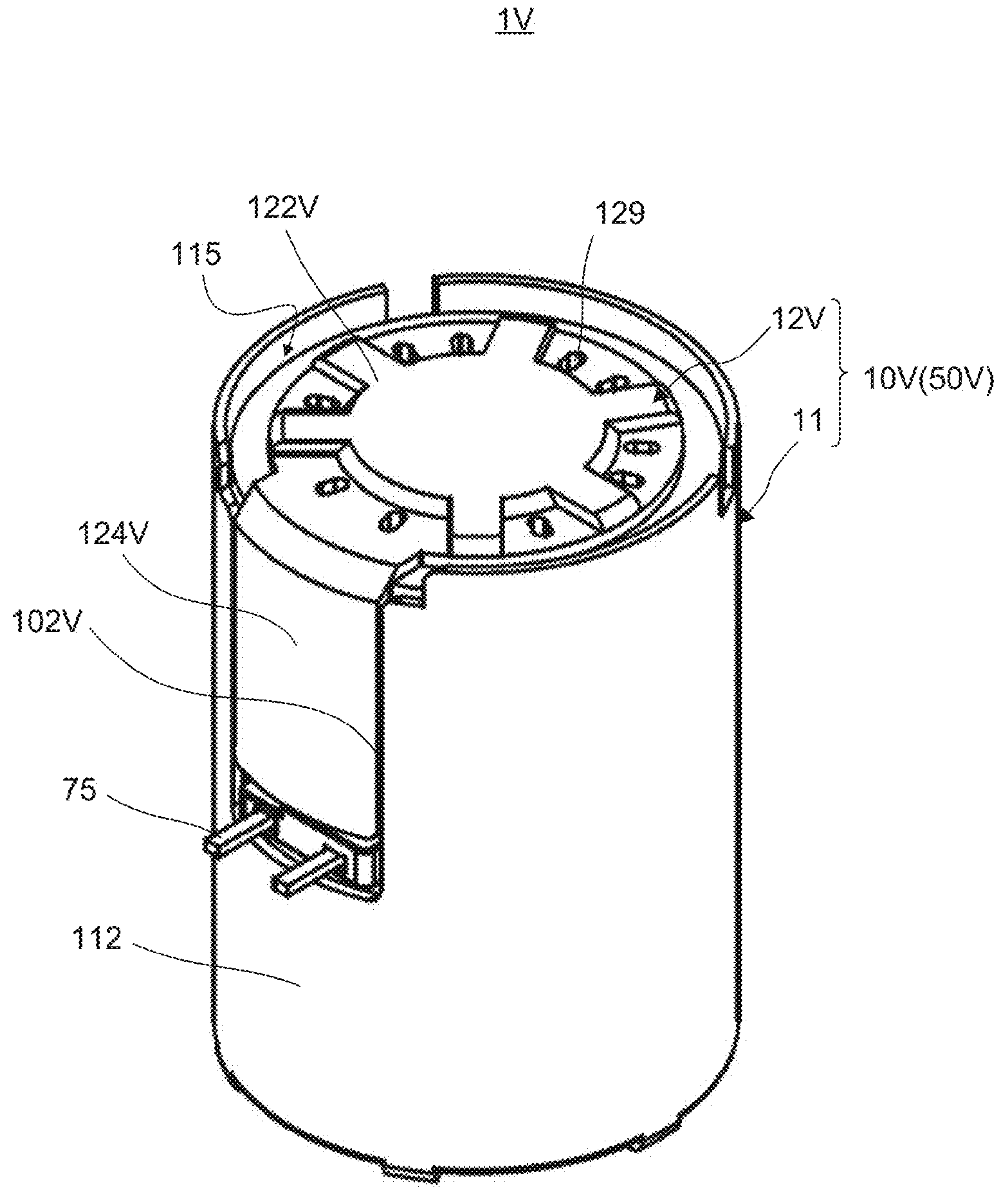
FIG. 62 is an external perspective view of an actuator according to Embodiment 6 of the present invention.
Figure 63:
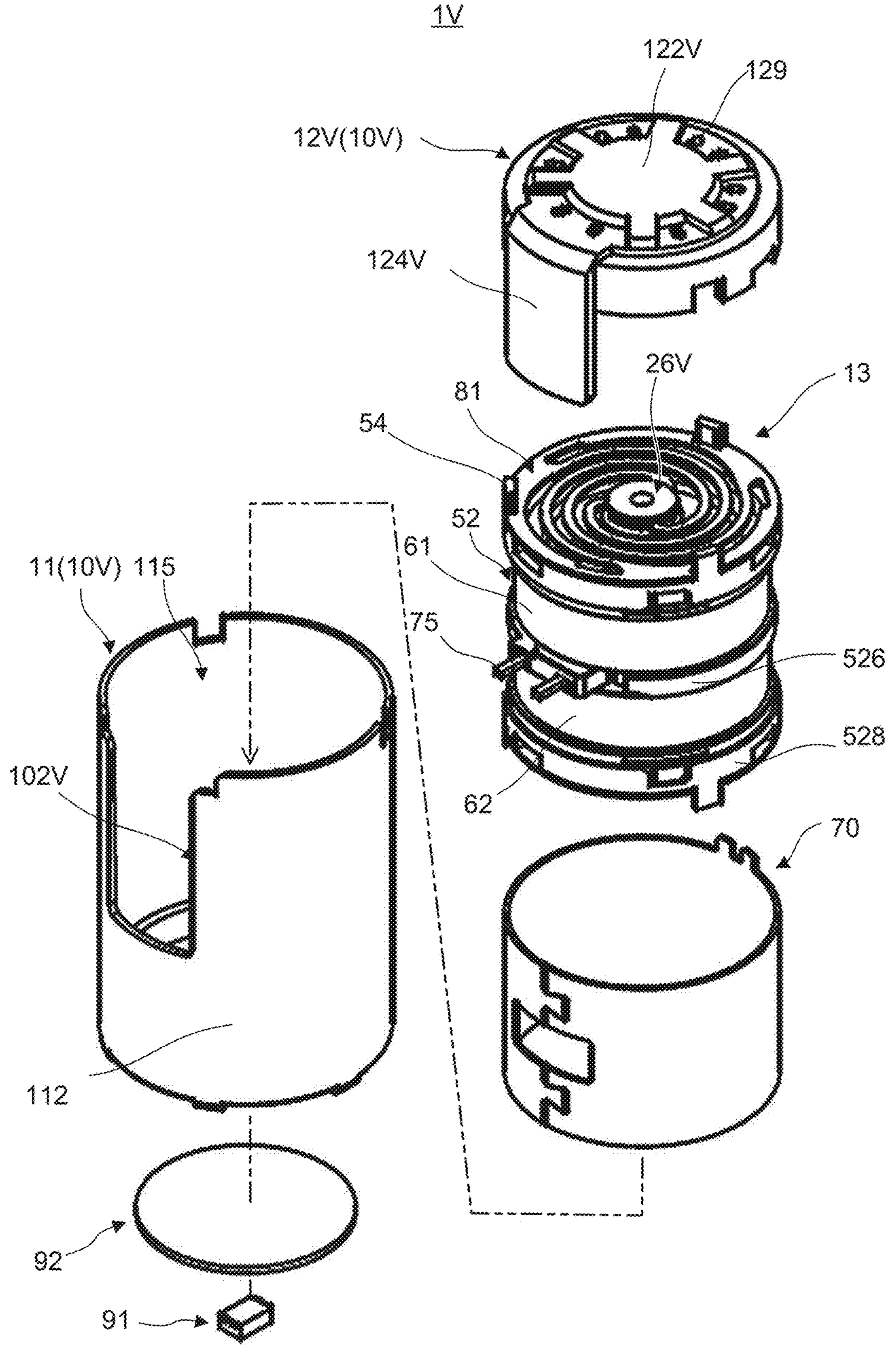
FIG. 63 illustrates an internal structure of the actuator from which a case is removed.
Figure 64:
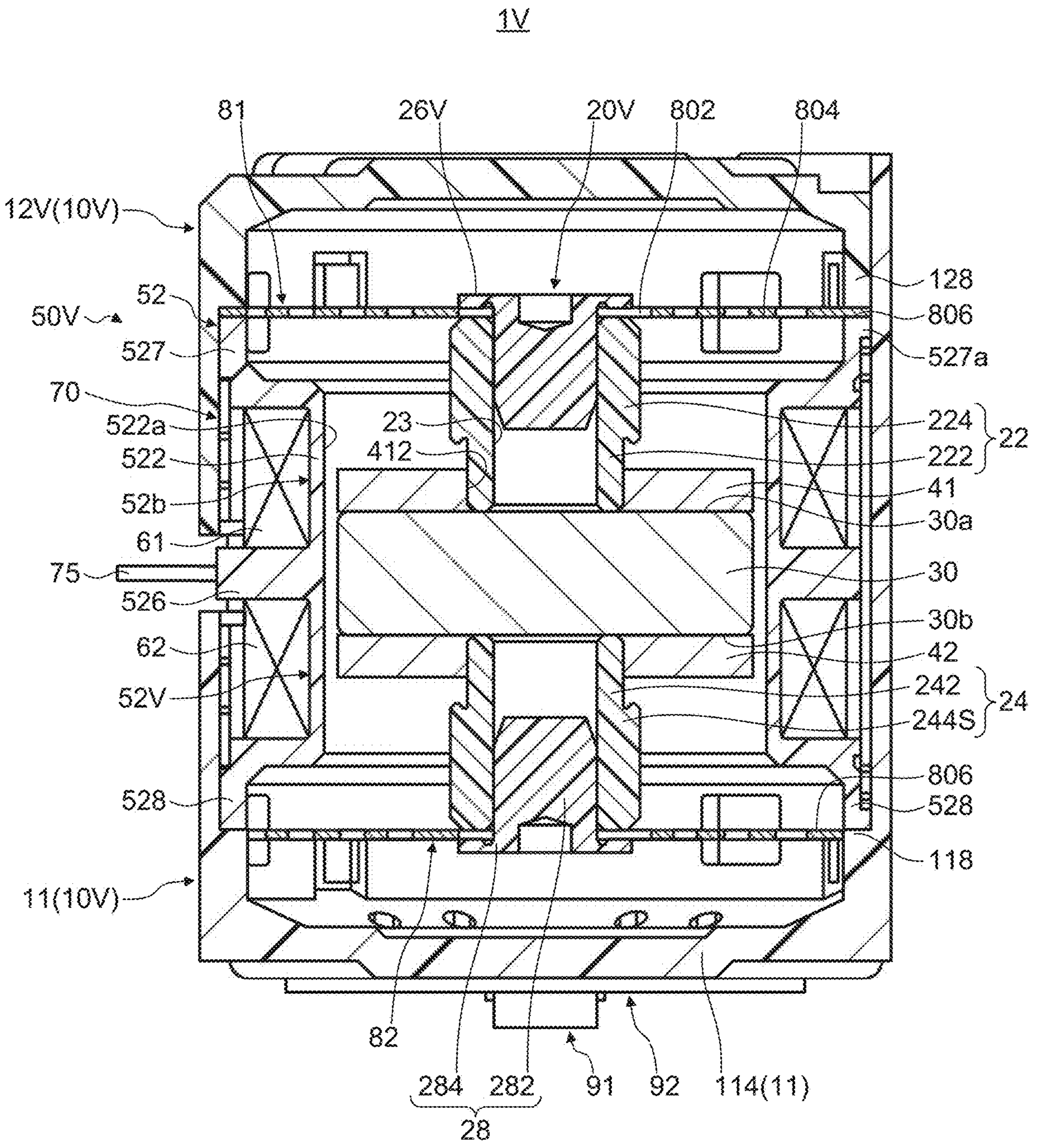
FIG. 64 is a longitudinal sectional view illustrating a configuration of a principal part of the actuator.
Figure 65:
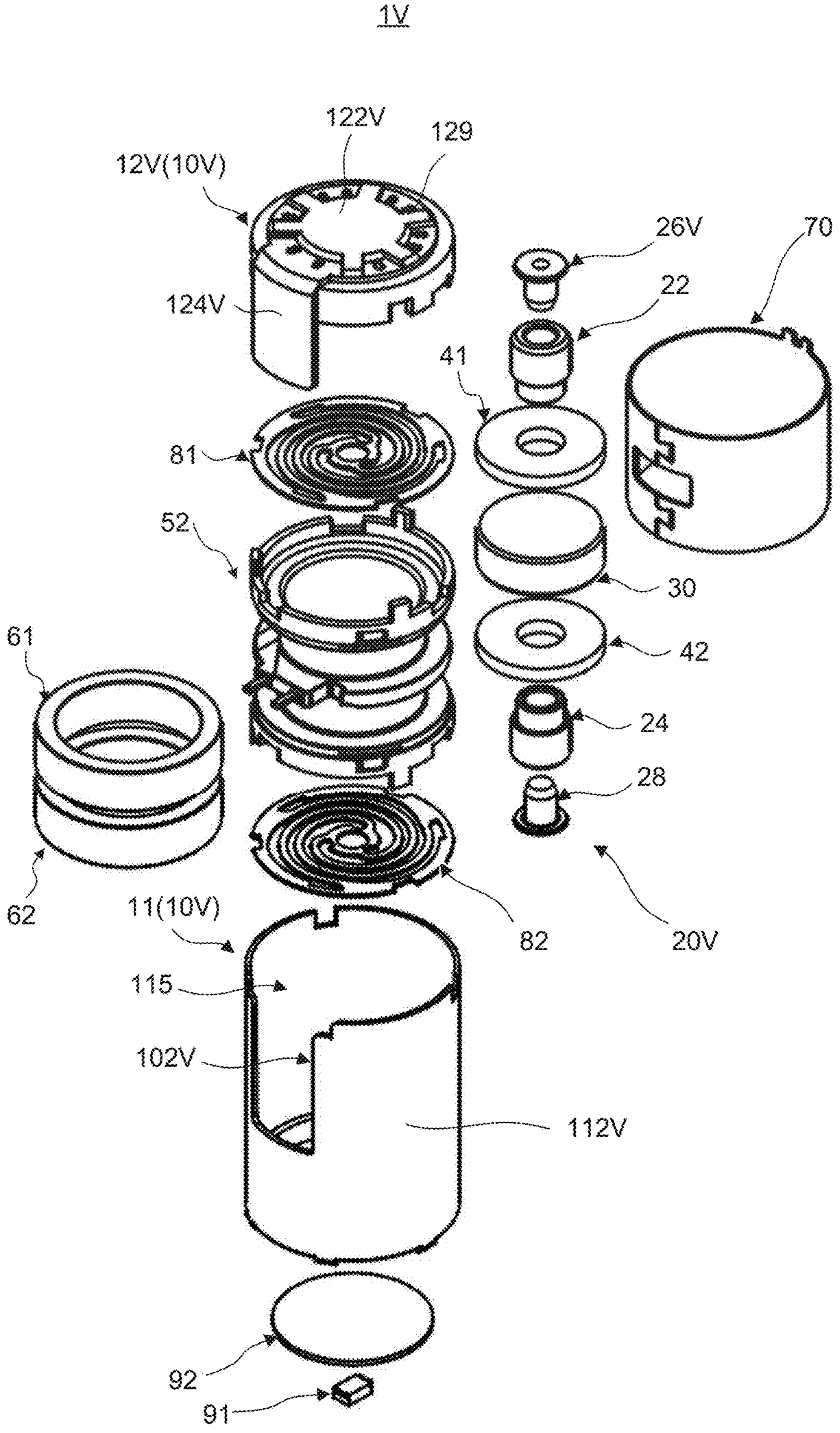
FIG. 65 is an exploded perspective view of the actuator.
Figure 66:
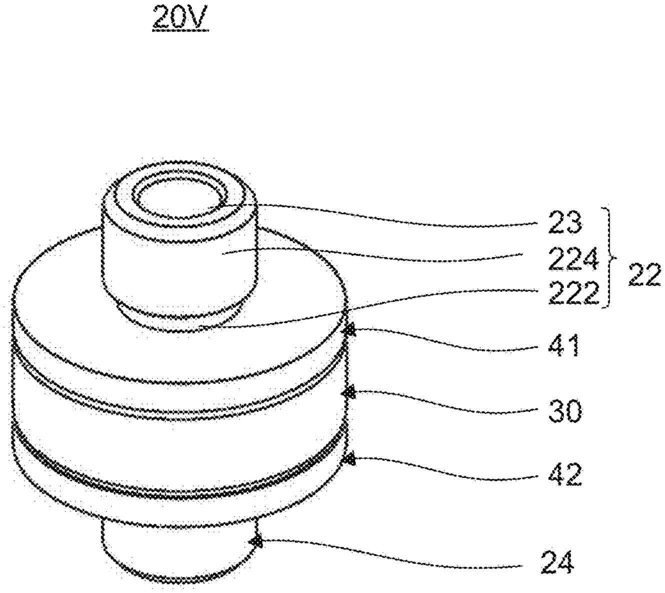
FIG. 66 is a perspective view of the movable body.
Figure 67:
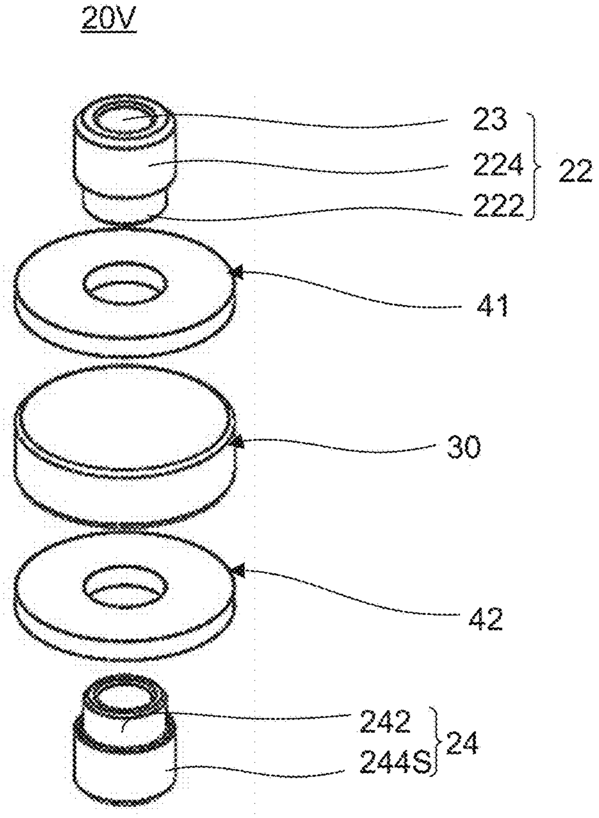
FIG. 67 is an enlarged exploded view of the movable body.
Figure 68:
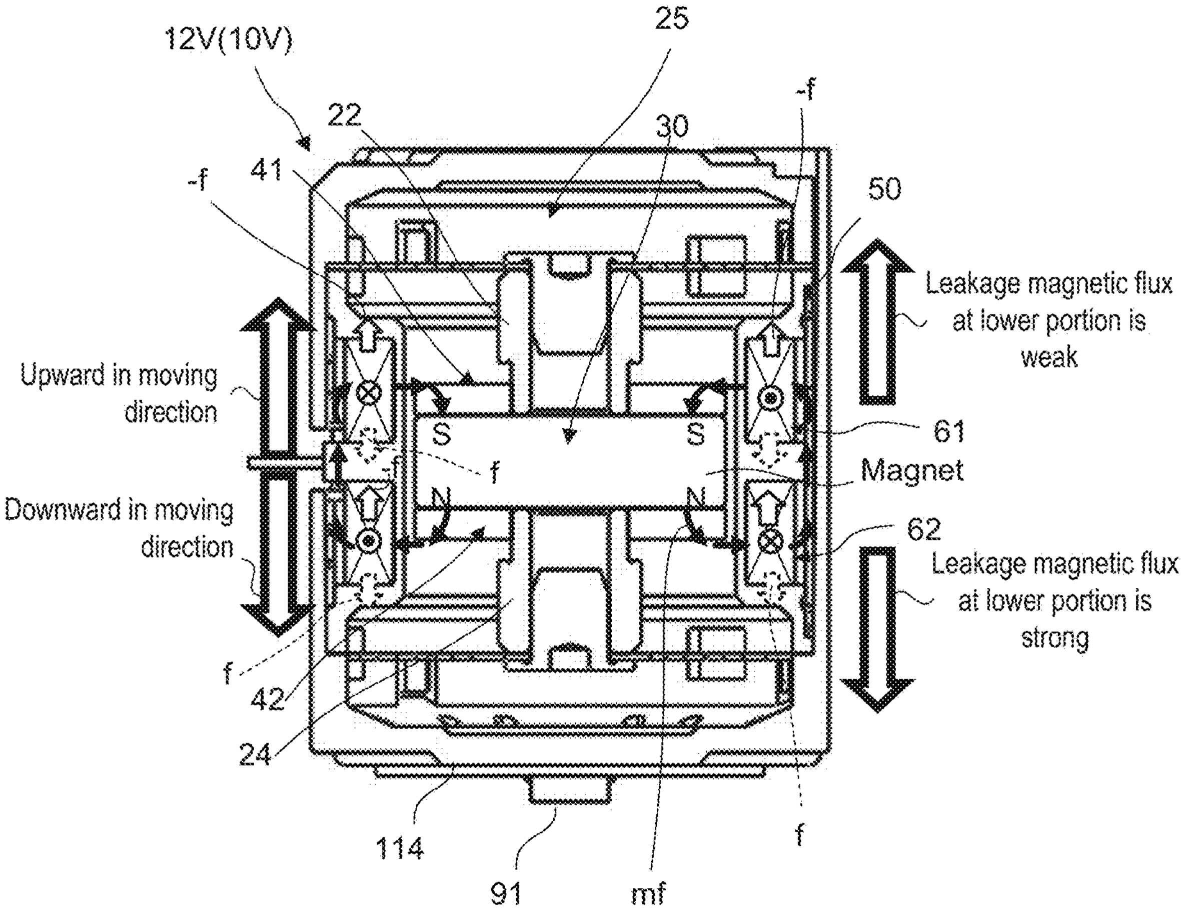
FIG. 68 is a diagram for explaining the operation of the actuator.

FIG. 62 is an external perspective view of an actuator according to Embodiment 6 of the present invention, FIG. 63 illustrates an internal structure of the actuator from which the case is removed, and FIG. 64 is a longitudinal sectional view illustrating a configuration of a principal part of the actuator. Further, FIG. 65 is an exploded perspective view of the actuator, and FIG. 66 is a perspective view of the movable body. In addition, FIG. 67 is an enlarged exploded view of the movable body, and FIG. 68 is a view for explaining the operation of the actuator.

Actuator 1V of Embodiment 6 has the same basic configuration as that of actuator 1S corresponding to Embodiment 3 illustrated in FIG. 48, and the same components as those of Embodiment 3 are denoted by the same reference numerals and the same names, and redundant explanation is omitted. Further, the operation of actuator 1V is illustrated in FIG. 68, which is substantially the same as the basic operation of actuator 1T, and therefore will not be described.

Actuator 1V illustrated in FIGS. 62 to 68 differ from actuator 1S in that there is no output drive shaft, and the other configurations are the same.

Actuator 1V is obtained by modifying in the configuration of actuator 1S such that output shaft portion 25 of movable body 20 is not used and, instead, first spring fixation portion 26V similar to second spring fixation portion 28 is used to sandwich and fix inner circumferential portion 802 of elastic supporting part 81 together with movable body 20V.

That is, actuator 1V is such an actuator as actuator 1S in which movable body 20V including no output shaft portion 25 is accommodated in fixing body 50V including case 10V including no central opening portion 126. Case 10V includes lid portion 12V for closing opening portion 115 of case main body 11, and in lid portion 12V, hanging portion 124V hanging from a part of the outer circumference of lid portion 12V is formed on circumferential wall portion 112 of case main body 11. The hanging portion is attached to case main body 11 while being engaged with cutout portion 102V. In addition, in a capped tubular body portion of lid portion 12V, a plurality of vent holes 129 are formed in top surface portion 122V so as to surround the central portion in the radial direction. Vent holes 129 are disposed between ribs disposed on top surface portion 122V in the radial direction.

Movable body 20 is movably accommodated in case 10V formed as described above. Thus, actuator 1V can be used as a vibration actuator, exciter, or the like.

Embodiment 7

Figure 69:
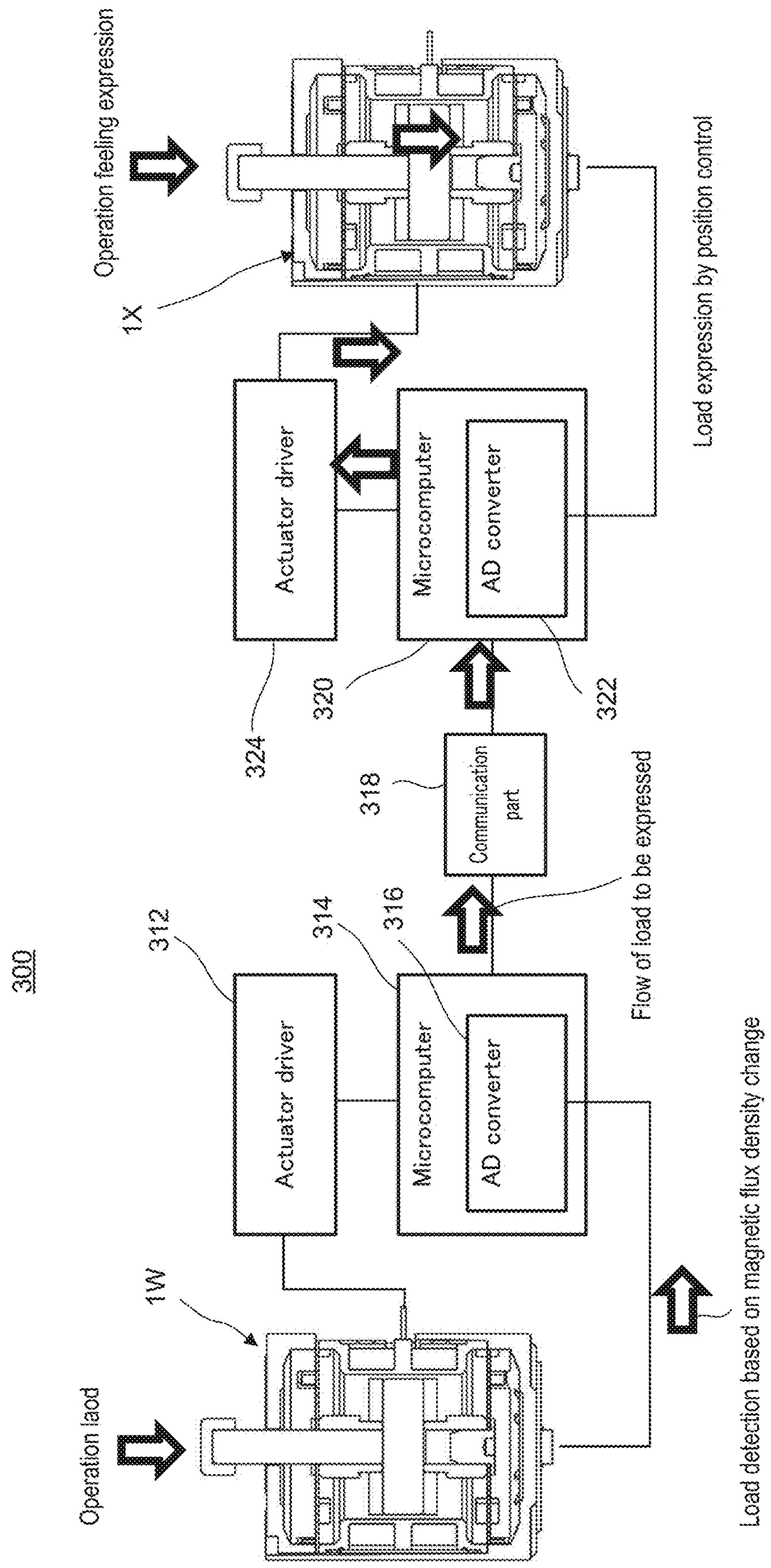
FIG. 69 is a diagram schematically illustrating a configuration of a principal part of a system according to Embodiment 7 of the present invention.

FIG. 69 is a diagram schematically illustrating a configuration of a principal part of system 300 according to Embodiment 7 of the present invention.

System 300 of the present invention uses actuators 1S to 1V as a plurality of devices connected for communication via a communication connection part to be capable of transmitting operational haptic feelings between the actuators. System 300 of the present invention includes, for example, a pair of actuators 1W and 1X, microcomputers 314 and 320 including AD converters 316 and 322 as control parts for respective actuators 1W and 1X, actuator drivers 312 and 324, and communication part 318. As actuators 1W and 1X, actuators 1S to 1V may be appropriately applied.

In this system 300, microcomputers 314 and 320, actuator drivers 312 and 324, and communication part 318 constitute the communication connection part, and the communication connection part can control displacement of the movable body of actuator 1X based on displacement of the movable body of actuator 1W.

Magnetic sensor 91 in actuator (first actuator) 1W functions for load detection, and magnetic sensor 91 in actuator (second actuator) 1X functions for feedback control of the position of movable body 20.

In system 300, when actuator 1W is operated, an operation load is applied to actuator 1W, and magnetic sensor 91 detects the operation load from the change in the magnetic flux density. The detected operation load is outputted via the AD converter to microcomputer 314, which is a control part.

Microcomputer (communication connection part) 314 transmits the inputted load to, for example, different remote actuator 1X via communication part 318 such as a communication network, and performs control for application of the same load. At this time, microcomputer 314 drives actuator 1W via actuator driver 312 to provide the user of actuator 1W with a feedback of the haptic feeling corresponding to the detected load.

Meanwhile, the operation load transmitted via the communication network is input to microcomputer 320 which is a counterpart control part. Microcomputer 320 drives actuator 1X via actuator driver 324 to control the position of movable body 20 to express the load. Thus, in actuator 1X, the operation similar to the operation feeling inputted at actuator 1W can be expressed and presented.

Microcomputer (communication connection part) 314 controls displacement of movable body 20 of actuator 1X based on displacement of movable body 20 of actuator 1W.

As described above, the operation of one actuator 1W is detected by magnetic sensor 91 and presented by the other actuator by the system using a plurality of actuators 1W and 1X, whereby the operational haptic feeling can be transmitted.

As described above, according to system 300, it is possible to realize the transmission of the operational haptic feeling when intention is to be transmitted in a remote operation or a game, so as to achieve an improvement in remote operability and a new type of transmission of intention such as transmission of an operational haptic feeling.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

The embodiment of the present invention has been described above. The above description is an illustration of the preferred embodiment of the present invention, and the scope of the present invention is not limited to the description. That is, the configuration of the device and the shape of each part are merely an example, and it is obvious that various variations and additions to these examples are possible within the scope of the present invention.

The disclosures of Japanese Patent Application No. 2021-211406, filed on Dec. 24, 2021, Japanese Patent Application No. 2021-214759, filed on Dec. 28, 2021, and Japanese Patent Application No. 2021-214748, filed on Dec. 28, 2021, including the specification, drawings and abstract, are incorporated herein by reference in its entirety.

INDUSTRIAL APPLICABILITY

The actuator according to the present invention is useful as an actuator capable of providing a strong haptic feedback to a user in quick response to a user's operation. In addition, the actuator according to the present invention can be easily manufactured at low cost, is easier to use, and has an operation detection function and a haptic feedback function, and is thus useful as an actuator for presenting a haptic feeling or the like.

REFERENCE SIGNS LIST

1, 1A, 1B, 1C, 1D, 1E, 1F, 1G, 1H, 1J, 1K, 1L, 1M, 1N, 1P, 1Q, 1S, 1T, 1U, 1V, 1W, 1X,
100 Actuator
10, 10A, 10B, 1C, 10D, 10J, 10K, 10L, 10M, 10T, 10V Case
11, 11T Case main body
12 Lid portion
13 Unit

20, 20A, 20B, 20C, 20D, 20F, 20J, 20K, 20L, 20M, 20P, 20V Movable body
20*a* Outer circumferential surface
22, 22A, 22B, 22C, 22D First spring retaining part (spring retaining part)
23, 23B, 23C, 23K, 23L Opening portion
23S Through-hole
24, 24A, 24B, 24C, 24D, 24J, 24K, 24L, 24M Second spring retaining part (spring retaining part)
25, 25A, 25B, 25C, 25D, 25F, 25J, 25K, 25L, 25M, 25P Protruding part
25S Output shaft portion
26 First spring fixation portion (spring fixation portion)
26V Spring fixation portion
28 Second spring fixation portion
29 Cap
30, 30F, 30P Magnet
30*a* Front surface
30*b* Back surface
41, 41B, 41C, 41D, 41K, 41L, 41M, 42 Yoke
50, 500 Fixing body
52 Coil holding part
52*b* Coil attachment portion
52*c* Coil attachment portion
54 Movable-range forming portion
61, 62 Coil
70 Outer yoke
75 Terminal part
78 Damping part
81, 81E, 82E, 81N, 82N, 82 Elastic supporting part (leaf spring)
91, 91T Magnetic sensor
92 Circuit board (control part)
102 Cutout portion
112 Circumferential wall portion
114, 114T Bottom portion
115, 310, 412, 422 Opening portion
116 Bottom-surface recessed portion
117 Surface recessed-portion edge
118 Step portion
122, 1220 Top surface portion
124 Projecting portion
126, 1260 Central opening portion
128 Pressing portion
202, 205 Shaft unit
203, 204 Sleeve unit
222, 222A, 222D, 222J, 222M, 242 Joint portion
224, 224A, 224B, 224C, 224D, 244, 244A, 224J, 224K, 224L, 224M, 244, 244J Connection portion
252, 252A, 252B, 252C, 252D, 252F, 252J, 252K, 252L, 252M, 252P Output shaft portion
254 Cap
255 Shaft portion
258 Flange portion
282 Insertion portion
284 Flange
300 System
312, 324 Actuator driver
314, 320 Microcomputer
316, 322 Converter
318 Communication part
412, 422 Opening portion
522 Holding-portion main body
522*a* Inner circumferential surface
526 Middle flange portion (flange portion)
527 Flange portion
527*a*, 528*a* End surface
528 Flange portion
782 Elastic push-in portion
784 Flange
802 Inner circumferential portion
804 Deformation arm portion
806 Outer circumferential fixing portion

The invention claimed is:

1. An actuator, comprising:
a movable body including:
a disk-shaped magnet,
a pair of disk-shaped yokes fixed to front and back surfaces of the disk-shaped magnet,
a pair of spring retaining parts each connected at one end to the disk-shaped yokes, respectively, and connected at an other end to central portions of circular leaf springs, respectively, and
a protruding part protruding in an axial direction of the disk-shaped magnet from the other end of one spring retaining part of the pair of spring retaining parts; and
a fixing body including:
a coil disposed at an outer circumference of the movable body, and
a case including an opening portion through which the protruding part is inserted, the case accommodating the coil and the movable body such that a protruding end side of the protruding part protrudes to an outside, the fixing body being configured to support the movable body movably in the axial direction of the disk-shaped magnet via the circular leaf springs, wherein
a position detecting part including a magnetic sensor configured to detect a magnetic flux of the movable body is disposed on an outer surface of the case.

2. The actuator according to claim 1, wherein
the opening portion is formed to provide a gap between the opening portion and an outer circumference of the protruding part such that the protruding part moves in a non-contact manner.

3. The actuator according to claim 1, wherein
the opening portion supports an outer circumference of the protruding part so as to allow forward/backward movement of the protruding end side in the axial direction in the outside.

4. The actuator according to claim 2, wherein
the gap between the protruding part and the opening portion is equal to or less than a dimension between an outer shape of the movable body and an inner diameter of the fixing body.

5. The actuator according to claim 3, wherein
the opening portion is formed in a sliding member separate from a case main body accommodating the movable body together with the coil.

6. The actuator according to claim 3, wherein
a portion of the case in which the opening portion is formed is formed from a polyacetal resin.

7. The actuator according to claim 5, wherein
the sliding member is an oil-impregnated sliding bearing.

8. The actuator according to claim 1, wherein
the disk-shaped yokes include, at central portions, central opening portions in which the one end of the spring retaining parts are respectively inserted, and that position the spring retaining parts on the axis.

9. The actuator according to claim 1, wherein
the disk-shaped yokes, the spring retaining parts, and the protruding part are parts separate from one another.

10. The actuator according to claim 1, wherein at least two or more of the disk-shaped yokes, the spring retaining parts, and the protruding part are integrally formed.

11. The actuator according to claim 1, wherein at least one of the spring retaining parts and the protruding part is formed from a non-magnetic material.

12. The actuator according to claim 1, wherein one of the circular leaf springs is sandwiched by one of the spring retaining parts and a press-fit ring externally fitted to the protruding part.

13. The actuator according to claim 1, wherein the disk-shaped yokes, the spring retaining parts, and the protruding part are formed as a single part from a same magnetic material.

14. The actuator according to claim 1, wherein the circular leaf springs are provided with a damping member.

15. The actuator according to claim 1, wherein:

the disk-shaped magnet, the disk-shaped yokes, and the spring retaining parts are provided respectively with through-holes into which the protruding part is inserted, and the protruding part is fixed to the disk-shaped magnet, the disk-shaped yokes, and the spring retaining parts at the through-holes, and protrudes from one of the spring retaining parts.

16. The actuator according to claim 1, further comprising:

a movable-body position-speed detecting part disposed on one of a plurality of case surface portions of the case facing each other in a moving direction of the movable body, the one case surface portion being opposite another surface portion including the opening portion, the movable-body position-speed detecting part being configured to detect a magnetic flux of the movable body.

17. The actuator according to claim 1, wherein a resonance frequency of the movable body is from 30 Hz through 500 Hz.

18. An actuator, comprising:

a movable body including:

a disk-shaped magnet, a pair of disk-shaped yokes fixed to front and back surfaces of the disk-shaped magnet, a pair of spring retaining parts each connected at one end to the disk-shaped yokes, respectively, and connected at the other end to central portions of circular leaf springs, respectively, and a protruding part protruding in an axial direction of the disk-shaped magnet from the other end of one spring retaining part of the pair of spring retaining parts; and a fixing body including:

a coil disposed at an outer circumference of the movable body, and a case including an opening portion through which the protruding part is inserted, the case accommodating the coil and the movable body such that a protruding end side of the protruding part protrudes to an outside, the fixing body being configured to support the movable body movably in the axial direction of the disk-shaped magnet via the circular leaf springs, wherein the movable body is configured to present an output perceptible by a user, when the movable body is driven in response to a movement of the movable body by operation of the user, the fixing body includes a magnetic sensor configured to detect a position of the movable body that moves by the operation, and the coil for moving the movable body by generating a magnetic field by energization based on a detection result of the magnetic sensor, and the magnetic sensor is disposed on the fixing body apart from the movable body in a moving direction of the movable body.

19. The actuator according to claim 18, wherein the magnetic sensor is disposed on or near a central axis extending in the moving direction of the movable body.

20. The actuator according to claim 18, wherein the fixing body includes an inhibitory portion disposed between the magnetic sensor and the movable body, and configured to inhibit contact between the movable body and the magnetic sensor.

21. The actuator according to claim 18, wherein:

the fixing body includes a case accommodating the coil and the movable body, and the magnetic sensor is disposed on an outer surface of the case disposed apart from the movable body in the moving direction of the movable body.

22. The actuator according to claim 21, wherein a lower surface of the case is formed from a non-magnetic material.

23. The actuator according to claim 18, wherein the magnetic sensor includes a Hall element.

24. The actuator according to claim 18, wherein a magnetization direction of the magnet is parallel to the moving direction.

25. The actuator according to claim 24, wherein the coil is disposed to surround the movable body, and generates the magnetic field so as to cause the movable body to move along the moving direction of the movable body moved by the operation.

26. The actuator according to claim 18, wherein the fixing body includes a magnetic shield surrounding the coil on an outer circumferential side of the coil.

27. The actuator according to claim 18, wherein the movable body is provided with a protruding part that protrudes in one direction of the moving direction of the movable body and that is movable forward and backward outside the fixing body.

28. The actuator according to claim 27, further comprising:

a control part configured to control movement of the movable body by energizing the coil in response to the detection result obtained by the magnetic sensor detecting an operation load received by the movable body via the protruding part.

29. The actuator according to claim 18, wherein the fixing body further includes a pair of elastic supporting parts disposed on opposite sides of the movable body in the moving direction and configured to movably support the movable body in the moving direction.

30. The actuator according to claim 29, wherein the pair of elastic supporting parts is provided with a damping part for damping vibration.

31. The actuator according to claim 29, wherein the movable body is provided with a protruding part that protrudes in one direction of the moving direction of the movable body to a side of one of the elastic supporting parts opposite the magnet and is movable forward and backward outside the fixing body.

32. A system, comprising:

a first actuator and a second actuator, each of which is the actuator according to claim 18; and a communication connection part configured to connect between the first actuator and the second actuator for communication, wherein the communication connection part controls a displacement of the movable body of the second actuator based on a displacement of the movable body of the first actuator.

* * * * *